(12) United States Patent
Duescher

(10) Patent No.: US 7,520,800 B2
(45) Date of Patent: Apr. 21, 2009

(54) RAISED ISLAND ABRASIVE, LAPPING APPARATUS AND METHOD OF USE

(76) Inventor: Wayne O. Duescher, 951 County Rd. C2 West, Roseville, MN (US) 55113

(*) Notice: Subject to any disclaimer, the term of this patent is extended or adjusted under 35 U.S.C. 154(b) by 727 days.

(21) Appl. No.: 10/816,275

(22) Filed: Aug. 16, 2004

(65) Prior Publication Data

US 2005/0032469 A1 Feb. 10, 2005

Related U.S. Application Data

(63) Continuation-in-part of application No. 10/824,107, filed on Apr. 14, 2004, which is a continuation-in-part of application No. 10/418,257, filed on Apr. 16, 2003, now abandoned.

(51) Int. Cl.
*B24D 3/28* (2006.01)
(52) U.S. Cl. ........................ 451/527; 451/530
(58) Field of Classification Search .................. 451/526, 451/527, 529, 530, 550, 56, 41
See application file for complete search history.

(56) References Cited

U.S. PATENT DOCUMENTS

| | | | |
|---|---|---|---|
| 794,495 A | 7/1905 | Gorton et al. | 451/529 |
| 1,657,784 A | 1/1928 | Bergstrom | 51/295 |
| 1,896,946 A | 2/1933 | Gauss | 451/527 |
| 1,924,597 A | 8/1933 | Drake | 451/550 |
| 1,941,962 A | 1/1934 | Tone | 5/295 |
| 2,001,911 A | 5/1935 | Wooddell et al. | 451/529 |
| 2,108,645 A | 2/1938 | Bryant | 427/204 |
| 2,115,897 A | 5/1938 | Wooddell et al. | 451/529 |
| 2,216,728 A | 10/1940 | Benner et al. | 51/298 |
| 2,242,877 A | 5/1941 | Albertson | 451/527 |
| 2,252,683 A | 8/1941 | Albertson | 51/298 |
| 2,292,261 A | 8/1942 | Albertson | 451/527 |
| 2,755,607 A | 7/1956 | Haywood | 451/527 |
| 2,820,746 A | 1/1958 | Keeleric | 205/114 |
| 2,838,890 A | 6/1958 | McIntyre | 451/527 |
| 2,907,146 A | 10/1959 | Dyar | 451/529 |
| 3,048,482 A | 8/1962 | Hurst | 51/298 |
| 3,121,298 A | 2/1964 | Mellon | 451/539 |
| 3,246,430 A | 4/1966 | Hurst | 451/534 |
| 3,423,489 A | 1/1969 | Arens et al. | 264/4 |

(Continued)

FOREIGN PATENT DOCUMENTS

WO WO 95/00295 1/1995

OTHER PUBLICATIONS

"Superabrasives and Microfinishing Systems" Product Guide. 3M, 1994, 60-4400-4692-2 (104.3) JR.

*Primary Examiner*—Robert Rose
(74) *Attorney, Agent, or Firm*—Mark A. Litman & Associates, P.A.

(57) ABSTRACT

Flexible abrasive sheet materials having annular bands of precise height flat-topped raised island structures that are coated with a mono layer of abrasive particles or abrasive agglomerates, processes for manufacture of the abrasive sheet materials, processes for using the abrasive sheeting in high speed lapping/abrading processes, and apparatus for using the abrasive sheeting are described. The process for manufacturing the abrasive sheeting provides an economical method for providing an improved configuration of abrasive sheeting that can provide precisely flat workpiece surfaces that are also highly polished.

26 Claims, 79 Drawing Sheets

U.S. PATENT DOCUMENTS

| | | | |
|---|---|---|---|
| 3,605,349 A | 5/1969 | Anthon | 451/534 |
| 3,495,362 A | 2/1970 | Hillenbrand | 451/527 |
| 3,498,010 A | 3/1970 | Hagihara | 451/527 |
| 3,517,466 A | 6/1970 | Bouvier | 451/466 |
| 3,702,043 A | 11/1972 | Welbourn et al. | 451/213 |
| 3,709,706 A | 1/1973 | Sowman | 501/103 |
| 3,711,025 A | 1/1973 | Miller | 239/222.11 |
| 3,859,407 A | 1/1975 | Blanding et al. | 241/3 |
| 3,916,584 A | 11/1975 | Howard et al. | 51/308 |
| 3,921,342 A | 11/1975 | Day | 451/550 |
| 3,933,679 A | 1/1976 | Weitzel et al. | 252/635 |
| 3,991,527 A | 11/1976 | Maran | 451/529 |
| 4,018,576 A | 4/1977 | Lowder et al. | 51/309 |
| 4,038,046 A | 7/1977 | Supkis | 51/295 |
| 4,111,666 A | 9/1978 | Kalbow | 51/295 |
| 4,112,631 A | 9/1978 | Howard et al. | 51/295 |
| 4,225,322 A | 9/1980 | Knemeyer | 51/295 |
| 4,251,408 A | 2/1981 | Hesse et al. | 524/541 |
| 4,256,467 A | 3/1981 | Gorsuch | 51/295 |
| 4,272,926 A | 6/1981 | Tamulevich | 51/216 |
| 4,311,489 A | 1/1982 | Kressner | 51/298 |
| 4,314,827 A | 2/1982 | Leitheiser et al. | 51/298 |
| 4,315,720 A | 2/1982 | Ueda et al. | 425/8 |
| 4,327,156 A | 4/1982 | Dillon et al. | 428/568 |
| 4,341,439 A | 7/1982 | Hodge | 350/96.22 |
| 4,364,746 A | 12/1982 | Bitzer et al. | 51/298 |
| 4,373,672 A | 2/1983 | Morishita et al. | 239/703 |
| 4,393,021 A | 7/1983 | Eisenberg et al. | 264/143 |
| 4,421,562 A | 12/1983 | Sands | 106/603 |
| 4,426,484 A | 1/1984 | Saeki et al. | 524/541 |
| 4,541,566 A | 9/1985 | Kijima et al. | 239/224 |
| 4,541,842 A | 9/1985 | Rostoker | 51/296 |
| 4,586,292 A | 5/1986 | Carroll et al. | 451/329 |
| 4,652,275 A | 3/1987 | Bloecher et al. | 51/298 |
| 4,710,406 A | 12/1987 | Fugier et al. | 427/389.8 |
| 4,773,599 A | 9/1988 | Lynch et al. | 241/69 |
| 4,776,862 A | 10/1988 | Wigand | 51/293 |
| 4,863,573 A | 9/1989 | Moore et al. | 205/50 |
| 4,903,440 A | 2/1990 | Kirk et al. | 51/298 |
| 4,918,874 A | 4/1990 | Tiefenbach, Jr. | 51/293 |
| 4,930,266 A | 6/1990 | Calhoun et al. | 51/293 |
| 4,931,414 A | 6/1990 | Woode et al. | 501/103 |
| 4,974,373 A | 12/1990 | Kawashima et al. | 51/295 |
| 5,015,266 A | 5/1991 | Yamamoto | 51/293 |
| 5,020,283 A | 6/1991 | Tuttle | 451/550 |
| 5,090,968 A | 2/1992 | Pellow | 51/293 |
| 5,107,626 A | 4/1992 | Mucci | 451/28 |
| 5,108,463 A | 4/1992 | Buchanan | 51/295 |
| 5,110,659 A | 5/1992 | Yamakawa et al. | 428/141 |
| 5,127,197 A | 7/1992 | Brukvoort et al. | 51/204 |
| 5,137,542 A | 8/1992 | Buchanan et al. | 51/295 |
| 5,142,829 A | 9/1992 | Germain | 451/537 |
| 5,152,917 A | 10/1992 | Pieper et al. | 51/295 |
| 5,175,133 A | 12/1992 | Smith et al. | 501/127 |
| 5,190,568 A | 3/1993 | Tselesin | 51/293 |
| 5,199,227 A | 4/1993 | Ohishi | 451/527 |
| 5,201,916 A | 4/1993 | Berg | 51/293 |
| 5,219,462 A | 6/1993 | Bruxvoort et al. | 51/293 |
| 5,221,291 A | 6/1993 | Imatani et al. | 51/293 |
| 5,232,470 A | 8/1993 | Wiand | 51/295 |
| 5,251,802 A | 10/1993 | Bruxvoort et al. | 228/121 |
| 5,273,805 A | 12/1993 | Calhoun | 428/156 |
| 5,297,364 A | 3/1994 | Tuttle | 451/527 |
| 5,304,225 A | 4/1994 | Gardziella et al. | 51/298 |
| 5,318,604 A | 6/1994 | Gorsuch et al. | 51/293 |
| 5,368,618 A | 11/1994 | Masmar et al. | 51/295 |
| 5,397,369 A | 3/1995 | Ohishi | 51/295 |
| 5,437,754 A | 8/1995 | Calhoun | 156/231 |
| 5,489,204 A | 2/1996 | Conwell et al. | 432/153 |
| 5,496,386 A | 3/1996 | Broberg et al. | 51/293 |
| 5,549,961 A | 8/1996 | Haas et al. | 428/143 |
| 5,549,962 A | 8/1996 | Holmes et al. | 428/144 |
| 5,551,961 A | 9/1996 | Engen et al. | 51/298 |
| 5,611,825 A | 3/1997 | Engen et al. | 51/295 |
| 5,674,122 A | 10/1997 | Krech | 451/536 |
| 5,733,175 A | 3/1998 | Leach | 451/41 |
| 5,820,450 A | 10/1998 | Calhoun | 451/530 |
| 5,888,121 A | 3/1999 | Kirchner et al. | 451/41 |
| 5,888,548 A | 3/1999 | Wongsuragrai et al. | 424/489 |
| 5,910,041 A | 6/1999 | Duescher | 451/28 |
| 5,910,471 A | 6/1999 | Christianson et al. | 51/295 |
| 5,924,917 A | 7/1999 | Benedict et al. | 451/526 |
| 5,967,882 A | 10/1999 | Duescher | 451/57 |
| 5,975,988 A | 11/1999 | Christianson | 451/28 |
| 5,993,298 A | 11/1999 | Duescher | 451/56 |
| 6,017,265 A | 1/2000 | Cook et al. | 451/41 |
| 6,048,254 A | 4/2000 | Duescher | 451/28 |
| 6,080,215 A | 6/2000 | Stubbs et al. | 51/295 |
| 6,099,390 A | 8/2000 | Nishio et al. | 451/36 |
| 6,102,777 A | 8/2000 | Duescher et al. | 451/36 |
| 6,120,352 A | 9/2000 | Duescher | 451/41 |
| 6,149,506 A | 11/2000 | Duescher | 451/59 |
| 6,168,508 B1 | 1/2001 | Nagahara et al. | 451/527 |
| 6,186,866 B1 | 2/2001 | Gagliardi | 451/28 |
| 6,217,413 B1 | 4/2001 | Christianson | 451/28 |
| 6,228,133 B1 | 5/2001 | Thurber et al. | 51/295 |
| 6,231,629 B1 | 5/2001 | Christianson et al. | 51/295 |
| 6,277,160 B1 | 8/2001 | Stubbs et al. | 51/295 |
| 6,299,508 B1 | 10/2001 | Galiardi et al. | 451/28 |
| 6,319,108 B1 | 11/2001 | Adefris et al. | 451/533 |
| 6,371,842 B1 * | 4/2002 | Romero | 451/540 |
| 6,521,004 B1 | 2/2003 | Culler | 51/298 |
| 6,537,140 B1 | 3/2003 | Miller et al. | 451/259 |
| 6,540,597 B1 | 4/2003 | Ohmori | 451/443 |
| 6,551,366 B1 | 4/2003 | D'Souza et al. | 51/309 |
| 6,602,439 B1 | 8/2003 | Hampden-Smith et al. | 252/79.1 |
| 6,613,113 B2 | 9/2003 | Minick et al. | 51/298 |
| 6,620,214 B2 | 9/2003 | McArdle et al. | 51/298 |
| 6,645,624 B2 | 11/2003 | Adefris et al. | 428/402 |
| 2002/0003225 A1 | 1/2002 | Hampden-Smith et al. | 252/79.1 |
| 2003/0022604 A1 * | 1/2003 | Annen et al. | 451/59 |
| 2003/0143938 A1 | 7/2003 | Braunschweig et al. | 451/533 |
| 2003/0207659 A1 | 11/2003 | Annen et al. | 45/526 |

* cited by examiner

A.)

B.)

A.)

B.)

A.)

B.)

A.)

B.)

A.)

B.)

A.)

B.)

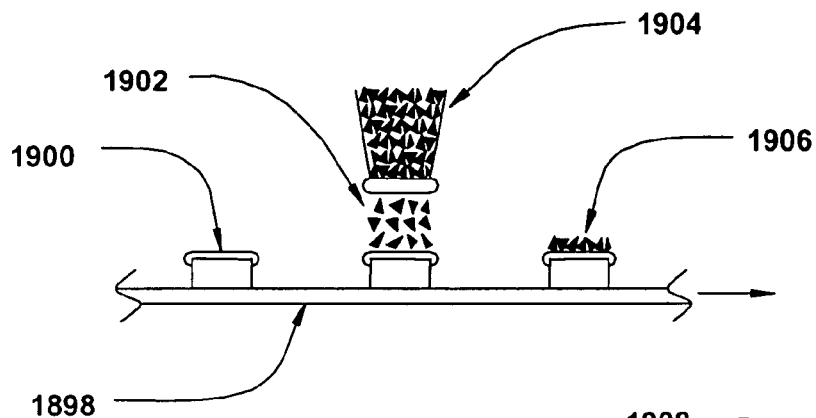
FIG. 98
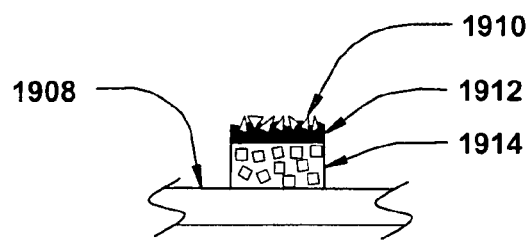
FIG. 99
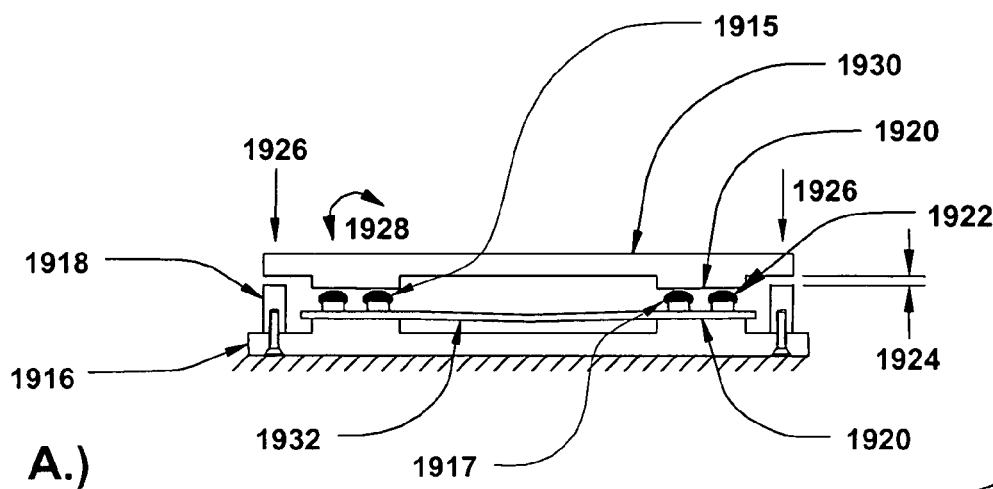
A.)
FIG. 100
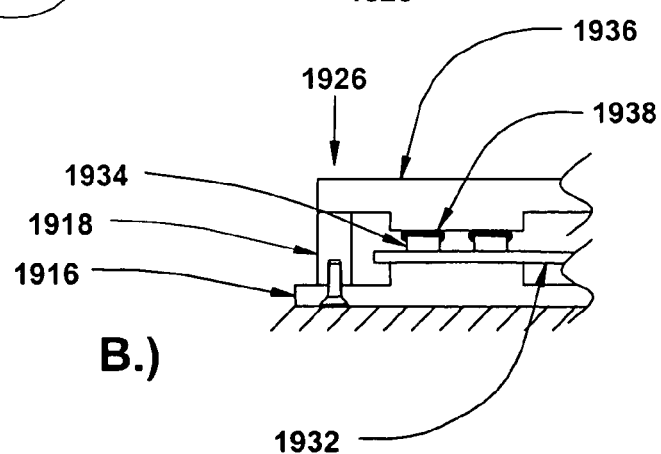
B.)

A.)

B.)

A.)

RAISED ISLAND ABRASIVE, LAPPING APPARATUS AND METHOD OF USE

CROSS REFERENCE TO RELATED APPLICATION

This invention is a continuation-in-part of U.S. patent application Ser. No. 10/824,107, filed Apr. 14, 2004, which in-turn is a a continuation-in-part of U.S. patent application Ser. No. 10/418,257, filed Apr. 16, 2003, now abandoned, and which applications are incorporated herein by reference.

BACKGROUND OF THE ART

1. Field of the Invention

The present invention relates to a new class of precision flat and precision thickness abrasive media, processes for using the abrasive media, and apparatus for practicing processes with the abrasive media. The media are thin flexible abrasive sheeting used for grinding, flat lapping, polishing, finishing or smoothing of workpiece surfaces. In particular, the present invention relates to such processes and apparatus that use removable or replaceable sheeting having abrasive particle or abrasive agglomerate coated raised islands formed in annular bands that are able to operate at high surface speeds, and apparatus that secures the abrasive sheeting to a supporting platen. The support may optionally move the sheeting at those high speeds (preferably without the use of adhesive layers between the sheeting and the support). The apparatus, processes and abrasive media provide a high degree of control over the contact area or contact plane of the abrasive sheeting and the article that is to be lapped, polished, finished or smoothed. Uniform wear of the abrasive is experienced across the full annular band of abrasive material that allows a continuously flat abrasive surface to be presented to a workpiece. Also, the disks having narrow annular band of abrasive reduces areas of uneven wear material removal rates compared to conventional disks. Abrasive articles including sheets, long strips, and circular disks without annular bands all can have abrasive particle coated raised island structures that are attached to flexible backing materials can all be manufactured with abrasive island surfaces that are located in a common plane that is precisely parallel to the back mounting surface of the backing sheet. All of these abrasive articles having thin coatings of abrasive particles or abrasive agglomerates can be used at high and slow abrading surface speeds where all or most of the abrasive particles are utilized in grinding or lapping flat workpiece surfaces. Hydroplaning of the workpiece does not occur as a large proportion of the abrasive coolant water can pass between the raised island structures. The precision thickness control of the backing sheet abrasive articles assures that all of the abrasive material contacts a flat workpiece.

2. Background of the Invention

High speed lapping and grinding using fixed abrasive on sheet disks for both rough grinding and smooth polishing is now a practical reality. Most performance issues relate to two primary concerns, 1) hydroplaning caused by water lubricant and 2) vibrations created by grinding machine component dimensional inaccuracies and thickness variations of abrasive disks along their tangential surfaces. Unique answers for the first problem of hydroplaning have been defined, numerous solutions have been created and most of these solutions have been implemented or evaluated.

High quality abrasive article sheets that have certain important characteristics that are necessary for high speed flat lapping are not presently available in the marketplace. The sheets should be of a sufficient dimension (e.g., at least a 6 inch (15.2 cm) diameter, at least a 12 inch (30.5 cm) diameter, or at least an 18 inch (45.7 cm) or larger diameter, and have islands comprising abrasive structures (preferably secured to a substrate and preferably arranged in an annular band). The structures have an uppermost abrasive surface that is extremely flat and of uniform thickness. Conventional flat surface grinding or lapping platens are set up to use the full surface area of a circular shaped flat flexible sheet of abrasive. However, the abrasive contact surface speed of the rotating disk varies from a maximum speed at the outer radius to zero at the innermost center at the disk (where the radius is zero). The grinding material removal rate is roughly proportional to the surface speed of the moving abrasive, so that most of the grinding or lapping action, and the most efficient grinding or lapping action occurs at the outer portion of a rotating disk. Not only is the inside portion of the abrasive disk not used to remove workpiece surface material, but also this portion of the abrasive is not worn down by the workpiece, resulting in a shallow, cone shape of the abrasive disk surface. This uneven wear continues with usage of the disk, with the cone angle progressively increasing to a sharper angle. This cone angle is translated to the surface of the workpiece that is intended for rigid axis lapping of a workpiece and prevents precision flatness grinding of the workpiece, transferring uneven surface contour to the workpiece surface. An effective answer to this uneven wear is to create an abrasive disk with a narrow annular band of abrasive material (at the outer edges of the annulus), allowing the abrasive to wear down more evenly across the full surface of the abrasive disk (which is essentially the annulus, not a continuous circular surface) as the disk is used. This type of media is not available commercially and probably would not be with present production methods. This is because the continuous method of manufacturing abrasive disks cannot technically or economically produce the necessary annular configuration. Presently, an important method of manufacturing a circular abrasive sheets is to coat a continuous web backing with diamond particles or abrasive agglomerates to form a coated sheet material and then to punch out round disks from the coated sheet material. Effectively, most of the expensive inner surface area of these disks is wasted. If a conventional coated disk is used with a platen having an outer raised annular ring, then all of the abrasive coated area located at a radius inside the ring is not used as it does not contact the workpiece surface.

Furthermore, it is not practical to punch out radial rings from a coated web sheet for a number of reasons. First, there is not necessarily a ready market for the smaller disk that remains left over from the center punch-out for the annular ring. Also, there is a large waste of coated web material left over between the circular disks that are cut out, even with proficient "nesting" of the circular rings. Furthermore, the annular ring of coated abrasives made of thin 0.005 inch (0.127 mm) thick polyester web has limited structural body strength for handling and mounting so that it cannot be practically used on a platen without creating many problems, including the problem that water and grinding swarf tend to collect under the inside edge of the loose annular ring sheet. Furthermore, round or bar raised-abrasive islands having a thin top coating of expensive diamond particles are needed to compensate for hydroplaning affects at high surface speed lapping. The only island type of abrasive media now available which can reduce hydroplaning is a diamond particle metal plated Flexible Diamond Products abrasive sheet supplied by the 3M Company (Minnesota Mining and Manufacturing Co.). Disk shapes of this abrasive media is created by cutting circular shapes from a rectangular sheet of this material.

However, due to the manufacturing process of this product, the product is commercially limited by at least two counts. First, each disk has large variations in flatness, or thickness, and, due to its unique construction, cannot be made flat enough to use effectively at high speeds where the unevenness is accentuated by the speed. Second, the Flexible Diamond Product abrasive sheet is constructed from plated diamonds which have been unable to produce a smooth polished finish.

Another widely used product from 3M Company is the pyramid shaped Trizact® abrasive which helps with hydroplaning effects. However, it is only practical for this product to be created with inexpensive abrasive media such as aluminum oxide which tends to wear fast and unevenly across its surface. Again, this is a continuous web type of product which does to have the capability of having precise thickness control.

Two common types of abrasive articles that have been utilized in polishing operations include bonded abrasives and coated abrasives. Bonded abrasives are formed by bonding abrasive particles together, typically by a molding process, to form a rigid abrasive article. Coated abrasives have a plurality of abrasive particles or abrasive agglomerates bonded to a backing by means of one or more binders. Coated abrasives utilized in polishing processes are typically in the form of endless belts, tapes, or rolls which are provided in the form of a cassette. Examples of commercially available polishing products include "IMPERIAL" Microfinishing Film (hereinafter IMFF) and "IMPERIAL" Diamond Lapping Film (hereinafter IDLF), both of which are commercially available from Minnesota Mining and Manufacturing Company (3M Company), St. Paul, Minn.

Structured abrasive articles have been developed for common abrasive applications. Pieper et al., U.S. Pat. No. 5,152,917 discloses a structured abrasive article containing precisely shaped abrasive composites. These abrasive composites comprise a plurality of abrasive grains and a binder. Mucci, U.S. Pat. No. 5,107,626, discloses a method of introducing a pattern into a surface of a workpiece using a structured abrasive article.

A new class of large diameter precise thickness disks which have an annular ring of raised islands coated with a thin coat of diamond abrasive particles or abrasive agglomerates is required for high speed lapping which requires a completely different manufacturing technique than has been employed in the past by the abrasives industry. The new batch type of processing required to produce these disks must be practical and cost effective. Eventually, this batch process of manufacturing a abrasive disk as a separate item can be converted partially or wholly into a continuous web-line process when the product sales volume demand warrants the investment in the required process equipment and converting technology. The abrasive agglomerates used include spherical shaped beads that have small diamond or other abrasive particles enclosed in a friable ceramic or metal oxide matrix where the ceramic erodes as the bead is abrasively worn down thereby progressively exposing new sharp abrasive particles. Abrasive agglomerates may also have many shapes other than spherical.

The primary competitor for the sheet fixed abrasive polishing technology is slurry lapping, which is necessarily very slow, even though it has been progressively up-dated. Slurry lapping produces a flatter surface on a workpiece at the present time than can be accomplished by high speed lapping, which has limited the sale of the high speed lapper machines. Other traditional grinding wheel machines can produce about the same flatness accuracy as the present configuration lapper but these machines can not produce the associated smooth polish that typical precision workpiece parts require. Accurate flat and smooth workpiece part surfaces are used to prevent leakage when these parts are mated stationary with other moving parts or when the workpiece parts are joined to dynamically rotate against each other.

High speed lapping uses expensive thin flexible abrasive coated disks that must be very precise in thickness and must also be attached to a platen that is very flat and stable. As the platen rotates very fast, this speed tends to "level" the abrasive as it is presented to the workpiece surface. As only the high spots of the abrasive contact the workpiece, the remainder of the disk abrasive is not used until the high spots wear down. Thus, it is necessary for the total system to be precisely aligned and constructed of precision components to initialize the grinding. Furthermore, the wear of the abrasive must proceed uniformly across both the surface of the sheet and the surface of each island to maintain the required flatness of both the effective abrasive surface and correspondingly, the workpiece surface. These issues have all been addressed here in defining various configurations of high speed lapper machines along with different abrading process techniques employed in operating the machines. To generate even workpiece surface wear with rotating abrasive disks, an annular raised abrasive flat surface is used as taught by Duescher in U.S. Pat. Nos. 6,149,506, 6,120,352; 6,102,777; 6,048,254; 5,993,298; 5,967,882; and 5,910,041 which are incorporated herein by reference. However, the desired large diameter flexible backing disks which are required for abrading large workpiece parts are not available as the size of commercially available abrasive disks is presently limited to about 12 inches (30.5 cm) diameter. This relatively small disk size severely limits the width of the annular abrasive band (or ring). A wide abrasive band on a small diameter disk results in a much slower surface grinding speed at the inside diameter of the band than the surface speed at the outside diameter of the band. This slower surface speed also results in reduced material removal from the portion of the workpiece that is located at this inside radial location. Furthermore, as the inside radial section of the abrasive disk wears slowly, the outside diameter portion of the abrasive progressively wears down much faster which results in an uneven abrasive surface across the surface of the annular band. Having larger nominal diameter abrasive disks with narrow annular bands, relative to the disk diameter, will inherently take care of most of these problems. A large diameter disk can have a wide annular band, where the annular width is measured in a radial direction, and the variation of the abrading surface speed across the radial width of the abrasive band will be minimized. The surface speed of an annular band will vary in direct proportion to the radial location of the abrasive. If a large nominal annular band diameter is used and the abrasive band width is narrow, the radius of the extreme inner radius of the band and the radius of the extreme outer radius of the annular band will be close in value. Because the radii of the inner and outer edges of the annular band are close in value, the abrading surface speed of the whole abrasive area will be fairly uniform. The larger the inner and outer annular band radii change in proportion to each other, the larger the variation the surface speed will occur across the radial width of the annular band width.

The typical workpieces that are lapped initially are not flat and have rough surfaces. Most potential customers seem to want both very flat (within 2 Helium light bands or 22.3 microinches or 0.6 micrometers) and smooth polished surfaces.

A preferred abrasive flat lapping process is now done in two separate steps. First, the parts are ground flat using a rigid spindle running at full 3,000 RPM speed, a very small contact force of 1 to 2 lbs. (0.454 to 0.908 kg) and typically, 3M Company's metal plated diamond abrasive. Water flows between the round islands of abrasive, reducing hydroplaning. Hydroplaning typically produces a cone shaped ground surface. Second, parts are polished using a spherical action workpiece holder, with low to moderate contact forces of 2 to 15 lbs. (0.908 to 6.81 kg), and uses a smooth coated abrasive disk operating at lower speeds of about 1,000 RPM or less to prevent hydroplaning. At this time, no "island type" of coated abrasive is available for polishing in combination with an effective polishing method.

Generally, use of the metal plated diamond island style abrasive disks to remove material is consider to be "grinding," as the surface finish is not smooth to the high standards of polishing that is required for flat lapping. Use of the coated (non plated) flat-surface flexible sheet abrasive articles can create very smooth surfaces and their use is considered to be "lapping". The plated diamond island disks tend to be very durable and may last a long time during abrading use. The coated diamond and other abrasive particle disks are much more fragile and are consumed much more rapidly.

With respect to performance, with rigid flat grinding, 2 Helium light bands (or 22.3 microinches or 0.6 micrometers) of flatness are obtained which is too high for most applications. Polishing results in acceptable smoothness but typically creates new problems with flatness because of hydroplaning. Flatness defects created in the polishing step are both cone shapes and saddle shapes.

The high surface speed of the plated island abrasive creates extraordinary high rates of material removal of very hard materials and this perhaps can be increased even further with higher speeds. This is the primary reason for the interest of the high speed grinding and lapping. There probably is a significant business just in the use of this grinding portion of the process to initially prepare parts for the subsequent smooth lapping processing by other traditional methods such as slurry lapping to finish the parts. However, this initial "fast grind" does not appear to be of sufficient benefit to introduce this totally new technology to the marketplace.

Hydroplaning of parts using fine small particle coated abrasive will always be a problem at very high speeds until an abrasive article disk is available which has "islands" of abrasive which allows excess water to pass around the island edges. A recent new commercial form of abrasive disks which has the abrasive formed into small pyramids of abrasive is available and it works well from a hydroplaning standpoint when the pyramids are fresh and not worn down. However, this Trizact brand disk sold by 3M Company is created only with relatively soft aluminum oxide and tends to wear out fast. It is not logical that the manufacturer would use longer wearing diamond particles in these pyramid shapes as each disk would consume so much diamond that the costs would be too high.

U.S. Pat. No. 5,611,825 (Engen) describes resin adhesive binder systems which can be used for bonding abrasive particles to web backing material, particularly urea-aldehyde binders. There is no reference made to forming or abrasive coating abrasive islands. He describes the use of make, size and super size coatings, different backing materials, the use of methyl ethyl ketone and other solvents. Loose abrasive particles are either adhered to uncured make coat binders which have been coated on a backing or abrasive particles are dispersed in a 70 percent solids resin binder and this abrasive composite is bonded to the backing. Backing materials include very flat and smooth polyester film for common use in fine grade abrasives which allow all the particles to be in one plane. Primer coatings are used on the smooth backing films to increase adhesion of the make coating. Water solvents are desired but organic solvents are necessary for resins. Fillers include calcium metasilicate, aluminum sulfate, alumina trihydrate, cryolite, magnesia, kaolin, quartz, and glass. Grinding aid fillers include cryolite, potassium fluroborate, feldspar and sulfur. Backing films include polyesters, polyolefins, polyamides, polyvinyl chloride, polyacrylates, polyacrylonitrile, polystyrene, polysulfones, polyimides, polycarbonates, cellulose acetates, polydimethyl silotanes, polyfluorocarbons. Priming of the backing to improve make coating adhesion includes a chemical primer or surface alterations such a corona treatment, UV treatment, electron beam treatment, flame treatment and scuffing. Solvents include acetone, methyl ethyl ketone, methyl t-butyl ether, ethyl acetate, acetonitrile, tetrahydrofuran and others such as methanol, ethanol, propanol, isopropanol, 2-ethoxyethanol and 2-propoxyethanol. Abrasive filled slurry is coated by a variety of methods including knife coating, roll coating, spray coating, rotogravure coating, and like methods. Resins used include resole and novolac phenolic resins, aminoplast resins, melamine resins, epoxy resins, polyurethane resins, isocyanurate resins, urea-formaldehyde resins, isocyanurate resins and radiation-curable resins. Different examples of make, size and super-size coatings and their quantitative amounts of components were given.

U.S. Pat. No. 4,903,440 (Kirk) describes the use of different reduced-cost drum cured binder abrasive particle adhesives which allow elimination of the use of web festoon ovens which are used because of the long cure times required by conventional phenolic adhesives used for abrasive webs. Typically a pre-coat, a make coat, having loose abrasive particles imbedded into the make coat and then a size coat are applied to a continues web backing. No reference is given to processing individual abrasive articles such as abrasive disks. Rather, a continuous backing web is coated with binders and abrasive particles, the binders are cured and then the web is converted into abrasive products such as disks or belts. Resole phenolic resins which are somewhat sensitive to water lubricants are catalyzed by alkaline catalysts and novolac phenolic resins having a source of formaldehyde to effect the cure are described. Viscosity of some binders are reduced by solvents. Fillers include calcium carbonate, calcium oxide, calcium metasilicate, aluminum sulfate, alumina trihydrate, cryolite, magnesia, kaolin, quartz and glass. Grinding aid fillers include cryolite, potassium fluroborate, feldspar and sulfur. Super size coats can use zinc stearate to prevent abrasive loading or grinding aids to enhance abrading. Coating techniques include two basic methods. The first is to provide a pre-size coat, a make coat, the initial anchoring of loose abrasive grain particles and a size coat for tenaciously holding abrasive grains to the backing. The second coating technique is to use a single-coat binder where a single-coat takes the place of the make coat/size coat combination. An ethyl cellosolve and water solvent is referenced for use with a resole phenolic resin.

U.S. Pat. No. 4,038,046 (Supkis) describes abrasive articles made with a blend of urea formaldehyde and alkaline catalyzed resole phenolic binder resins which are cured with the same curing time and temperatures as conventionally used for phenolic resins. Abrasive particles applied by gravity and also by electro-coating methods. A typical oven cure cycle of the web is 25 minutes at 125 degrees F., 25 minutes at 135 degrees F., 18 minutes at 180 degrees F., 25 minutes at 190 degrees F., 15 minutes at 225 degrees F. and 8 hours at 230 degrees F. Yellow and blue dyes are mixed in the binder system.

U.S. Pat. No. 4,710,406 (Fugier) describes a production method for the manufacture of a condensation reaction phenolic resin with different alkali catalysts and which can be diluted up to 1,000 percent.

U.S. Pat. No. 4,426,484 (Saeki) describes phenolic resins which have the cure time accelerated by using special additives.

U.S. Pat. No. 5,304,225 (Gardziella) describes phenolic resins which typically have high viscosity which can be lowered by the addition of solvents or oils.

U.S. Pat. No. 5,397,369 (Ohishi) describes phenolic resins used in abrasive production which have excessive viscosity where a large amount of solvent is required for dilution to adjust the viscosity within an appropriate range. Examples of organic solvents with high boiling points include cyclohexanone, and cyclohexanol. Solvents having an excessively high boiling point tend to remain in the adhesive binder and results in insufficient drying. When the boiling point of a solvent is too low, the solvent leaves the binder too fast and can result in defects in the abrasive coating, sometimes in the form of foamed areas. Additives such as calcium carbonate, silicone oxide, talc, etc. fillers, cryolite, potassium borofluoride, etc. grinding aids and pigment, dye, etc. colorants can be added to the second phenolic adhesive (size coat) used in the abrasive manufacture.

U.S. Pat. No. 5,674,122 (Krech) described screen abrasive articles where the abrasive particles are applied to a make coat of phenolic resin by known techniques of drop coating or electrostatic coating. The make coating is then at least partially cured and a phenolic size coating is applied over the abrasive particles and both the make coat and size coat are fully cured. Make and size coats are applied by known techniques such as roll coating, spray coating, curtain coating and the like. Optionally, a super size coat can be applied over the size coat with anti-loading additive of a stearate such as zinc stearate in a concentration of about 25 percent by weight optionally along with other additives such as cryolite or other grinding aids. In addition, the abrasive coating can be applied as a slurry where the abrasive particles are dispersed in a resinous binder precursor which is applied to the backing by roll coating, spray coating, knife coating and the like. Various types of abrasive particles of aluminum oxide, ceramic aluminum oxide, heat-treated aluminum oxide, white-fused aluminum oxide, silicone carbide, alumina zirconia, diamond, ceria, cubic boron nitride, garnet and combinations of these in particle sizes ranging from 4 to 1300 micrometers can be used.

U.S. Pat. No. 4,251,408 (Hesse) describes phenolic resins used in preparation of abrasives where rapid curing as a result of increasing the curing temperature tends to form blisters which impairs the adherence of the resin to the substrate backing. Special cure cycles are used which have low initial curing temperatures with regulated, progressively increasing temperature which prevent blister formation but the time required for cross-linking is thereby increased. Drying and curing of webs by use of loop dryers or festoon dryers are discussed which provide both the function of driving off the solvents from the binder and to cross-link cure the binder. The cure rate of a resin is defined by the B-time which is the time required to change from a liquid state to reach the rubbery elastomer state (B-state).

U.S. Pat. No. 5,551,961 (Engen) describes abrasive articles made with a phenolic resin applied as a make coat used to secure abrasive particles to the backing by applying the particles while the make coat is in an uncured state, and then, the make coat is pre-cured. A size coat is added. Alternatively, a dispersion of abrasive particles in a binder is coated on the backing. The use of solvents is described to reduce the viscosity of the high viscous resins where high viscosity binders cause "flooding", i.e., excessive filling in between 30 to 50 micrometer abrasive grains. Also, non-homogenous binder resins result in visual defects and performance defects. Both flooding and non-homogenous problems can be reduced by the use of organic solvents which are minimized as much as possible. Resole phenolic resins experience condensation reactions where water is given off during cross linking when cured. These phenolics exhibit excellent toughness, dimensional stability, strength, hardness and heat resistance when cured. Fillers used include calcium sulfate, aluminum sulfate, aluminum trihydrate, cryolite, magnesium, kaolin, quartz and glass and grinding aid fillers include cryolite, potassium fluoroborate, feldspar and sulfur. Abrasive particles include fused alumina zirconia, diamond, silicone carbide, coated silicone carbide, alpha alumina-based ceramic and may be individual abrasive grains or agglomerates of individual abrasive grains. The abrasive grains may be orientated or can be applied to the backing without orientation. The preferred backing film for lapping coated abrasives is polymeric film such as polyester film and the film is primed with an ethylene acrylic acid copolymer to promote adhesion of the abrasive composite binder coating. Other backing materials include polyesters, polyolefins, polyamides, polyvinyl chloride, polyacrylates, polyacrylonitrile, polystyrene, polysulfones, polyimides, polycarbonates, cellulose acetates, polydimethyl siloxanes, polyfluocarbons, and blends of copolymers thereof, copolymers of ethylene and acrylic acid, copolymers of ethylene and vinyl acetate. Priming of the film includes surface alteration by a chemical primer, corona treatment, UV treatment, electron beam treatment, flame treatment and scuffing to increase the surface area. Solvents include those having a boiling point of 100 degrees C. or less such as acetone, methyl ethyl ketone, methyl t-butyl ether, ethyl acetate, acetonitrile, and one or more organic solvents having a boiling point of 125 degrees C. or less including methanol, ethanol, propanol, isopropanol, 2-ethoxyethanol and 2-propoxyethanol. Non-loading or load-resistant super size coatings can be used where "loading" is the term used in the abrasives industry to describe the filling of spaces between the abrasive particles with swarf (the material abraded from the workpiece) and the subsequent buildup of that material. Examples of load resistant materials include metal salts of fatty acids, urea-formaldehyde resins, waxes, mineral oils, cross linked siloxanes, cross linked silicones, fluorochemicals, and combinations thereof. Preferred load resistant super size coatings contain zinc stearate or calcium stearate in a cellulose binder. In one description, the make coat precursor can be partially cured before the abrasive grains are embedded into the make coat, after which a size coating precursor is applied. A friable fused aluminum oxide can be used as a filler.

U.S. Pat. No. 5,137,542 (Buchanan) describes a coated abrasive article which has a coated layer of conductive ink applied to the surface of the article, either as a continuous film or the back side of the backing or as printed "island" patterns on the abrasive particle size of the article to prevent the buildup of static electricity during use. Static shock can cause operator injury or ignite wood dust particles. The islands coated on 3M Company Imperial® abrasive were typically quite large 1 inch (2.54 cm) diameter dots and cover only about 22 percent of the article surface. Further, they are very thin, about 4 to 10 micrometers. No reference is made to the affect of the raised islands on hydroplaning effects when used with a water lubricant and no reference is made to high speed lapping. Raised islands of this height would provide little, if any, benefit for hydroplaning. Further, islands of this large diameter would also develop a significant boundary layer across its surface length. Also, top coatings such as these electrically conductive particle filled materials would not allow the typically small mono layers of diamonds used in lapping films to abrasively contact the workpiece surface until the static coating was worn away, after which time it is no longer effective in static charge build-up prevention. Description is made of using polyester film as a backing material for lapping abrasive articles. Bond systems include phenolic resins and solvents include 2-butoxyethanol, toluene, isopropanol, or n-propyl acetate. Coating methods include letterpress printing, lithographic printing, gravure printing and screen printing. For gravure printing, a master tool or roll is engraved with minute wells which are filled with coatable electrically conductive ink with the excess coating fluid removed by a doctor blade. This coating fluid is then transferred to the abrasive article.

U.S. Pat. No. 5,108,463 (Buchanan) describes carbon black aggregates incorporated into a super size coat which also included kaolin.

U.S. Pat. No. 5,221,291 (Imatani) describes the use of a polyimide resin for the combination use as an adhesive bonding agent for abrasive particles, and also, to form an abrasive sheet. Diamond particles were dispersed in solvent thinned polyimide resin and coated on a flat surface with 60 micrometer diamond particles. The sheet was tested at very low speeds of 60 rpm but did remove material, leaving a smooth workpiece surface even though the particles were principally buried within the thickness of the resin which also formed the thin abrasive disk sheet. Most of the expensive diamonds are lost for use as grinding agents but the polyimide successfully bond the diamonds within the sheet.

U.S. Pat. No. 5,368,618 (Masmar) describes preparing an abrasive article in which multiple layers of abrasive particles, or grains, are minimized. Some conventional articles have as many as seven layers of particles which is grossly excessive for lapping abrasive media. He describes "partially cured" resins in which the resin has begun to polymerize but which continues to be partially soluble in an appropriate solvent. Likewise, "fully cured" means the resin is polymerized in a solid state and is not soluble. If the viscosity of the make coat is too low, it wicks up by capillary action around and above the individual abrasive grains such that the grains are disposed below the surface of the make coat and no grains appear exposed. Phenolic resins are cured from 50 degrees to 150 degrees C. for 30 minutes to 12 hours. Fillers including cryolite, kaolin, quartz, and glass are used. Organic solvents are added to reduce viscosity. Typically 72 to 74 percent solids are used for resole phenolic resin binders. Special tests demonstrate that a partially cured resin is capable of attaching loose abrasive mineral grains which are drop coated onto test slides with the result that higher degree of cure results in lower mineral pickup and lower degree of cure results in less mineral pickup. Abrasive grains can be electrostatically projected into the make coat where the ends of each grain penetrates some distance into the depth of the make coat. No description was provided about the desirability, necessity, or ability of the grain application process having a flat uniform depth of the tops of each particle for high speed lapping.

U.S. Pat. No. 5,924,917 (Benedict) describes methods of making endless belts using an internal rotating driven system. He describes the problem of "edge shelling" which occurs on small width endless belts. This is the premature release of abrasive particles at the cut belt edge. He compensates for this by producing a belt edge that is very flexible and conformable. The analogy to this edge shelling occurs on circular abrasive disks also. To construct a belt, an abrasive web is first slit to the proper width by burst, or other, slitting techniques which tends to loosen the abrasive particles at the belt edge when the abrasive backing is separated at the appropriate width for a given belt. These edge particles may be weakly attached to the backing and they may also be changed in elevation so as to stick up higher than the remainder of the belt abrasive particles. Similarly, when a disk is punched out by die cutting techniques from a web section, the abrasive particles located on the outer peripheral cut edge are also weakened. This happens particularly for those discrete particles which were pushed laterally to the inside or outside of the die sizing hole by the matching die mandrel punch. Other types of cutting, slitting or punching abrasive articles from webs also create this shelling problem including water jet cutting, razor blade cutting, rotary knife slitting, and so on. Resole phenolic resins are alkaline catalyzed by catalysts such as sodium hydroxide, potassium hydroxide, organic amines or sodium carbonate and they are considered to be thermoset resins. Novolac phenolic resins are considered to be thermoplastic resins rather than thermoset resins which implies the novolac phenolics do not have the same high temperature service performance as the resole phenolics. Resole phenolic resins are the preferred resins because of their heat tolerance, relatively low moisture sensitivity, high hardness and low cost. During the coating process, make coat binder precursors are not solvent dried or polymerized cured to such a degree that it will not hold the abrasive particles. Generally, the make coat is not fully cured until the application of the size coat which saves a process step by fully curing both at the same time. Fillers include hollow or solid glass and phenolic spheroids and anti-static agents including graphite fibers, carbon black, metal oxides, such as vanadium oxide, conductive polymers, and humectants are used. Abrasive material encompasses abrasive particles, agglomerates and multi-grain abrasive granules. Belts are produced by this method using a batch process. The thermosetting binder resin dries, by the release of solvents, and in some instances, partially solidified or cured before the abrasive particles are applied. The resin viscosity may be adjusted by controlling the amount of solvent (the percent solids of the resin) and/or the chemistry of the starting resin. Heat may also be applied to lower the resin viscosity, and may additionally be applied during the processes to effect better wetting of the binder precursor. However, the amount of heat should be controlled such that there is not premature solidification of the binder precursor. There must be enough binder resin present to completely wet the surface of the particles to provide an anchoring mechanism for the abrasive particles. A film backing material used is PET, polyethylene terephthalate having a thickness of 0.005 inch (0.128 mm). Solvents used include trade designated aromatic 100 and Shell® CYCLO SO 53 solvent.

U.S. Pat. No. 5,318,604 (Gorsuch et al.) and 4,863,573 (Moore et al.) describes abrasive articles made by metal plating islands of which are top coated with diamond abrasives that have been plated onto the islands. The technique employed is to create an island by printing an insulation solder photo resist insulation pattern over an electrical conducting plate and overlaying this with a woven non-electrical conduction cloth mesh. When immersed in a plating bath, a metal plated island is formed integral with the cloth mesh over the electrically exposed island areas of the photo resist covered metal conducting plate. After a minimum height of metal plated island area is built up by metal progressively covering the island area of interlocking mesh fiber strands, diamond particles are suspended in the plating bath liquid and allowed to free fall by gravity onto the mesh. Those particles that fall into the small island areas, which are very irregular in shape due to the unevenness of the interlocking fibers, are progressively plated onto the existing metal plated surfaces. However, the individual plated abrasive particles do not lie in a common flat plane. Instead, the particles are electroplate bonded on the curved surface of the raised islands, and also, are attached at many different random elevations within the upper portion of island structures. This abrasive particle out-of-flatness condition, where each particle is at a different elevation, occurs in part, because of uneven metal deposition rates that occur over the surface of the drum at all the different island locations during the process of building-up the height of each island. Also, a random uneven particle deposition occurs over time when particles come out of solution and are deposited in the final portion of the island build-up. The presentation of the individual particles to the raised island area is completely random. Some particles will fall deep into the "log pile" mesh, and others will land on the top curved surface of an individual cylindrical mesh fiber. Some of the abrasive particles will come to rest on other particles that have already been plated onto the mesh, forming standing "rock towers" of particles. Further, the plating process creates nominal island height differences that vary from island to island, in part, due to the different characteristics of the individual fibers of the mesh cloth. The height thickness of each island, as measured from the surface of the plated abrasive particles to the backside of the mesh cloth, or to the island bottom, is not precisely uniform. Another thickness tolerance disadvantage of this product occurs when the plated cloth material is stripped from the electrically conductive metal base and attached with adhesive to a backing substrate sheet to form a laminated abrasive article. This laminated abrasive article does not have precise overall thickness control due to thickness variations in the island plated cloth material, in the backing sheet, and due to thickness variations in the laminating adhesive layer. There is no possible height control mechanism that can be employed to assure that there exists a uniform flat level surface of the individual diamond abrasive particles over the complete surface area of the abrasive article. Diamonds that are bonded at different elevations below the uppermost surface of the top surface of the fiber "logs" in the "log jam" that forms the foundation of the raised island structures are not used and are wasted. Further, there is no control over the thickness variation of the woven mesh material and no description of techniques to level-smooth it down to the surface of the photo resist covered electrical conducting plate used as a geometric reference base for the plating process. After sufficient plating has been achieved, the electrically insulated cloth, made of plastic fibers, is stripped away from the photoresist plate, which can be used again with another mesh cloth. The cloth can then be attached to a backing material or it can be dissolved away with strong chemicals or acids. Attaching the plated cloth with PSA (pressure sensitive adhesive) to a backing introduces new variance in the total thickness of the abrasive article. This process can be used to produce a rectangular sheet, but when a circular disk is punched out with the use of a punch-and-die set, the round surface of the die set will intersect with small portions of the typical round islands and either remove a sliver from some islands, or, leave just a sliver of a rather tall island weakly attached to the backing. In either case, the shearing action of a die punch will tend to jam the sliver portion of the island into the matching die set members. This jamming action will introduce unbalanced forces that will tend to push the island, or a crescent shaped sliver of an island sideways, which will weaken the islands structural attachment to the disk backing. Then the problem of "edge shelling" described earlier occurs and these raised island edge-slivers, or whole island structures, will tend to break loose during grinding and cause scratches that will occur on a lapped workpiece surface. Flex-Diamond® electroplated type of raised island diamond abrasive article sheets available from the 3M Company, St Paul, Minn. have been used to flat-grind workpiece surfaces at high rotational surface speeds using 12 inch (30.5 cm) diameter abrasive disks and these disks have successfully produced workpiece surfaces that had a very precise flatness. There was no indication of the occurrence of hydroplaning of the workpiece using the electroplated raised island product at rotational speed of up to 3,000 RPM. However, these precisely flat workpiece surfaces were simultaneously not polished smooth by the rotating disk abrading action, where the smoothness is relative to the micron size rating of the abrasive particle size of the abrasive article. Flat surfaced (non-island) abrasive disk articles of the same 12 inch (30.5 cm) diameter size having the same abrasive particle size rating tended to produce polished workpiece surface that were much smoother than was produced by the electroplated raised island articles under the same rotational speed conditions but these smooth surfaces were not precisely flat. This plated raised island product cannot be used to produce a precisely smooth and flat workpiece surface, primarily because of the non-uniformity of the elevation of individual abrasive particles that are electroplate bonded to the irregular shaped raised island structures. The mesh plastic cloth is used to produce the abrasive coated islands as it can be easily stripped away from the photo resist plate. Direct plating of abrasive particles to the top surface of island structures is described by Gorsuch but is not used as it is too difficult to separate the direct plated island from the electrically exposed areas of the photo resist plate. There is no discussion of the concerns of hydroplaning of the workpiece when used at the high speeds desired for abrading with diamond abrasive which the height of the raised islands easily prevents. Instead, there is only discussion of a passageway for the water to travel outward to flush out the swarf generated as grinding particles are removed from the workpiece surface. Gorsuch makes an attempt to produce a flat level diamond abrasive surface, indicating he is aware of only the fundamental problem with this invention. He first plates a thin layer of metal in an array of islands "upside down" on a smooth cylinder. Then he plates on a layer of diamonds, which is followed by adding a cloth mesh and then adds a layer of metal plating on top of the diamonds which are now fully encapsulated into the thick layer of plated metal. The mesh is stripped off the drum to use the diamonds that originally lay on the flat surface of the drum. However, all the diamonds are completely buried in the plated metal and are useless for use as an abrasive article. Further, there was no description of uncurling a sheet of this material from the curvature of the drum and laying it flat for use as a disk without bending or distorting the abrasive metal plated sheet. The top surface of the raised island is formed in a non-flat cylindrical shape that matches the cylindrical curvature of the surface of the plating drum. Another part of the invention produces a disk with islands of abrasive. These are very thick disks that have a pattern of islands which are raised 25 percent to 50 percent (of the overall thickness of the disk) above the disk base or backing. A thick layer of abrasive slurry of abrasive particles mixed in a resin is deposited on a backing and the thickness is controlled by the use of mold plates. No description is made of how critical it is to control the flatness of the upper surface of the molded layer of abrasive, or of how the abrasive surface is maintained flat during wear. Further, no description was made of any of the issues of hydroplaning at high speed with water lubricants which is a primary concern for use with high speed lapping. A description is given of the use of very large hemispherical elements of metal that have a diameter of 0.5 to 3 mm which has generally only five abrasive particles which have a very large average size of 250 micrometer diameter. These abrasive particles are located at the top and along the lower side walls of each hemisphere and are metal plated to be embedded from 30 percent to 50 percent as an integral part of the metal hemisphere. These hemispheres are high enough to act as islands and the rounded tops would also aid in preventing hydroplaning at high speeds. However, this type of construction with very tall domes having only a single abrasive particle located on the very apex of the dome peak has little use for lapping. The single particle will be very aggressive in material removal but it will only produce distinct scratches as it removes a single track of material as it passes over a workpiece surface. This highest particle will have to become worn down along with some of the parent metal used for the dome construction before another particle will be active in partnership with the first. Having only five particles on a huge dome means most of the whole dome must effectively be worn down before the lower particles are engaged as grinding elements. The whole abrasive grinding load forces are so concentrated on single grains of abrasive that the grains tend to be knocked out of place, or "pulled" from the very strong plated metal binding. Use of expensive abrasive particles such as diamond seems totally out of place economically for this type of abrasive article construction. It has absolutely no value for lapping. None of the plating methods employed in this plating technique of forming abrasive articles has any capability of controlling the height of the particles relative to the backside of a backing, which is a critical factor for lapping at high surface speeds.

U.S. Pat. No. 4,256,467 (Gorsuch) describes an abrasive article with diamond particles plated onto an electrically insulated mesh cloth which can be cut into a "daisy wheel" for use in grinding curved, convex, or concave optical lenses. These articles are intended for rough grinding and not for lapping. A electrically conductive smooth metal cylindrical drum is coated with an insulating resist except in circular dot or spot areas where metal plating is desired. An electrically insulating woven cloth, typically made of common plastic fiber materials, is stretched over the whole drum surface including both the conductive spot areas and the resin insulated drum areas. The cloth covered drum is then placed in a plating tank and electroplating then starts where metal is plated through the cloth at the conductive spot areas. Buildup of plated metal occurs at the circular spots and electroplating continues until the desired plated metal thickness is reached to form raised islands that extend through the cloth thickness and above the curved cylindrical drum surface. Then small diamond particles are introduced into the electroplating bath liquid and plating continues, thereby trapping some of these diamond particles at the island top surface by metal electroplate bonding them to the exposed surface of the previously plated island areas. The plating action is stopped, the drum is removed from the bath and the cloth is separated from the drum surface to provide a cloth material having integral raised islands that have non-flat drum-cylinder shaped curved top surfaces that are covered with abrasive particles. The drum is described as being optionally rotated. After plating these diamond particles on the island top surfaces, the particles will all have different heights relative to the drum surface, and thus, relative to the bottom of the cloth due to a number of factors. It is well known that metal plating varies in thickness over different areas of a plated member simply due to variables inherent in an electro-plating process. Also, the woven cloth will have different thicknesses due to variations in the weaving machine performance. Also, there are variances in the thickness of individual woven cloth strands of the very fine denier fibers that are joined together to form a single strand. Further, the sleeve of material is stretched and pulled over the cylindrical drum, which can cause variations in the cloth thickness around the surface of the drum. All of these factors result in a flexible abrasive that can be cut into weak strips or legs that are fanned out from a common hub to form a daisy wheel article where the legs will conform to a curved lens when used at very low speeds. The individual stiff metal raised abrasive island structure surfaces of this daisy wheel will not locally conform, across the semi-rigid surface area of a typical metal plated flat abrasive island, to a curved lens surface. In fact, as the individual raised islands have the same curved surface shape as the drum surface, these island shapes will not lay in flat contact with a flat workpiece surface and also will not lay in conformance to a spherical lens curvature. Use of these stiff metal abrasive islands in abrading contact with the curved lens surface can result in abrading contact to be concentrated at a very small portion of a raised island structure. A plated metal portion of the island structure may contact the curved lens at a raised island location that does not contain abrasive particles, or it is possible that a single abrasive particle that is plated at the highest elevation of that portion of the raised island structure will alone contact the curved portion of the lens which will result in undesirable scratches of the lens surface by that single particle. This daisy wheel article is not useful for high speed lapping which requires extremely precise abrasive article thickness control. Again, in this patent, as was the case in his U.S. Pat. No. 5,318,604, he acknowledges and addresses the issue of obtaining an abrasive article that does, in fact, have all the abrasive particles in the same plane. This is done producing a cloth mesh island abrasive covered article with use of plastic cloth over a patterned drum. Here, he electroplates islands of metal over exposed areas and electroplates particles dropping out of the plating solution to these plated islands after which he continues to build up the metal plating thickness, add a cloth, continue plating, and then remove the cloth mesh from the drum. The islands are refereed to as having flat plane abrasive surfaces but island flat plane surface can not be produced from a cylindrical drum surface. The resultant article would seem to have little use as a abrasive article as the diamond particles are not exposed at the drum surface, but rather, are enclosed or buried within the plated metal layer by the progressively built-up plating metal. As they are not exposed from the plated metal surface, they cannot effect their abrasive cutting action. Also, the backside thickness of plated metal would vary in height due to variances in the deposition rate of material over each island site to variances in electrical conductivity of the unknown coating applied over each site which allows the plated metal to be peeled from the drum. When the cloth is turned over, and mounted to a backing, the variance in height of each island, as measured from the front surface of the diamonds to the cloth bonded surface of the backing, will be significant over the whole surface of the abrasive article. This abrasive article would have no use for high speed lapping where the high speed of a rotating platen establishes an abrasive sheet mounting flatness plane more precise as the platen rotation speed is increased. The requirements of high speed lapping far exceed the capability of this system of creating abrasive articles.

U.S. Pat. No. 5,549,962 (Holms) describes the use of pyramid shaped abrasive particles by use of a production tool having three-dimensional pyramid shapes generated over its surface which are filled with abrasive particles mixed in a binder. This abrasive slurry is introduced into the pyramid cavity wells and partially cured within the cavity to sufficiently take on the shape of the cavity geometry. Then the pyramids are either removed from the rotating drum production tool for subsequent coating on a backing to produce abrasive articles, or, a web backing is brought into running contact with the drum to attach the pyramids directly to the backing to form an abrasive web article. If a web backing is used is contact with the drum, the apexes of the pyramids are directed away from the backing. If loose discrete pyramids are produced by the drum system, the pyramids can be oriented on a backing with the possibility of having the pyramid apex up, or down or sideways relative to the backing. The pyramid wells may be incorporated into a belt and also, these forms can extend through the thickness of the belt to aid in separating the abrasive pyramid particles from the belt.

Over time, many attempts have been made to distribute abrasive grits on the backing in such a method that a higher percentage of the abrasive grits can be used. Merely depositing a thick layer of abrasive grits on the backing will not solve the problem, because grits lying below the topmost grits are not likely to be used. The use of agglomerates having random shapes where abrasive particles are bound together by means of a binder are difficult to predictably control the quantity of abrasive grits that come into contact with the surface of a workpiece. For this reason, the precisely shaped (pyramid) abrasive agglomerates are prepared. Some pyramid-shaped particles are formed which do not contain any abrasive particles and these are used as dilutants to act as spacers between the pyramid abrasive agglomerates when coated by conventional means. Many different fillers and additives can be used including talc and montmorillonite clays. Care is exercised to provide sufficient curing of the agglomerate binders in the drum cavities so that the geometry of the cavity is replicated. Generally, this requires a fairly slow rotation of the production tooling cavity drum. No description is given to the accuracy of the height or thickness control of the resultant abrasive article which incorporates these very large agglomerate pyramids which typically are 530 micrometers high and have a 530 micrometer base length. Thickness variations of conventional lapping disk abrasive sheets generally are held within 3 micrometers in order for it to be used successfully. The system of using the large pyramids described here cannot produce an abrasive article of the precise thickness control required for high speed lapping for a number of fundamental reasons. Some of these reasons are listed here. First, creation of many precise sized pyramid cavities by use of a belt that is replicated into a plastic form to control the belt cost adds error due to the sequential steps taken in the replication process. Variations in binder cures from production run to run and also variations in binder cures across the surface of a drum belt result in pyramids that are distorted from the original drum wells. For backing belts to be integrally bonded to the pyramids during the formation of the pyramids, it is required that any adhesive binder used to join the agglomerate be precisely controlled in thickness. Thickness control is difficult to achieve with this type of production equipment as there are many thickness process variables that must be controlled that are in addition to those variables that are controlled to successfully create or form precise shaped pyramids. The backing material must be of a precise thickness. Random orientation of the large agglomerates will inherently produce different heights at the exposed tops of the agglomerates depending on whether an agglomerate has its apex up, it lays sideways, or has its sharp apex embedded in a make coat of binder. The use of pyramids where all the apexes are up and the bases are nested close together produces grinding effects that change drastically from the initial use where only the tips of the pyramids contact the workpiece, to a final situation where the broad bases contact the workpiece when most of the pyramid has worn away. There was no description of the inherent advantage of the use of upright pyramids for hydroplaning or swarf removal which is a natural affect of these relatively tall "mountain pyramids" and the "valleys" between them which can carry off the water quite well. There was no discussion of the use of this pyramid material for high speed lapping or grinding. The water lubricant effects on grinding would change significantly as the abrasive article wears down. There is a fundamental flaw in the design of the pyramid for upright use. Most of the abrasive material contained on the pyramid lies at the base which is worn out last during the phase of wear when the variations in thickness of the backing, and other thickness variation sources, prevent a good proportion of the bases from contacting a workpiece surface. When using these large-sized pyramid agglomerates, they are designed to progressively breakdown and expose new cutting edges as the old worn individual abrasive particles are expended as the support binder is worn down, exposing fresh new sharp abrasive particles. Most of the value of the expensive abrasive particles lies in the base, as most of the volume of a triangle is in the base. Here, most of the valuable abrasive particles at the base areas will never be used and are wasted. Further, as wear-down of the pyramids is prescribed by selection of the pyramid agglomerate binder, the level surface of the abrasive disk will vary from the inside radius to the outside radius as the contact surface speed with a workpiece will be different due to the radius affect of a rotating abrasive platen. The pyramids are grossly high compared to the size of abrasive particles or abrasive agglomerates and this height results in uneven wear across the surface of an abrasive article that often is far in excess of that allowable for high speed flat lapping. This uneven wear prevents the use of this type of article for high speed lapping. Inexpensive abrasive materials such as aluminum oxide can be used for the pyramid agglomerates but it is totally impractical to use the extra hard, but very expensive, diamond abrasives in these agglomerates. The flaws inherent in the use of conventional pyramid shaped type of agglomerates, due to the size variations in the agglomerates, would tend to prevent them from being used successfully for flat lapping. First, agglomerates can be made and then sorted by size prior to use as a coated abrasive. Also, the configuration of a generally round shaped conventional agglomerate would certainly wear more uniformly than wearing down a pyramid which has a very narrow spiked top and, after wear-down, a base which is probably ten times more large in cross-sectional surface area than the pyramid top. Random orientation of the pyramid shape does not help this geometric artifact. Another issue is the formulation of the binder and filling used in a conventional agglomerate. A wide range of friable materials such as wood products can be joined in a binder which can be selected to produce an agglomerate by many methods, including furnace baking, etc. The binder used in the production of the pyramids must be primarily selected for process compatibility with the fast cure replication of the drum wells and not for consideration of whether this binder will break down at the desired rate to expose new abrasives at the same rate the abrasive particles themselves are wearing down. It does not appear that this pyramid shaped agglomerate particle has much use for high speed lapping. Use of a polyethylene terephthalete polyester film with a acrylic acid prime coat is described.

U.S. Pat. No. 4,652,275 (Bloecher) describes the use of erodible agglomerates of abrasive particles used for coated abrasive articles. The matrix material, joined together with the abrasive particles, erodes away during grinding which allows sloughing off of spent abrasive particles and the exposure of new abrasive grains. The matrix material is generally a wood product such as wood flour selected from pulp. A binder can include a variety of materials including phenolics. It is important that the binder not soften due to heat generated by grinding action. Instead, it should be brittle so as to breakaway. If too much binder is used, the agglomerate will not erode and if too little is used, the mixture of the matrix and the abrasive particles are hard to mix. The preferred agglomerate is made by coating a layer of the mixture, curing it, breaking it into pieces and separating the agglomerate particles by size for coating use. Agglomerates of a uniform size can be made in a pelletizer by spraying or dropping resin into a mill containing the abrasive mineral/matrix mixture. Agglomerates are typically irregular in shape, but they can be formed into spheres, spheroids, ellipsoids, pellets, rods and other conventional shapes. Other methods of making agglomerates include the creation of hollow shells of abrasive particles where the shell breaks down with grinding use to continually expose new abrasive particles. Other solid agglomerates of abrasive particles are mixed with an inorganic, brittle cryolite matrix. A description is made of conventional coated abrasives which typically consist of a single layer of abrasive grain adhered to a backing. It has been found that only up to 15 percent of the grains in the layer are actually utilized in removing any of the workpiece. It follows then that about 85 percent of the grains in the layer are wasted. The agglomerates described here preferably range from 150 micrometers to 3000 micrometers and have between 10 and 1000 individual abrasive grain particles for P180 grains and only 2 to 20 grains of larger P36 grains. These agglomerates far exceed the size required for high speed lapping. In fact, only single layers of diamond particles is required or typically used as a coating for most lapping abrasive articles, so these huge agglomerates have little or no use in lapping. Further, there would not be an effective method of maintaining a flat abrasive surface as the abrasive agglomerates are worn down by abrasive lapping or grinding action.

U.S. Pat. No. 4,799,939 (Bloecher) describes use of 70 micrometer diameter hollow glass spheres which are mixed with abrasive particles and a binder to form erodible 150 to 3000 micrometer agglomerates which are used for coating in abrasive articles. The hollow glass spheres are strong enough for the mixing operation and for the process used to form the agglomerate particle. However, they are weak enough that they break when used in grinding. Again, as for U.S. Pat. No. 4,652,275, these agglomerates are much too large and inappropriate for use in high speed lapping.

U.S. Pat. No. 4,327,156 (Dillon) describes a plastic mold cavity made from a powdered metal binder mixture that was molded in a RTV rubber mold. An A-6 tool steel powder is mixed with a thermosetting adhesive binder that is diluted with a liquid that is a good solvent for the uncured binder but poor solvent for the cured binder. This diluent/thermoset binder can be mixed with powdered metals, deposited in a mold, solidified by curing and the form shape can be fired in a furnace to produce an exact replica of the original mold shape that is a few percent smaller than the original shape. The diluent comes out of phase with the thermoset binder and is exhausted from the green powder shape, leaving the thermoset binder attaching each powdered metal particle bound to adjacent particles. Furnace heating is continued at a higher temperature and a porous metal shape is created which can be filled with molten copper by wicking action. Here, a completely solid metal form has been produced which is an extremely accurate representation of the original shape. This same technology can be used to form island base foundations of raised abrasive islands.

These systems have been described as providing benefits to particular technical and commercial fields, but they have not been shown to provide any particular benefits to truly high speed lapping/polishing systems and materials. No operational speeds are listed in any of the reference patents listed here indicates a lack of interest or awareness of the resultant artifacts of high speed lapping or polishing.

U.S. Pat. No. 794,495 (Gorton) discloses dots of abrasive on round disks formed by depositing abrasive particles on adhesive binder wetted dot areas printed on the backing, primarily to aid the free passage of grinding debris away from the workpiece surface. These dot areas are not elevated as raised island shapes from the surface of the backing.

U.S. Pat. No. 3,916,584 (Howard, et al.) discloses the encapsulation of 0.5 micron up to 25 micron diamond particle grains and other abrasive material particles in spherical erodible metal oxide composite agglomerates ranging in size from 10 to 200 microns and more. The large agglomerates do not become embedded in an abrasive article carrier backing film substrate surface as do small abrasive grain particles. In all cases, the composite bead is at least twice the size of the abrasive particles. Abrasive composite beads normally contain about 6 to 65% by volume of abrasive grains, and compositions having more than 65% abrasive particles are considered to generally have insufficient matrix material to form a strong acceptable abrasive composite granule. Abrasive composite granules containing less than 6% abrasive grains lack enough abrasive grain particles for good abrasiveness. Abrasive composite bead granules containing about 15 to 50% by volume of abrasive grain particles are preferred since they provide a good combination of abrading efficiency with reasonable cost. In the invention, hard abrasive particle grains are distributed uniformly throughout a matrix of softer microporous metal oxide (e.g., silica, alumina, titania, zirconia, zirconia-silica, magnesia, alumina-silica, alumina and boria, or boria) or mixtures thereof including alumina-boria-silica or others. Silica and boria are considered as metal oxides. The spherical composite abrasive beads are produced by mixing abrasive particles into an aqueous colloidal sol or solution of a metal oxide (or oxide precursor) and water and the resultant slurry is added to an agitated dehydrating liquid including partially water-miscible alcohols or 2-ethyl-1-hexanol or other alcohols or mixtures thereof or heated mineral oil, heated silicone oil or heated peanut oil. The slurry forms beadlike masses in the agitated drying liquid. Water is removed from the dispersed slurry and surface tension draws the slurry into spheroidal composites to form green composite abrasive granules. The green granules will vary in size; a faster stirring of the drying liquid giving smaller granules and vice versa. The resulting gelled green abrasive composite granule is in a "green" or unfired gel form. The dehydrated green composite generally comprises a metal oxide or metal oxide precursor, volatile solvent, e.g., water, alcohol, or other fugitives and about 40 to 80 weight percent equivalent solids, including both matrix and abrasive, and the solidified composites are dry in the sense that they do not stick to one another and will retain their shape. The green granules are thereafter filtered out, dried and fired at high temperatures. The firing temperatures are sufficiently high, at 600 degrees C. or less, to remove the balance of water, organic material or other fugitives from the green composites, and to calcine the agglomerate body matrix material to a firm, continuous, microporous state (the matrix material is sintered), but insufficiently high to cause vitrification or fusion of the agglomerate interior into a continuous glassy state. These abrasive composite agglomerate beads incorporate abrasive particles 25 microns and less sized particles, as abrasive particle grains 25 microns and larger can be coated on abrasive articles to form useful materials. In one example, a slurry of the average sized 50 micron abrasive agglomerates was mixed in a phenolic resin and was knife coated with a 3 mil (0.003 inch or 72 micron) knife gap setting which exceeded the size of the agglomerates. As the individual abrasive particles were smaller than the depth of the coated resin binder slurry, there is indication that enough resin binder solvent was evaporated after coating to expose a substantial portion of the individual coated abrasive agglomerates when the abrasive product was dried. U.S. Pat. No. 3,916,584 (Howard, et al.) is herein incorporated by reference.

U.S. Pat. No. 5,232,470 (Wiand) discloses raised molded protrusions of circular shapes composed of abrasive particles mixed in a thermoplastic binder attached to a circular sheet of backing.

U.S. Pat. No. 5,910,471 (Christianson, et al.) discloses that the valleys between the raised adjacent abrasive composite truncated pyramids provide a means to allow fluid medium to flow freely between the abrasive composites which contributes to better cut rates and the increased flatness of the abraded workpiece surface.

U.S. Pat. No. 6,186,866 (Gagliardi) discloses the use of a abrasive article backing contoured by grinding-aid containing protrusions having a variety of peak-and-valley shapes. Abrasive particles are coated on both the contoured surfaces of the protrusions and also onto the valley areas that exist between the protrusion apexes. The protrusions present grinding aid to the working surface of the abrasive article throughout the normal useful life of the abrasive article. Useful life of an abrasive article begins after the abrasive particle coating that exists on the protrusion peaks is removed, which typically occurs within the first several seconds of use. Initial use, which occurs prior to the "useful life", is defined as the first 10% of the life of the abrasive article. Protrusions contain a grinding aid, with the protrusions preferably formed from grinding aid alone, or the protrusions are a combination of grinding aid and a binder. The protrusion shapes have an apex shape that is coated with an adhesive resin and abrasive particles. The particles are drop coated or electrostatically coated onto the resin and thereby form a layer of abrasive particles conformably coated over both the peaks and valleys of the protrusion shapes. The primary objective of the protrusion shapes is to continually supply a source of grinding aid to the abrading process. There are apparent disadvantages of this product. Only a very few abrasive particles reside on the upper-most portions of the protrusion peaks and it is only these highest-positioned particles that contact a workpiece surface. The small quantity of individual particles contacting a workpiece, which are only a fraction of the total number of particles coated on the surface of the abrasive article, will be quickly worn down or become dislodged from the protrusion peaks. Particles would tend to break off from the protrusion wall surfaces, when subjected to abrading contact forces, due to the inherently weak resin particle bond support at individual particle locations on the curved protrusion walls. Abrasive particles are very weakly attached to the sloping sidewalls of the protrusions due to simple geometric considerations that make them vulnerable to detachment. It is difficult to bond a separate abrasive particle to a wall-side with a resin adhesive binder that does not naturally flow by gravity and symmetrically surrounds the portion of the particle that contacts the wall surface. Abrasive particles attached to a traditional flat-surfaced abrasive backing sheet article tend to have a symmetrical meniscus of resin surrounding the base of each particle but this configuration of meniscus would not generally form around a particle attached to a near vertical protrusion side-wall. Also, the protrusion side-wall is inherently weak as the protrusion body is constructed of grinding aid material. Much of the valuable superabrasive particles located in the valley areas are not utilized with this technique of particle surface conformal coating of both protrusion peaks and valleys. As the abrading action continues, with the wearing down of the erodible protrusions, more abrasive particles are available for abrading contact with a workpiece article. However, the advantage of having protrusion valleys, that are used to channel coolant fluids and swarf, disappears as the valleys cease to exist. The procedure cited for testing the protrusion contoured abrasive article cited the use of a 7 inch (17.8 cm) diameter disk operated at approximately 5,500 rpm indicating an intended high surface speed abrading operation.

U.S. Pat. No. 6,231,629 (Christianson, et al.) discloses a slurry of abrasive particles mixed in a binder and applied to a backing sheet to form truncated pyramids and rounded dome shapes of the resin based abrasive particle mixture. Fluids including water, an organic lubricant, a detergent, a coolant or combinations thereof are used in abrading which results in a finer finish on glass. Fluid flow in valleys between the pyramid tops tends to produce a better cut rate, surface finish and increased flatness during glass polishing. Presumably, these performance advantages would last until the raised composite pyramids or domes are worn away. Abrasive diamond particles may either have a blocky shape or a needle like shape and may contain a surface coating of nickel, aluminum, copper, silica or an organic coating.

U.S. Pat. No. 6,217,413 (Christianson) discloses the use of phenolic or other resins where abrasive agglomerates are drop coated preferably into a monolayer. Leveling and truing out the abrading surface is performed on the abrasive article which results in a tighter tolerance during abrading.

U.S. Pat. No. 6,299,508 (Gagliardi, et al.) discloses abrasive particle coated protrusions attached to a backing sheet where the protrusions have stem web or mushroom shapes with large aspect ratios of the mushroom shape stem top surface to the stem height. A large number of abrasive particles are attached to the vertical walls of the stems compared to the number of particles attached to the stem top surface. Abrasive discs using this technology range in diameter from 50 mm (1.97 inches) to 1,000 mm (39.73 inches) and operate up to 20,000 revolutions per minute. As in Gagliardi, U.S. Pat. No. 6,186,866, the abrasive article described here does not provide that the attachment positions of the individual abrasive particles are in a flat plane which is required to create an abrasive article that can be used effectively for high surface speed lapping.

U.S. Pat. No. 6,319,108 (Adefris, et al.) discloses the electroplating of composite porous ceramic abrasive composites on metal circular disks having localized island area patterns of abrasive composites that are directly attached to the flat surface of the disk U.S. Pat. No. 6,371,842 (Romero) describes abrasive grinding disk articles that have an article center aperture hole and circular bands of raised islands having flat top surfaces that are adhesive coated and abrasive particles which are deposited onto the adhesive. The abrasive articles described are not suggested for nor is awareness indicated for their use in flat lapping or in flat grinding where the disks would be mounted on a flat surfaced rotary platen. Instead the articles are taught to be mounted on hand tool mandrels by the use of mechanical fasteners that penetrate an aperture hole located at the center of the circular disk. No mention or teachings are made of the art of precision flat grinding, or lapping, of flat workpiece surfaces or of using these island disks in that abrasive application area. Also, there is no mention of the precision control of the variation in the thickness of the abrasive disk articles or the use of the precision flatness grinding or lapping machines that are required to produce precise flat workpiece surfaces. There is no mention of the desirability of the existence of a mono (single) layer of coated abrasive particles; or of controlling the variation of the thickness of the abrasive article to a proportion of the diameter of the coated abrasive particles. Further, no mention is made of the problems of hydroplaning of disks or workpieces. Instead, the raised island abrasive hand tool disks taught by Romero are intended to correct a specific problem that occurs in typical non-island disk manufacturing where thick preformed disks are coated with a adhesive binder that has a tendency to form a high lip of binder coating on the disk backing outer peripheral edge after which abrasive particles are deposited on the binder raised peripheral lip. This raised elevation outer diameter raised lip that is coated with abrasive particles causes undesirable workpiece surface scratches during abrading use. The use of abrasive coated raised island structures that are attached to a backing sheet reduces the formation of the raised abrasive peripheral edge lips on manual tool grinding disk articles.

Romero does not teach the advantages or requirements of having the features of uniform flat surfaces or even "substantially planar surfaces" for: the valley areas located between the islands; the top surfaces of the islands; or the back side surface of the backing in the non-claims portion of the patent specification. There is no reference given for the use of the island type abrasive articles to be used for creating precision flat workpiece surfaces or precise smooth workpiece surfaces as in a flat-lapping operation. Flat lapping requires extremely flat abrasive disk machine tool platens and the abrasive disk article also must be precisely flat and of uniform thickness to enable all of the coated abrasive particles to be utilized. Further, there is no mention of the advantages of arranging the raised islands in an annular array having a narrow outer radius annular band width of abrasive to avoid having the slow moving abrasive surfaces that are located at the inner diameter area of a disk, to be in contact with a workpiece surface. Uneven wear occurs across the surface of a workpiece when the workpiece is in contact with an abrasive article abrading surface that has both fast and slow surface speeds.

His abrasive disks have significant amounts of fibers and other fillers imbedded in the disk backing which tends to produce a disk of limited thickness uniformity. The preferred embodiment of Romeo is a thick fiber filled disk having integral raised islands that is constructed by: molding a flat disk with integral raised islands; or adhesively bonding island shapes cut out from sheet material to a backing disk; or embossing island shapes into the surface of a flat backing disk sheet. None of these three raised island disk manufacturing techniques would be expected to produce islands having precisely flat surfaces where the island height variations, as measured from the backside of the backing, is within the 0.0001 to 0.0003 inch (0.003 to 0.008 mm) tolerance that is typically required for 8,000 or more SFPM high speed platen flat lapping. The Romero disks are intended for use with manual grinding tools where the amount of workpiece material removal is of primary concern, rather than controlling the flatness of the workpiece. This type of grinding disk generally would have large sized abrasive particles that are not suitable for polishing or lapping operations. The described abrasive disk is frictionally mounted to a flexible backup pad that is attached to a mandrel with a disk-center screw-cap that penetrates the disk-center aperture hole and squeezes the disk against the flexible and conformable metal or polymer backup pad. The screw-cap mounting forces result in significant and uneven distortions of both the abrasive disk sheet and the backup pad prior to the moving abrasive contacting a workpiece. Romero does not teach the use of a circular disk backing that does not have a center hole aperture in the non-claims portion of the patent specification. He describes raised island abrasive substrate sheets having rectangle, square, hexagon, octagon and oval shapes. However, these non-circular shapes are intended to also be used with sheet center aperture holes, the same as for circular disks, to allow multiple layers of these non-circular abrasive sheets to be mounted on a mandrel. He incorporates by reference U.S. Pat. No. 5,142,829 (Germain) which describes a variety of these same types of non-circular abrasive sheet shapes, all having center aperture holes, where the holes allow them to be progressively stacked on a mandrel for use as a flapper abrasive portable manual tool. There is no mention of flat sheets, long strips or belts of abrasive coated raised island articles that do not have a disk-center aperture hole or where these disks would be used for non-manual tool abrading purposes. The only described disk articles are those that have disk-center aperture holes that are used exclusively on portable tool mandrels. The method described by Romero for coating the abrasive disk with abrasive particles is to first coat the island top surfaces with a make coat of binder, deposit loose abrasive particles on the make coat and then add a size coat of binder after which the binders are cured. Coating the island top surfaces with a abrasive slurry is not taught.

Romero does not teach the hydroplaning of workpieces surfaces when lapping at very high surface speeds. Hydroplaning would not be an issue when using a abrasive disk on a mandrel tool device as the abrasive article would have a line-shaped area of contact with a workpiece surface due to the abrasive article out-of-plane distortion by the tool operator. A water boundary layer does not build up in thickness and create hydroplaning for line-contact abrading surfaces because there is not enough distance for the water film to increase in thickness across the short distance of the line width. Also, there is a very high localized area of contact pressure at the abrading contact line area due to the large applied pressure that is distributed over a very small area. This high contact line-area pressure tends to prevent the boundary layer thickness buildup of coolant water. In the instance of flat lapping, the abrasive contacts the workpiece with a very low contact force across a full surface area that is typically as wide as the width of the workpiece. Due to the low contact force and large contact area, the water boundary layer can build up in substantial thickness across the relatively long distance that extends across the full length of the mutual abrading contact area. In this way, hydroplaning, where a portion of the workpiece is lifted from the abrasive surface by the depth or thickness of the water boundary layer, does not tend to occur for mandrel-and-pad type of manual tool abrading but is difficult to avoid for machine tool flat lapping.

Island types of abrasive articles used for precision flat grinding or lapping are primarily suited for use with rotating flat platen surfaces. The localized individual island sites are structurally stiff due to their increased thickness as compared to the thickness of the adjacent thin backing sheet. The flexural stiffness of the island areas is a function of the total island material thickness cubed, which means a relatively small change in the backing sheet material thickness at the location of a raised elevation island can change the localized stiffness of the island area by a very large amount. These abrasive coated stiff islands will not easily conform to a curved surface. Stiff raised large diameter islands that have a thin flat top surface coating of abrasive material will only be contacted by a workpiece at the central portion of the island abrasive when contacting a convex workpiece. Only the abrasive outer island peripheral edges of a stiff island would be contacted for a concave workpiece. In either case, abrading action results in uneven wear of both the island coated abrasive and of the workpiece surface. In a like manner, raised island abrasive disk articles having stiff islands that have their flat disk-plane surface distorted by manual pressure when contacting a flat workpiece will only be effective in uniform material removal if the island dimensions are very small, in particularly the tangential direction. Here, small islands can lay flat to a workpiece but only if the adjacent disk backing material that is located next to the islands is flexible enough to allow the island to bend enough to compensate for the disk out-of-plane distortion created by the abrasive tool operator. Even if the backing is flexible, the backing pad would tend to prevent this conforming action. Stiff and thick backings are generally used with manual abrasive disk articles as thin backings are too fragile for this type of abrading usage. Manual pressure will distort the disk plane in both a radial and tangential direction. This abrasive sheet distortion would prevent the production of a precision flat workpiece surface with this manual apparatus and abrasive article. Flexible sheets of a non-island uniform coated abrasive article having a thin backing will conform to a flat rigid platen which provides a natural flat abrading surface for the whole surface of the abrasive sheet. Likewise, a thin backing sheet or disk having integral raised islands will likewise conform to the flat platen surface where each of the individual islands will be presented with a flat island top surface that is mutually flat to the workpiece surface. Flexible abrasive sheets or disks having raised islands mounted on flat platens can be used effectively for the flat grinding and smooth lapping of a flat workpiece surfaces. The Romero described abrasive disks as used with conformable screw-cap mandrel pads are not practical for use for precision flat grinding. Conformable pad mandrels are generally used on portable grinding tools that are held with large (6 kilogram or 13 lbs) manual contact forces against a workpiece which deforms the flexible abrasive disk supporting pad to allow an area of the thick and stiff abrasive disk to be in flat contact with a workpiece surface. The whole large contact force tends to be concentrated at the typical small line-type contact area that exists between the abrasive and the workpiece surfaces. The manual abrasive grinding operator typically moves the disk with a random oscillation-type orientation motion relative to the surface of the workpiece. In the comparative case of a flat lapping machine, a low contact force of 1 to 2 lbs (0.5 to 1 kg) is spread evenly over large surface areas of a workpiece that is supported by a workpiece holder spindle. The workpiece spindle of a flat lapping machine is typically orientated perpendicular to the surface of an abrasive disk that is flat mounted to a rigid platen. A manual abrasive disk tool is typically oriented at a significant angle to the workpiece surface. Very low stresses are induced within the thin and weak abrasive backing sheet used in flat lapping because the relatively large mutual flat workpiece and abrasive contact surface areas do not create localized areas of abrading contact forces. Thin backings as used with the manual tool grinding pad disks is stated by Romero to be a problem as this fragile type of disk easily rips and tears and can crease and pucker the disk article.

U.S. Pat. No. 5,733,175 (Leach) describes workpiece polishing machines with overlapping platens that provide uniform abrading velocities across the surface of the workpiece. Hydroplaning of workpieces during abrading action is discussed.

U.S. Pat. No. 4,586,292 (Carroll et al.) describes an apparatus that provides a complex rotary motion used to lap polish the inside diameter of a spherical surface workpiece.

U.S. Pat No. 3,702,043 (Welbourn et al.) describes a machine used for removing material from the internal surface of a workpiece and the use of a strain gage sensor device that indicates the cutting force exerted by the cutting tool upon the workpiece.

U.S. Pat. No. 5,190,568 (Tselesin) discloses a variety of sinusoidal and other shaped peak and valley shaped carriers that are surface coated with diamond particles to provide passageways for the removal of grinding debris. There are a number of problems inherent with this technique of forming undulating row shapes having wavelike curves that are surface coated with abrasive particles on the changing curvature of the rows. The row peaks appear to have a very substantial heights relative to the size of the particles which indicates that only a very small percentage of the particles are in simultaneous contact with a workpiece surface. One is the change in the localized grinding pressure imposed on individual particles, in newtons per square centimeter, during the abrading wear down of the rows. At first, the unit particle pressure is highest when a workpiece first contacts only the few abrasive particles located on the top narrow surface of the row peaks. There is a greatly reduced particle unit pressure when the row peaks are worn down and substantially more abrasive particles located on the more gently sloped side walls are in contact with the workpiece. The inherent bonding weakness of abrasive particles attached to the sloping sidewalls is disclosed as is the intention for some of the lower abrasive particles, located away from the peaks, being used to structurally support the naturally weakly bonded upper particles. The material used to form the peaks is weaker or more erodible than the abrasive particles, which allows the erodible peaks to wear down, expose, and bring the work piece into contact with new abrasive particles. Uneven wear-down of the abrasive article will reduce its capability to produce precise flat surfaces on the work piece. Abrasive articles with these patterns of shallow sinusoidal shaped rounded island-like foundation ridge shapes where the ridges are formed of filler materials, with abrasive particles coated conformably to both the ridge peaks and valleys alike is described. However, the shallow ridge valleys are not necessarily oriented to provide radial direction water conduits for flushing grinding debris away from the work piece surface on a circular disk article even prior to wear-down of the ridges. Also, a substantial portion of the abrasive particles residing on the ridge valley floors remain unused as it is not practical to wear away the full height of the rounded ridges to contact these lower elevation particles.

U.S. Pat. No. 4,930,266 (Calhoun, et al.) discloses the application of spherical abrasive composite agglomerates made up of fine abrasive particles in a binder in controlled dot patterns where preferably one abrasive agglomerate is deposited per target dot by use of a commercially available printing plate. Small dots of silicone rubber are created by exposing light through a half-tone screen to a photosensitive silicone rubber material coated on an aluminum sheet and the unexposed rubber is brushed off leaving small islands of silicone rubber on the aluminum. The printing plate is moved through a mechanical vibrated fluidized bed of abrasive agglomerates which are attracted to and weakly bound to the silicone rubber islands only. The plate is brought into nip-roll pressure contact with a web backing which is uniformly coated by a binder resin which was softened into a tacky state by heat thereby transferring each abrasive agglomerate particle to the web backing. Additional heat is applied to melt the binder adhesive forming a meniscus around each particle, which increases the bond strength between the particle and the backing. The resulting abrasive article has gap-spaced dots of abrasive agglomerate particles on the backing but the agglomerates are attached directly to the backing surface and are not raised away from the backing surface. Each composite abrasive agglomerate preferably is a spherical composite of a large number of abrasive grains in a binder; the agglomerates typically range in size from 25 to 100 microns and contain 4-micron abrasive particles. It is indicated that the composite abrasive agglomerate granules should be of substantially equal size, i.e., the average dimension of 90% of the composite granules should differ by less than 2:1. Abrasive grains having an average dimension of about 4 microns can be bonded together to form composite sphere granules of virtually identical diameters, preferably within a range of 25 to 100 microns. Preferably, the abrasive composite granules have equal sized diameters where substantially every granule is within 10% of the arithmetic mean diameter so that the granules protrude from the surface of the binder layer to substantially the same extent and also so the granules can be force-loaded equally upon contacting a workpiece. Granules are spherical in shape or have a shape that has approximately that same thickness in every direction. By individually positioning the equal sized granules to be spaced equally from adjacent granules, the granules each bear the same load and hence wear at substantially identical rates and tend to be equally effective. Consequently, workpieces continue to be polished uniformly. One difficulty with this abrasive product, even with abrasive composites having uniform diameters where each composite granule can be positioned to protrude to the same extent from the binder layer, the variation in the thickness in the backing thickness is not considered. If there are significant variations in the backing thickness, even equal sized individual composite abrasive agglomerates coated on a abrasive article rotating at high lapping surface speeds of 8,000 surface feet per minute will not evenly contact a workpiece surface. Eventually, the highest positioned composite abrasives will wear down and adjacent composite agglomerates will be contacted by the workpiece surface. It is necessary to control the diameter of the composite agglomerates, the thickness variation of the binder and the variation of the coated surface height of the backing, relative to the back platen mounting side of the backing, to some fraction of the diameter of the average diameter of the abrasive composites to attain effective utilization of all or most of the abrasive composite agglomerates.

U.S. Pat. No. 5,251,802 (Bruxvoort, et al.) discloses the use of solder or brazing alloys to bond diamond and other abrasive particles to a flexible metal or non-metal backing material.

U.S. Pat. No. 5,496,386 (Broberg, et al.) discloses the application of a mixture of diluent particles and also shaped abrasive particles onto a make coat of resin where the function of the diluent particles is to provide structural support for the shaped abrasive particles.

Abrasive tools having an annular band of raised islands containing diamond particles impregnated in a metal matrix have been available from the Boart Longyear Interfels of Bad Bentheim, Germany for use in rock core drilling. These toolbits have a inside annular band diameter that is approximately 60% of the annular band outside diameter. They have a similar construction appearance to the flexible sheet abrasive articles having an annular band of raised islands that are described here.

SUMMARY OF THE INVENTION

Lapper Process and Apparatus

Lapping or grinding with precision flat and precision thickness flexible sheet abrasive media having raised abrasive coated islands is operated at high surface speeds of 10,000 surface feet per minute which requires the use of water-like lubricants to cool the workpiece and to carry away grinding swarf. A workpiece can be held rigidly or flexibly by a rotating spindle to effect grinding contact with a rotating abrasive platen, but the spindle must be maintained precisely perpendicular to the abrasive surface to obtain a workpiece surface flat within about 2 lightbands (22.3 microinchs or 0.6 micrometers). The aggressive cutting action of plated diamond island style flexible sheets requires the grinding contact perpendicular force to be near zero pounds at the start and end of the grinding procedure and to be controlled within plus or minus 0.5 pounds (227 grams) with a typical nominal force of 2.0 lbs. (0.908 kg) for an annular ring shaped workpiece having approximately 3.0 square inches (19.4 square cm) of surface area. Hydroplaning of the workpiece on the water lubricated abrasive is minimized when using abrasive covered raised island sheets, but is severe for uniformly coated abrasive disks generally used for smooth polishing or lapping. Hydroplaning causes cone shaped ground workpiece surfaces, even with raised platen annular rings. Lapping requires a low friction spherical action workpiece holder which does to tilt due to abrasive contact forces. A lightweight three-legged offset center-of-rotation spherical workholder with fluid joints and a link arm connecting the two matching spherical mechanism segments can significantly reduce workpiece tilting due to abrasive planar contact forces. Rotating the workpiece holder in the same clockwise or counter clockwise direction as the abrasive when using large diameter disks with narrow annular bands of thin coated raised abrasive islands is an effective method to flat-grind or lap-polish workpieces with increasingly large diameters. The abrasive platen must be ground very flat and the abrasive disk sheet must be precise in thickness to be used effectively at high speeds.

Raised Island Abrasive Sheets

Abrasive disks of large 18 inch (0.46 m), 24 inch (0.61 m), 36 inch (0.91), 48 inch (1.2 m) or even 60 inch (1.5 m) diameter having an outer annular band of raised islands which have a thin precise coating of diamond particles can be produced effectively with very precise thickness control. Raised islands can be deposited by a variety of means on a variety of commonly available thin flexible plastic or metal backing materials. Loose diamonds can be metal plated or plastic binder coated as a single mono layer on top of these islands which have been height controlled to produce a precisely controlled thickness relative to the bottom surface of the disk backing material. Diamond particles can be coated with the use of binders such as phenolics that have been used traditionally in the abrasive industry for many years. A make binder coating can be applied to a backing material, abrasive particle powder applied, a partial or full cure effected and a filled size coat applied and then the full substrate disk cure effected. These disks typically would be produced by a batch process; however, the basic process can also be applied to continuous webs. Fine abrasive particle disk sheets or belts can be used for lapping and coarse particle disks used for grinding.

BRIEF DESCRIPTION OF THE DRAWINGS

FIG. 98 shows a side view of abrasive particles applied to adhesive wetted islands with a salt shaker type device.

FIG. 99 shows a side view of a sintered powder metal abrasive island.

FIG. 100A shows a side view of an abrasive disk with a mold plate set used to flatten and level an abrasive particle island top layer.

FIG. 100B shows a side view of a sintered metal island with a mold plate in level contact with an abrasive particle island coating.

DETAILED DESCRIPTION OF THE INVENTION

Figure 1:
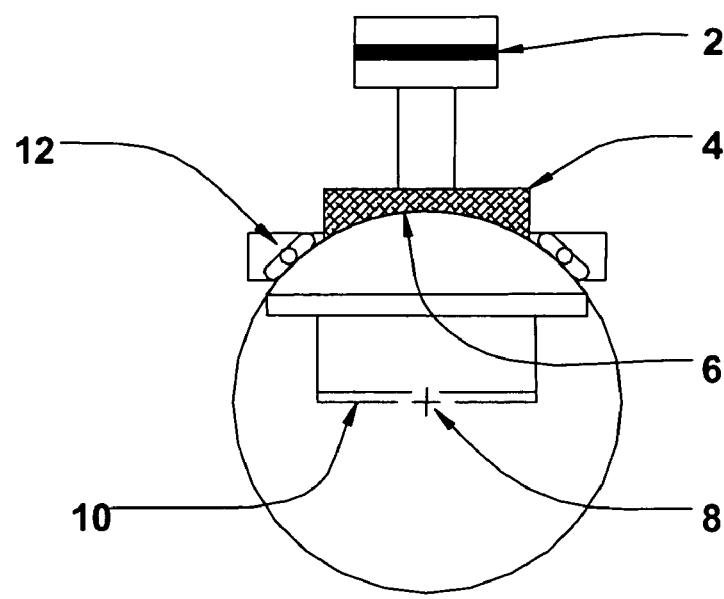
FIG. 1 shows a cross-sectional view of a workpiece holder with a brake pad restraining system.

Apparatus, abrasive sheets and methods are needed for super high speed lapping at greater than 500 rpm, greater than 1500 rpm, higher than 2,000 rpm and even speeds of 3,000 or 5,000 or greater rpm with abrasive sheets of 6 inch (0.15 m), 12 inch (0.30 m), 18 inch (0.46 m), 24 inch (0.61 m), 36 inch (0.91 m), 48 inch (1.2 m) and 60 inches (1.5 m) in diameter.

The present invention may be further understood by consideration of the figures and the following description thereof.

The materials and process of the present invention may be used, by way of non-limiting example, in the various fields such as there are a variety of methods that could be used to create the desirable "island-like" coating patterns on abrasive disk products which are described here.

Precision Flat Abrasive Platen

Variations in the precision of the abrasive platen spindle prevent the sheets of abrasive acting as a flat surface to the workpiece. A commercial spindle typically can provides flatness within 0.0001 inch (0.00254 mm) for a full revolution of the platen. This means that a perfectly flat abrasive disk would have to wear down 0.0001 inches (0.00254 mm) in some areas, on this level of platen precision, for all of the abrasive on the disk to be in contact with the substrate at very high speeds. At low speeds, the workpiece can travel up and down with the abrasive "hills and valleys" to utilize all of the abrasive. However, when the non-precise platen surface rises and falls as it passes a workpiece, this induces a vertical vibration input into the bottom of the workpiece which disturbs both flat grinding and polishing. The faster an abrasive platen rotates, the "flatter" the abrasive surface "appears" to the workpiece. However, the faster the speed, the less the surface area of a typical abrasive sheet actually contacts the workpiece as only the high plateau areas touch the workpiece. The platen spindle used to-date would typically have a precision of about 0.0005 inch (0.0127 mm) upon initial assembly but this would degrade with usage.

Thickness Variation of Abrasive Disks

Sheets of abrasive normally are about 0.0005 inch (0.0127 mm) thick with 0.003 inches (0.076 mm) thick plastic backing and 0.002 inches (0.051 mm) thickness of abrasive. Thus the abrasive can wear down 0.0001 inches (0.00254 mm) or 0.0002 inches (0.00508 mm) without destroying the abrasive layer. Typical variations in the thickness of abrasive sheets varies with the manufacturer. Coated diamond abrasive sheets from 3M Company have a typical thickness variation of about 0.0001 inch (0.00254 mm), and the plated Flex-Diamond® island sheets vary by up to 0.002 inches (0.051 mm) and their pyramid shaped Trizact® also varies by about 0.002 inches (0.051 mm). Sample abrasive sheets from Moyco Industries, Inc of Montgomeryville, Pa. vary by about 0.0008 inch (0.0203 mm). The abrasive used most to affect rigid spindle flat grinds is the 3M Company Flex-Diamond® disks which have the largest thickness deviation.

There are a number of techniques which would be employed to flatten out an existing expensive abrasive disk. This can be done by backside grinding of the outer annular ring portion of a disk or by re-cementing and leveling an annular ring to a new backing disk. Associated with having precise thickness abrasive disks is the desire to have large diameter disks and ones that utilize all of the expensive web stock to create these annular shapes.

Rotation Speed of Workpiece

It is necessary to rotate a workpiece as fast as possible when contacting an annular ring of abrasive. If the ring is less wide than the workpiece, a groove the width of the annular band is cut into the workpiece surface. Also this groove depth is tapered with faster cutting action at the outer radial periphery of the annular ring as the abrasive is traveling faster which results in a higher cutting rate than the slower moving inside radial positions. If the workpiece is held stationary, there will be a single track ground in. If the workpiece is rotated very slowly, the track will progress circumferentially around the workpiece. If the workpiece is rotated rapidly, the surface will tend to be ground more uniform and flat across the whole surface. The faster that the platen is rotated, the higher the grinding rate of material removal and the more pronounced the track affect on the surface. Here, the wonderful capability of fast material removal works against producing a flat surface. Conversely, if the workpiece is less wide than the annular ring, the workpiece will tend to wear a groove into the abrasive equal to the width of the workpiece. Also, the tapered nature of the groove would still exist as the outer radius of the abrasive ring would cut faster than the inboard radius. To compensate for this narrow workpiece, the workpiece holder can be translated radially to oscillate back and forth across the edges of the abrasive annular ring to wear the annular ring evenly across its surface. Sharp edges on the abrasive annular ring can cause sharp lines to be ground into the workpiece surface so it is desirable to provide a tapered edge to the abrasive.

To help adjust for the difference in the surface speed abrasive wear rate and material removal at the outer and inner radii of the annular ring, the workpiece can be rotated in the same clockwise or counterclockwise direction as the platen. Here, the workpiece would typically be rotated at the same RPM as the abrasive platen to obtain a similar relative abrasive cutting surface speed, SFPM, at both the inner and outer annular radius. The result of these two elements rotating in the same direction provides a subtraction of the workpiece surface speed from the platen speed at the outer radius and an addition of the two at the inner diameter as measured in the tangential direction of the abrasive platen. Because the abrasive platen has a very high rotational RPM velocity to obtain a high surface speed, of surface feet per minute, it is necessary to have a very high rotational speed of the workpiece holder also. The workpiece holder then has to be balanced quite well even with the casual loading of unfinished workpiece parts to prevent centrifugal out of balance forces from tipping the workpiece relative to the abrasive surface and causing non-flat patterns to be ground into the workpiece. This is particularly of concern when using a low friction spherical movement workholder for polishing.

Need Large Diameter Annular Abrasive Disks

If a very large abrasive platen diameter is used, perhaps even 36 inches (0.91 m) or 48 inches (1.2 m) in diameter, then a small platen rotational speed can be used to obtain the desired high surface grinding speed. Here, the rotational speed of the workpiece can be drastically reduced due both to the nominal speed reduction of the platen and also due to the fact that there is a smaller difference in surface speed at the inner and outer radii of a narrow annular abrasive ring of large nominal diameter. To achieve the high surface speeds required for high speed grinding, small disks of 1.5 inches (3.81 cm) diameter may have to rotate at 20,000 to 30,000 rpm.

Grinding Technique

A simple process technique can be employed during the grinding process which can diminish the effects of a number of process variables. A workholder can present the workpiece flat to the abrasive, and its rotation started prior to starting the rotation of the abrasive platen. Then after grinding is completed, the abrasive grinder slowed down, then the workholder slowed down and after both have stopped rotating, the workholder raised up from the abrasive surface to remove the workpiece.

Slurry Grinding Flatness

A slurry of abrasive particles mixed in a liquid is commonly used to lap grind workpieces flat and smooth with the use of a slowly rotating platen. The slurry is applied to the large diameter platen and the workpiece is positioned in an annular region at the outboard position of the platen. The workpiece is brought in contact with the free surface slurry and it is typically rotated in the same direction as the platen to create similar tangential surface speeds at the inboard and outboard slurry abrasive contact sections of the workpiece on the platen. The wear material removal rate from the workpiece surface tends to be more even across the workpiece surface with this same direction rotation technique. The thick viscous slurry travels freely with the platen and it wears away on the bottom surface of the workpiece. The slurry is many abrasive particles deep and when the top surface is dragged back by contact with the workpiece, a fluid shear is set up through the thickness of the slurry. This creates some limited motion of the abrasive relative to the platen surface and tends to wear the platen under the path of the workpiece units. Some modest change to the flatness of the platen is not critical to producing a flat surface to the workpiece as there are a number of abrasive particles stacked upon each other and only the top ones are in contact with the workpiece. Locking of individual particles and fluid shear from the particle suspension liquid provide relative velocity between the particles and the workpiece. Each workpiece is nominally flat which tends to level the slurry arriving under the workpiece. Differentially increased abrasive wear action takes place on areas of the workpiece which extends out further into the slurry from a nominal flat plane reference on the workpiece which wears the highest areas off faster to create a precision flat surface. Patterns of motion to move the workpiece about the platen surface in conjunction with raising and lowering the RPM speed of the workpiece and the platen can be optimized to obtain flat workpiece surfaces and make the uniform wear of the abrasive slurry platen. The workpiece can be laid freely on the surface of the slurry coated platen with or without static weights or other nominal contact force inducing devices such as air cylinders. Because of the typical very low 200 RPM rotational speeds of the abrasive platen and the 48 inch (1.2 m) or larger diameters, it is not usually necessary to rotate the workpiece at high enough speeds to generate dynamic balancing imbalances or hydroplaning effects. Cut rates are slow, however, sometimes taking hours for what can be accomplished by high speed lapping in minutes or seconds.

Another use of the spherical workholder with the offset to compensate for tilting effects of the abrasive contact forces would be to employ this device for slurry grinding or lapping. Here, the material removal rate could be increased by increasing the downward contact force and also, by increasing the rotational speed of the abrasive platen.

Compare High Speed Lapping and Slurry Lapping

The analogy between high speed lapping and slurry lapping is subtle and important to achieve a flat grind. A circumferentially "flat" abrasive surface is created by high speed rotation of the abrasive coated disks and correspondingly, there is a difference in abrasive wear rate which generates an uneven surface. The slow moving "flat" slurry abrasive surface is created by the leveling action of the workpiece itself.

When wear of the annular ring of abrasive occurs, the precision alignment of the workholder to the abrasive platen is lost. Radial flatness of the annular ring is only maintained if the whole ring wears evenly across the full radial width. The smaller nominal diameter of the annular ring, the less the difference in the inboard and outboard surface speed and the better the uniformity of the wear rate across the radial width of the ring.

Dual Platen Machine

A single machine that has two independent platen spindles is in the final stages of construction. It has the capability to grind a workpiece flat with plated metal island abrasive on one spindle and finish lap the same workpiece on the second spindle using fine grit coated abrasive.

Other features of the lapping apparatus of the invention, with the problems specifically addressed, and solutions to these problems are also described herein. They are numerically listed below.

1. Granules in Liquid for Gap Separation

Problem: When a workpiece is lowered initially into contact with a moving abrasive surface and it is not in perfect parallel alignment with the abrasive, a cone-shape will be ground in the surface of the rotating workpiece. This can occur during the brief period of time it takes to get the workpiece to continue its travel toward the abrasive to when the workpiece does lay flat with the surface of the moving abrasive after it first makes contact with the abrasive. Also, when a liquid is used in a workpiece holder spherical bearing, it is desired to keep the two matching spherical components separated without the parts touching each other. Furthermore, to increase the material removal rates of a workpiece, chemicals can be added to the liquid, such as surface wetting agents, surfactants, chelating agents, etc.

Solution: Microspheres (e.g., made of resinous or polymeric materials such as urea/formaldehyde, glass, ceramics, and the like) such as those made by 3M Company can be added to the liquid injected into the spherical gap of a workpiece holder spherical bearing to maintain the gap between the spherical pivot components. Also, these types of microspheres may be added to the water lubricant water applied to a high speed platen abrasive disk just prior to lowering the workpiece to the abrasive surface. These particles would be selected to have low friction, be soft enough to not damage or scratch the workpiece surface and be large enough to act as separating roller balls to assist in levelling the workpiece surface. When the workpiece makes initial contact with the abrasive, the workpiece would contact the spheres only for the first period of process time until the workpiece has time to continue its travel until it lays fully flat against the abrasive. Then the microspheres would be washed off the abrasive by the applied water flow (just as swarf is removed) and the abrasive grinding would start. Also these spheres or other materials could be composed of certain chemicals which would chemically react with the workpiece material to accelerate the removal of material.

2. Work Holder Gimbal Brake

Problem: When a workholder uses low friction bearings to create a spherical gimbal rotation, substantial vibration can be present between the two primary upper and lower gimbal components. This vibration is induced by the contact forces of the surface of the workpiece that are present when touching the high speed moving abrasive platen. Undesirable grinding patterns are generated on the workpiece surface due to these vibrations. A variety of techniques can be employed to damp out these vibrations, but most tend also to tilt the workpiece holder out-of-flat with the platen-grinding surface. Vibrations tend to vary in amplitude and frequency, depending on a large number of factors including the mass and size of the workpiece, the contact force, platen speed, amount of coolant flow, type of abrasive and so on. This is particularly a problem with an offset spherical gimbal device where the abrasive contact plane is located below the gimbal bearings, which are traveling in a radially curved slot. Further, it is desired to mount a workpiece, lower it to flat contact with the stationary surface and fixture the workpiece into this position for subsequent grinding process steps with moving abrasive.

Solution: A passive or active spherical brake can be used on a two-part gimbal workholder unit. In this construction, an upper dome spherical shaped segment is attached to the lower moving part of the workholder that contains the workpiece. A brake pad that has a matching spherical shape is mounted to the upper part of the workholder so that the brake pad is stationary while the moving dome segment slides relative to the pad. The friction energy developed at the brake pad by the relative motion between the two sliding components, by the vibration-induced oscillations, will tend to damp out the vibrations. The pad can be held against the dome by a flat or coil spring or a variable force air cylinder can be used. This pad brake can also be used to hold a workpiece stationary in a desired alignment position with controlled restraint friction when a spring or air cylinder applies a normal force to the pad.

FIG. 1 shows a view of one of the two sets of roller bearings operating in a radial slot to effect a spherical motion. An air cylinder 2 applies force on a brake pad 4 that is in contact with a spherical dome 6. Gimbal bearings and radial slots 12 generate spherical motion around a spherical center 8 that is at the same contact plane as a workpiece surface 10.

3. Work Holder Retaining Spring

Problem: When a workpiece holder device is used with high speed lapping of 8,000 surface feet per minute (SFPM), there exists some joint gaps between the upper and lower components of the spherical pivot holder device. When a workpiece is attached to the lower portion of the holder, the weight of the workpiece and holder block act with gravity to separate the two components by a few thousandths or more of an inch. This separation is due to clearance within bearing elements and this loose gap occurs as a workpiece is held in free space above the abrasive platen. As the workpiece is lowered into contact with the abrasive and a pressure force is applied to the workpiece holder to push the workpiece against the abrasive, this separation gap disappears. The bearing gap is very large as compared to the amount of material removed in a typical lapping or polishing process step for either high speed 8,000 SFPM or even for low speed slurry lapping. An accurate measuring device such as a linear readout scale is commonly used to establish the relative position of the workpiece surface while grinding occurs. This device indicates the lapping material removal rate but the bearing gap tends to generate an error in the reference position by an amount equal to the gap. Other factors such as the thickness of lubrication on the bearing rollers produce short term unknown or unpredictable gap variations so that a predicted offset compensation gap amount can not be determined.

Solution: For both slow moving 300 SFPM or high speed 8,000 plus SFPM (surface feet per minute) speed, the workholder device components can be held together by use of a tension spring mounted at approximately the exact center of the spherical pivot device. The spring would be strong enough to hold the workholder parts together, even against the pulling gravity force from a large heavy workpiece part. As the spring is centered, there is little or no possibility of the retaining spring imparting an off-center torque force which would tilt a workpiece into a non-flat position. This construction allows the spring axis to pass through the center of the spherical gimbal rotation.

4. Lapper Spindle Air Bearing

Problem: There is significant friction in the vertical slide assembly which holds a rotating workpiece holder, due in part to overhung loads from the spindle shaft, bearings and drive motor which are mounted on a low friction slide such as an air bearing table. Also, when a separate low friction air cylinder is also mounted outboard, with its axis located some distance from the axis of the center of the air bearing slide, sliding load torque is developed which tends to bind the slide. Very low friction forces of 1 pound or less are required for a 15 to 20 pound assembly used in lapping. Large friction forces prevent high quality lapping action that makes it very important to accurately control the contact force between the workpiece and the moving abrasive for lapping.

Solution: Construct a slide assembly using concentric round air bearings with a hollow slide shaft through which a rotating workpiece holder shaft is mounted at each end with bearings. In this construction, the axis of the rotating shaft is concentric with the tubular air bearing, hollow slide shaft. In this way, there is no overhung load due to the weight of the rotating shaft and its bearings. The hollow shaft and housing would be matched for coefficient of thermal expansion to control the fit of the air bearing. Further, the use of an independent air cylinder can be eliminated by use of a stepped diameter hollow shaft where the upper air bearing has a larger diameter than the lower air bearing. An opening is provided to the sealed chamber connecting the two bearings and is air pressurized with a regulated air source. The diameter of the air bearings is selected such that the upper cross-sectional surface area is greater than the lower so that the net differential air cylinder force pushes the tubular hollow slide upward to counterbalance the weight of the assembly. Controlling the pressure will either lift the assembly or allow the workpiece to contact an abrasive surface with the desired controlled force.

Figure 2:
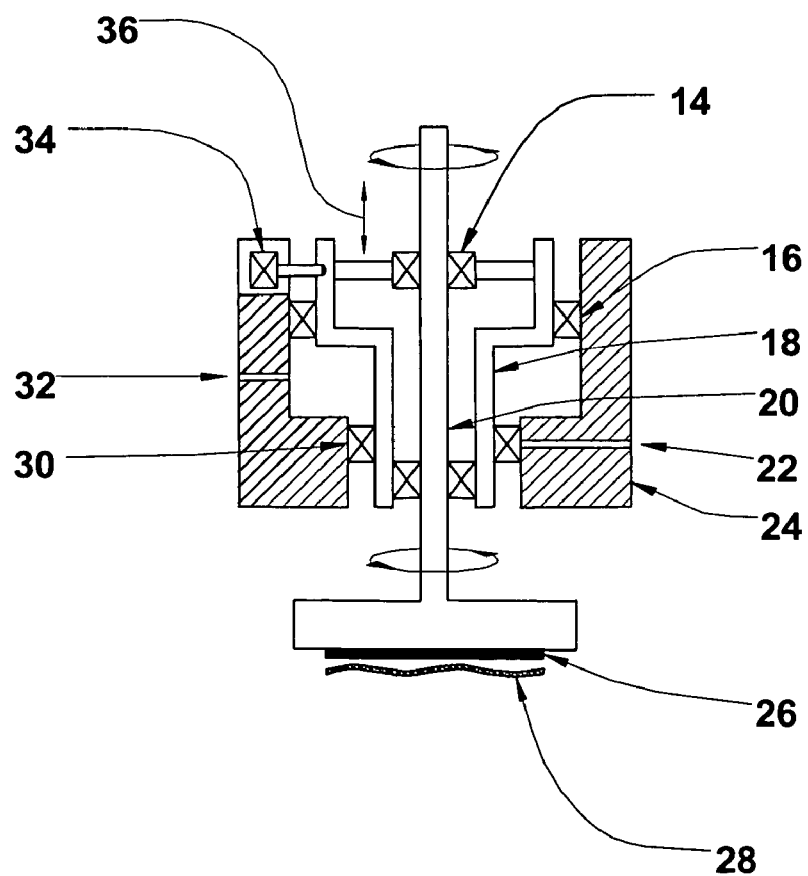
FIG. 2 shows a cross-sectional view of a lapper spindle which is supported by an air bearing slide assembly.

FIG. 2 shows an air bearing slide assembly with a workpiece spindle shaft 20 rotating bearing 14 held by a hollow tubular section 18 supported by a large air bearing 16 and a small diameter air bearing 30 which are contained in an air bearing housing 24. Inlet pressurized air 22 is provided to control the abrasive contact force on the workpiece 26 as it contacts moving abrasive 28 with an air exhaust passage 32. An anti rotation pin and bearing assembly 34 stabilizes the tubular section 18. The slide assembly moves vertically as shown by 36.

5. Spherical Air Bearing-Offset

Problem: An offset spherical bearing with low friction is required to assure that grind patterns are not established in a workpiece because of the workpiece hanging up as it is rotated during lapping or grinding.

Solution: Use of porous carbon or porous graphite in a cup or spherical shell form can be used as a fluid bearing. Here an annular section of the cup shaped shell with a matching spherical shaped rotor section can be used. When vacuum is applied to the inner section of the shell assembly to draw the rotor section into the assembly, this will also create a vibration damping action for the spherical rotor. The rotor is floated on an adjacent pressurized air film, which opposes the vacuum force. An anti-rotation bearing device prevents rotation of the spherical rotor relative to the cup housing. The cylindrical axis of the workpiece is allowed to float freely about a spherical axis point that is located offset from the workpiece holder assembly.

Figure 3:
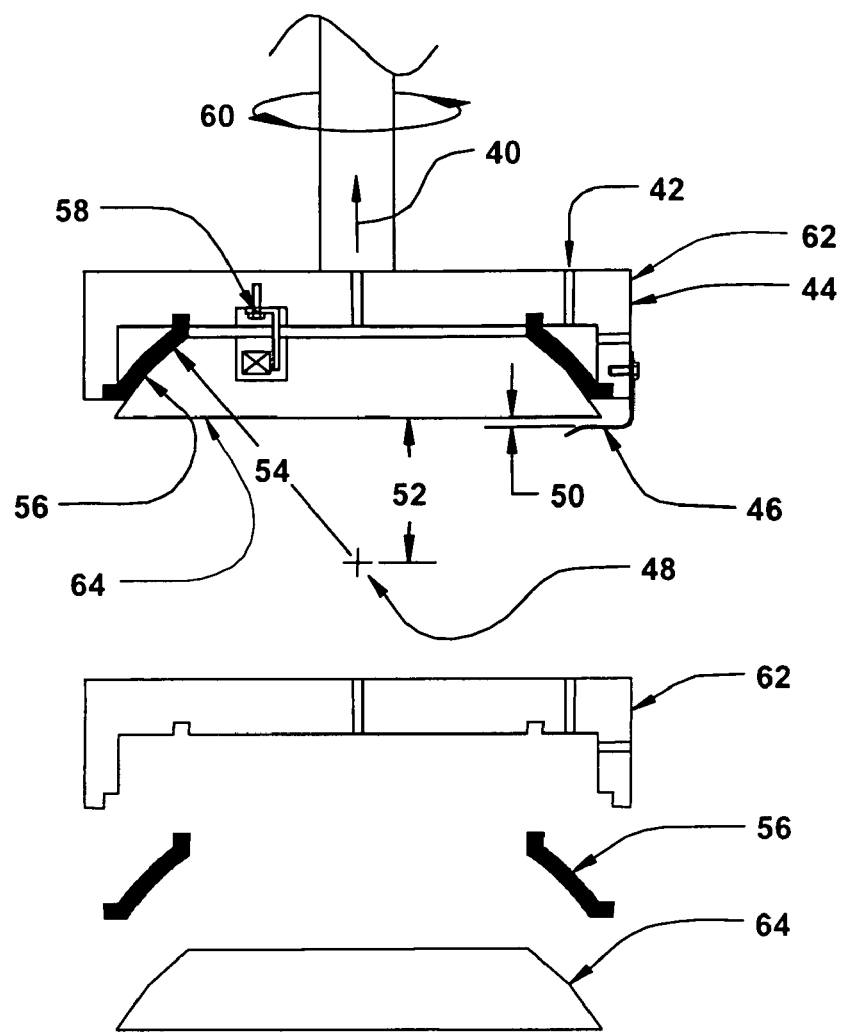
FIG. 3 is a cross-sectional view of a fluid bearing spherical motion workpiece holder.
Figure 4:
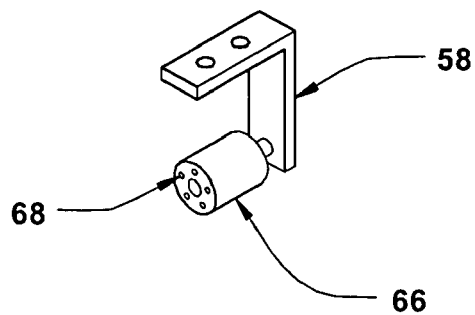
FIG. 4 is an isometric view of a roller bearing device which prevents the axial rotation of a spherical workpiece holder.

In FIG. 3, a workpiece holder with a spherical offset center of rotation 48 shows how a vacuum source 40 acts against the inner portion of spherical rotor 64 having a spherical radius 54 which is contained by a spherical porous graphite cup 56 mounted in a workpiece holder assembly 44. Positive air pressure 42 is directed into the porous carbon bearing 56 to counterbalance the vacuum 40 force. The center of rotation 48 of the spherical rotor 64 is offset from the rotor surface by an offset distance 52 which allows a workpiece part of a certain thickness to be mounted to the rotor where its lapped surface is nominally at the center of rotation 48. The workpiece can be recessed into the rotor to effect this alignment of the center of rotation with the workpiece lapped surface. The housing 62 which holds the porous carbon or graphite bearing 56 can be constructed of aluminum or titanium to reduce the inertial mass of the rotating workpiece holder. FIG. 4 shows the anti rotation device which is constructed of an anti rotation bearing 66 which uses 0.125 inch (3.175 mm) inside diameter needle bearings 68. A spring clip 46 that is shown at the bottom surface for illustration purposes only is used to limit the angle of the rotor 64 by allowing range of motion over a gap range 50.

6. Air Bearing Spherical Workpiece Holder

Problem: A large 2 to 4 inch (5.08 to 10.2 cm) spherical diameter is required to create an offset spherical center of rotation so that a workpiece lapped surface contacts a high speed or low speed lapping or grinding abrasive surface, either for use with diamond sheets of abrasive or slow slurry lapping, to prevent tipping of the workpiece due to abrasive contact forces.

Solution: Use a portion of a sphere pivot ball with separate annular sectors having different functions. A low negative pressure vacuum of about 13 psi can use a large central spherical rotor area to resist the downward force of a high pressure annular top ring, which nominally pushes down. The vacuum force balances out the downward thrust force of the top ring and the pressurized air gap thickness is controlled by adjusting either or both the vacuum and the pressure levels. The lower pressurized annular ring primarily resists radial load forces and provides a minimum of vertical force thereby contributing to the total force on the spherical joint.

Figure 5:
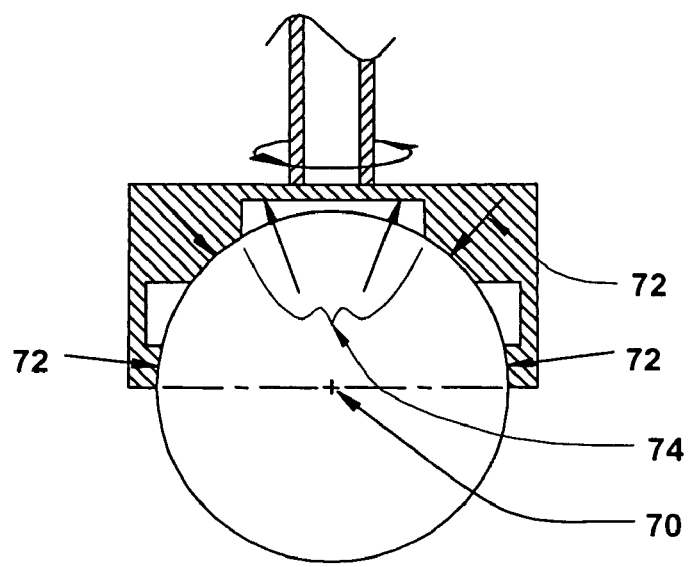
FIG. 5 is a cross-sectional view of a fluid bearing spherical workholder joint with a vacuum central section.
Figure 6:
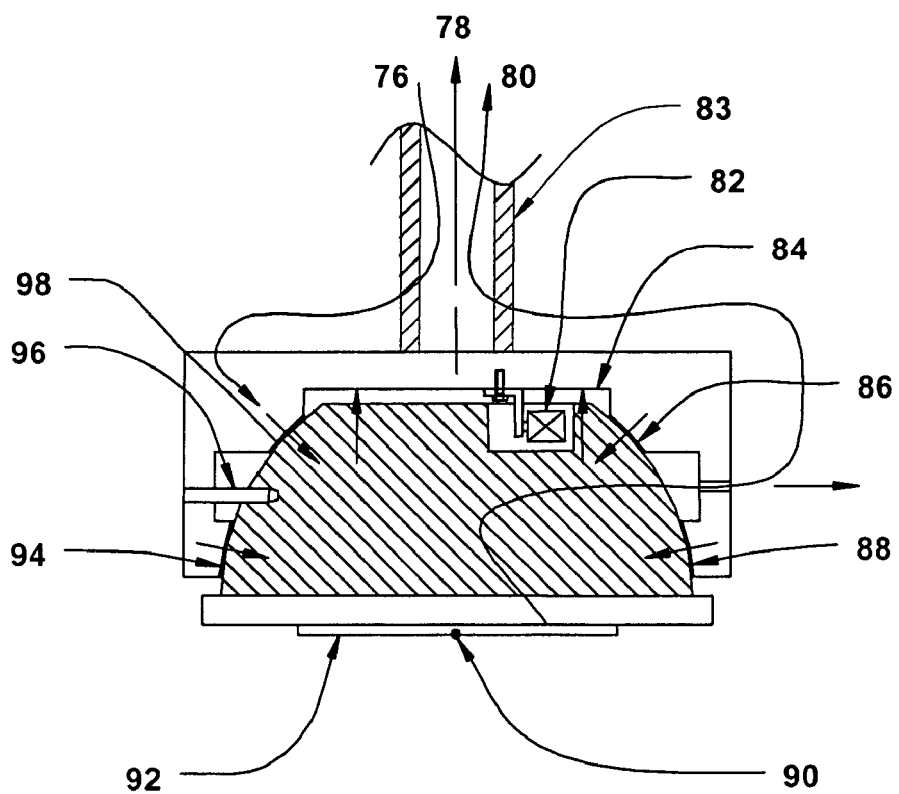
FIG. 6 is a cross-sectional view of a spherical joint workholder with an anti rotation device.

FIG. 5 shows a spherical motion workholder with a spherical center of rotation 70. A pressurized fluid source 72 counteracts a vacuum area 74. FIG. 6 shows more details of this basic design, where the fluid pressure source 76, the counter acting vacuum 78, the air and vacuum source lines 80, the vertical restraint vacuum area 84, and the vertical thrust air pad annular spherical ring 86 act mutually on the assembly. Fluid pressure is applied by the use of small 0.008 inch (0.02 mm) diameter jeweled orifice holes feeding air to 0.010× 0.010 inch (0.25×0.25 mm) grooves which are three independent separate segments extending for 100 degrees each around the circumference of the spherical ring. There is an interrupted gap between each of the grooved air feeder passage ends. The radial thrust air pad annular ring 88 has three separate grooves which are supplied by an individual feed orifice and is separated from the other two grooves. These grooves collectively span the full 360 degree latitude circle of the spherical globe. The spherical center of rotation 90 allows a workpiece 92 to freely rotate. The primary radial thrust which counteracts abrasive contact forces is provided by the lower pressurized annular ring 94. Restraining pins 96 can be used as an anti rotation system to keep the rotor section from rotating axial relative to the spindle or an anti rotation bearing 82 can be used to accomplish this. The pressurized annular ring fluid bearing section 98 is used primarily to counteract downward abrasive contact forces which push the workpiece 92 into the flat surface of the moving abrasive.

7. Air Bearing, Air Cylinder

Problem: In many technical fields, it is desirable to have or use an air cylinder that has no friction of the cylinder shaft. Present cylinders employ rod pistons that have flexible O-rings or other seals which are in dragging contact with the inner diameter of the cylinder walls. This dragging of the O-ring creates friction or stiction as does the piston rod which drags on a cylinder rod end bushing. It takes a force of a range of ounces to pounds to break the stiction force when starting a cylinder piston rod to move. This hysteresis force is a source of difficulty when a piston O-ring cylinder is used for web handling dancer systems used to take up web tension. Also high friction cylinders, even rolling diaphragm cylinders have undesirable high friction for use on applications employing slide mechanisms used to hold or position or move component parts, product devices, mechanical testing machines, medical examination test devices and so on.

Solution: Create an air cylinder with the use of air bearings which radially support the piston rod shaft within the cylinder housing so that a film of air or other fluid separates the rod from the cylinder body. Then apply the desired air pressure to the free end of the piston contained within the cylinder body so a force is created on the rod axially on its cylindrical cross section area. The larger diameter the cylinder rod, the larger the cylinder force capability. The piston rod can be supported by one or two or more air bearings of porous carbon purchased from New Way Machine Co. or the rod may be surrounded by jeweled orifice air jets. An air pressure regulator can supply the desired air activation pressure and may be of the pressure relieving style to accommodate leakage air from the air bearings. An option is to use a bleed air orifice to exhaust air. The piston activation pressure should be less than the air bearing pressure. A gimbal type mount may be used on either or both ends of the cylinder.

8. Annular Ring Abrasive Disk

Problem: Abrasive disks are commercially available in standard sizes of 12 inch (30.5 cm) diameter (or less) with diamond or other abrasive coated or plated on flexible cloth, plastic or paper backing. They are either in a full diameter sheet form or as an annular cut-out ring. In either case, the abrasive at the cut edges at both the outside and inside diameters tend to break off and scratch the part being polished. Also, it is difficult to match the width of the annular ring of abrasive to be approximately 75 to 90 percent of the widest width of a workpiece being ground or lapped which is an important factor in having the workpiece overhang the abrasive. It is difficult to attach the bent down periphery of the ring to the platen.

Solution: A standard full sized round abrasive disk can be used to provide an annular width of abrasive to be slightly wider than the workpiece and also have the outboard and inboard edges of the raised annular abrasive ring to be lower than the raised surface and be attached to the high speed rotating platen. Bending the outboard and inboard edges down at the edges of the raised areas avoids contact of the weak individual abrasive particles, or islands, with the workpiece and prevents these abrasive particles from breaking loose. To accomplish this, a flat abrasive platen is used. Adhesive is applied uniformly to the abrasive disk opposite the abrasive, then a thin annular ring of material is added to the adhesive side. The result is to elevate the outer portion of the disk for a specified width leaving the outermost periphery of the disk and the innermost center both with exposed adhesive. The composite disk is then mounted to the platen and the outer diameter and the inner diameter is held down lower than the flat annular raised abrasive surface. Here, another variation would be to attach the central portion of the disk to the platen by vacuum and attach the outer edge with adhesive or vacuum.

Figure 7:
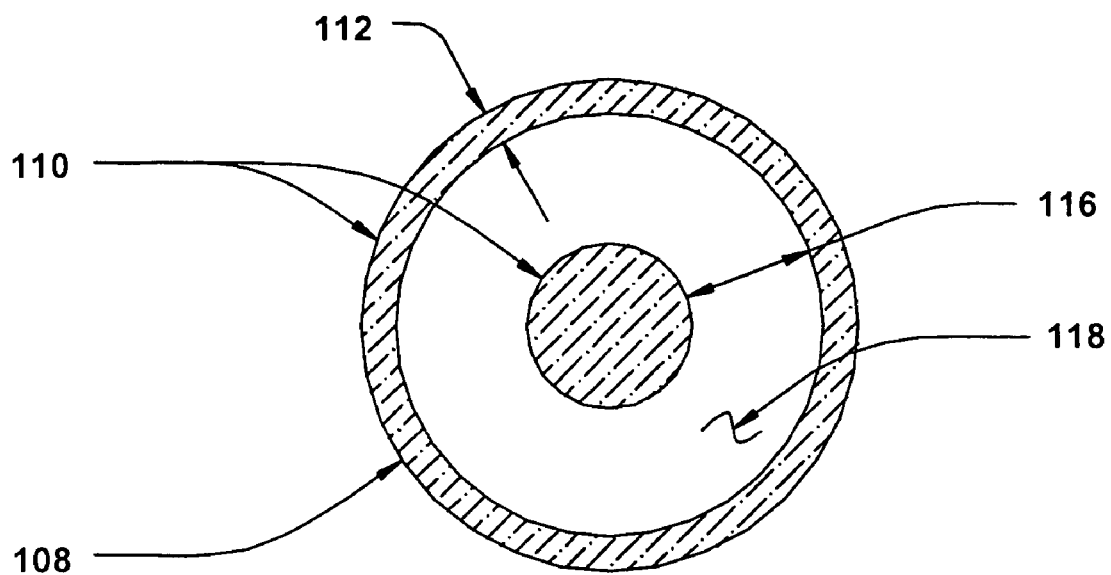
FIG. 7 is a top view of an abrasive disk with a raised annular ring ledge attached with adhesive.
Figure 8:
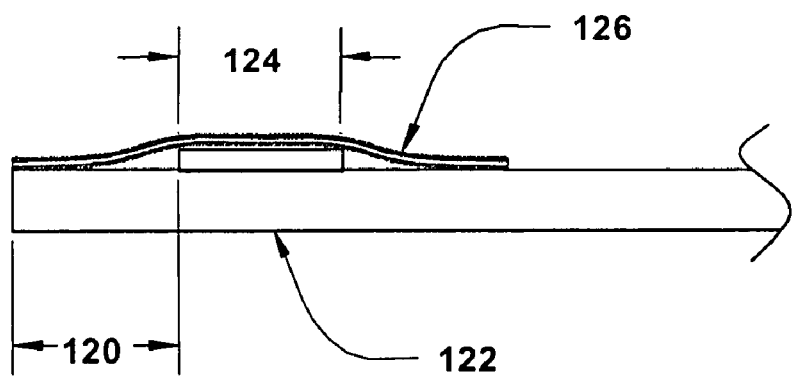
FIG. 8 is a cross-sectional view of a platen and abrasive disk with an attached raised annular ring.

FIG. 7 shows an abrasive disk 108 with a raised annular ring 118 having a width 116 attached by adhesive that is applied uniformly to the disk surface on the side away from the abrasive. The raised ring 118 is typically 0.5 to 4 inches (1.27 to 10.2 cm) wide for a disk of 12 inches (30.5 cm) diameter. An exposed ring of adhesive 110 extends about 0.5 inches (1.27 cm) outboard 112 of the raised ring 118 and adhesive 110 covers the portion of the disk inboard of the ring 118. In FIG. 8, a cross sectional view of the disk 126 and the platen 122 show the raised ring section 124 with adhesive distance 120 at the outboard section of the abrasive disk 126.

9. Lapper Spindle Speed and Pressure

Problem: When a workpiece is lapped on an annular abrasive disk mounted on a 12 inch (30.5 cm) diameter platen operating at a typical speed of 3,000 RPM, the spindle speed at which the workpiece is rotated while in contact with the abrasive is important. If the workpiece spindle is stationary, a groove the width of the annular abrasive is cut into the workpiece with the groove tapering such that it is most shallow at the inner radius of the annular ring where the surface speed of the abrasive is lowest. The groove will be cut deepest at the outer radius of the annular disk where the abrasive has the highest surface speed. Also, the higher the contact force, the higher the removal rate and the deeper the groove. If the workpiece is rotated slowly, the groove will be established and prevent the workpiece surface from being lapped or ground flat. Grooves easily tend to be cut when a workpiece is first brought in contact with a rotating abrasive platen.

Solution: The platen and the workpiece spindle can be stopped when the grinding process begins, and the workpiece lowered to lay flat and parallel to the platen abrasive. Then the workpiece spindle is progressively brought up to full rotational speed of 200 to 2,000 RPM during the time the abrasive platen speed is also increased from zero to a full speed of 2,000, 3,000 or 5,000 RPM. The faster the workpiece spindle rotates, the less deep a single grooved area becomes on the workpiece surface. Simultaneously, or with the workpiece brought up to speed with the platen stationary, as the speeds of the workpiece spindle and the abrasive platen are brought up to maximum, the normal downward acting pressure holding the workpiece in contact with the abrasive is started as near zero as is practical. Then it is increased to a maximum of 1 to 5 lbs. per $in^2$ of workpiece surface area when the platen and spindle speeds are at maximum. Further, as the workpiece spindle speed is progressively reduced, the contact pressure is reduced and the platen speed reduced simultaneously. At the time both the spindle and platen are stopped, the contact pressure is at a minimum. To further reduce the likelihood of creating grooves at startup, the workpiece can be supplied an increased flow of lubrication water to raise the part up away from the abrasive due to the developed fluid boundary layer. Each abrasive media and workpiece part would require an optimum selection of these variables.

10. Lapper Workholder Mount System

Problem: It is difficult to mount a workpiece on a workholder without having distortion of the workpiece lapped surface during the lapping or grinding operation. Here a workpiece part can be attached to a mounting plate, the flat lapping completed and when the part is removed from its mounting plate it is no longer flat within one Helium light band (or 11 millionths of an inch or 0.3 micrometers). This can be due to residual stresses introduced by the attachment mechanism or technique. Another problem is the presence of localized forces on the workpiece part due to application of the contact force holding the workpiece against the moving abrasive. A further cause is the flexibility of the workholder which distorts the workpiece due to the abrasive contact force. Limited room is available for workpiece mounting to the workpiece holder, as the center of spherical rotation should be close to the abrasive surface which contacts the workpiece surface.

Solution: A very stiff workpiece holder mount can be fitted up within the body of a half-sphere holder ball which has a small extended area which has Velcro® brand hook-and-loop detachable materials attached respectively to the ball recess and the mount. This allows the workpiece mount to be removed for easy replacement of workpiece parts to the holder and allows rotational torque to be applied to the holder spindle. A cone shape of the removable mount provides great stiffness directed out from a small central force load area at the Velcro® surface which minimizes distortion of the holder mount due to the contact forces. The Velcro® attachment could be replaced with a rubber magnet, vacuum lock, mechanical snap holders, etc. Each workpiece part would be adhesively bonded to its own holder mount with the use of a cement (e.g., polymeric cement), such as an epoxy cement, urethane cement, acrylic cement, or other cements, RTV adhesive, hot melt adhesive in such a way that a uniform thickness of adhesive is present between the full surface of the workpiece part and the holder plate to prevent any localized distortion of the workpiece part due to contact forces. Teflon®, lubricants, grease or other coatings can be applied to the holder and to the part prior to application of adhesive so that enough strength is obtained to retain the part to the holder but yet allow the part to be easily removed when lapping is complete. Extra adhesive can be applied at external surfaces which are easily accessible and are located away from the critical lapped surface for later removal. Holder elements can be constructed of solid Teflon® with mechanical indented features that would temporarily "lock" the workpiece to the workholder with use of fast cure epoxy but would allow easy future removal after lapping with Teflon®'s nonstick character.

Another effective method is to apply pressure sensitive adhesive, PSA tape, to a workpiece backside and then use epoxy to structurally attach the tape-covered part to the workpiece holder for lapping. After lapping the workpiece is separated from the PSA tape.

Figure 9:
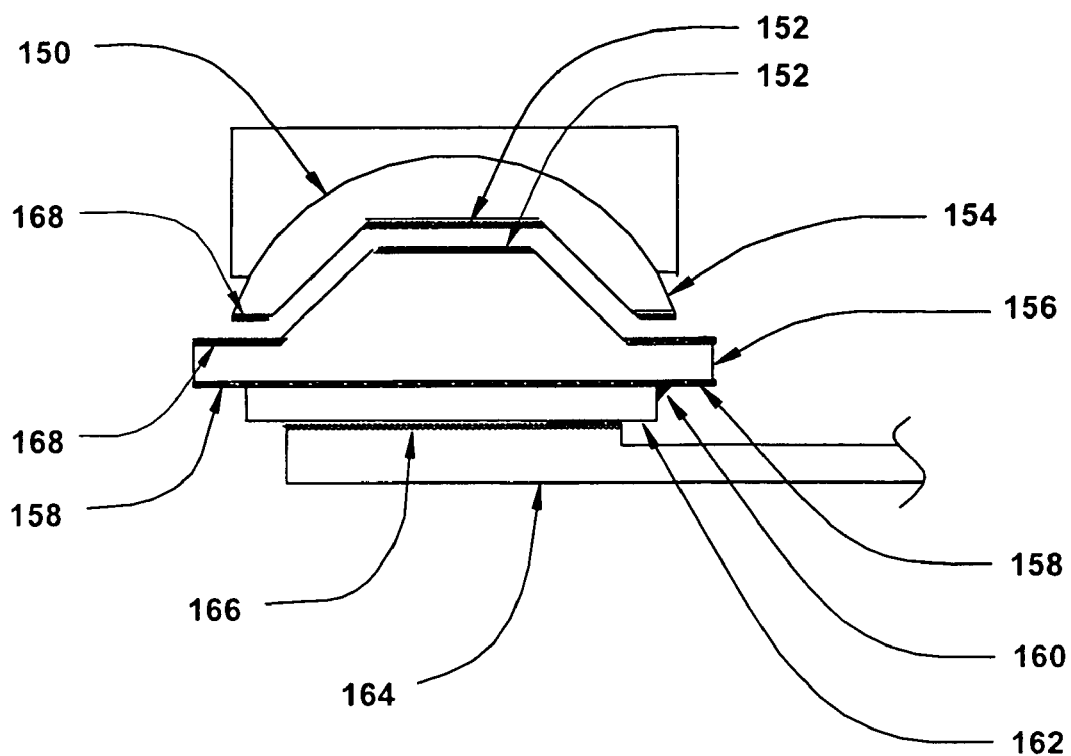
FIG. 9 is a cross-sectional view of a workpiece holder system.

FIG. 9 shows pressurized air or fluid 150 applied to a spherical offset half-ball 154 workholder fluid bearing where a workpiece holder mount 156 is attached to the mount 154 by use of Velcro®, brand of half-loop attachment material 152, 168 or a magnet device. The workpiece 162 is attached to the workpiece holder mount 156 that is coated with Teflon® coating or other release agents 158 with use of an adhesive. The workpiece 162 contacts a platen 164 that is covered with an abrasive sheet 166. As an alternative, the workpiece mount 156 can be attached to the spherical half-ball rotor 154 by use of three-point separate islands of Velcro® tape which are spaced 120 degrees apart on a flat outboard edge of the rotor 154.

11. Spring Retainer Sphere Ball

Problem: It is difficult to hold a spherical workholder ball in its socket by using vacuum which is applied to a portion of the ball surface area to act against the air bearing pressure pads.

Solution: Use a number of different types of mechanical springs to hold the sphere ball in the ball socket in such a way the ball is free to rotate over a very limited angle. Because of the central location of these mechanical spring retention systems, the rotation friction of the spherical motion will remain low.

Figure 10:
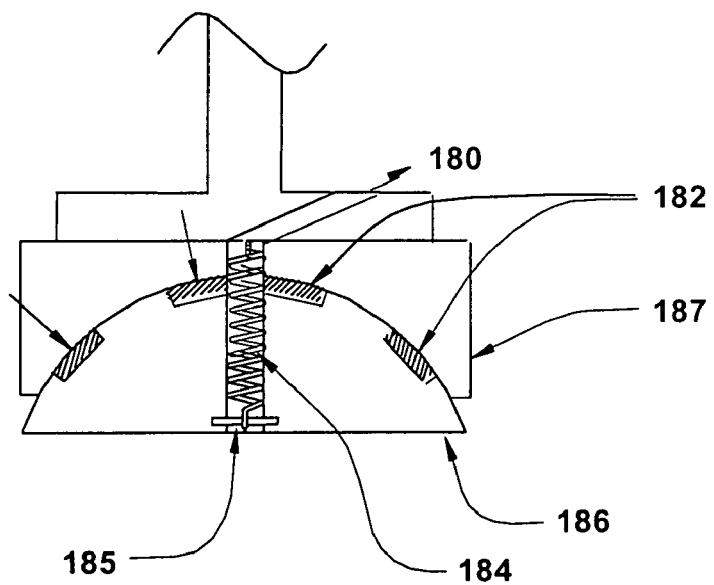
FIG. 10 is a cross-sectional view of a mechanical spring retainer system for a spherical workholder system.
Figure 11:
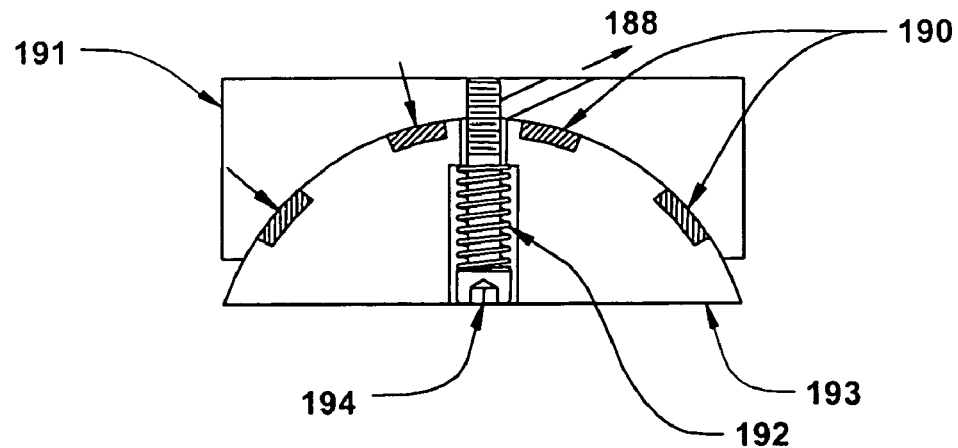
FIG. 11 is a cross-sectional view of a mechanical spring retainer system for a spherical workholder system.
Figure 12:
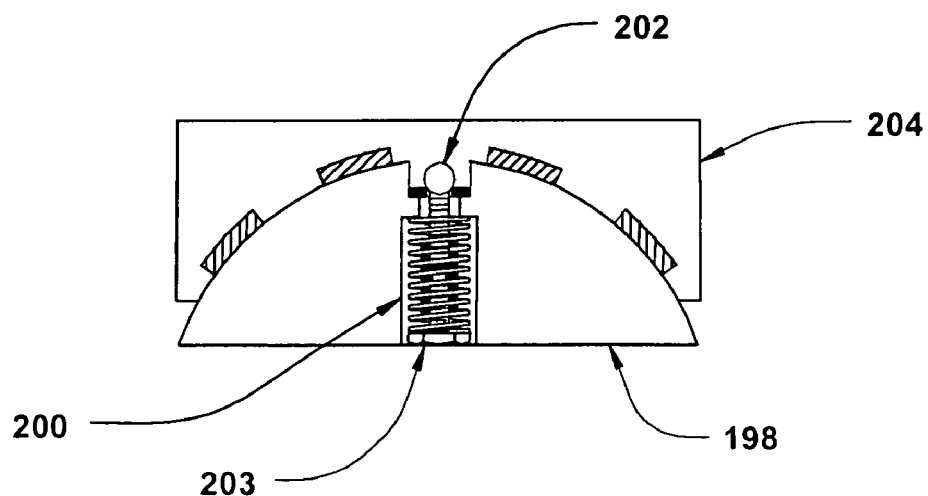
FIG. 12 is a cross-sectional view of a mechanical spring retainer system for a spherical workholder system.
Figure 13:
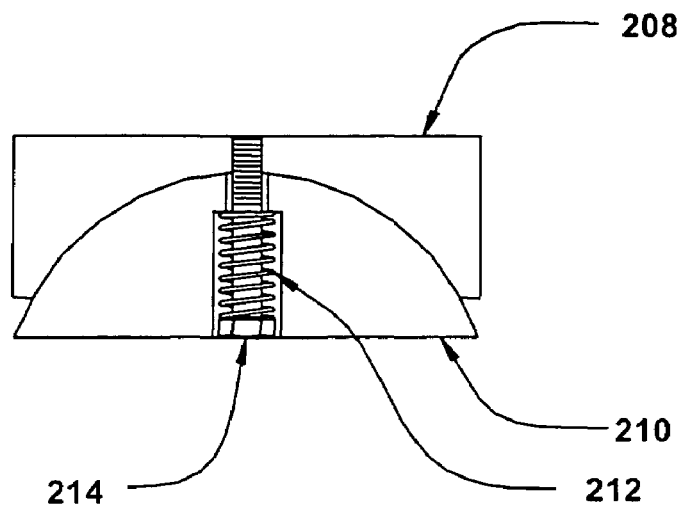
FIG. 13 is a cross-sectional view of a mechanical spring retainer system for a spherical workholder system.
Figure 14:
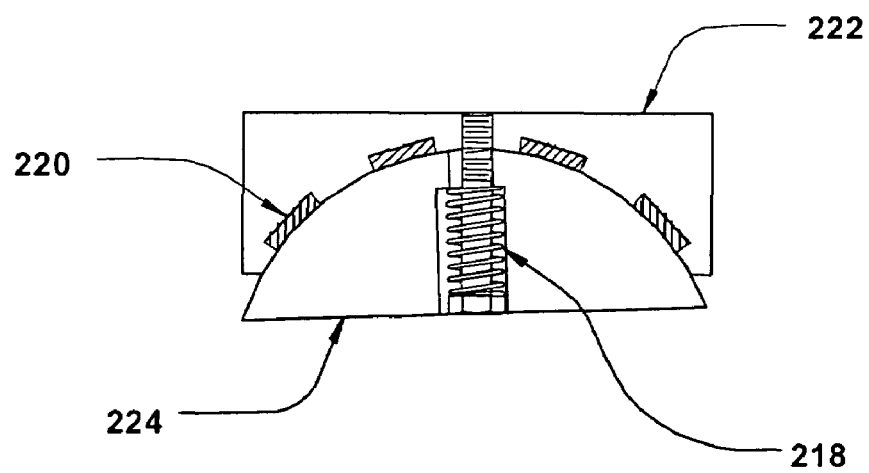
FIG. 14 is a cross-sectional view of a mechanical spring retainer system for a spherical workholder system.

FIG. 10 shows a workholder spherical ball system having a ball rotor 186 held away from its mating spherical housing 187 by pressurized air pads 182 having a central air vent 180. A tension spring 184 is held by a slender cross pin 185 on the rotor and is attached to the housing 187 so as to retain the rotor 186 into the housing. FIG. 11 shows a cap screw 194 that is threaded into the housing 191 to allow adjustment of the rotor 193 retaining force against air pads 190 by use of the spring 192. An air vent 188 allows exhaust air from the air pads 190 to vent from the screw 194 threaded section. FIG. 12 shows a spring 200 and bolt device 203 which is threaded into a pivot rod or ball 202 which allows the spherical rotor 198 to move freely in the housing 204 while maintaining a restraining force on the rotor 198. FIG. 13 shows a rotor 210 retained with a force provided by a compression spring 212 which is tension adjusted by use of a hexagon shaped bolt 214 which is threaded into the spherical housing 208. FIG. 14 shows a housing 222 with air pads 220 used to effect a spherical motion to a spherical workholder rotor 224 with the use of a hex bolt spring tension adjustment device 218.

12. Trunion Arm, Gimbal Stick for Wobble Plate

Problem: It is difficult to hold a quarter or half sphere ball section against its matching spherical ball seat under mechanical spring or vacuum retention and obtain very low friction in the ball motion over limited rotation. It is also hard to prevent the ball from rotating about an axis projection from a workholder spindle axis to the center of the sphere. This is a particular problem for a wobble plate workpiece holder for a lapping apparatus with the ball held tight to the ball socket against air bearing pressure.

Solution: This friction is minimized by coupling the loose ball quarter section to the fixed sphere ball seat housing with the use of a linkage arm having bearings acting perpendicular to the arm with each one spaced 90 degrees from the other. One end of the arm is rigidly attached to the free moving sphere quarter and a compression spring is placed under the other end of the arm. Here, the spring compresses axially, forcing the loose ball against the socket but yet allowing friction free spherical motion of the ball quarter or ball half. The upper arm is restrained about an axis parallel to the arm that allows the ball to move spherically but not axially about the spindle axis.

Figure 15:
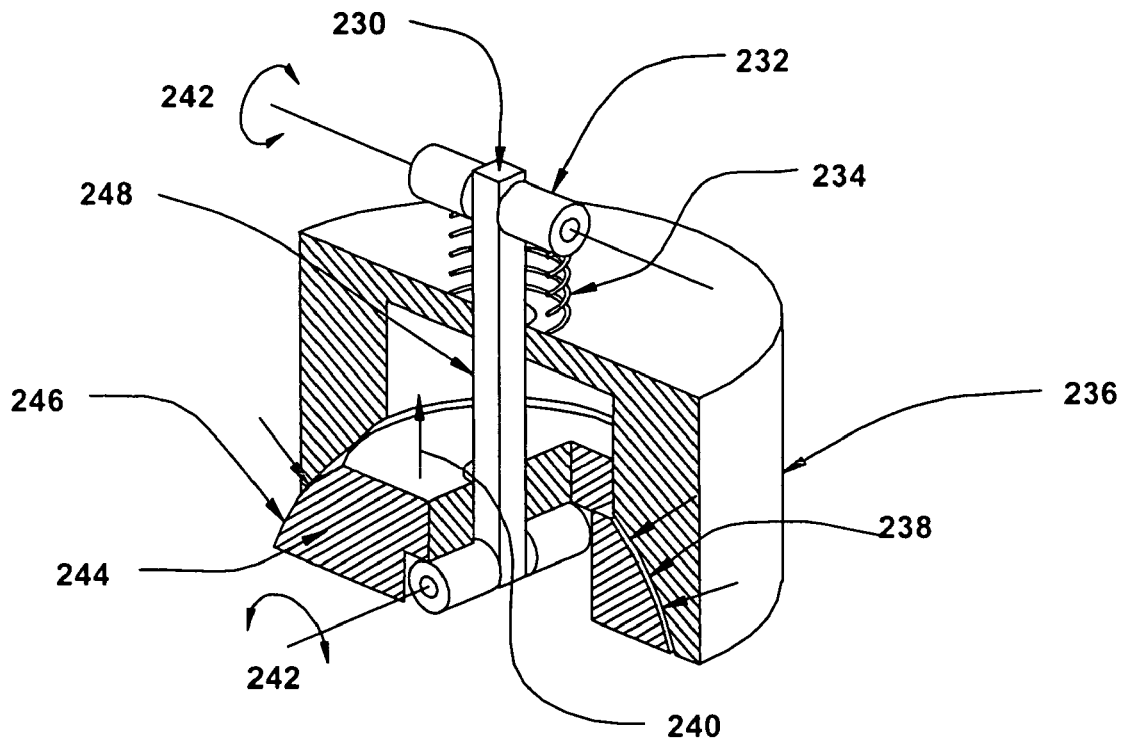
FIG. 15 is a cut-away view of a spherical workholder with a spring linkage rotor retainer system.
Figure 16:
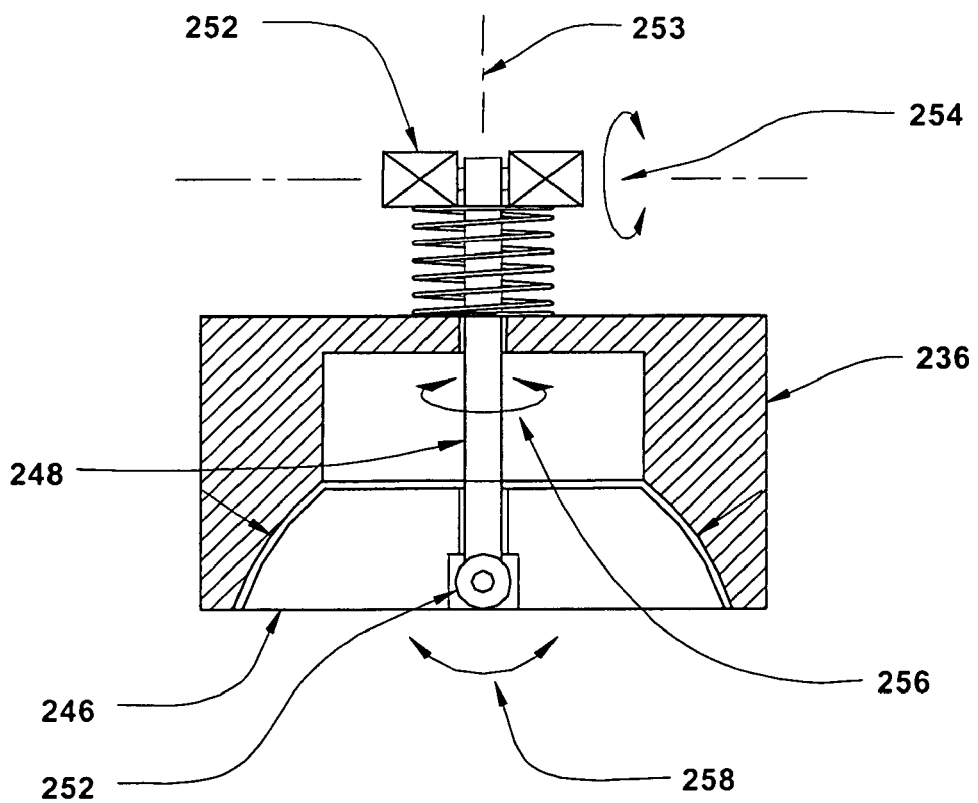
FIG. 16 is a cross-sectional view of a spherical workholder showing the rotational motion of the spring rotor retainer system.

FIG. 15 shows an off-set spherical workholder system which is attached to a workholder spindle not shown. A workpiece not shown is attached to the bottom of the spherical ball 246 that is shown in a cut-away view 244. A trunnion arm gimbal link 248 is attached at the top with a bearing 232 which rotates about a bearing axis 242 to form a pendulum gimbal arm 230. A spring 234 applies an upward force 240 to retain the spherical rotor 246 in the spherical socket housing 236 against pressurized air 238. FIG. 16 shows the same system of FIG. 15 but the axis of rotation of the bearings 252 located at both ends of the link arm 248 are shown. The first axis of rotation 254 located at the upper bearing 252 is shown as well as the second axis of rotation 258 shown at the lower bearing 252 which is positioned 180 degrees away from the first bearing relative to the link arm 248. The upper bearing 252 is restrained in a slotted portion of the workholder spindle head that is not shown. This slot allows axial motion of the upper bearing 252 but prevents it from rotating 256 along the spindle axis 253, which in turn, prevents the rotor 246 from rotating along the spindle axis 253 from the rotor housing 236.

13. Vacuum Pad Workpiece Holder

Problem: When a workpiece is mounted on a lapping machine for grinding and polishing to be flat within 1 to 3 lightbands (11.6 to 34.8 microinches or 0.25 to 0.76 micrometers), it is important that the workpiece be held firmly in a way that it is not distorted or stressed during lapping. Otherwise, the workpiece will spring back to a new shape after being separated from its mount. This new shape has a tendency to reduce the flatness achieved in the lapping process so that a part may be ground flat while held in a distorted position, be removed and become non-flat. The location and direction of mechanical clamp forces create these distortions. Most problems occur when clamp locations are not coincident with mount point locations resulting in twisting torques within the mount body.

Solution: A system of mounting workpiece parts in a free stress condition can be achieved by the use of stiff workpiece holder rings that are attached to a lapping machine head with a three-point location. These rings are held in place by vacuum suction forces which are applied to the surface of the mounting ring by a method which prevents the vacuum clamping forces from distorting the ring. Here, a resilient conformal rubber-like membrane surrounds both a vacuum hole and a rigid localized surface mount island that is located at each of three points positioned at places 120 degrees apart around the periphery of the workpiece ring. The flat contact surface of the ring is held in contact with the vacuum pads, vacuum is then applied and the ring is drawn tight to the flat mount islands with all of the clamping forces applied locally on the 3 discrete mounting point surfaces only. No distortion of the mounting ring occurs even though the clamping forces due to suction are substantial because the vacuum attachment forces are concentrated at the rigid surface-mount island. Also, there is no particular accuracy of the mounting ring required other than a smooth enough surface to maintain a vacuum seal at the rubber pads. The workpiece would have been pre-mounted to the ring in a stress free state by use of an adhesive bond applied between the workpiece and holder. Little or no force is introduced to the workpiece as the removable adhesive cures or dries. Easy registration of the workpiece occurs with the use of matching cylindrical shapes of the holder and the workpiece spindle holder.

Figure 17:
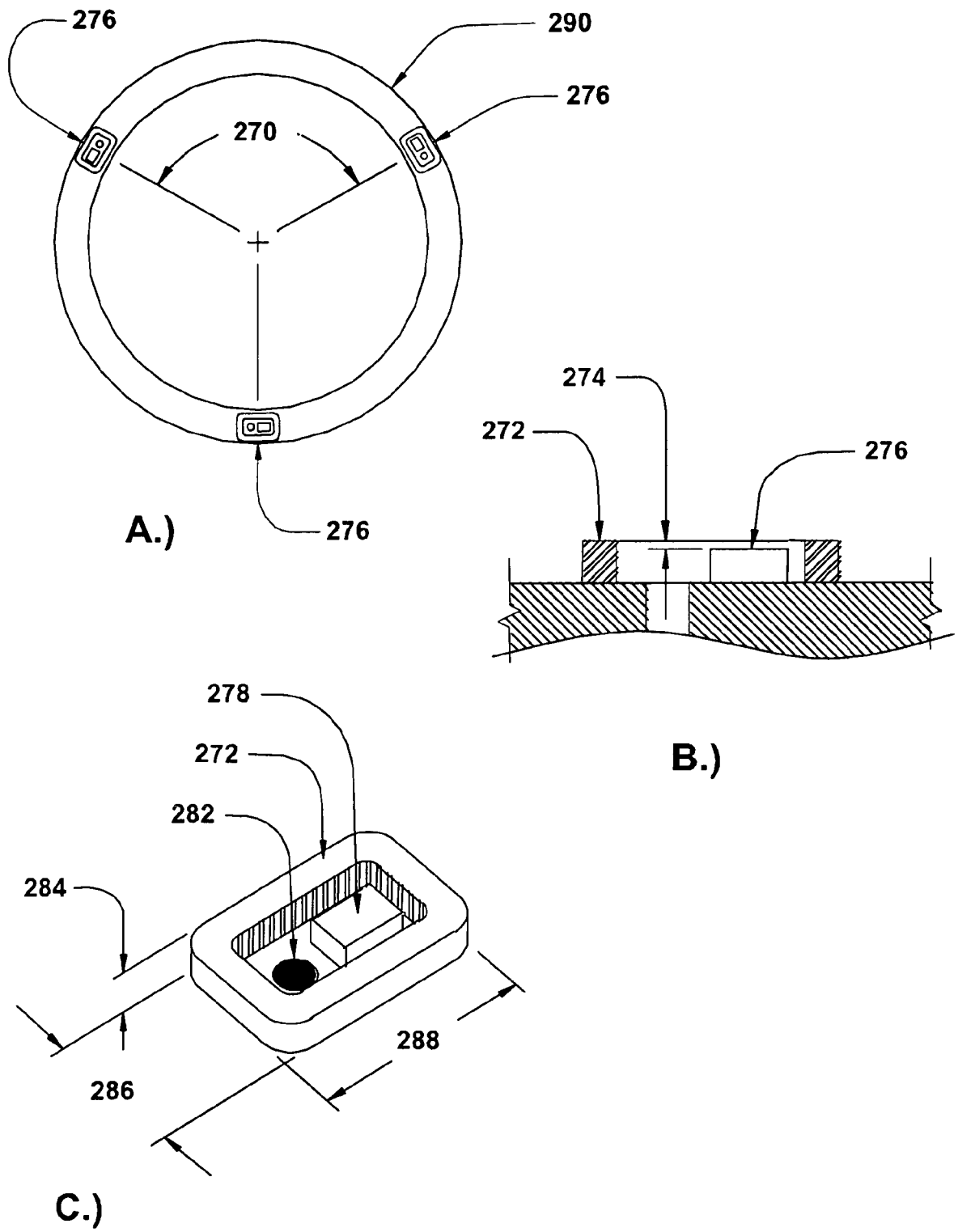
FIG. 17 shows views of a system of workpiece vacuum support islands.
Figure 18:
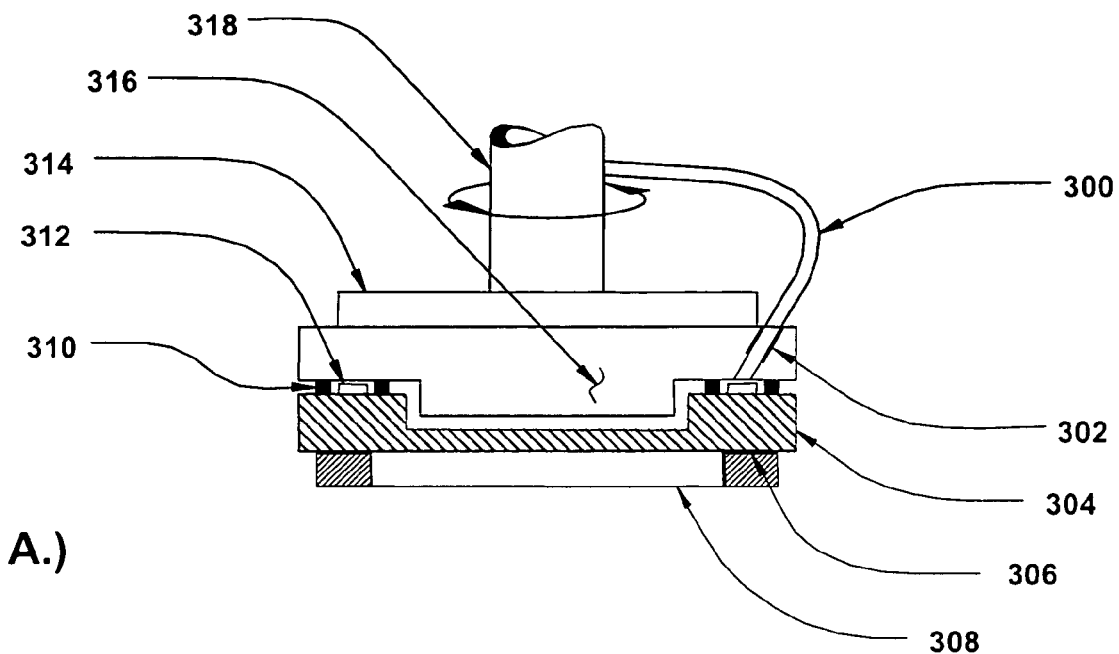
FIG. 18 shows views of a workpiece holder ring assembly.
Figure 18:
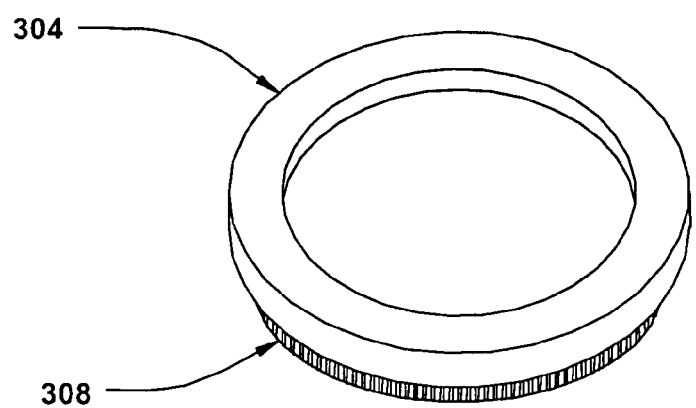

FIG. 17 shows a workpiece support ring 290 with three rigid support pads 276 positioned at 120 degrees 270 with a rubber pad border 272 which is allowed to distort or deflect 274 enough to contact the rigid support pad 278 shown in its cross-sectional location. Vacuum is applied to the flexible container through porthole 282. The rubber border 272 has a nominal thickness of 0.125 inch (3.175 mm) 284 and a cross-sectional size of 0.5 inch (1.27 cm) 286 by 0.75 inch (1.91 cm) 288. FIG. 18 shows the workpiece holder ring 304 with a workpiece 308 attached to a spindle plate 314 that is mounted to a rotating workpiece spindle 318. The spindle plate 314 may be mounted to a fluid bearing spherical gimbal system 316 which is not shown but rather designated by location. The rigid support pad 312 is mounted within the rubber pad border 310 that is attached to the spindle plate 314. The workpiece 308 is held to the workpiece holder ring 304 by use of adhesive 306. Vacuum, which can be turned off to release the workpiece holder ring 304 is supplied by a flexible vacuum line 300 cemented into the housing 302 which allows free spherical motion of the workholder 14. Flat Abrasive Island Disks Problem: When using abrasive coated disks at high abrading surface speeds of approximately 8,000 to 10,000 SFPM (surface feet per minute) it is necessary that all of the individual particles of abrasive be of the same exact height measured from the bottom side of the disk that mounts onto a rotating platen. Having all of the abrasive at same elevation assures even wear across the whole surface of the removable abrasive sheet and also assures that maximum grinding material removal from the workpiece is attained. Having uneven levels of abrasive across the abrasive disk surface creates a particular problem when a workpiece is first brought in contact with the moving abrasive. The workpiece part having a horizontal flat surface contacting a horizontal abrasive surface is unable to be moved quickly enough in an up-and-down vertical direction to follow the dynamic change of elevation caused by a non-flat disk surface excursion. Due to the mass inertia of the workpiece holder mechanism and due to the mass inertia of the workpiece part, the workholder cannot follow this vertical change of abrasive elevation which occurs 50 times per second for a 3,000 RPM platen speed. The most desirable form of abrasive is for the abrasive to be located on top of discrete raised elevation islands to allow the cooling or lubricating water to flow around the side of the island structures rather than allowing the water to be present in a continuous water film on the surface of a disk having a continuous flat abrasive surface, thereby preventing hydroplaning of the workpiece.

Solution: Abrasive top coated islands that are placed in closely spaced array patterns on an annular ring portion of a plastic or metal disk backing, where the islands are attached to the backing, can be constructed in manufacturing steps to obtain true precision flatness of each island. First, a backing sheet having attached abrasive particle coated islands, which have diamond, CBN (cubic boron nitride), aluminum oxide or other abrasive particle material can be created by a number of optional manufacturing methods. In one manufacturing method, abrasive particles or abrasive agglomerates would be placed at island sites in direct contact with a double-sided pressure sensitive adhesive (PSA) adhesive sheet, or a hot wax adhesive sheet, where the adhesive sheet has been attached to one side of a thick optical flat cylinder mounting plate which has been ground flat preferably within 1 to 3 Helium lightbands (11.0 to 34.8 microinches or 0.25 to 0.76 micrometers) to establish that all of the individual island site surfaces of abrasive particles or abrasive agglomerates are in a flat plane. The location and size and shape of each island structure can be easily formed, and positioned in an annular pattern, by use of a thin metal font sheet having through-holes at the desired island site locations. The font sheet can be formed by methods including, but not limited to, EDM (electrical discharge milling), chemical milling, drilling, laser cutting, and other methods. The font sheet is flat mounted in contact with the adhesive sheet that is mounted to the flat mounting plate. The island-site holes in the font sheet leave island-areas of the adhesive contained in the adhesive sheet exposed while the non-hole portion of the font sheet covers that portion of the adhesive sheet. The abrasive particles or abrasive agglomerates can be deposited at each of these font sheet hole island sites in a single or mono layer of particle thickness or they can be deposited in multiple particle thickness levels or deposited in particle clumps. Particles deposited in the font holes would become bonded to the surface of the exposed adhesive. The deposited layer of particles at each island site can be bound together in a common plane by metal plating, or preferably, they may be bound together by applying a polymer binder adhesive to the exposed layer of particles that reside in each of the island site font holes. After the font sheet holes are bottom-filled with the layer of abrasive particles or abrasive agglomerates, that are temporarily bonded to the PSA or hot wax sheet that is attached to the flat cylinder mounting plate and where the particles are bound together in a flat plane, the remainder of the depth of the font sheet island cavity holes are filled with an uncured polymer binder or other filled or unfilled island foundation structure material. The island foundation structure polymer material is then made level to the surface of the font sheet at each island site to establish the height of island structures where the height of the structures measured above the backing sheet surface is equal to the thickness of the font sheet. After solidification of the island foundation material, the font sheet is removed thereby leaving the individual island foundation columns attached to the PSA or wax sheet at the abrasive particle end of the raised island column structure. Then a flexible metal or polymer plastic abrasive disk backing such as brass or stainless shim stock or plastic sheet can be temporarily bonded to another thick and stiff optical-flat mounting plate with the use of either an adhesive or a solder material. A polymer adhesive is preferred to temporarily bond the backing sheet to the mounting plate. Adhesive cement, or solder, can then be applied to the exposed ends of the individual island column bases. It is preferred that a flexible polymer backing sheet be used with a polymer adhesive deposited on the free ends of the island structures, or most preferably, that a polymer adhesive be applied to the surface portion of the backing sheet that contacts the annular array band of raised island structures. Then the backing sheet attached to the second flat mount plate can be brought in contact with the exposed island adhesive, or solder, so that the non-solidified adhesive, or non-solidified solder, bonds to the abrasive backing. A nominal gap from 0.001 to 0.010 inch (0.025 to 0.25 mm) is maintained between the backing and the ends of the ends of the island columns with the use of mounting plate gap spacers. This gap assures that an adequate quantity of adhesive exists at each island site so that the variation in island structure heights is compensated for by the thickness of island bonding adhesive to allow each island to be bonded in a mutual flat plane. Three equal height gap spacers are mounted on the first or second optical flat plates to form a three-point separation between the two optical flat plates. After the island base bonding material, which is in contact with both the backing sheet and the ends of the island foundation structure columns, is solidified, the two optical flat mount plates are separated from the PSA sheets to form an abrasive disk. The abrasive sheet article, having the attached abrasive coated island structures, is then also separated from the PSA sheets by separating each attached abrasive coated island from the contacting PSA sheet and by separating the disk article backing from the other PSA sheet. The resulting disk article has an annular pattern of raised abrasive particle coated islands, all of which are exactly the same height from the back side surface of the abrasive disk backing. Each island also has the same thickness as measured from the top exposed surface of the abrasive to the flat back surface of the backing sheet. During flat abrading use each island that is integrally bonded to the backing sheet will have uniform wear across the island surface.

Figure 19:
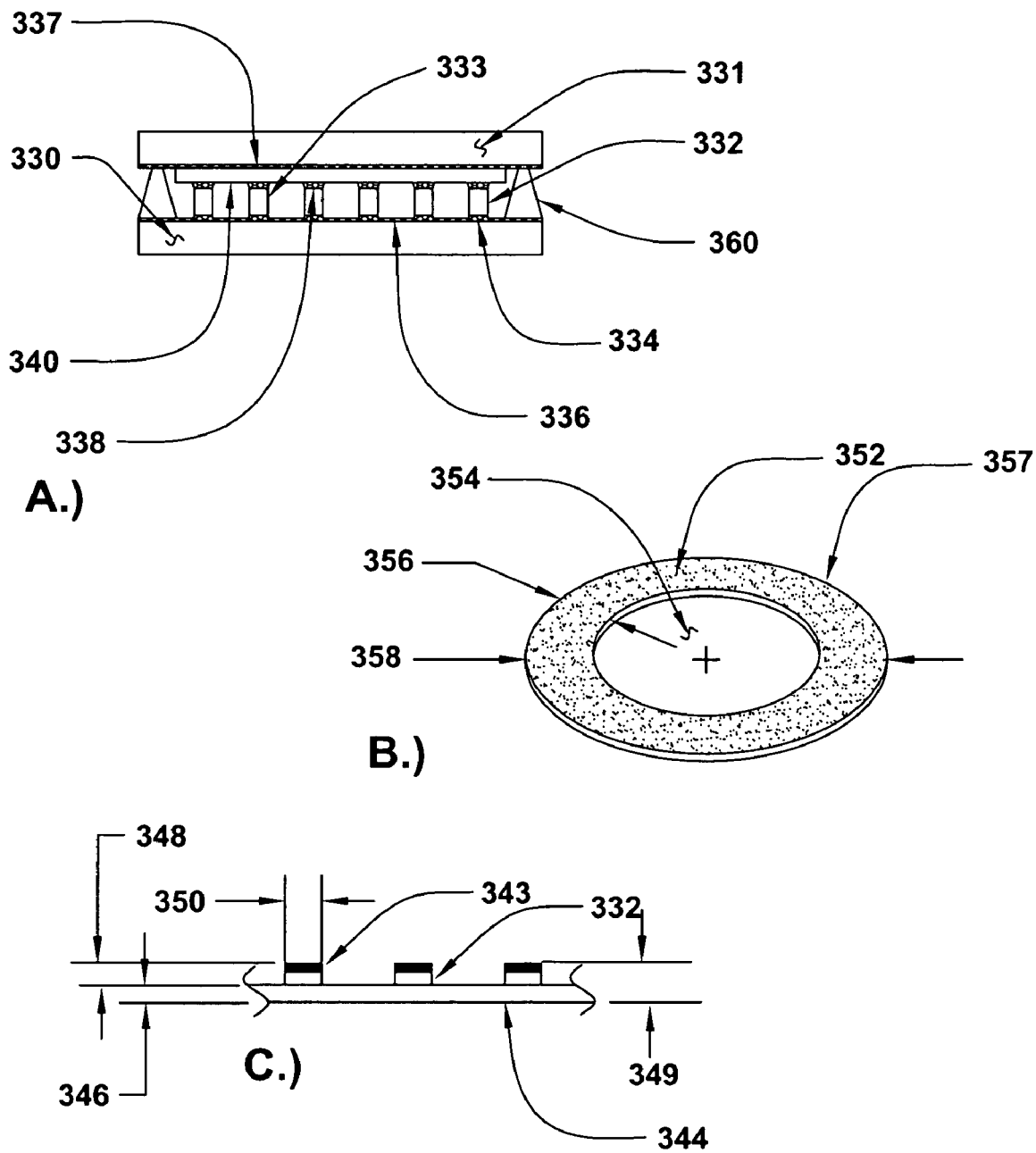
FIG. 19 shows views of creating a very flat abrasive flexible disk.

FIGS. 19A, 19B and 19C show how an abrasive disk can be fabricated where the total thickness of the disk as measured from the backing to the top of the abrasive islands is within 0.0001 inch (0.0025 mm) over the whole area of the annular band of abrasive. FIG. 19A shows two optical flats 330 and 331, having uniform thickness pressure sensitive adhesive (PSA) sheets 337 and 336 are used to act as flat references during the fabrication and they are precisely separated by three each gap posts 360 mounted at 120 degrees from each other. FIGS. 19B and 19C show a continuous annular band of abrasive islands 352 (island structures are not individually shown) that are formed which have an island diameter 350 of, for example, 0.060 inches (1.52 mm) with an abrasive island top height 348 or island thickness 349 ranging from 0.001 to 0.020 inches (0.025 to 0.51 mm) on a backing sheet 344 having a backing thickness 346 ranging from 0.002 to 0.020 inches (0.051 to 0.51 mm) thick. There is an abrasive particle top coating 343 on top of the island base foundation structure 332. FIG. 19A shows an abrasive disk backing 340 having an adhesive layer 338. A PSA abrasive sheet 336 is shown with the diamond abrasive particles 334 that are temporarily bonded to the sheet 336 having abrasive 334 coated island structures 332 to form abrasive coated islands 333. In FIG. 19B the abrasive disk 357 has a diameter 358 of 12.0 inches (30.5 cm) with a 1.5 inch (3.81 cm) wide 356 abrasive island annular band 352 with a bare area of the backing 354 at the center of the disk 357.

15. Diamond Plated Ribbed Disk

Problem: An abrasive disk with raised annular ribs is needed to break up the water boundary layer which increases in thickness with length of continuous line contact between the workpiece surface and the abrasive surface.

Solution: An abrasive disk is fabricated with raised ribs on outer annular area having plated diamonds or coated diamonds on top of the ribs. These ribs are nominally positioned to lay in a radial direction but can be angled away from a true radial line. The boundary layer develops along a tangential direction so having a short land area width to the ribs breaks up the boundary layer and the workpiece surface is not separated from the abrasive by the water boundary layer.

Figure 20:
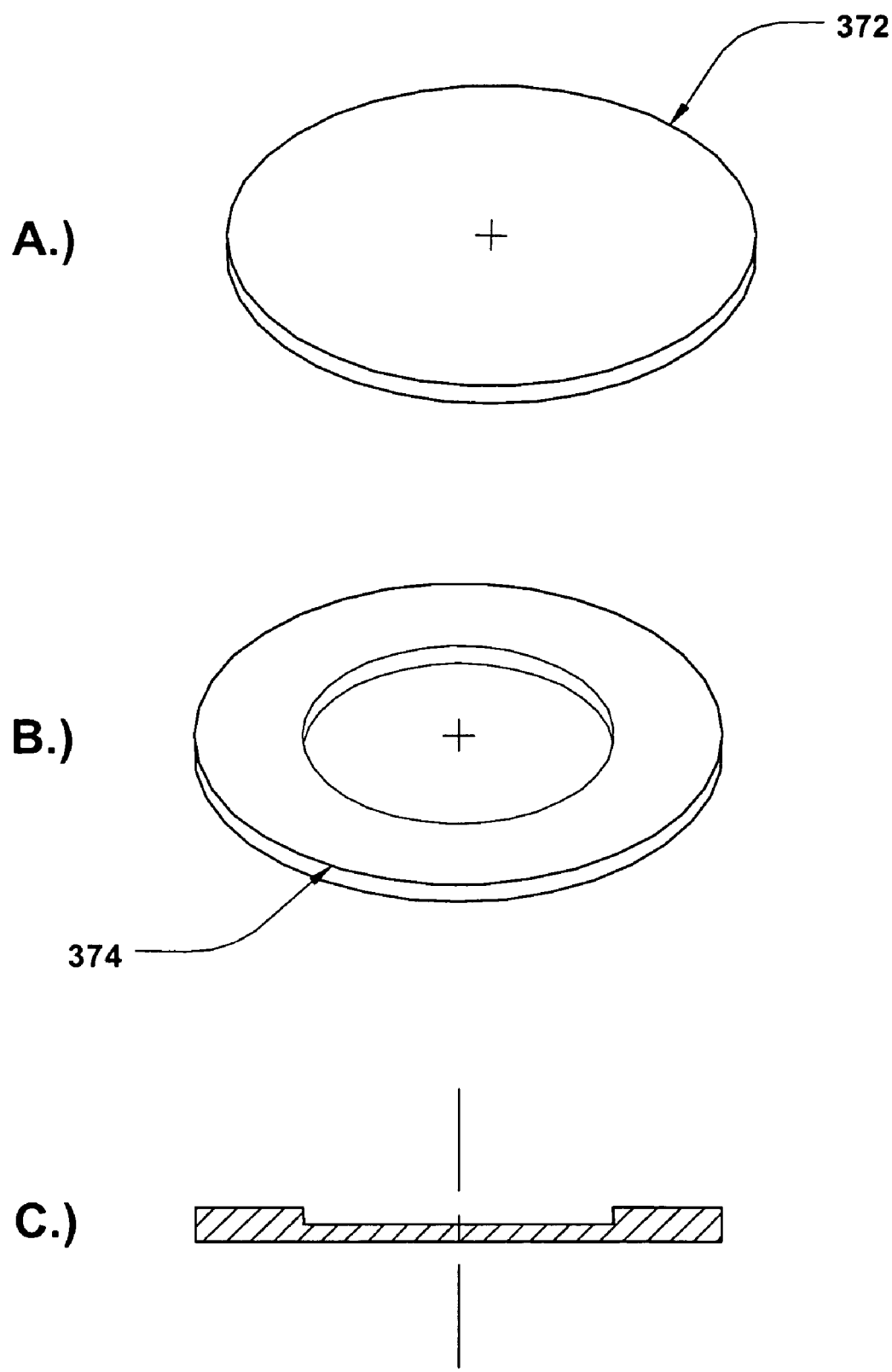
FIG. 20 shows views of a flat metal disk used to form an annular abrasive disk.
Figure 21:
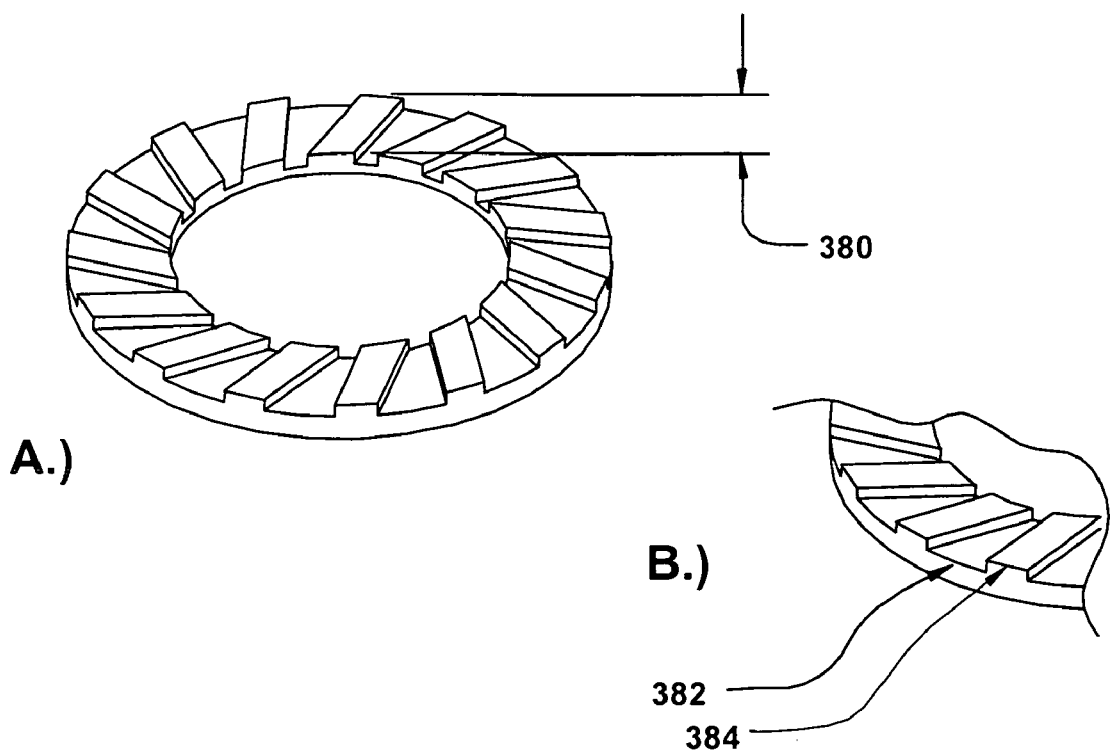
FIG. 21 shows views of a flat metal disk with ribs machines into an annular ring.
Figure 22:
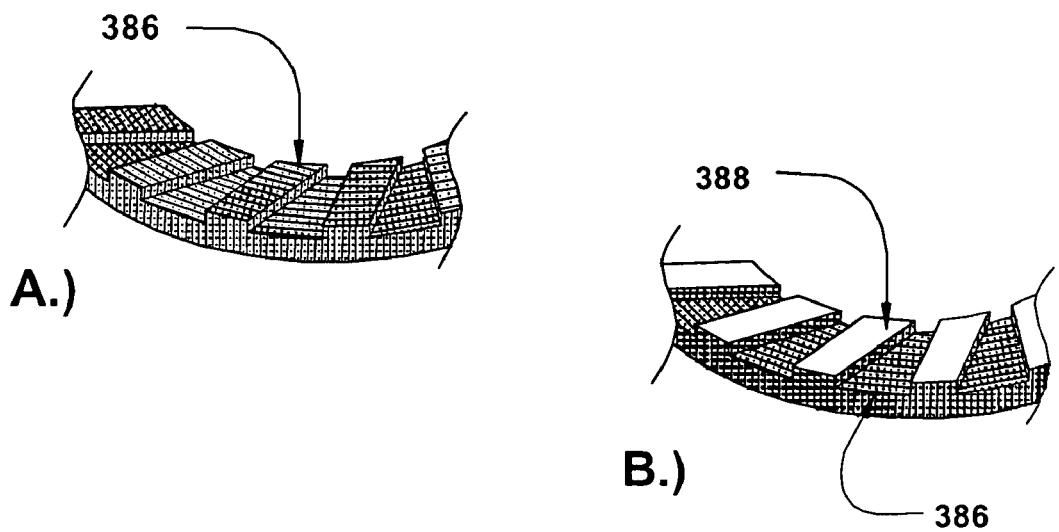
FIG. 22 shows views of a ribbed metal disk coated with a nonconductive coating.
Figure 23:
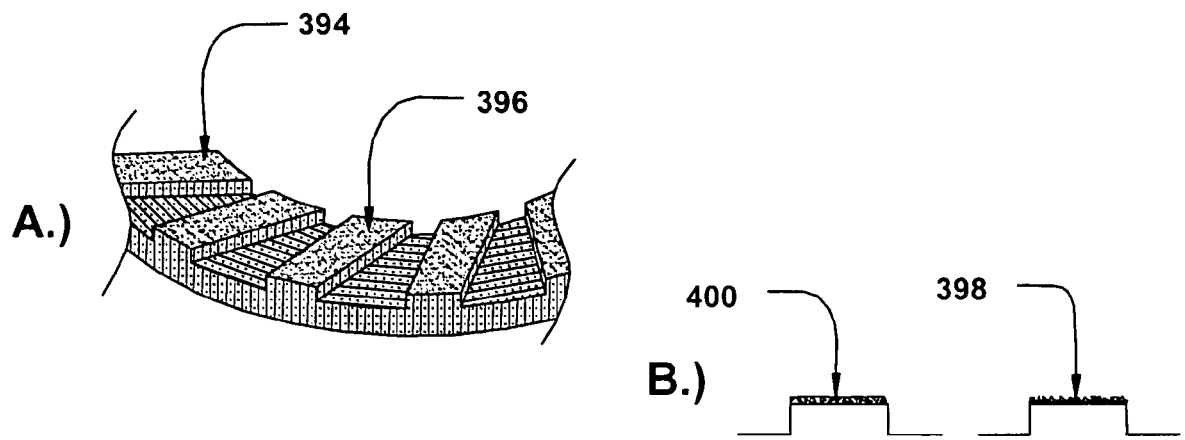
FIG. 23 shows views of a ribbed annular disk with the rib tops coated with an abrasive.

FIGS. 20, 21, 22 and 23 show how a metal disk can be fabricated to construct a disk with narrow radial ribs. In FIG. 20, a brass or other flat metal disk 372 is produced and then it has part of the center material removed to result in a disk with a stepped outer annular ring configuration 374. FIG. 21 shows ribs 384 of annular width 380 which are machined into the annular ring 382. FIG. 22 shows the disk surface coated with a non-electrical coating material 386 such as plastic or wax by first covering the whole disk with this coating. Then machining or grinding is applied to the top surface of the ribs to expose bare metal 388 at these locations while leaving a coating 386 on the shallow areas between the ribs. FIG. 23 shows diamond particles 394 bonded to the upper surface of the ribs 396 either by metal plating or by adhesive bonding to the top surface. Exposed plated dry diamonds 398 are shown on top of the rib and wet coated diamonds 400 are shown on another rib. When the solvent based binder system dries and recedes from the wet diamonds 400, individual diamond particles will be exposed for contact with a workpiece (not shown) surface.

16. Precision Flatness Abrasive Disks

Problem: When diamond or Cubic Boron Nitride (CBN) coated abrasive disks are produced they tend to have abrasive coatings that are very thin. Generally only one layer of abrasive is coated and the particles typically have a diameter of 3 to 80 micrometers or about 0.1 mil to 0.003 inches (0.0025 to 0.076 mm). These thin abrasives are coated or plated on thin plastic sheets perhaps 0.003 inch (0.076 mm) thick or thicker metal disks. The thickness tolerance range for these backings may vary from 0.0001 inch to 0.001 inch (0.0025 to 0.025 mm) that produces an abrasive disk which has a net thickness change greater than the thickness of the abrasive coating thickness. When used at slower RPM speeds of 500 RPM a workpiece part can be held against the abrasive surface which changes elevation due to these thickness variations. However, when the rotary abrasive platen is operated at 3,000 or 5,000 RPM, it is difficult to hold the workpiece part against the surface. Because low contact forces of only 0.2 lb/square inch are typically used for high speed lapping at 8,000 or more surface feet per minute, SFPM, there is not enough force to maintain the heavy inertia workholder against the abrasive, which moves up and down as the platen rotates. It is desirable to have the total thickness variation of a 12 inch (30.5 cm) diameter disk to be less than 0.1 mil (0.0001 inch, 0.0025 mm) so that when it is installed on a perfectly flat platen, only a small portion of the abrasive high areas are removed during grinding. This brings more of the total disk abrasive in contact with the workpiece part. A very small amount of high spot abrasive areas can be removed by normal grinding action, which can effectively flatten a disk if the high spots are modest in height relative to the abrasive thickness. Also, it is desirable that the abrasive be in the form of islands on the surface of the abrasive disk to allow water flow between the islands and prevent hydroplaning of the workpiece.

Solution: An existing abrasive sheet disk may be reworked to give it a precision thickness. This can be done by applying a layer of low viscosity adhesive to the non abrasive side of the disk backing and sandwiching it between two precision flat plates which are separated by a three-point precision spacer system. When the two plates are lightly clamped, the excess adhesive will flow out before the adhesive cures and forms to be an integral part of the disk backing. Each area of the adhesive now is the exact same distance from the back surface of the disk backing and will run true and flat when the disk is mounted to a flat platen. Also, a new precision thickness disk can be made with desirable large diameters with annular bands of abrasive in the form of discrete island strips (or other patterns) using common available precision thickness plastic or metal backing materials. Special techniques can be used in creating ribs for raised islands, then coating these ribs with an excess of adhesive binder loaded with diamond particles. While the abrasive binder is yet uncured and flows easily, the abrasive ribbed disk is sandwiched between two flat surfaces separated with a precision 3-point mount. The abrasive adhesive is allowed to cure while clamped between the two parallel surfaces. Upon removal, the abrasive strips will have flowed out with some surface width variation, which is not important, but the total thickness will be as perfect as the flatness of the two mounting surfaces and the gap adjustment spacer system. The island strips can be created first and topped with diamond abrasive mixed in an adhesive which breaks away to expose new abrasive with progressive wear during grinding. The gap between the two mounting plates can be set up with air gauges, adjusted with set screws and can have the gap permanently established with cured plastic separation adhesive bumpers. The optically flat mounts can be made of plastic, ceramic, composite, metal, glass or quartz for UV curing of non-shrink adhesives.

Figure 24:
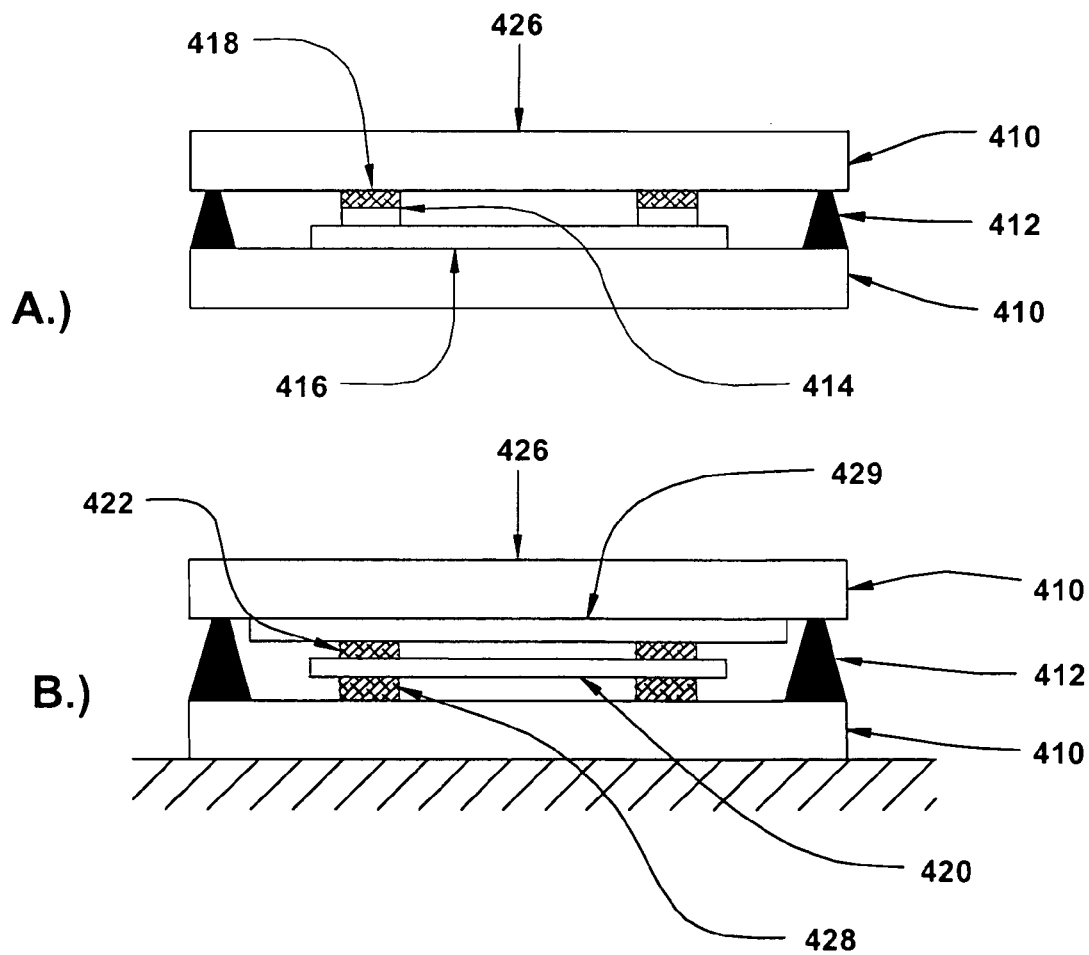
FIG. 24 shows views of a mechanism device used to rework the thickness of an existing abrasive disk.
Figure 25:
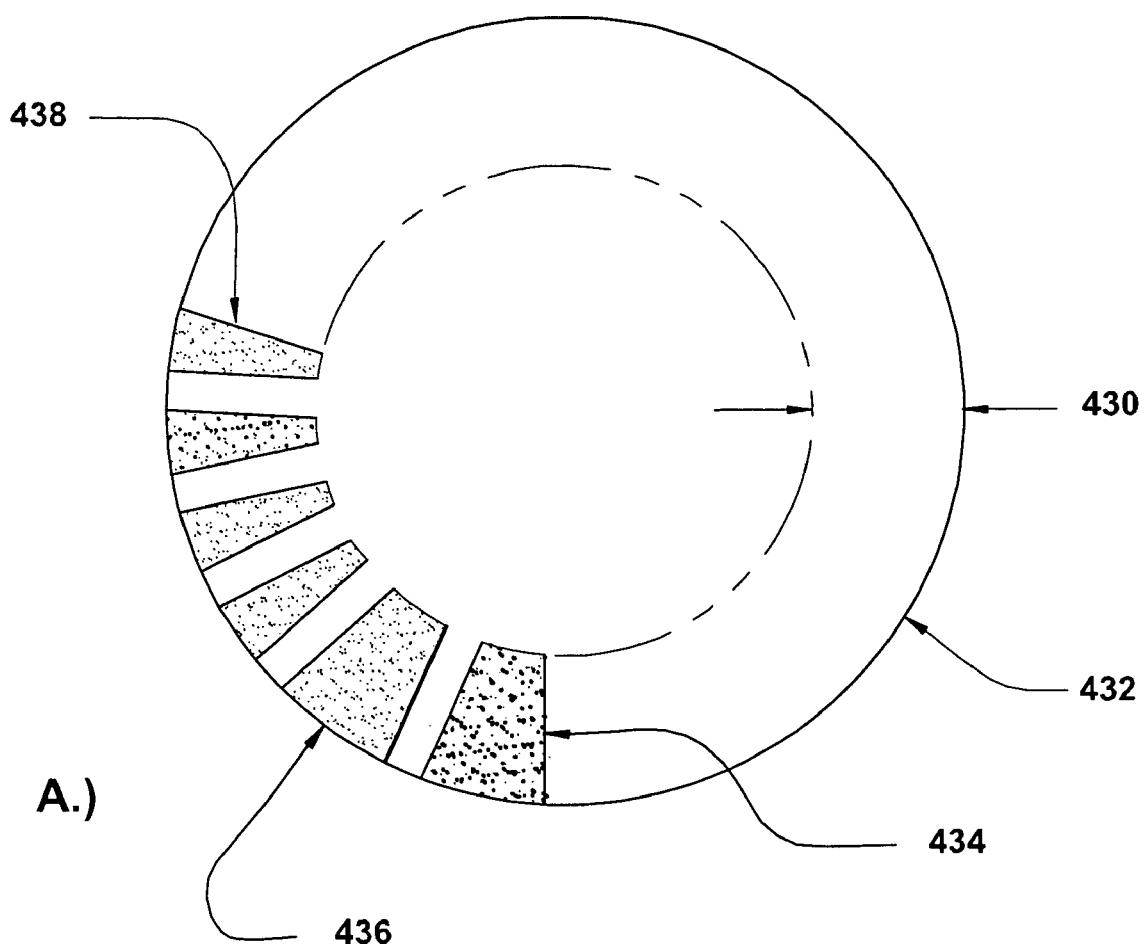
FIG. 25 shows views of an annular ring abrasive disk with a variety of shapes of abrasive bars.
Figure 25:
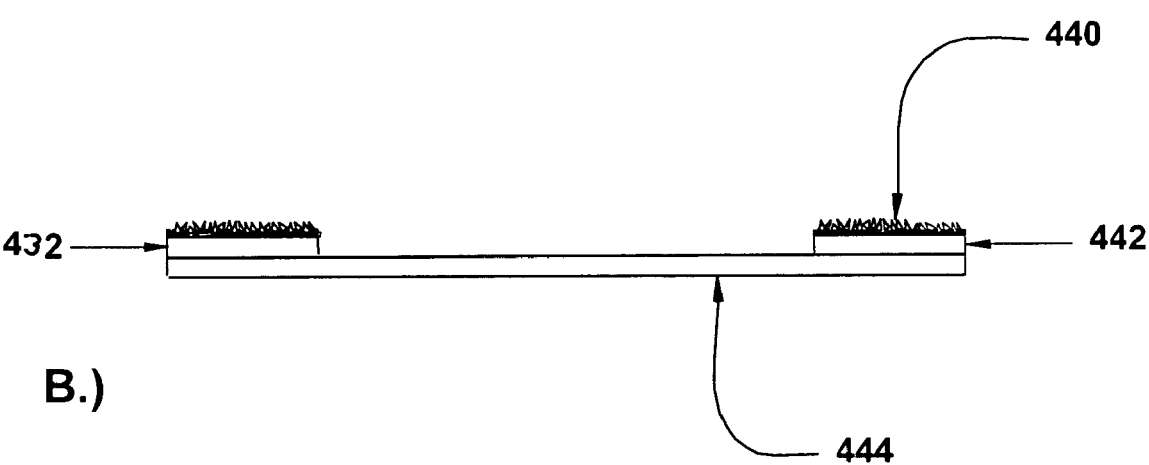

FIG. 24 shows two flat mounts 410 held apart by three or more precision gap spacers 412 which are used to rework the precision thickness of an existing abrasive coated disk or to fabricate a new disk. FIG. 24A shows how a new abrasive disk can be produced using two precision flat mounts 410 with gap spacers 412 with an abrasive disk backing 416 having raised island strips 414 to which an abrasive filled binder excess coating 418 is applied. The procedure is to mount the disk backing 416 on the lower flat mount 410, apply the abrasive binder 418 to the surface of the raised rib island strips 414 and then install the upper flat mount 410 in contact with the abrasive binder 418. Then a clamp force 426 is applied to the upper flat mount 410 that squeezes the excess abrasive binder downward and to the side until the flat mount contacts the gap spacer 412 at which time the whole disk is flat across its surface. To better insure that the abrasive binder flows to the proper height or thickness, vertical or horizontal, or both, vibration can be applied to the upper flat mount 410, which will tend to move the abrasive coating with very little force. FIG. 24B shows a similar setup but it is used to adjust the thickness of an existing abrasive disk 420 having a coated abrasive 428 top by use of the flat mount 410 clamp system. Here, the coated abrasive surface 428 is laid in contact with the lower flat mount 410 and the old disk backing 420 is facing upward and is coated with an adhesive 422. A precision thickness release liner 429 is laid in the exposed adhesive 422, or the adhesive 422 is partially surface cured to reduce sticking to the upper flat mount 410 which is lowered in contact with the adhesive 422 and clamp force 426 is applied until the gap spacers 412 are contacted. Excess adhesive 422 is squeezed out to precisely set the thickness of the abrasive coated disk. FIG. 25 shows the finished form of a precision thickness 12 inch diameter abrasive disk 432 which has 1.5 inch wide ring of abrasive strips 430 which have various tangential widths 434 where each of these islands are wider 436 at the outside diameter to promote even wear at the high surface speed at the outer edge as compared to the more narrow portion at the inner edge which operates at a slower surface speed. For comparison with the wide strip 434, a narrow strip 438 is shown. The FIG. 25B cross-sectional view shows the abrasive disk 432, the thin flexible backing 444, the raised island strip 442 with the abrasive particle top 440.

17. Abrasive Island Flat Disks

Problem: It is difficult to construct a flexible sheet of abrasive disks with raised islands of abrasive material that have the abrasive particles, such as 3 to 80 micrometers diameter diamond, to be located exactly the same distance above the base of the disks backing. If this exact distance is not maintained, not all of the abrasive particles will contact a workpiece surface when used in high speed lapping at 3,000 or more RPM with a 12 inch diameter disk even with use of a perfectly flat platen. Only the highest particles will contact the workpiece surface. Individual island patterns forming an annular ring on a common disk sheet is most desirable because of the reduction in hydroplaning effects.

Solution: A disk can be constructed with a series of fabrication steps using commonly available materials. They would be used in conjunction with two thick and stiff flat blocks that are held apart but yet aligned perfectly parallel to each other by a three-point gap spacer. Here, a detachable non-stick font sheet with a discrete pattern of tapered holes is used to allow the abrasive topped island shapes to be easily formed, the thin flexible disk backing sheet is attached to the islands and then the non-stick font sheet removed. A process technique used would be to coat the desired annular ring area of one flat block surface with a sticky adhesive or wax, position the font sheet with the larger opening side of the tapered island shaped holes (used to form cylindrical, rectangular or other shapes) in contact with the disk backing surface. The font can be easily removed due to the tapered wall shape where the larger hole diameter is adjacent to the backing sheet and the narrow top section is away from the backing. The cone shape of the tapered font holes would naturally loosen from the flat cone shaped islands. Then an excess of abrasive particles, or clumps of uniform sized particles bonded in a binder system together, are introduced into the font island holes, and pressed into contact with the sticky adhesive exposed in the bottom of the hole. The excess surface abrasive particles are removed from the top of the hole, leaving a single layer of abrasive binder fixtured to the sticky adhesive on the backing. Next, thin low viscosity particle adhesive is introduced into the island hole to contact the portions of the abrasive particles not contacted and held by the sticky surface adhesive to join all the individual particles together structurally upon curing. Following this, a higher viscosity adhesive can be added to raise the island height as measured from the backing base. After partial or complete curing of the diamond or other abrasive adhesive, another layer of thin, low viscosity adhesive is applied to the whole annular area of the font and the abrasive disk backing sheet of thin plastic or metal is applied in wet contact with this adhesive. Then, the second flat block is installed to rest on the three-point gap spacers with enough force applied initially to the block to drive the excess disk bonding adhesive from between the backing sheet and the island font until the flat block rests on the gap spacers. The holding force can now be reduced or eliminated to decrease deflection of the flat blocks. After the backing sheet adhesive cures, the assembly is taken apart, the island font sheet is pulled off the abrasive island sheet and the abrasive island sheet disk is completed. All the abrasive surface-to-backing base is exactly the same over the whole surface of the abrasive disk area.

Figure 26:
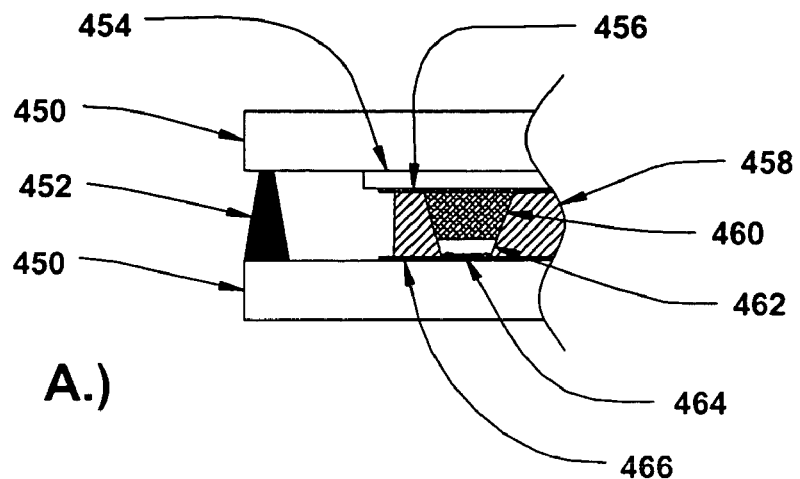
FIG. 26 shows different views of an abrasive sheet with cone shaped abrasive islands.
Figure 26:
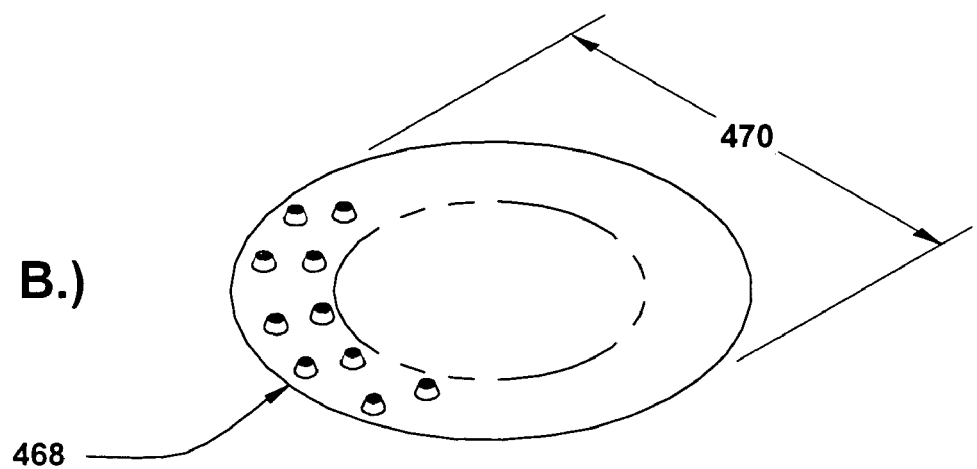
Figure 26:
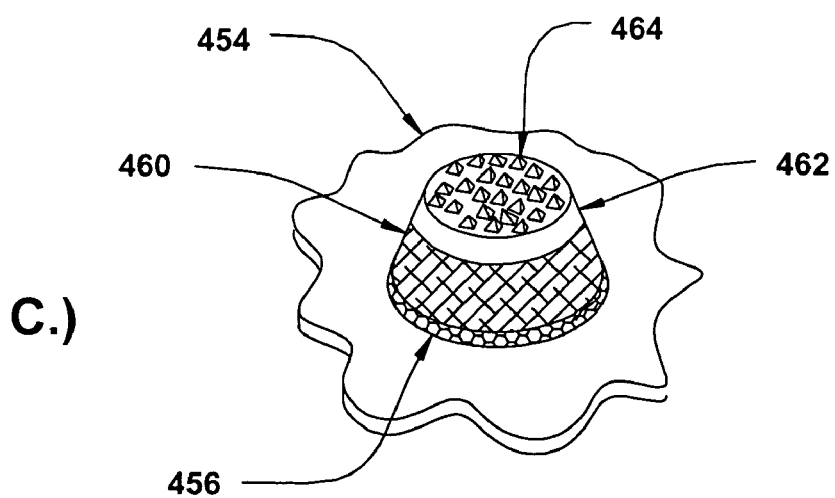

FIG. 26 has different views showing the construction of annular disks having cone shaped tapered abrasive islands. FIG. 26B shows an abrasive disk with an annular ring 25 abrasive sheet 468 of 12 to 20 or more inches (30.5 cm to 50.8 cm or more) in diameter 470. FIG. 26C shows a single abrasive top coated island attached to a disk backing sheet 454 where the abrasive particles 464 are attached with an abrasive binder 462 to an island height filler 460 which is attached to a disk backing 454 by a disk backing adhesive 456. FIG. 26A shows a cross-sectional view of the abrasive island and its components. Pressure sensitive 30 adhesive, PSA, 466 is applied to a lower flat block 450 and an island font sheet 458 is applied to the adhesive 466. The abrasive particles or abrasive agglomerates 464 are loosely introduced to the tapered hole in the font sheet 458 to contact the PSA adhesive 466 and an abrasive particle adhesive 462 is introduced into the font hole 458 to bind the abrasive particles or abrasive agglomerates 464 together and to the particles already attached to the backing PSA adhesive 466. Following this, island height filler 460 is introduced into the font hole 458 and then also contacts the disk backing filler adhesive 456 to effect a strong bond of the island structure to the disk backing 454. The top flat block 450 is lowered on the composite unit until it contacts the gap spacers 452 which controls the precision thickness of the disk backing as measured to the top of the islands. After all the adhesives have cured, the flat blocks 450 and the island font sheet 458 are removed to leave the abrasive islands integrally attached to the backing sheet 454.

18. Annular Ring Flat Abrasive Disk

Problem: It is desired to have an abrasive disk with a raised section of abrasive at its outer periphery so that workpiece contact is at this section only, but yet extremely flat so that the disk can be rotated at very high speeds of 3,000 or more RPM or 8,000 SFPM and all or most of the thin layer of abrasive has contact with the workpiece surface when used on a perfectly flat rotating platen. Also, it is desirable that more than one layer of very fine 6 micrometer abrasive to be used to allow wearing off of the upper abrasive layers and exposing new sharp layers of abrasive.

Solution: Thin metal or plastic font sheets can be used which have abrasive island holes arranged in patterns at the outer annular ring area which are of the desired abrasive thickness of 0.0005 to 0.010 inch (0.013 to 0.25 mm). The font sheet can be attached to a flat block and a mixture of abrasive particles or abrasive agglomerates can be introduced into the font holes and the excess scrapped off along the surface of the font. The font thickness can be changed to allow only single or mono layers of abrasive particles or it can be thick enough for multiple layers of abrasive particles which is mixed with an adhesive binder. The abrasive mixture can include other particles of metal, plastic or compounds such as titanium dioxide, zirconium or hollow glass spheres or other materials which would break or dissolve or wear away, thereby exposing new sharp abrasive particles during the grinding process. After curing or set-up, the abrasive binder-bonding agent hardens and bonds together an island of abrasive which is attached to a disk sheet by adhesively bonding the islands to the sheet. Font sheets may be coated with mold release for easy removal later in the process. Also, an existing sheet of abrasive that has a uniform coating of abrasive particles across its surface can be flattened and a raised annular ring of abrasive at the outer periphery can be constructed with near perfect flatness. This can be accomplished by attaching the disk abrasive surface temporarily to a precision flattened block and then applying an excess of construction adhesive to the outer annular ring area only of the abrasive disk sheet. Then a very thin coating of mold release is applied to another precision flattened block and this block is positioned in contact with the filler construction adhesive. Then the mold release block is pushed down on the sandwich until it comes in contact with a 3-point system of stops made from shim stock with the excess filler adhesive flowing out from the sandwich layers. When a cure is effected on the filler adhesive, the system is disassembled and an abrasive disk is produced with the abrasive raised at the outer periphery. The inner portion of the disk area is relatively low and not in contact with a workpiece part surface.

Figure 27:
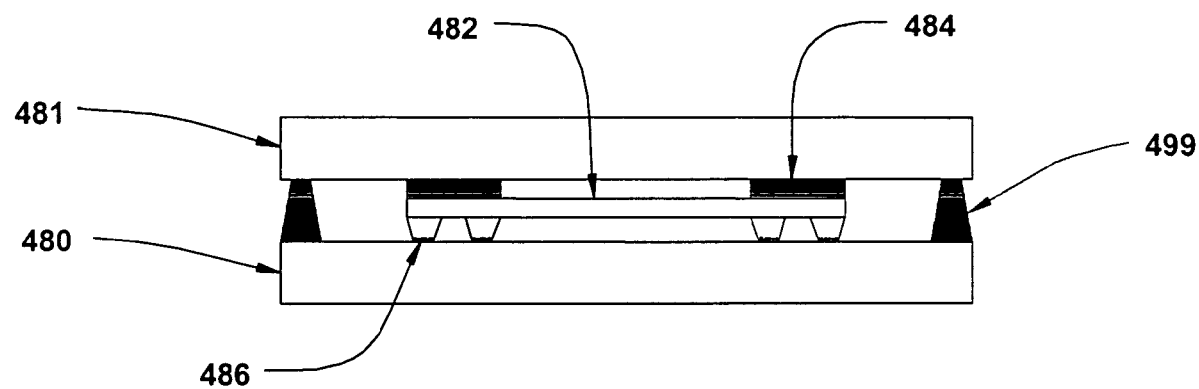
FIG. 27 shows different views of a thin hole font system of producing flat abrasive disks.
Figure 27:
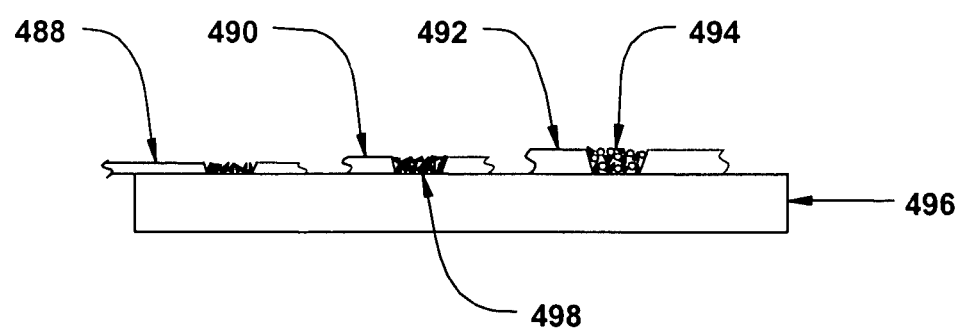
Figure 28:
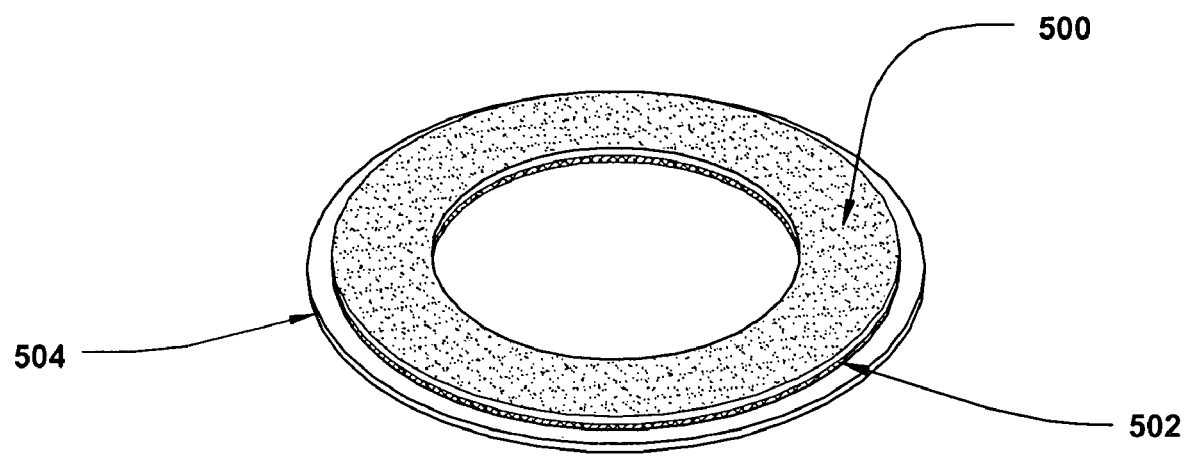
FIG. 28 shows a rotating platen with a precision thickness annular abrasive disk.
Figure 28:
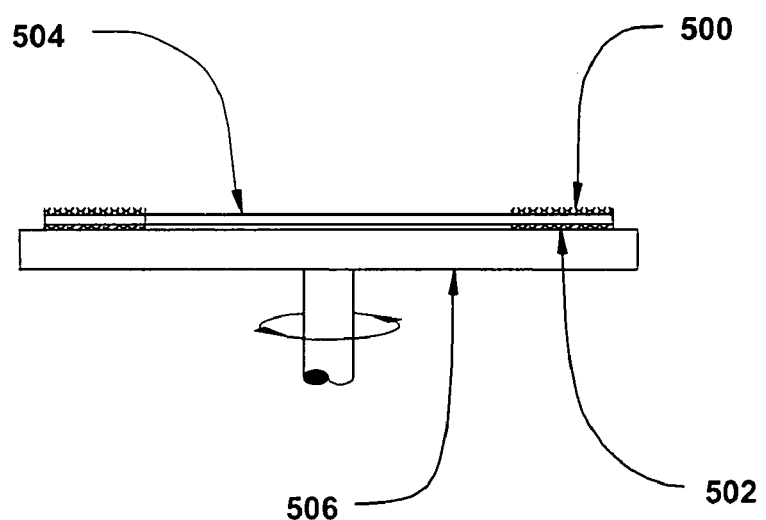

FIG. 27 has two views that show the construction of a raised island abrasive disk. FIG. 27B shows either a thin abrasive media font 488 or a medium thickness font 490 or a maximum thickness font 492 placed on contact with a flat block 496 to allow a mixture of adhesive binder and abrasive particles 494 to be introduced into holes in the font 488, 490 or 492 and the excess of the abrasive binder 494 scraped off the surface of the font 488 to leave an island of abrasive. A very thin layer of abrasive particles 498 can be deposited in the bottom of the font 488 holes rather than the thicker layer of abrasive mixed in a binder with other materials 494. FIG. 27A shows a disk sheet 482 with abrasive islands 486 in contact with a flat block or plate 480 while a filler adhesive 484 is applied to the portion of the disk backing on the back side of the disk sheet 482, the side that is opposite from the side having the abrasive islands 486. Then another flat block 481 is coated with mold releaser and is lowered in contact with the filler adhesive 484 until the block 481 contacts gap stops 499. The excess filler adhesive 484 is squeezed out of place and is allowed to cure or harden before the flat blocks 480 and 481 are separated which produces an abrasive disk of precise uniform thickness. FIG. 28A shows a completed abrasive disk sheet 504 with excess filler adhesives 502 to produce an abrasive annular ring 500. FIG. 28B shows a cross-sectional view of a platen 506 with an abrasive annular ring 500, a disk sheet 504 backing and the relative location of the filler adhesive 502.

19. Plated Abrasive Annular Rib Disk

Problem: It is desirable to have an abrasive disk coated with diamonds that will minimize hydroplaning at high 8,000 SFPM speeds when used with a water lubricant. It is also important that the abrasive disk is very flat, so that a single layer of diamonds will remain in contact with a workpiece surface with strong enough bonding that the diamonds don't break loose from the disk backing. When a uniform abrasive pattern is used, harmonics can be set up in the grinding which can reduce the effectiveness, speed and quality of grinding.

Solution: A brass or other metal disk can be constructed from precision sheet metal such as shim stock where the center two-thirds area of the disk can be machined out by mechanical cutting or chemical erosion to result in an annular outer periphery area raised up from the center by about 0.010 inch (0.25 mm). Likewise, radial ribs can be formed in the outboard annular area by mechanical machining or chemical milling. These ribs would be wider at the other periphery as the tangential surface speed is higher there than at the inboard portion of the annular raised ring. The hydrodynamic boundary layer builds up in thickness in a tangential direction so the less wide the ribs are in the tangential direction, the less the boundary layer thickness is built up and the less the workpiece part surface is pushed up and away from the abrasive surface. The gap lines between the adjacent ribs would be from 0.010 to 0.060 inch (0.25 to 1.5 mm) wide and about 0.010 to 0.015 inch deep (0.25 to 0.38 mm). Disks could be constructed of a large range of sizes with those of 12 inch to 48 inch (30.5 to 122 cm) diameters of the most interest with an annular rib width area section of from 1 to 8 inches (2.54 cm to 20.3 cm) wide which is the normal radial length of a typical rib. The ribs would vary from 0.030 to 0.250 inches (0.76 to 6.35 mm) wide in the tangential direction.

Numerous methods can be employed to fabricate these disks by plating hard abrasive particles of diamond, cubic boron nitride, CBN, ceramics and other materials with nickel or other plating materials. Also, the same rib surfaces can be coated with diamond or other abrasive particles mixed in plastic binder chemical solutions and the coating cured in place on top of the ribs by a variety of techniques using heat, water activation, UV, electron beam or chemical additives. If a metal disk is to be plated, the upper flat tops of the ribs can be protected by a variety of methods to apply an electrically insulating coating to these portions of the disk which are not to be plated with abrasive particles. For instance, a plating ground lug can be attached at the disk center and protective PSA tape can be applied to the top of the ribs. Then the disk assembly can be immersed or coated with a nonconductive coating of plastic or wax, the PSA tape removed and the exposed metal surface of the ribs then having diamond particles bonded to it by means of plating deposition.

The raised abrasive bars can be given variable or random characteristics to prevent the steady state lifting or harmonic nature of grinding action. Bar widths can be varied around the disk periphery as can the raised bar shapes. Further, the gap widths between the bars can be varied. Types and sizes of abrasive particles can also be changed from bar to bar.

Figure 29:
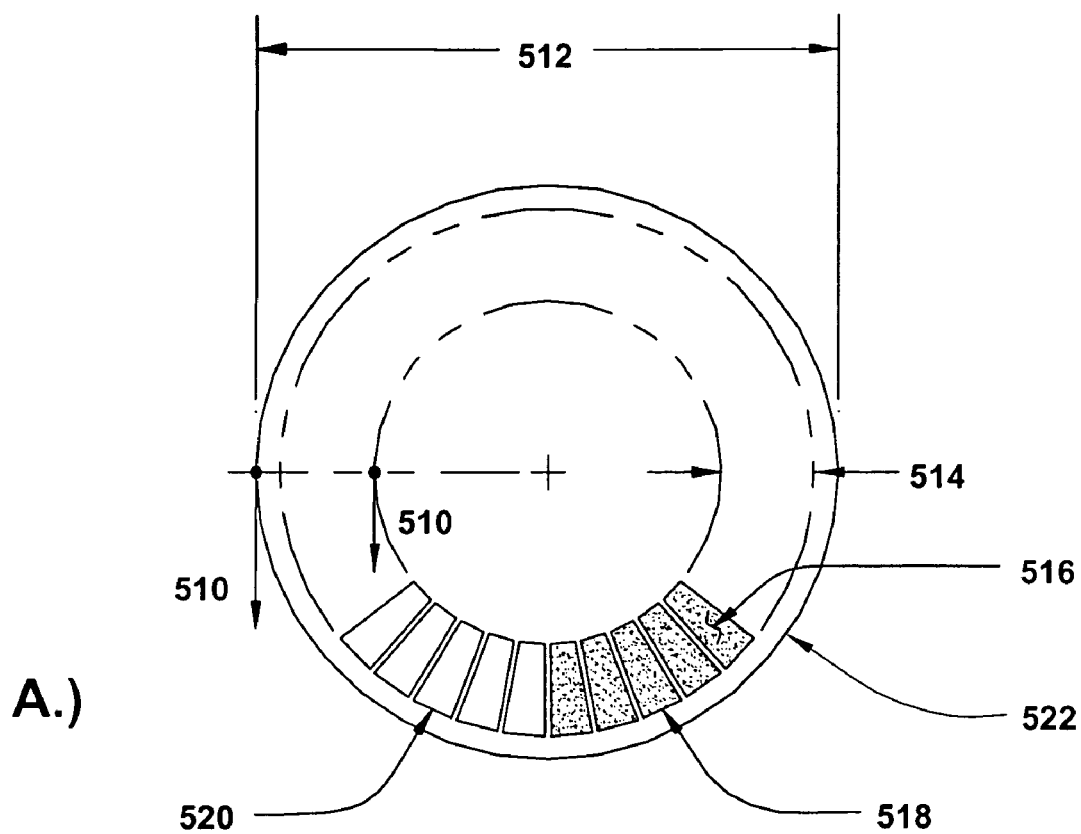
FIG. 29 shows a top and side view of a platen with a disk having diamond plated ribs.
Figure 29:
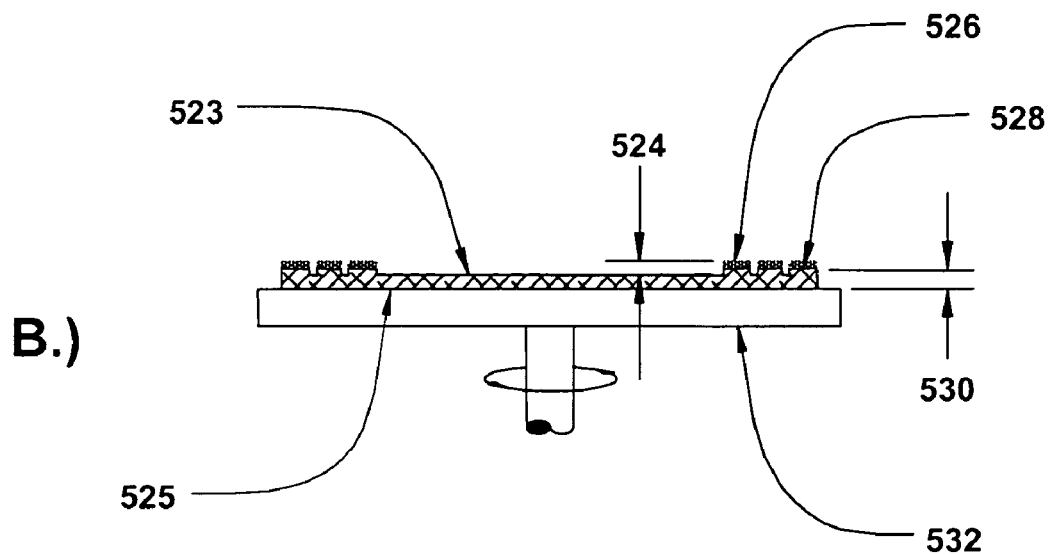
Figure 30:
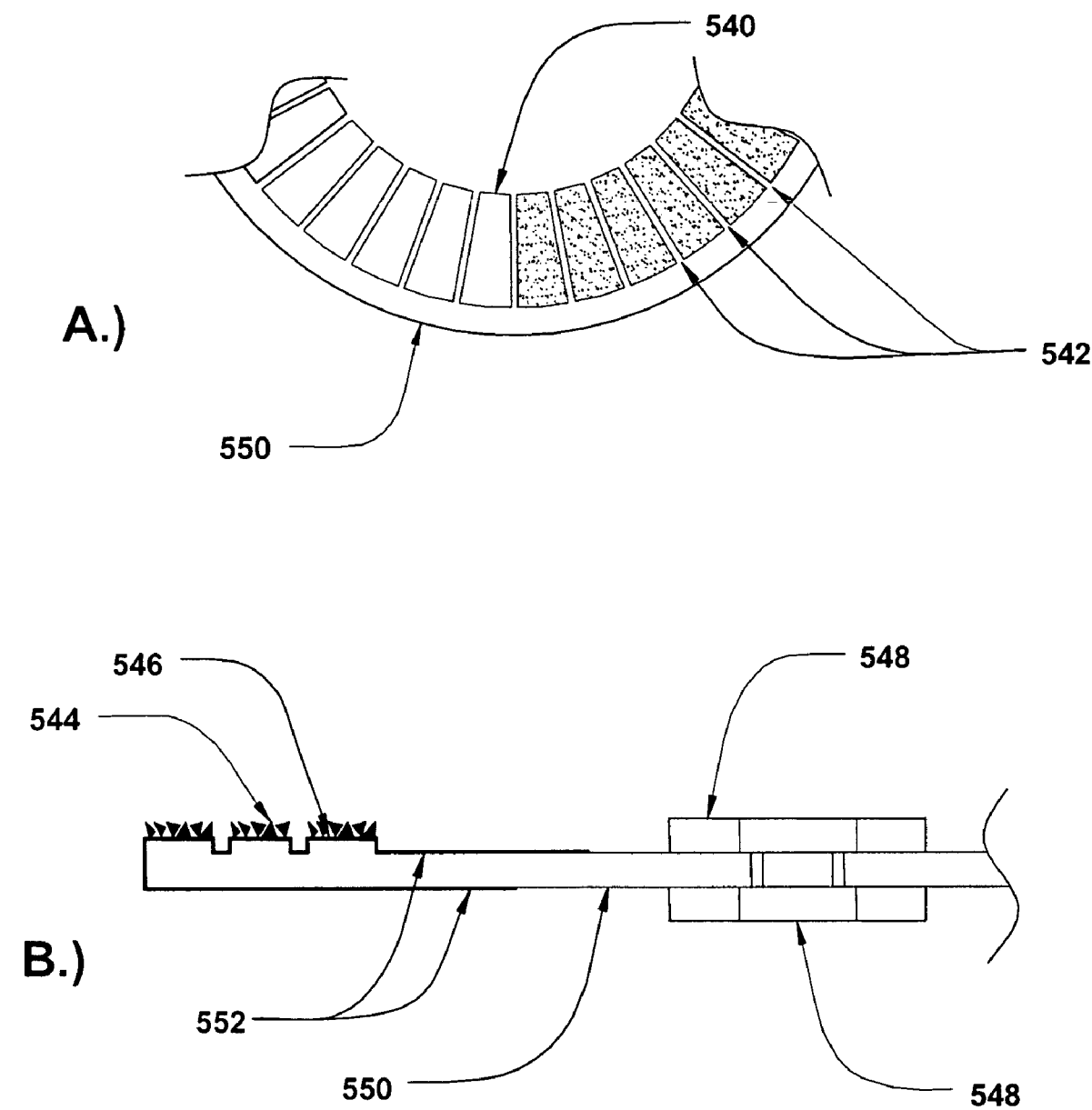
FIG. 30 shows a top and side view of a metal disk with plated diamond abrasive particles.

FIGS. 29A and 29B show the top view of an abrasive disk 522 with annular diamond abrasive particle 516 coated ribs 518 where the ribs can also be in radial segments 528. Some rib sections 520 maybe uncoated or coated with a different type of abrasive or of a variety of different sizes or shapes such as round mixed with rectangular to provide a variety in the abrasive characteristics applied to the grinding or lapping surface on a workpiece. The introduction of this somewhat random abrasive characteristic will provide a changing grinding action with each platen revolution which will tend to stabilize the grinding action and improve cut rates and prevent grinding patterns on the workpiece surface. The tangential surface feet per minute velocity 510 is larger at the outer periphery of the disk and is reduced proportional at the inner radius of the abrasive annular ring. The disk can be from 12 to 48 inches (30.5 cm to 122 cm) in diameter 512 or more and the radial width of the islands 514 can be from 1 to 8 inches (2.54 to 20.3 cm). The raised ribs with the abrasive top 526 would typically be 0.010 inch (0.25 mm) 524 high from the base surface of the abrasive disk 523 and the disk backing would typically be 0.040 or less inches (1.02 mm or less) 530 thick which would be thin enough that the disk backside 525 would lay flat on a rotating platen 532 which has vacuum hold down disk attachment holes, not shown, to attach the disk 522 to the platen 532. FIGS. 30A and B show a top and side view of a metal abrasive disk 550 with raised rib island sections 540 with gaps 542 between the ribs. These gaps 542 may be changed in width to generate a variety in boundary layer effects and grinding actions as the platen, not shown, is rotated. Diamond or other abrasive particles 544 can be plated or coated 546 on top of the raised island rib sections 540. A non-conducting removable electrical insulation coating 552 is applied to those sections of the metal disk which are not to be plated 552 including the bottom side of the disk 550 which is mounted to the platen surface not shown. A ground lug bolt clamp 548 is shown attached to the metal disk 550 for use in electroplating.

20. Resilient Pad Annular Ring

Problem: It is very difficult to get an abrasive disk with sufficient thickness accuracy to utilize all areas of abrasive on the disk because the diamond coating of particles is so thin. In fact, the total thickness of a diamond coating may only be 0.001 or 0.002 inch (0.025 to 0.051 mm) which approaches the tolerance variation in standard commercial roller bearings. When an abrasive disk is mounted on a platen operating at low or high speeds of 3,000 RPM or more, only the apparent high spots of the abrasive contact a workpiece. It is important that only an annular ring of abrasive is in active contact with the workpiece and that the workpiece part surface doesn't catch the outer periphery edge of the abrasive sheet.

Solution: A compliant soft base material can be used between a standard diamond or other coated thin flexible plastic or metal backing disk and a platen. Here, an annular ring of thin compliant foam rubber or other precision sponge, which is on the outer one third of the disk between the disk backing and the flat platen, can be used. This sandwich combination will create a raised annular ring of abrasive but the sponge will compress sufficiently when the workpiece is brought in contact with the surface of the abrasive sheet. Even with a small contact force, the surface of the abrasive disk would be compressed slightly to conform with the workpiece surface which will tend to create a uniform contact of all the abrasive with the workpiece. A compliant sponge pad can be attached to the platen, it can be ground flat and also have the inner and outer edges tapered somewhat to provide a smooth abrasive edge presentation to the workpiece.

Figure 31:
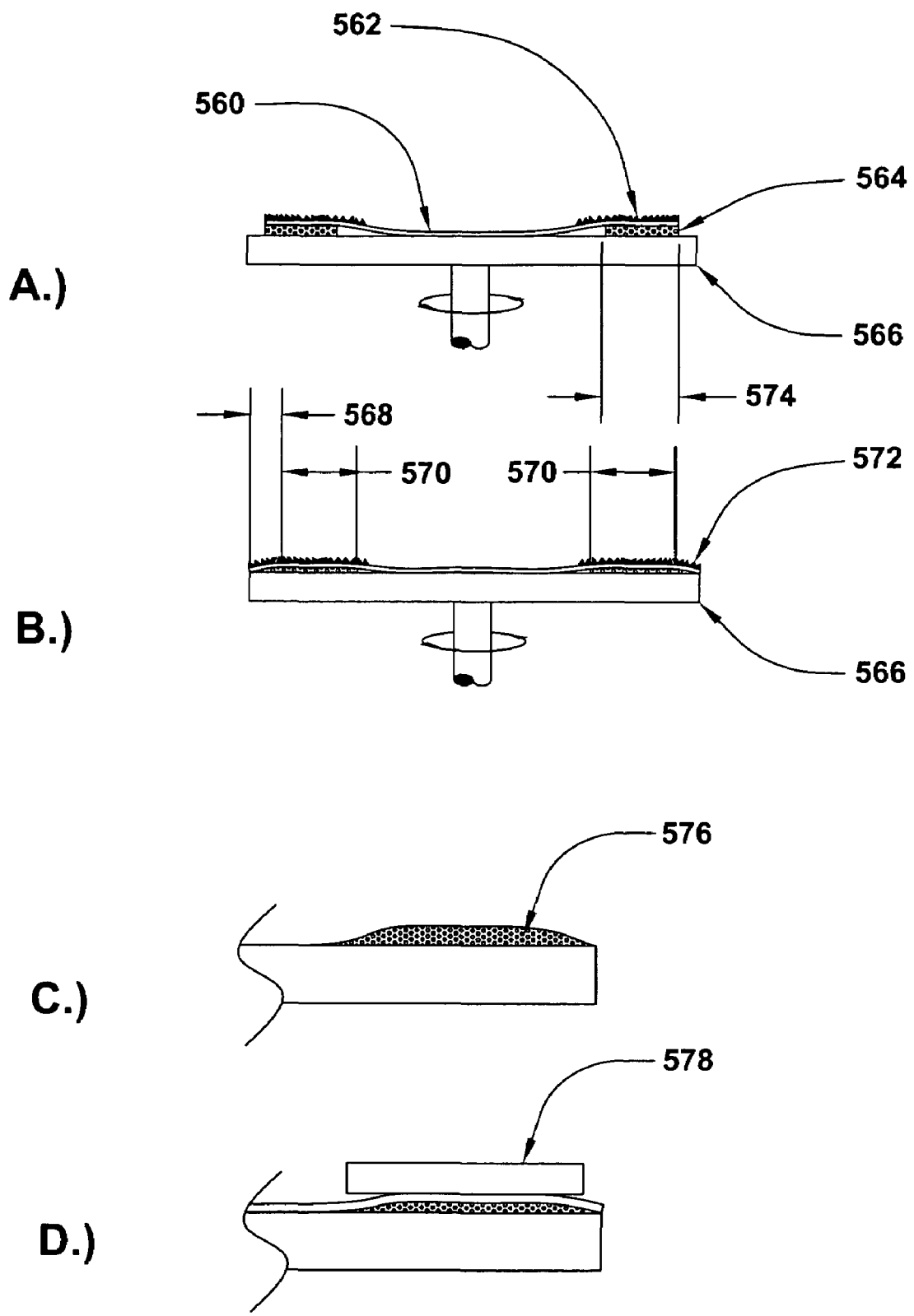
FIG. 31 shows a number of views of an abrasive sheet on a flexible annular sponge spacer.

FIG. 31 has a number of different views that show how a compliant sponge backing can be used under a raised annular ring of an abrasive disk. The abrasive disk backing 560 is covered with abrasive 562 that is bonded to the backing 560 in a raised annular ring 570 and it is mounted on a rotating platen 566. An annular ring of sponge 564 with a radial width 574 is attached to the platen 566 and is shown in cross-section 576. The sponge is tapered down on the outer periphery 572 to a reduced height outer radius area 568. When the abrasive sheet 560 is attached to the platen 566 it lays on the annular ring of sponge 574 with the outer edge laying down almost flat to the platen 566 surface. The workpiece 578 is brought in contact with the abrasive 562 only at the top of the raised area and the transition contact with the raised ledge of abrasive is gradual at the outer edge because of the tapered side 572.

21. Precision Thickness Grinding Abrasive Disks

Problem: If thin flexible abrasive coated sheet disks of abrasive do not have a very precise thickness controlled to 0.0005 inches (0.013 mm) or less, there is a significant problem with their use with very high speed rotating platens operated at 3,000 or more RPM as only the few very highest areas of abrasive will contact the surface of a workpiece held against its surface. Wherever the local thickness of the abrasive sheet is less than the disk total area average thickness, this "low" area will not be utilized for grinding as the workpiece does not have sufficient time to be lowered into contact with the abrasive located in this low valley area due to the high rotational speed of 3,000 RPM or 50 revolutions per second. To maintain contact with all portions of the hills and valleys would require the workpiece to travel from high abrasive points to low abrasive points at a rate of 50 times per second. This is not practical due to the mass weight of the workpiece part and the mass of the associated workpiece part holder assembly. To minimize the workpiece vertical travel at high platen RPM and to utilize the whole area of coated or plated abrasive it is desirable that the total thickness variation of the abrasive disk be within 0.0001 inch (0.0025 mm) or less.

Solution: The primary objective is to utilize the abrasive area of an abrasive disk in the outer annular area. To get this annular area of a disk to have a very precise thickness, a platen can be ground very flat to within 0.0001 inch (0.0025 mm) or less and then an abrasive disk can be mounted upside down to the flat platen with the abrasive contacting the platen. The abrasive disk can be held to the platen by mechanical clamps or by vacuum hold-down at the center inner area. Then a precision grinding head can be brought into contact with the backing side of the abrasive disk as it is rotated with the platen in such a way to grind the outer annular ring of backing flat to result in a uniform thickness of the abrasive disk to be within 0.0001 inch (0.0025 mm) or less. A grinder with a head having a typical width that is wider than the abrasive annular band width of, for example, 1.5 inches (3.8 cm), the head could be lowered to the surface of the rotating platen to complete this grinding. Also, a more-narrow grinder could be traversed radially across the platen to achieve the same results. The same grinding head used to flat grind the top surface of the platen while it is mounted on the lapper machine can be used to grind the back side of the abrasive disk backing.

Figure 32:
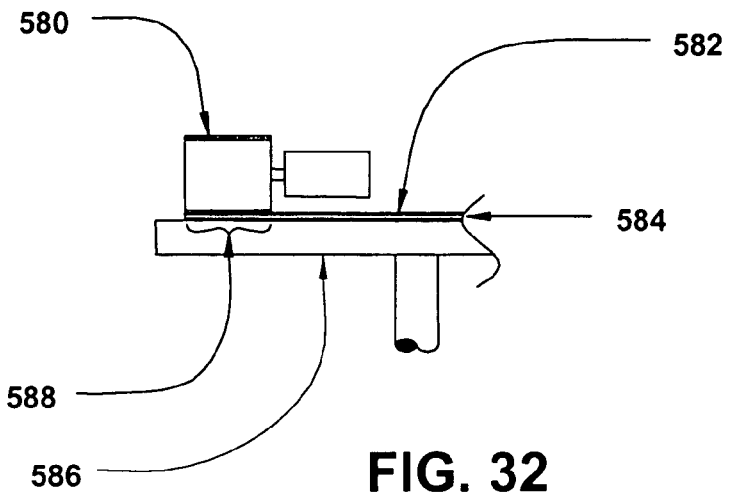
FIG. 32 shows a grinder which is used to grind the backside of an abrasive disk.

FIG. 32 shows a motor driven grinder 580 mounted above a rotating platen 586 which has an abrasive disk 584 mounted with the abrasive side down 588 in contact with the platen 586 surface. The backing side 582 of the abrasive disk is exposed to the grinding head 580. The platen 586 is rotated and the rotating grinding head 580 is brought in contact with the abrasive disk 584 backing and the high spots or areas are ground off. A single wide grinding head 580 can be used to cover the full width of the abrasive annular ring or a narrow head 580 can be used and the whole grinder assembly moved radially to cover the whole abrasive surface.

22. Sponge Abrasive Sacrificial Protector

Problem: When a thin flexible sheet of abrasive is used with an annular ring of resilient sponge to assure contact of all the abrasive surface with a workpiece surface, when lapping at either high 8,000 SFPM or 3,000 RPM or even very low speeds of 10 to 200 RPM speeds, the abrasive tends to abrade the leading and trailing edges of the workpiece in part due to compression of the sponge backing. When a workpiece part has an annular ring shape, both the outer periphery and the inner radius are ground lower than the centroid area which results in a well polished but non flat part. Soft sponge backing is used as the abrasive contact forces are very low, typically from 0.1 to 2.0 lb. per square inch (0.645 to 12.9 lb. per square cm) of workpiece surface area.

Solution: Apply sacrificial material both externally and internally about the workpiece so as to surround the exposed area to be lapped or ground in such a way that both the sacrificial material and the workpiece material is simultaneously ground down by the abrasive sheet. The sponge backed abrasive will be pressing down on the sacrificial area which is wide enough to prevent the resilient abrasive from protruding below the plane of the workpiece surface being ground. The soft sponge backing provides very effective abrading action and excellent fast polishing and the sacrificial material may be selected for fast or slow abrasive wear resistance and also may be pre-ground to achieve good initial flatness. Sacrificial material could be used repeatedly by employing different mounting techniques to insert new workpiece parts.

Figure 33:
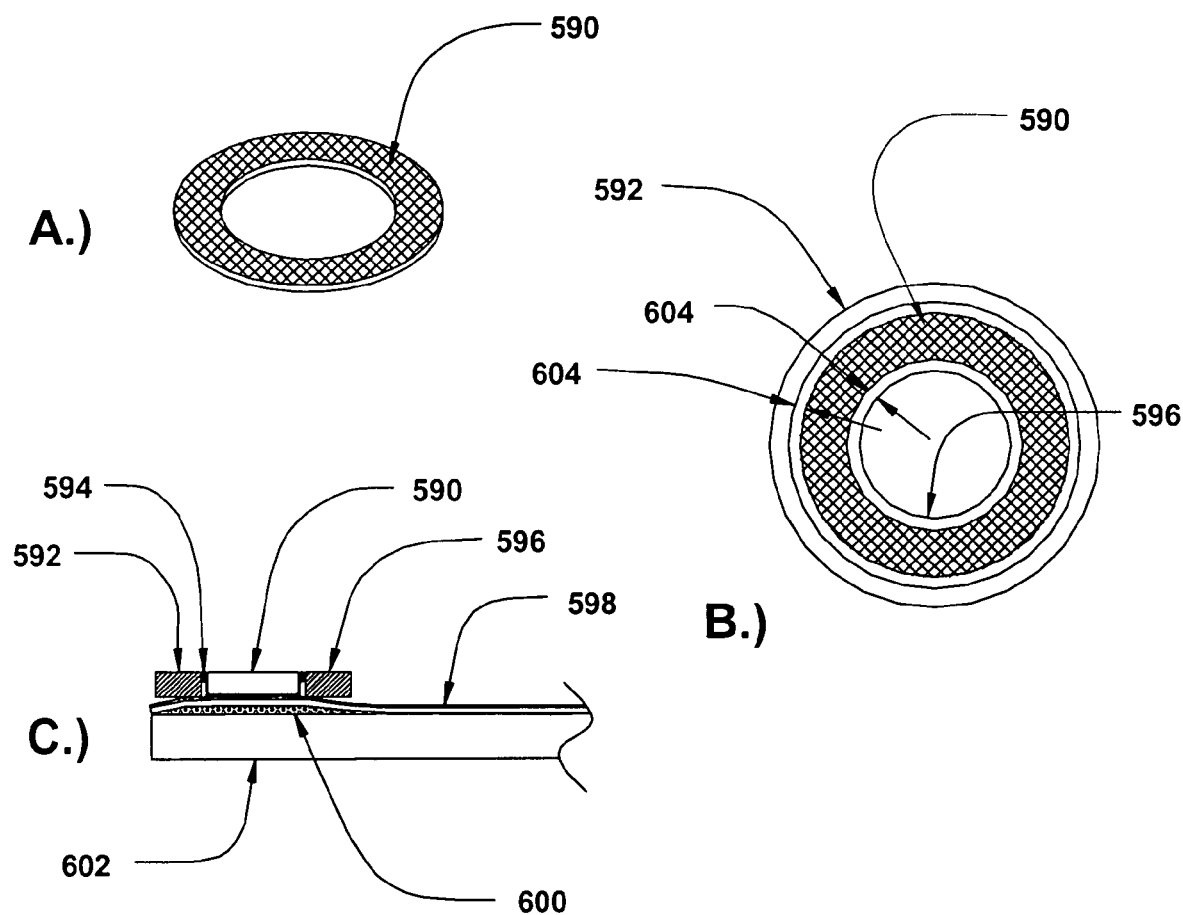
FIG. 33 shows different views of a workpiece surrounded by sacrificial grinding material as the workpiece contacts a sponge supported sheet of abrasive.

FIG. 33 shows an abrasive sheet 598 mounted in contact with a sponge underlayer 600 which in turn is attached to a rotating platen 602. A workpiece part 590 contacts the abrasive coated sheet 598. A sacrificial material may have many shapes, configurations and materials as it is used to protect the leading edges of the workpiece 590 when contacting the resilient sponge 600 supported abrasive sheet 598. An outboard sacrificial piece 592 and an inboard sacrificial piece 596 are both shown as attached to workpiece 590 with adhesive or wax 594 as they are positioned level with the ground surface of the workpiece 590.

23. Abrasive Disk Island Patterns

Problem: When using thin diamond coated lapping disks such as 3M Company brand 12 inch (30.5 cm) diameter disks on a lapper platen rotating at 3000 RPM with water as a lubricant, the water film tends to form a boundary layer between the workpiece surface and the abrasive which tends to tip the part and prevents a flat grind of the workpiece within 1 to 2 Helium light bands (11.6 to 23.2 microinch or 0.25 to 0.51 micrometers). This tipping action occurs particularly with low friction spherical wobble head workpiece holders because a continuous film of water which exists between the workpiece and the continuous smooth abrasive surface. The water film is sheared across its thickness by the relative stationary velocity where it contacts the workpiece surface and the very high speed where it contacts the abrasive surface. The shear force imparted by the moving abrasive across the water film thickness to the workpiece surface tends to tip the workpiece part held by the spherical action workholder. The boundary layer tends to build in thickness along the continuous length of uninterrupted water film that exists between the moving abrasive and the surface of the workpiece.

Solution: Breaking up the continuous smooth surface of the abrasive into discrete patterns so that gaps exist between the independent islands of abrasive will also break up the continuous film of water in the developed boundary layer between the workpiece and the abrasive. Whenever the water is moved across a gap, as the abrasive island moves with the abrasive sheet, the continuous boundary layer is broken and not allowed to build further in height or thickness. Whenever the boundary layer path is shortened, its thickness is reduced and the workpiece is not lifted as high from the abrasive surface which minimizes the tipping angle between the workpiece part surface and the abrasive. Whenever the boundary layer thickness shear force is reduced, less tipping of the workpiece occurs and less of a cone shape is produced on the workpiece surface. Many different shapes can be produced to make these islands of abrasive with the gaps between them. The individual island patterns can be produced on an existing continuous abrasive sheet disk by eroding or removing paths of abrasive coating from the plastic or metal backing by a number of techniques. Lasers could be used to burn trace lines through portions of the abrasive and perhaps into the substrate. Paths could be ground by thin abrasive wheels on a Dremel® type tool, paths could be sandblasted either with a jet or by use of a lined font with gaps where many paths are cut at once. Chemicals or heat can be employed to weaken a path or extreme cold ($CO_2$ type of cold gas) could be applied and the frozen path of weakened particles could be blown free with a high pressure air jet Solvents could be used to weaken a path area and many types of machine cutters could be used to cut bar shaped or other geometric patterns. Any of these path gaps between the islands of abrasive could aid in breaking up the boundary layers forming in a tangential direction along the abrasive disk surface on the moving platen.

24. Tapered Grind Backside Annular Rings

Problem: When an annular ring of abrasive is used for high speed 8,000 SFPM grinding it is important that the inner and outer radial edges are lowered from contact with the workpiece to prevent edge abrasive particles on this edge line from being broken off and scratching the workpiece surface. Also, the whole surface under the annular ring needs to have a very precise thickness so that all of the abrasive contained on the surface is utilized. This abrasive contacts the workpiece which is relatively stable in a direction perpendicular to the abrasive surface. It is wasteful not to utilize the inner core area of an annular disk inboard of the annulus so a method to salvage this expensive material is important.

Solution: A sheet disk of abrasive can be turned upside down to expose the disk backing and then mounted onto a precisely flattened platen and a special abrasive covered shaped mandrel held against the abrasive plastic, metal or fiber matting disk backing while the platen is rotated either slow or very fast. The mandrel would be shaped such that more of the disk backing thickness is ground away at the effective inboard and outboard annular edge areas so that the disk can be turned back over and mounted flat to the platen. The result would be about 0.25 inch (6.4 mm) of lowered edge abrasive area, at both the inner and outer annular edges, which does not contact a workpiece surface. The abrasive disk can be held upside down to the platen with vacuum or by PSA adhesive. The platen may be flat or have a raised annular plateau edge. The grinding tool used to shape the bottom of the backing may be stationary or moving. It could be an annular ring of hardened metal with 3 point abrasive pads at 120 degrees and a wobble joint holder to maintain all three pads in contact with the abrasive sheet backing as the platen is rotated. Another method would be to cut out an independent annular ring of abrasive, backside grind the inner and outer radius edges and then attach this ring to a flat round sheet of plastic or metal. This composite sheet could then be turned over and the backside of the disk be ground flat on the annular disk portion only. There would be some grinding overlap to the backing area inside the annular ring to allow enough flexibility of the backing that the primary annular ring ground surface will lay flat to the platen under the full abrasive coated annular ring area. Another technique would be to cut out an annular ring of abrasive, retain the inner diameter core for other use and attach the as-cut annular ring to a round sheet of plastic or metal. Then the composite sheet could be turned upside down and the back-side of the backing be ground so that the narrow ¼ inch adjacent area which is underneath both the inner and outer edges of the annular abrasive ring is ground down. This adjacent band area would be ground down 0.001 to 0.003 inches (0.025 to 0.076 mm) on the backing that is 0.005 to 0.007 inches (0.127 to 0.178 mm) thick. When the ground composite ring is turned over with the abrasive side up and mounted to a precisely flattened platen, the cut edges of abrasive will not contact a workpiece part. With this thickness correction grinding technique all the tolerances usually experienced in disk production steps are eliminated by final grinding.

25. Segmented Abrasive Annular Disk

Problem: It is desirable to have an annular disk of abrasive where the outer periphery of an annular band of abrasive is located back a short distance from the outer radial edge of a thin plastic or metal backing, and also, not extended far toward the center of the continuous sheet of backing. Use of expensive diamond or other abrasive media prohibits the use of only the outer 20 to 30% of the uniformly coated sheet on a raised annular land area and not utilize the inner surface area. The abrasive-free outer edge is desired to bend the abrasive sharp edge down from contact with a workpiece. The inner radial portion of a round abrasive disk is not used with 7,000 to 10,000 SFPM grinding or lapping because of the slow surface speed of the inner radius area. However, it is desirable that a continuous inner surface of the disk backing exist to effect a vacuum hold down of the disk to the platen with vacuum. Having the abrasive to be integral to the backing sheet is necessary to prevent inclusion of particles under the inner radius of the annular ring. It also is critical that the thickness of the web sheet be uniform within 0.0001 to 0.0002 inch (0.0025 to 0.0051 mm).

Solution: Arc segments can be cut out of a continuous web sheet of abrasive coated material so as to utilize almost all of the web material as these pieces can be put together end to end to form a continuous annular ring shape with slight gaps at the ends of each segment. These segments could be adhesively bonded to a loose sheet of plastic or metal backing. The thickness of the composite segmented disk would be controlled in such a way that each segment's abrasive surface is exactly the same distance from the bottom of the backing. This can be done by attaching the segments with vacuum or electrostatics in a circular annular fashion on a square holding plate which has been ground precisely flat on its annular and outboard area. A loose thin sheet of plastic backing can be attached to another matching square vacuum holding plate which also has been machined precisely flat on the bottom surface to which the backing is attached. The backing can be attached to the holding plate electrostatically or by other means. Then a low viscosity bonding agent is applied in excess in the annular ring section on the exposed side of the backing sheet. Then, the abrasive segment holding plate is brought in contact in such a way that the backing sides of the abrasive arc segments are wetted uniformly with the excess bonding agent. The abrasive holding plate is lowered against the square backing sheet plate until the square corners of the plates contact spacer blocks located in each of the four corners. Some linear or vibration motion may be applied to either the upper or lower square plates to generate a lateral scrubbing motion to the web bonding adhesive while clamping pressure is applied. This relative motion will spread the bonding agent over the surface of the abrasive arc segment surfaces and also wet the free edges of the arc segments.

Figure 34:
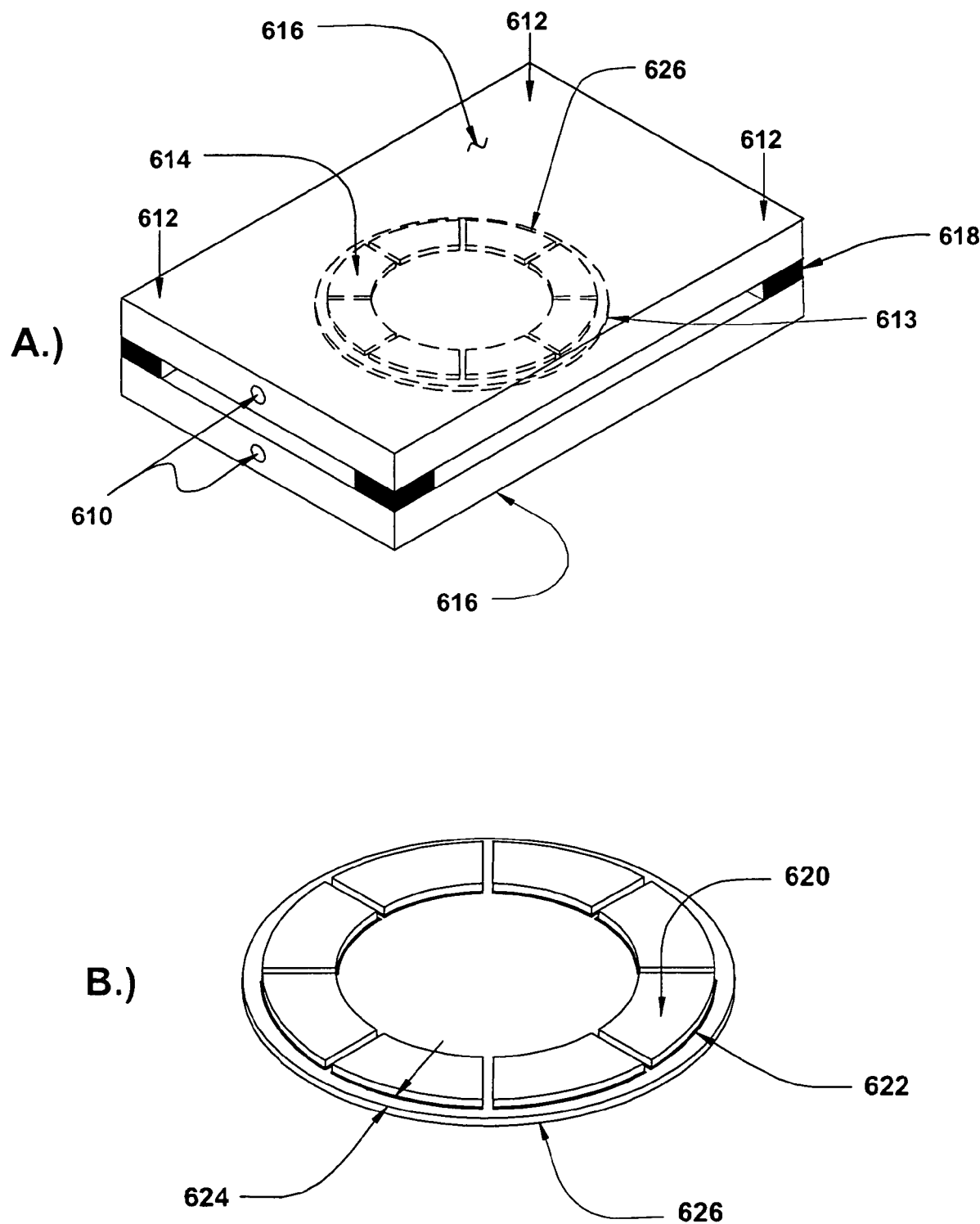
FIGS. 34A and B are views of a mold plate set which precisely controls the height of an abrasive disk made of abrasive arc segments.

FIG. 34B shows a segmented abrasive disk 626 with abrasive segments 620 with a layer of bonding agent 622 attaching the segments 620 to the disk 626 with an overhang border distance 624. The border 624 is used for a variety of reasons such as aiding in vacuum holding of the disk to a platen, not shown, and to provide means to reduce the sharp line cutting action of the edge of the abrasive. FIG. 34A shows upper and lower square or rectangular flat mount holding plates 616 which has loose coated abrasive arc segments 614 laid on the backing 613 of an abrasive disk 626. Both the backing and the segments 614 can be held to the mount plate 616 with vacuum introduced in the port holes 610. Forces 612 are applied to the four corners above the precision gap spacer blocks 618.

26. Relative Velocity of Workpiece an Annular Abrasive

Problem: It is difficult to grind a workpiece flat within 2 Helium light bands (23.2 microinches or 0.51 micrometers) when using an annular ring of abrasive fabricated from 3M Company Trizact® brand abrasive sheets having pyramid shaped forms of aluminum oxide or other abrasives, because of their fast cut rates which cut grooves in a workpiece that is wider than the abrasive ring. Also the cut groove is deeper toward the outer annular ring as the relative speed between the abrasive and the workpiece is greater on the outer diameter than at the inner diameter.

Solution: Use an annular ring of abrasive that has a width of 90 to 95, or somewhat less, percent of the width of the workpiece to minimize the overhang of the workpiece off the inner and outer diameters of the abrasive annular ring that is flat mounted to a platen. Also it is desirable to keep the differential surface speed of the platen mounted abrasive to no more than 20 percent at the outer and inner radii of the annular disk that means creating annular rings of substantial diameters in excess of 12 inches (30.5 cm) for many workpiece parts. Further, rotating the workpiece in the same clockwise or counterclockwise direction as the platen so that the surface speed of the workpiece helps compensate for the difference in surface speed at the inner and outer radii of the annular abrasive disk. Rotating the workpiece in the same direction as the platen subtracts from the surface speed of the platen at the outer radius of the annular ring and adds to the platen speed at the inner radius, resulting in somewhat the same relative surface speed and abrasive material removal rate at both the outer and inner radius. The workpiece should be centered on the annular ring. Further, the faster that the workpiece is rotated before a platen is brought up to speed and during the full grinding procedure, the more the creation of grooves in the workpiece surface is minimized. For platen speeds of 1,000 to 3,000 RPM it is desired to have the workpiece to travel at 200, 500, 1,000, 1,500 and even up to 3,000 RPM to allow matching of the workpiece speed RPM to the platen RPM, to obtain uniform abrasive contact velocity in surface feet per minute (SFPM) across the annular width. The optimum rotational speed of the workpiece depends on a number of variables including the speed of the platen, the diameter of both the workpiece and the platen, the width of the annular abrasive disk and the radial location of the annular disk plus many material factors of both the workpiece and the abrasive media. Overhanging the annular ring with the workpiece assures even wear across the full width of the abrasive which prevents grooves being cut in the abrasive. The pyramid of abrasives integral to the Trizact® brand are initially tall enough with unworn or slightly worn abrasive pyramids to prevent hydroplaning of workpiece parts and allow each disk to be worn flat on the platen when exposing new abrasive particles as old pyramids are worn away.

Figure 35:
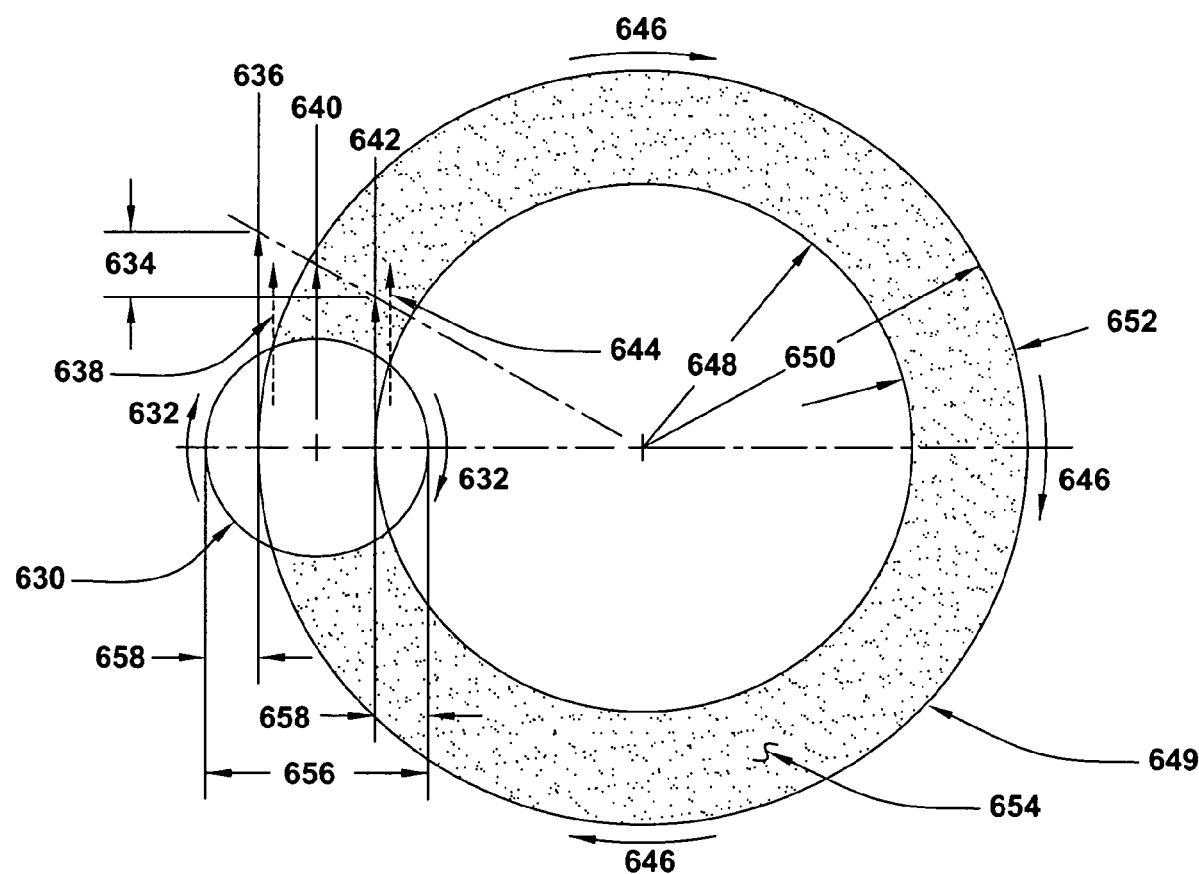
FIG. 35 is a top view of the relative surface speeds of a rotating workpiece in contact with a rotating abrasive platen.

FIG. 35 shows an annular ring of abrasive 654 with a width 652 having an outer radius 650 and an inner radius 648 mounted on a rotating platen 649, now shown, which has a rotation speed 646. The workpiece 630 has a rotational speed 632 that produces surface speeds that vary proportionally to the radial location on its surface. The surface speed of the annular abrasive disk is 642 at the inner diameter, the surface speed at the middle is 640 and at the outer radius is 636. The difference in abrasive speed from the inner and outer annular positions is shown by 634. The relative surface speed applied to the workpiece material by the abrasive when the workpiece 630 rotates in the same direction as the platen is a subtraction of the workpiece 630 surface speed from the outer abrasive annular ring speed 636. Likewise, the workpiece 630 surface speed is added to the abrasive annular speed 642 at the inner annular position. The relative surface speed at the outer radius is shown by 638 and by 644 at the inner radius and both 638 and 644 can be equal with the optional selection of variables. These speeds are all tangential and are shown for the extreme inner and outer annular positions only. There are speed vector components of the workpiece 630 which are directed nominally toward the radial center of the abrasive ring 654 which also benefit the even wear of the abrasive annular ring. The workpiece 630 shown has a diameter considerably larger than the width of the abrasive annular ring 652 as shown by 656 with an overhang of the workpiece 630 on the abrasive ring 654 by an amount 658. Optimizing the rotational velocities of the workpiece 630 to the platen has many beneficial affects with a workpiece 630 having a larger diameter than the width of the annular ring 652. In the same way, the workpiece 630 may be moved radially from the platen center across the surface of the annular abrasive ring 652 with patterns of motion to optimize the relative speeds and the wear on both the abrasive ring 654 and the workpiece 630 plus it allows a workpiece 630 to have a smaller diameter than the width 652 of the annular ring. These radial oscillation movement patterns of the workpiece 630 relative to the platen center can reduce the necessity of having high speed workpiece 630 rotation balance and vibration problems and yet accomplish even wear of both the abrasive ring 654 surface and the workpiece 630 surface.

27. Workpiece and Platen RPM Speed Control

Problem: When a workpiece is ground, it is difficult to get a totally flat ground surface of 1 to 2 Helium light bands (11.6 to 23.2 microinches or 0.25 to 0.51 micrometers) flatness on the workpiece surface when using an annular band of abrasive that is less wide than the contacting width of the workpiece part. It is necessary to overhang the part on the annular band ring to obtain even wear across the ring but this tends to produce a wide undercut on the workpiece center with more undercut material removed in rough proportion to the linear surface velocity of the abrasive relative to the workpiece. Also it is typically necessary to use a spherical motion workpiece holder to assure the workpiece lays flat to the platen abrasive when the last stage of lapping is carried out to achieve a workpiece surface flatness of 1 to 2 Helium light bands (11.6 to 23.2 microinches or 0.25 to 0.51 micrometers). Because of the free spherical motion of the workholder it is necessary to keep the workpiece in flat contact with the platen abrasive from the very start of the lapping process when both the platen and workpiece are not rotating. This flat contact needs to continue through all grinding events. Then all rotation of both the workpiece and the platen should be stopped before removal of the workpiece from the platen abrasive to prevent scratches in the surface of the workpiece from the edge of the annular abrasive as the workpiece is tipped by spherical action when the workpiece is raised up from the abrasive surface. Rotating the workpiece in the same direction as the platen evens the abrasive contact speed at the workpiece surface to obtain uniform wear.

Solution: A process technique can be incorporated into the grinding or lapping procedure to accomplish the desired stable and flat contact of the workpiece surface with the abrasive. This technique is particularly necessary with the extra low friction designs of the workholder spherical joints employed in lapping and grinding with abrasive annular rings.

First, the non rotating workpiece is brought into a light pressure contact with the stationary platen. Then, slowly over a defined period of time, the workpiece is brought up to full RPM speed with the same rotation direction as the platen is run. Also, the platen is brought up to the desired speed over a controlled period of time with a defined acceleration time profile. The faster the abrasive contact surface speed, the faster the removal of material rate from the workpiece. Because of this, it is desired that the workpiece makes many full rotations relative to the rate of material removal so that abrasive wear is spread out evenly over the workpiece surface to achieve extreme flatness. For instance, 0.001 inch (0.025 mm) total of workpiece surface material may be removed, but the workpiece may only have rotated a total of 100 revolutions over this period of time which means the surface height variation per revolution would only be 0.001 divided by 100 or 0.00001 inch (0.00025 mm) which typically would be sufficient for the desired flatness on a 3 inch (7.7 cm) diameter workpiece. If a workpiece is a common ring-shaped part with an opening at the center radius, then the ground material removal rate at the center is not important. However for a solid workpiece disk it may be an advantage to first bring both up to RPM speed and either reduce the platen speed to a very low RPM while the workpiece is rotated at full RPM. Many relative speed patterns may be developed for different types of parts and different abrasives and these patterns could be repeated in processing a workpiece part.

28. Radial Tracks in Abrasive Disk Sheets

Problem: When an annular ring uniform abrasive coated disk sheet is operated at very high 9,420 surface feet per minute, SFPM, speeds such as with a 12 inch (30.5 cm) diameter platen operated at 3,000 RPM, with coolant water applied to the grinding surface, a boundary layer of water builds up between the abrasive surface and the workpiece. When an abrasive disk is used, which has the abrasive formed on small islands of approximately 0.125 inch (3.175 mm) diameter, then the workpiece can easily be ground flat within 0.0002 inches (0.0051 mm) over 4 inches (10.2 cm) diameter. However, when an abrasive disk is used at these speeds which has a continuous flat coating of abrasive over its full surface, the workpiece is typically not ground to this same accuracy. The boundary layer tends to build in thickness with a longer length of tangential contact with a workpiece. Also, vibrations caused by the hydrodynamic interface forces where the workpiece contacts the wetted abrasive affect the grinding action. Vibrations and changes in the grinding action due to shedding of the water eddies and other phenomenon which occur at the contact of the workiece with the water film covered abrasive tend to be periodic in nature and can reactively build up a dynamic oscillation of the workpiece.

Solution: Patterns of cut-out recessed lines can be produced in the surface of these abrasive disks which will break up the tangential boundary layers of fluid by interrupting the continuous layer of the water film which is sandwiched between the workpiece and the abrasive. This can easily be done to existing commercially available smooth coated abrasive disks by using a variety of methods. A very simple method is to use a hard narrow tool to scribe out radial lines on the disk in the area that contacts the workpiece. Here, both the land area between the radial scribed lines and the width of the scribed lines may be as wide as 0.250 inch (6.35 mm) but may be as little as 0.010 inch (0.25 mm) wide. Numerous other patterns may be produced by scribing to produce four sided diamond shapes, or curved lines, or circles, etc. Another way to produce these boundary layer break-up lines in manufactured disks would be to abrade out the line paths by use of a narrow bead blaster. For instance, these cut line patterns could be added to the 30 micrometer sized diamond coated disks produced by the 3M Company Microfinishing Group. Line patterns could also be scribed into these type of disks through the full thickness of the abrasive coating which is typically only about 0.001 to 0.015 inches (0.025 to 0.038 mm) thick. The abrasive disk backing is typically made of tough 0.003 to 0.005 inch (0.076 to 0.127 mm) thick polyester that would be durable enough to maintain the holding vacuum of a vacuum chuck platen. Other methods such as laser beam thermal breakdown path treatments may be employed. The width between the tracks may be staggered and random to breakup the hydrodynamic and other types of periodic sources of surface vibrations of the workpiece as it contacts with wetted abrasive.

Figure 36:
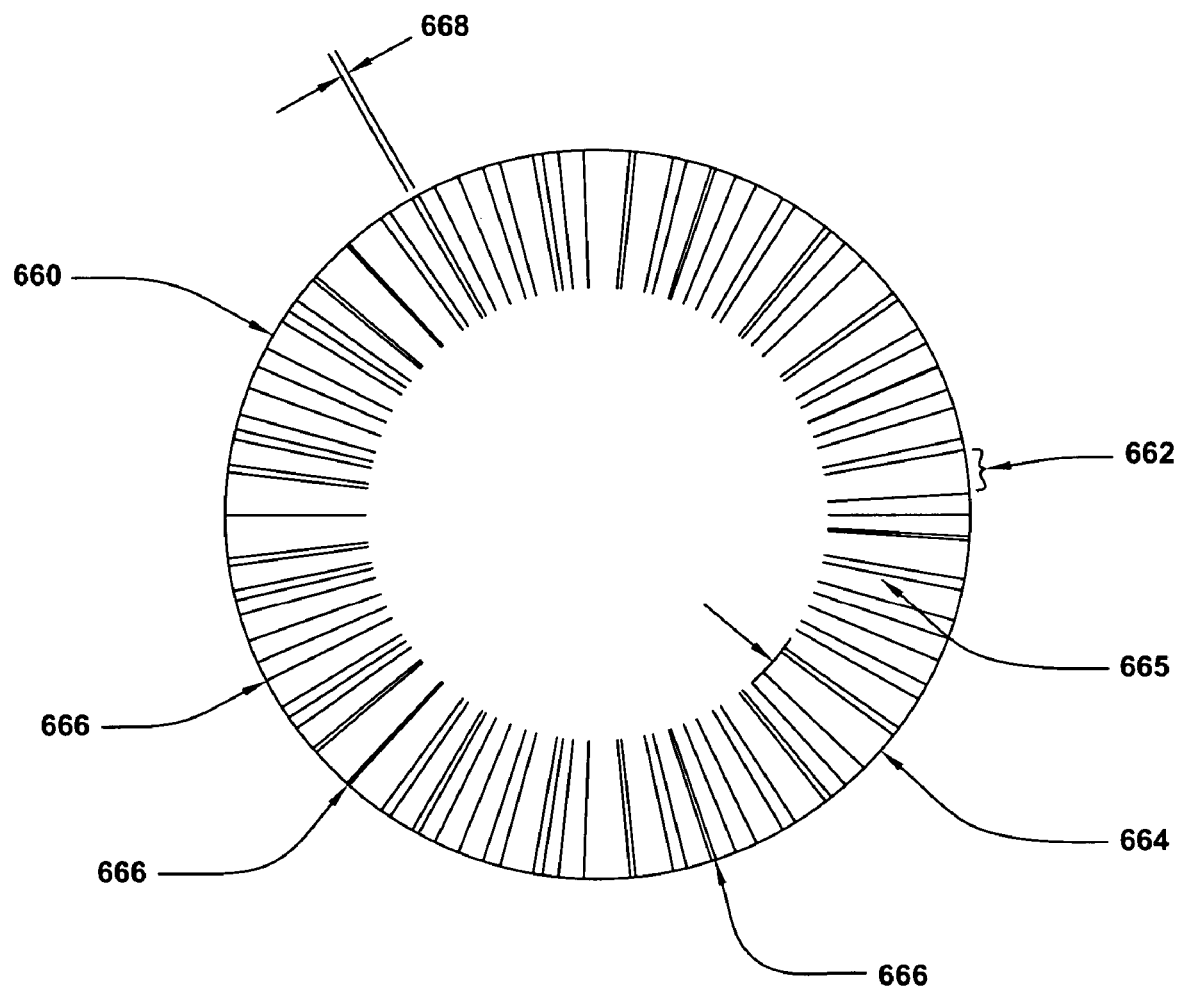
FIG. 36 shows an existing smooth coated abrasive disk which has been grooved to make abrasive islands.

FIG. 36 shows a typical 12 inch (30.5 cm) diameter abrasive disk 660 which has an annular outer ring 665 of abrasive which typically ranges in width from 1 to 3 inches (2.54 to 7.6 cm) in width 664. The continuous smooth coating of the annular ring 665 is scribed with radial cut lines leaving radial shaped islands of abrasive 662 that can vary from 0.010 to 0.250 inches (0.25 to 6.35 mm) wide and they can be of a consistent width or a variable width that is measured tangentially around the periphery of the abrasive disk 660. Also, the scribe line 666 widths may vary in width from 0.005 to 0.250 inches (0.127 to 6.35 mm) and may be of a consistent width 668 or they may vary in width 668 around the periphery of the disk 660. The scribe lines 666 are shown as straight lines but they may also be curved lines and they may be continuous line shapes, not shown, such as circles, ellipses, figure eights and other patterns.

29. Rotating and Lifting Lapper Spindle

Problem: It is difficult to provide a workpiece holder spindle which will precisely align the workpiece with the abrasive platen, have low vertical motion friction and provide good mechanical rigidity.

Solution: An air bearing spindle shaft having different diameters along its length can allow both rotation and vertical motion to the workholder attached to the shaft. The shaft can be raised and lowered as an air bearing cylinder and would be rotationally driven by a non-contact dc motor. A special spherical workpiece rotor and rotor housing assembly would be attached to the end of the spindle shaft. The workpiece would be attached to the workpiece holder by vacuum or other mechanical attachment devices.

Figure 48:
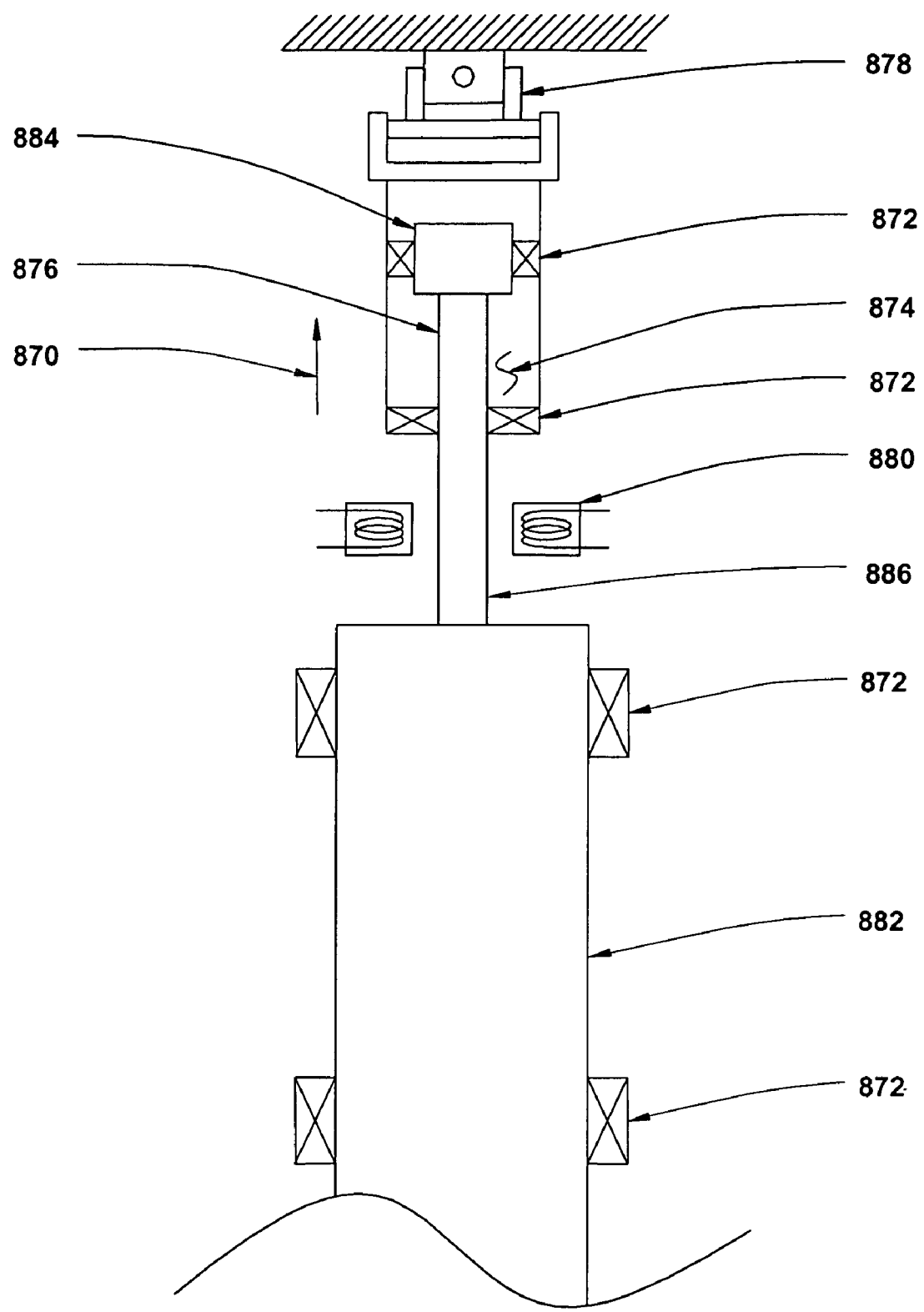
FIG. 48 shows a cross-sectional view of a rotating and lifting air bearing workholder spindle shaft with a universal joint end mount.
Figure 49:
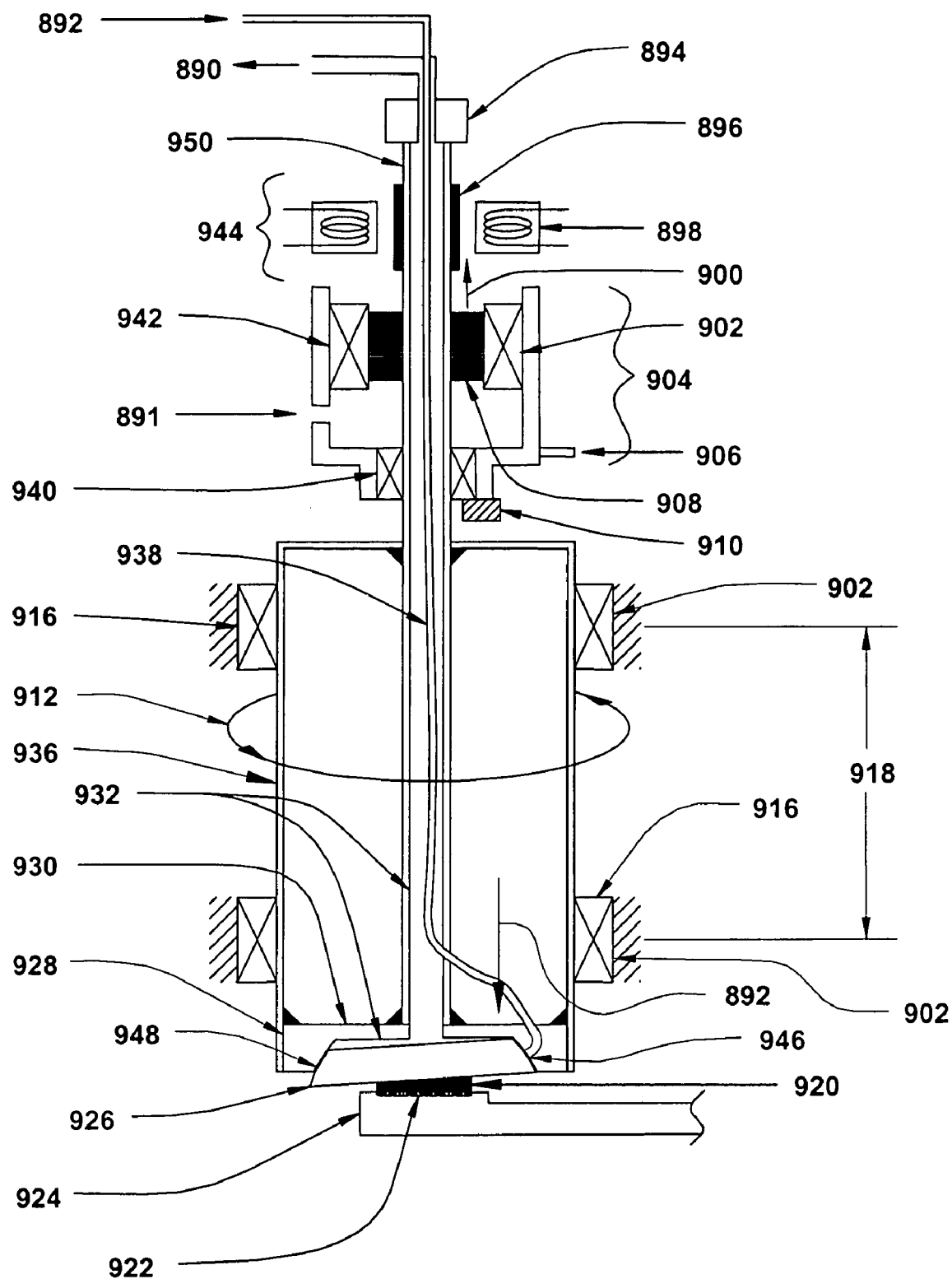
FIG. 49 shows a cross-sectional view of a rotating and lifting workholder shaft with air pressure and vacuum supplied to the workholder assembly.

FIGS. 48 and 49 both show essential features of a rotating and lifting air bearing workholder spindle system. FIG. 48 is a simplified schematic view of some of the features of the system. A lifting force 870 is applied to the spindle shaft 886 by use of pressurized air 874 that is applied to both the small diameter shaft 876 and the large diameter shaft 884 because of differences in the shaft cross-sectional surface areas of the two shafts 876 and 884. The whole assembly is mounted to a universal joint device 878 which allows enough lateral movement that the small independent lifting air bearing device utilizing the two shafts 876 and 884 do not interfere with the free motion of the large diameter spindle shaft 882 which is sufficiently stiff because of its large diameter to resist lateral contact forces applied by the abrasive grinding platen, not shown. All of the shaft and cylinder shafts are supported by air bearings 872 having appropriate sizes for their shafts.

FIG. 49 shows a cross-sectional view of a stepped diameter workholder spindle shaft. Vacuum 890 and air pressure 892 are connected through a dual rotary union 894 to connect to the workholder spherical rotor housing 928 having a air pressure sealed top surface 930 which contains a spherical shaped rotor 926 surface to which is mounted a workpiece 920 which contacts an abrasive sheet 922 which is mounted on a rotating platen 924. A fluid film spherical bearing with a fluid film 948 caused by fluid entering the passageway 946 is one type of workholder that can be used with this stepped air bearing shaft device. Other spherical motion workholders, such as trunion type devices, not shown, can also be used in place of the fluid film device. A non-contact DC motor assembly 944 direct current motor coil winding 898 can surround permanent magnets 896 mounted on the spindle shaft 950 to create rotational torque for the workpiece 920. Vacuum 932 is shown to be contained inside the hollow spindle shaft 950 and pressurized air is supplied through a tube 938. The vertical lift force 900 counteracting the spindle assembly weight force 892 is generated by air pressure 891 acting on a large diameter shaft hub 908 and the spindle shaft 950 both of which are supported by air bearings 942 and 940. The lifting device is effectively an air cylinder 904. The large diameter lower section spindle 936 typically would have a diameter of three inches (7.6 cm) and it would be radially supported by air bearings 916 which are spaced a significant distance 918 apart for shaft stability. The spindle shaft 950 would be hollow to accommodate vacuum and the air tube 938. The spindle would be rotated 912 at high speed and would be limited in travel by an adjustable stop 910. Pressurized air 902 is supplied to the air bearings. An anti-rotation pin 906 is used to prevent the air cylinder 904 from rotating with the spindle shaft 950.

30. Platen Vibration Material

Problem: When a platen is constructed of an un-damped material, such as a good quality steel, there is a tendency for the platen to be vibrationally excited during a high speed grinding or lapping operation with resultant oscillations of the outer flat surfaces of the platen. The vibrations acting perpendicular to the platen surface, which occur as a function of the rotating speed of the platen, the dynamic characteristics of the rotating platen structure and other causes tend to build up in amplitude over time. The buildup to full scale oscillation amplitude occurs particularly when the platen is rotated at a rotational speed in revolutions per second which approaches one of the platen assemblies natural frequencies which also are represented in oscillations per second of time. Vibrations within the platen are maximum in a direction perpendicular to the platen surface but occur in other directions as well. These vibrations act to prevent grinding or lapping a workpiece to better than 4 Helium lightbands (46.4 microinch or 1.2 micrometers) of flatness in many instances. Vibrations are commonly present with platen rotational speeds of 1,000 to 3,000 RPM with an annular ring of abrasive sheet attached to the platen with vacuum. These vibrations occur particularly in platens which are constructed of low-damped material such as high strength steel.

Solution: The platen can be constructed of a material that intrinsically has good vibration damping characteristics such as MIC 6 cast aluminum tooling plate. When a platen made of a two layer bolted aluminum sandwich is used in place of a sandwich layer of steel, the vibrations present in the platen are reduced considerably and the flatness of a ground workpiece is markedly improved. In one case, the typical flatness of a 3 inch (7.6 cm) diameter workpiece ground with a steel platen was flat within 0.0002 inch (0.0051 mm) but the same part was flat within 0.0001 (0.0025 mm) or better with the aluminum cast MIC 6 tooling plate platen. Other damped materials of construction can be used to construct a platen of, with a few examples, such as cast steel, plastic materials, layers of viscoelastic sheets of plastic sandwiched between layers of a platen, coatings on a platen and so on. Operating these abrasive platens at speeds far away from their critical natural frequencies is an advantage. Each platen assembly will have a number of natural frequencies but the lowest natural frequency will be the most troublesome as it will be excited first as the platen speed, RPM, is increased until the two frequencies are matched or are close to one another. Any design change in a platen assembly structure that affects its mass, inertia, stiffness and damping material properties will change its natural frequency.

31. Spherical Holder

Problem: An offset spherical workpiece holder has a number of functional requirements in order for it to perform satisfactorily for grinding or lapping. For instance, it needs to move freely in a spherical housing, be restrained three dimensionally in the housing, not be allowed to rotate relative to the housing about the axis of the driven workholder spindle and not be contaminated by the grinding environment from abrasive ground particles. It is necessary that any of the linkage mechanisms which retain the movable spherical member to its spherical socket and allow it to be driven do not create torque inducing forces on this rotor. Any torque force which results in non-symmetrical force loads on the rotor will tend to tip the rotor, and the attached workpiece, as the workholder spindle is rotated while in contact with the moving abrasives. These non-symmetrical forces on the workholder rotor will tend to press the workpiece part surface with more force into the abrasive at discrete portions of the workpiece, resulting in distortion of the flatness of the ground surface. Also, it is desired to freely float the moving spherical rotor workpiece holder at process event times in the grinding process. At other process event times it is desirable to also allow the moving spherical workpiece holder to be rigidly captured in the housing without changing the radial position of the moving spherical rotor holder relative to the housing. In this care, the rotor holder is rigidly coupled to the rotor housing. Using the same spherical rotor workpiece holder with two separate modes of operation, free spherical motion and rigid locked connection provides certain process advantages. With this flexibility, a workpiece part can be attached to the workholder rotor, the rotor rigidly connected to the rotor housing and the part can be rigidly rough ground flat using a coarse abrasive. Then, the workholder rotor can be allowed low friction spherical motion, and the workpiece can be presented to another fine abrasive surface for lapping without removing the workpiece from the workpiece holder. Also, low mass and inertia of the moving spherical rotor holder are designed to minimize out-of-balance effects when the whole assembly is rotated about the workholder spindle axis. Here, the free spherical motion of the rotor is desired when grinding a workpiece against a moving abrasive surface which is not perfectly parallel to the workpiece surface. Further, vibration damping between the moving holder and the housing is desired.

Solution: A workpiece holder which is lightweight, has a three-point fluid island suspension rotor where high pressure water or another fluid is injected through orifice jets at the three island segments, which have a spherical shape that matches a rotor support housing having a similar spherical shape can be used. The three-point island rotor floats in a fluid layer of air or water that separates the moving sphere rotor workpiece holder component from its matching spherical housing. In one configuration, a counteracting vacuum force acts against the fluid bearing water source. The water or other fluid tends to clean the spherical joint gap area from grinding swarf and thus maintain a very small bearing gap and it also provides vibration damping between the moving holder and the housing. Use of a very flexible non-corroding bellows type of vacuum chamber provides a large surface area, and force, for the vacuum to counteract the localized higher pressure water, and will also keep the spherical joint parts together and act as an anti-rotation restraint for the moving spherical part holder. Vacuum can be maintained constantly and the water pressure reduced when it is desired to clamp the workholder rotor to the rotor housing.

A dual passage rotary union is used on the workholder spindle shaft to supply both pressurized fluid, such as air or water, and also a vacuum source to the workholder assembly which is attached to the spindle shaft.

FIGS. 37, 38, 39 and 40 show components used in a vacuum bellows restrained workholder rotor.

Figure 37:
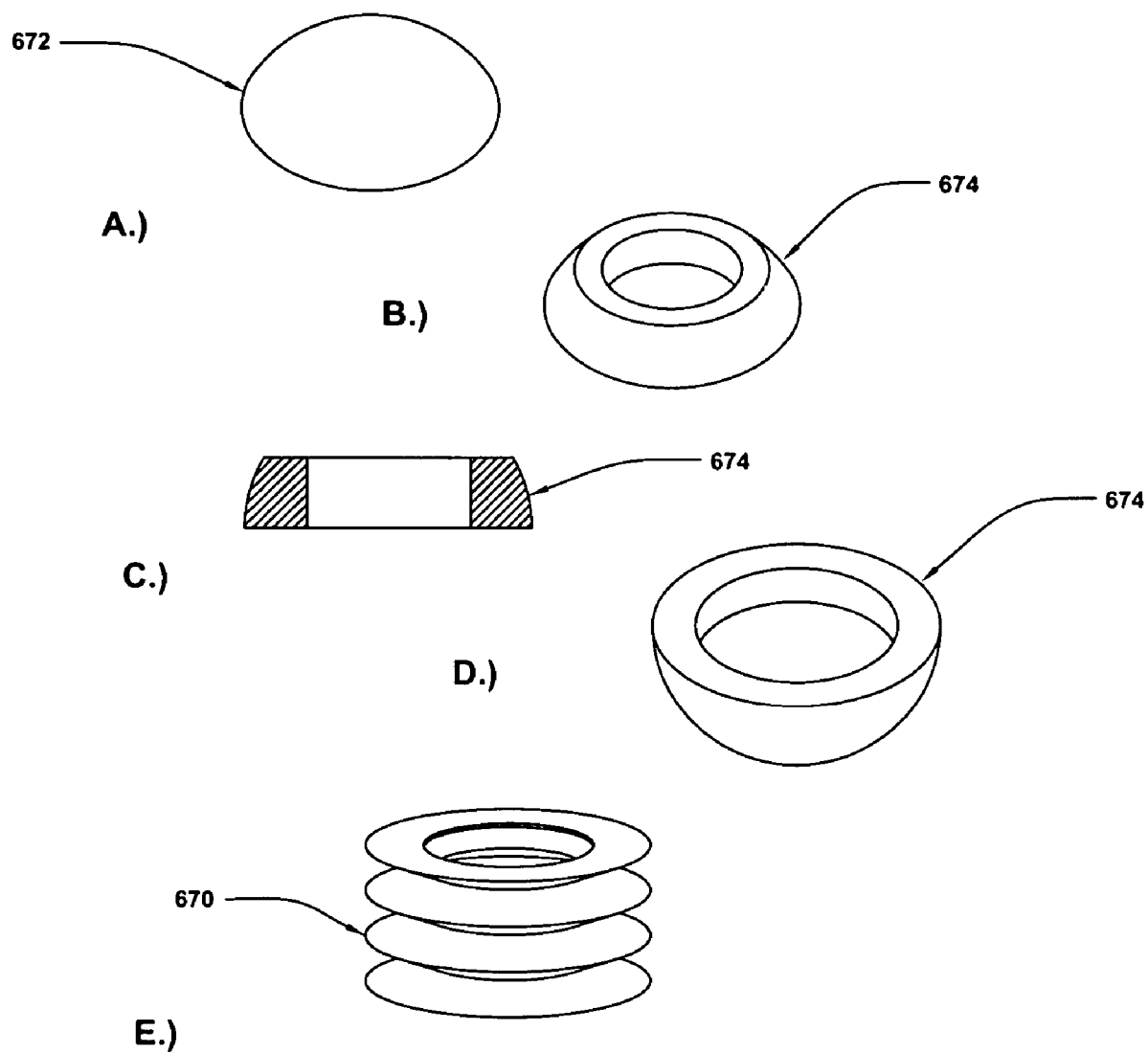
FIG. 37 shows a number of components used to apply vacuum restraint to a spherical workholder device.
Figure 38:
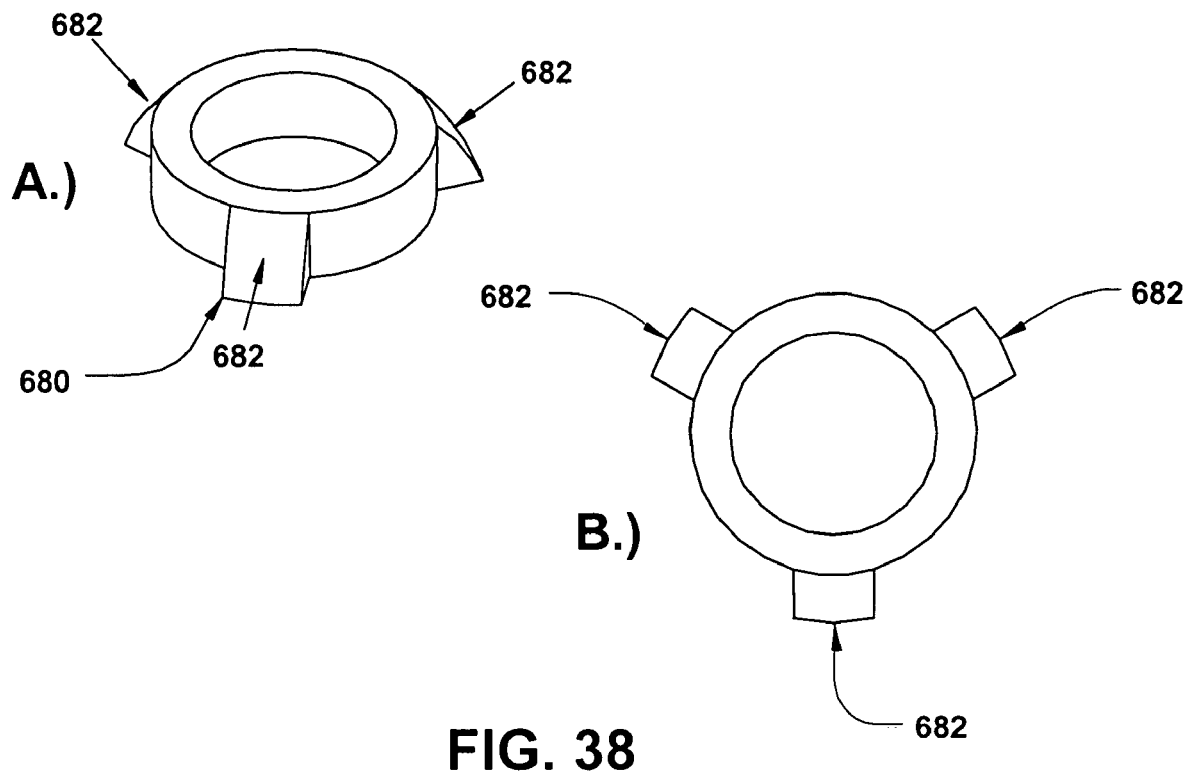
FIG. 38 shows a three-point spherically segmented fluid bearing rotor.

FIG. 37 shows a number of components used in constructing a three-point island spherical workpiece holder (not shown). FIG. 37A shows a hemispherical section 672 from which a three-point rotor, not shown, can be constructed. FIG. 37B shows an isometric view of a spherical ring 674 which can be constructed from the hemisphere 672 and FIG. 37C shows a cross-sectional view of the ring 674. FIG. 37D shows a bottom side view of the spherical ring 674. FIG. 37E shows a large diameter sealed bellows 670 which is used to apply vacuum pressure forces to the ring 674 to restrain it to a matching spherical housing, not shown.

FIG. 38A shows a three-point spherical island ring 680 that has been constructed from the spherical ring 674 shown in FIG. 37. There are three independent spherical islands 682 which are positioned at 120 degree intervals around the circumference of the ring 674. The distribution intervals around the ring are a matter of choice, as long as stability is provided. Each of these islands has a spherical shape which has the same precise radius and reference location defined by the sphere radial center of the hemisphere 672 in FIG. 37 and this sphere center is offset some distance away from the flat end of the hemisphere 674.

Figure 39:
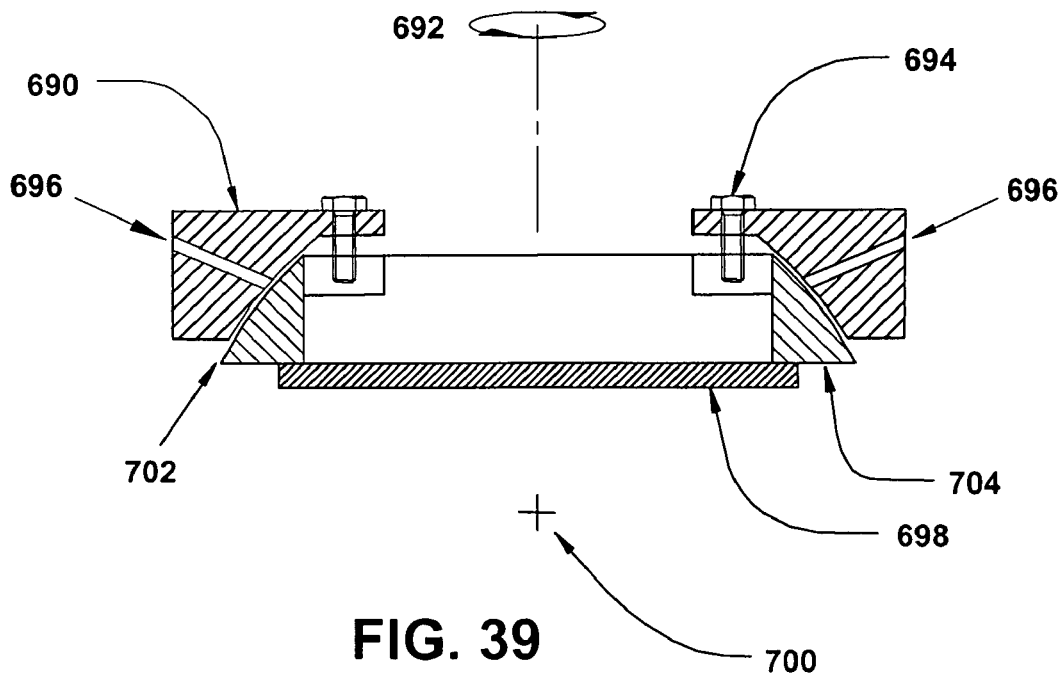
FIG. 39 shows a three-point rotor installed in a fluid bearing rotor housing.

FIG. 39 shows a semi cross-sectional view of a spherical three-point workholder rotor 704 mounted in a spherical housing 690 which has a spherical center of rotation 700 which is located some offset distance from the flat surface of the workhoder rotor 704. This distance is shown as excessively large for drawing clarity but it generally lies coincident with the exposed surface of the workpiece 698 that is attached to the workpiece rotor 704. A fluid of air or water is injected through jets or a porous bearing 696 to produce a fluid bearing fluid film 702 that separates the three-point island rotor 704 from the spherical housing 690. Special capture bolts 694 are rigidly attached to the rotor 704 but loosely attached to the spherical housing 690 so as to provide limited angle spherical rotation of the rotor 704 in the housing 690 yet keep the rotor 704 from falling freely away from the housing 690 when the rotor 704 is not restrained by vacuum bellows support system (not shown) forces. The complete workholder assembly rotates 692 about the workholder spindle (not shown) axis. The workholder spindle, not shown, enables rotation of the workpiece 698 as it contacts an abrasive surface (not shown).

Figure 40:
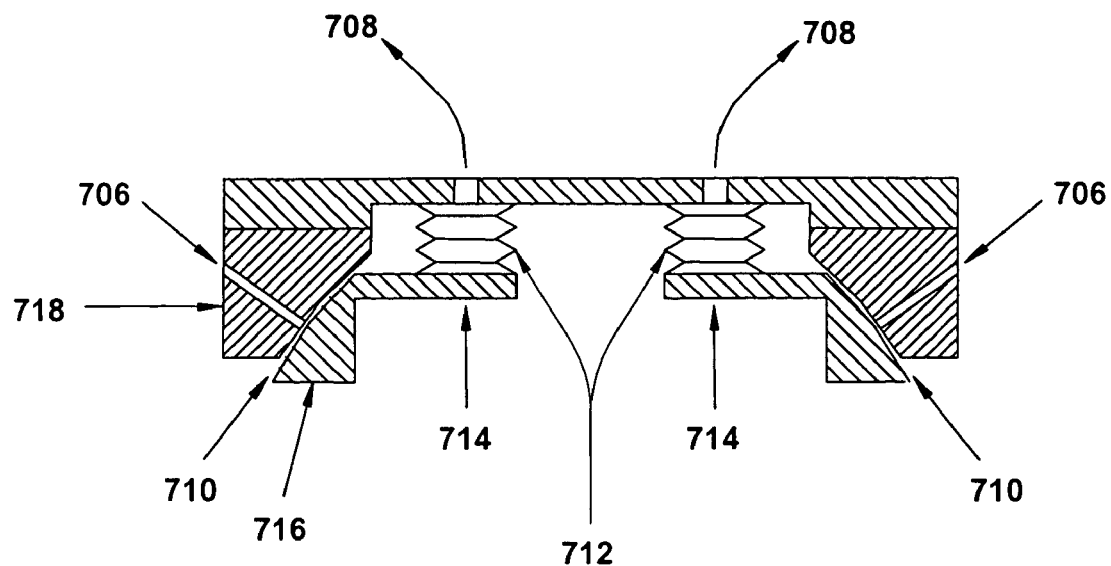
FIG. 40 shows a three-point rotor with independent bellows vacuum restraint devices.

FIG. 40 shows a workpiece holder assembly 716 with a sealed bellows 712 that is fabricated by a variety of techniques including a adhesively bonded stack of stainless steel, or polyester, or other plastic, annular sheets. This bellows 712 provides upward lift on the workpiece rotor 714 to hold it into the spherical rotor housing 718. The bellows 712 are attached to both the rotor 714 and the rotor housing 718. The bellows has an opening on the inside radius so it is shown as two segments as it is split with the cross-sectional view cut-line. Water or other fluid is injected at the entrance channels 706 and the fluid film 710 has a typical pressure of 60 lbs per square inch (psi). The vacuum 708 is a pressure of approximately negative 14 psi so the larger area bellows provide a vacuum force that approximates and opposes the force applied by the water or other fluid pressure acting on the smaller area spherical surfaces. When it is desired to float the rotor 716 from the housing 718, fluid is injected into the fluid bearing passageway 706 and a counterbalancing, but lesser force, is provided by the vacuum bellows 712. When it is desired to operate the workholder rotor 714 rigidly attached to the spherical housing 718, fluid pressure 706 is cut off which removes the floating pressure and the sealed bellows 712 restraining vacuum force is applied to the rotor 714 to rigidly hold it into the housing 718. The bellows 712 are sufficiently flexible not to impart significant torque forces to the rotor 714 when the rotor 714 is moved through a very limited spherical angle.

32. Spherical Part Holder Suspension

Problem: An offset continuous or three-point spherical part holder rotor has an upper semi-hemisphere section which has to be held in place vertically to keep the part holder from falling out of its spherical shaped pocket mount. The spherical surfaces are separated by a film of air or liquid which also pushes down on the movable part holder rotor. It is important that the vertical restraint system apply a force to counteract the liquid water film in such a way that the force is uniform across the span of the spherical rotor surface to prevent a tipping torque to be applied to the attached spherical workpiece. This spherical motion part holder is used for lapping or grinding a workpiece that is held flat against a moving or stationary abrasive surface. Use of vertical force devices positioned about the spherical section to evenly distribute the forces on the spherical rotor requires that each device impart a constant and equal force to its portion of the rotor section to prevent tilting of the section or the rotor. If a rotor is tilted by these restraint devices, the ground surface of the workpiece will be uneven.

Solution: An offset spherical rotor section may be shaped as a continuous segment or it may have a three-point geometry with the use of three separate islands of spherical surfaces located 120 degrees apart which nest into three matching spherical pockets which assure that the spherical part holder remains centered with spherical motion. The actual contact points for a continuous annular ring of spherical shape can shift around the periphery of the rotor somewhat, with spherical motion, as the air or water gap is so thin (typically 0.0005 inches, (0.0127 mm)) as compared to the accuracy of fit of the spherical joint. A simple solution is to use a flexible device such as a cable, wire, rope, woven line, chain or bar linkage system that is stiff axially but weak or flexible perpendicular to its length to couple a force source device to the center point of the spherical section. This single-point mounting or attachment assures that the vertical restraint force is located on the exact center between the three-point spherical islands and thus the total force is quite evenly distributed to each of the three islands even when the spherical segment is rotated through a typical very small angle of less than 5 degrees.

Many different types of force devices can be used including a spring, air cylinder, vacuum device, or many others. The longer the cable length, the less there will be a tilting force due to the spherical tipping motion. If an air cylinder is used, it could also be a diaphragm type unit with zero or limited friction; or, it could be a cylinder having low rod breakaway friction, called stiction, can be used. Also the air cylinder could be mounted in series with a spring to reduce stiction effects. It is desirable to have the cable attachment point as low to the workpiece or to the center of rotation of the spherical holder as possible, to minimize tilting torque forces. Single cable attached at a single point to the center of the spherical rotor can be used or an alternative three-point tripod secondary cable support system which has individual cables attached to three points on the rotor can be used.

Figure 41:
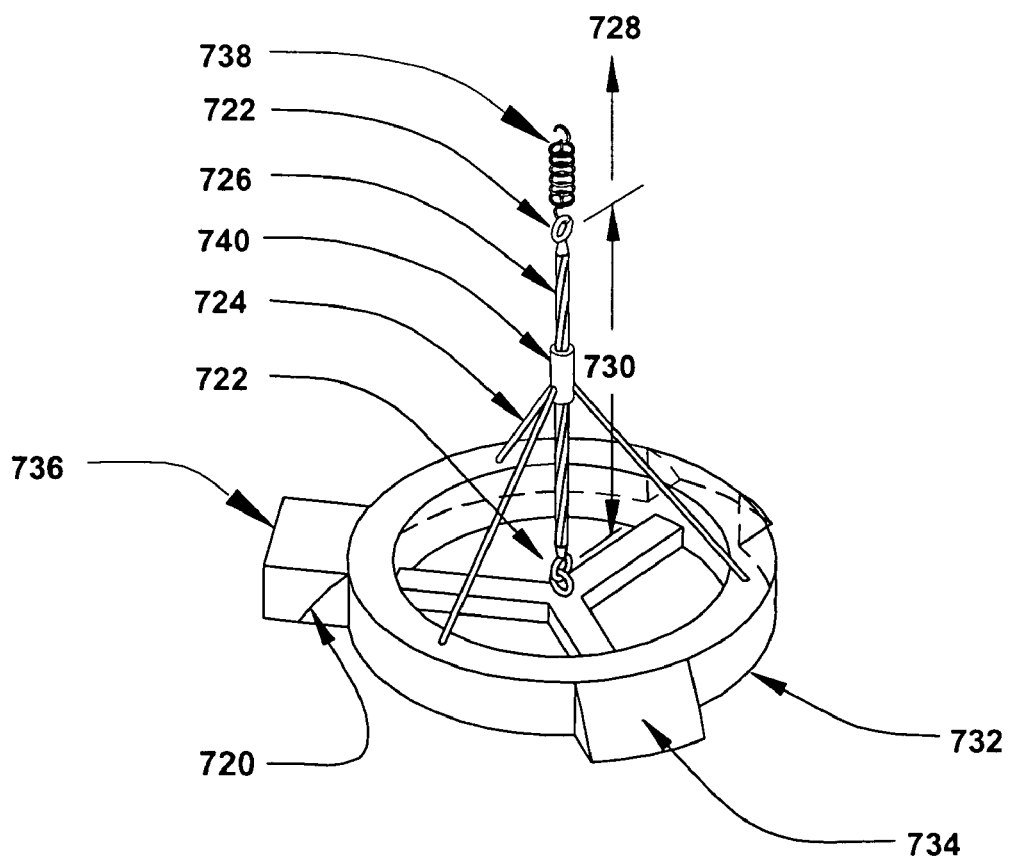
FIG. 41 shows a spherical workholder rotor held into a rotor housing by a cable suspension system.
Figure 42:
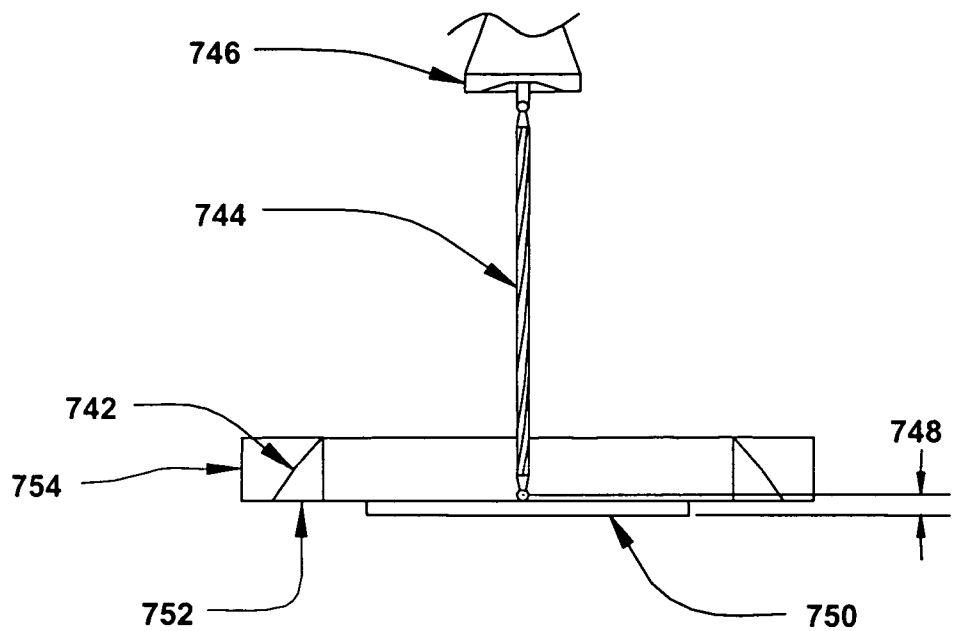
FIG. 42 shows a diaphragm force cylinder applying force by cable to hold a spherical rotor into a housing socket.

FIGS. 41 and 42 show cable restrained workholder rotors. FIG. 41 shows a spherical workholder rotor 732 that has three spherical islands 734 and a single leg of a spherical housing 736 with the other two legs, not shown, to better clarify the assembly and its function. Two alternative designs of a cable support system are shown in the figures but only one design would be used on an assembly. A single cable system 726 could extend from a support tension spring 738 to double ring couplings 722 mounted to the cable 726 and also mounted on the workholder rotor 732 at its center as close to the workpiece, not shown, as 30 possible to minimize rotor 732 tilting torque loads induced by the cable force 728. The single cable would have a length 730 as long as possible in the workholder assembly to minimize these tilting torque forces which would tend to rotate the spherical rotor 732 in the spherical housing 736. There is a spherical fluid gap at each of the three legs between the rotor 732 and the housing which is supplied with a pressurized fluid which physically separates the rotor 732 from the housing 736 and results in very low friction spherical motion and also provides vibration damping between them due to the shear of the fluid layer when the rotor 732 is rotated relative to the housing 736. An alternative cable suspension system is also shown where one end of the cable 726 is attached to the force spring 738 which is terminated at a cable tripod connector link 740 which has three tripod cable or solid support links 724 of equal length which are, in turn, attached to three points on the workpiece rotor 732 at positions mounted 120 degrees apart around the periphery of the rotor 732. The link arms 724 can be attached at the rotor island 734 position, if desired, but it is not necessary in order to provide equal vertical support at each island 734 from the single central cable force 728 at the center. Further, link arms 724 can be of a solid material or may be flexible cable segments. The cable 726 is attached to a spring 738 or other devices, not shown, such as an air cylinder, at a point which lies on the spindle axis of the workholder spindle, not shown, to which the workholder housing 736 is mounted. The spring 738 force 728 must be large enough to carry the gravity weight of the workpiece (not shown), the workholder rotor 732 and yet counteract the fluid pressure present at all three spherical island 734 fluid pressure bearing film 720 gaps.

FIG. 42 shows a spherical workholder rotor 752 nested in a matching spherical rotor housing 754 with a workpiece 750 attached to the rotor 752 constructed of three separate spherical support islands 742. A center cable 744 is connected on one end to a diaphragm cylinder 746 mounted on the axis of the workholder spindle, not shown, and the other end of the cable is mounted to the rotor 752 at a point as close as possible to the bottom contact surface of the workpiece to minimize the offset distance 748. A low friction connection is made at the point of cable 744 attachment to the rotor 752 to minimize inducing any rotor 752 tilting forces from the cable 744 force as the rotor is spherically moved due to contact with the abrasive surface, not shown.

33. Anti Rotation Device, Spherical Part Holder

Problem: The bottom moving workpiece part holder rotor of an offset spherical assembly moves freely as it is enclosed by a spherical mounting housing but it is necessary to restrain the workholder spindle axis rotary motion of the moving rotor segment to the matching housing to impart a torque to the workpiece as it contacts a moving abrasive. The axial rotary motion restraint must have only a very small amount of friction imparted to the friction free spherical motion, which allows a workpiece to be held flat to a moving abrasive surface. When the axis of linear spindle rotation of the workpiece holder is not aligned perfectly perpendicular to the abrasive surface it is necessary that the workholder move continuously with a spherical rotation as the workholder spindle axis is rotated in order to keep the workpiece surface flat on the abrasive surface. Contamination of the anti-rotation device bearing surfaces by abrasive debris would add to the spherical motion friction. An island type of 3-point spherical surface assembly requires rotational alignment of the rotor islands with the matching rotor housing islands.

Solution: A small 4 mm (0.157 inch) diameter, low friction bearing can be attached to one of the spherical part holder assembly plates and this bearing can contact a round post attached to the other assembly plate. As the assembly is rotated, about the workholder spindle axis, the bearing will press against the post with point contact and cause the other plate to rotate. Self-cleaning of the post occurs with contact by the bearing element. Any grinding swarf or debris deposited on the post will be pushed off the contact point by the surface of the bearing as it moves up and down the post due to spherical motion of the workholder. One bearing and post unit can effect spindle rotation in one direction. Another bearing and post unit can be installed on the other side of the spherical rotor to effect rotation in the opposite direction and also act as a counterbalance for the first unit. One configuration could use a small 0.1 to 15 mm (e.g., 0.125 inch (3.175 mm)) inside diameter (I.D.) needle bearing mounted on a hollow mandrel which can be occasionally greased to flush debris from the bearing. The bearing axis should be parallel to the post radial line to avoid wedge friction causing forces.

Figure 43:
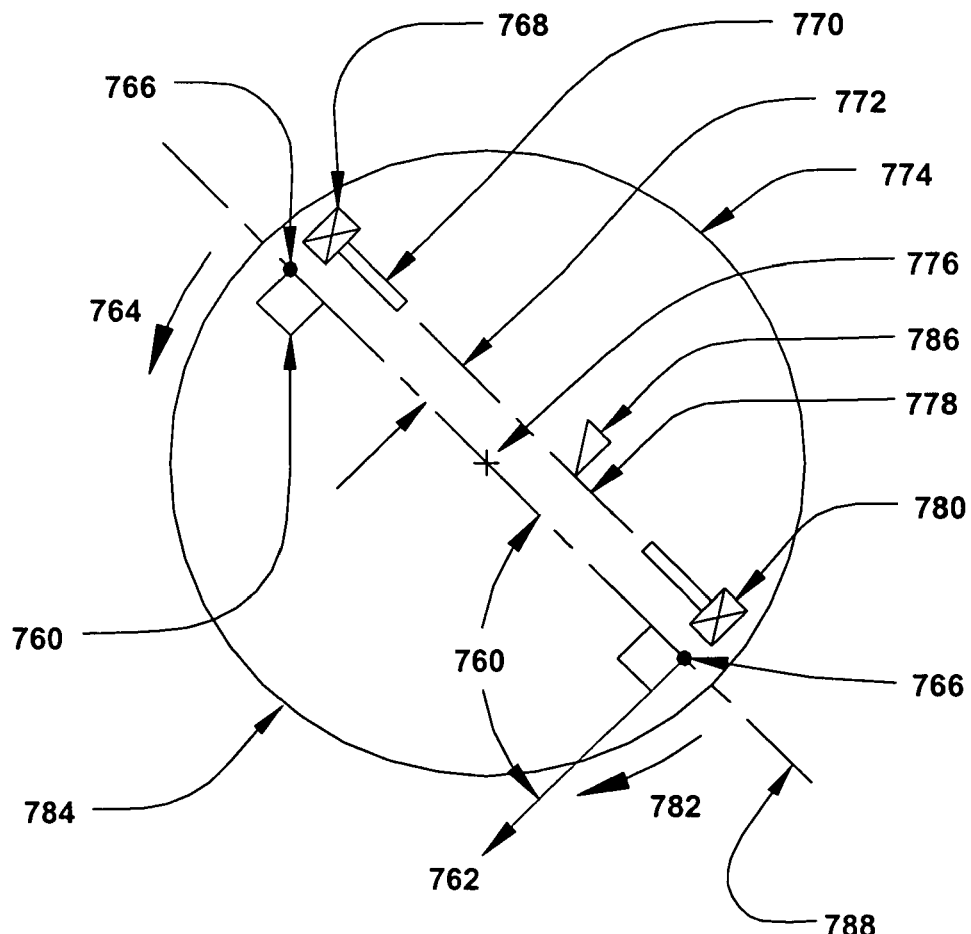
FIG. 43 shows a spherical workholder rotor which is restrained within a rotor housing along a workholder spindle axis.

FIG. 43 shows a top view of a workpiece holder assembly 774 with a center of workholder spindle axis 776, a spherical workholder rotor 784 and a matching spherical rotor housing 786, which is only partially shown. The workholder housing is rotated along the spindle (not shown), axis 776 and it is necessary to transmit this rotary motion to the rotor 784 without imparting significant friction to the spherical motion of the rotor 784. The workholder assembly 774 can be rotated in either a clockwise rotation 782 or a counter clockwise rotation 764. A bearing element 780 mounted on the bearing shaft 770 shown for clockwise rotation is attached to the rotor housing 786 and contacts a post 766 which is attached to the rotor 784 and a rotation force 762 is imparted from the bearing 780 to the post 766 at a right angle 760 to a common post location line 788 drawn located at the axis of both posts 766 and the center of rotation of the workholder axis 776. Likewise a bearing 768 is used in conjunction with a post 766 to effect counter rotation of the rotor 784. The bearing 768 axis 770 is located a distance 772 from the common line 788 to allow the contact alignments of the bearings 768 and 780 with the posts 766 to effect the bearing contact angles which minimizes the generation of torque or tilting forces on the rotor 784 due to the axial rotation forces 762.

34. Spherical Part Holder Retainer System

Problem: When a three-piece island spherical joint system or an annular spherical ring joint system is used to support a workpiece part, it is necessary to retain the moving rotor portion of the system within the confines of the spherical rotor housing in such a way that no tipping or tilting torque is imposed on the moving rotor portion. A tilting torque would tend to create non-flat patterns on a workpiece being lapped or ground when the workpiece is rotated against a moving flat abrasive surface. The offset spherical joint presents the lapped surface of the workpiece at the center of rotation of the spherical joint. Preventing vibration of the spherical rotor within the rotor housing improves the quality of lapped surfaces on the workpiece.

Solution: The restraining force which holds the moving spherical workpiece holder can be originated by either compression, tension or flat cantilever springs and be configured with an attachment means that is aligned with the structure of the moving workpiece assembly. Also, it is preferable that the rotor attachment device be located as close to the polished surface of the workpiece, which in turn, is nominally close to the center of rotation of the spherical joint. It is desirable that the restraining force, which is mutually applied between the rotor and the rotor housing, is aligned along the workholder spindle axis. Even if the retaining force is not aligned along the axis of rotation of the workpiece spindle, this angled force will still not impose a significant tilting force on the workpiece holder if the rotor housing attachment is on the spindle axis center-line. To prevent oscillator vibration of the workholder rotor, some vibration damping needs to be provided between the rotor and its housing. A water film on the spherical joint will provide dynamic vibration damping of the movable workpiece holder. An air film provides lower viscosity, and faster rotor rotation action response but will provide less spherical rotor vibration damping.

Figure 44:
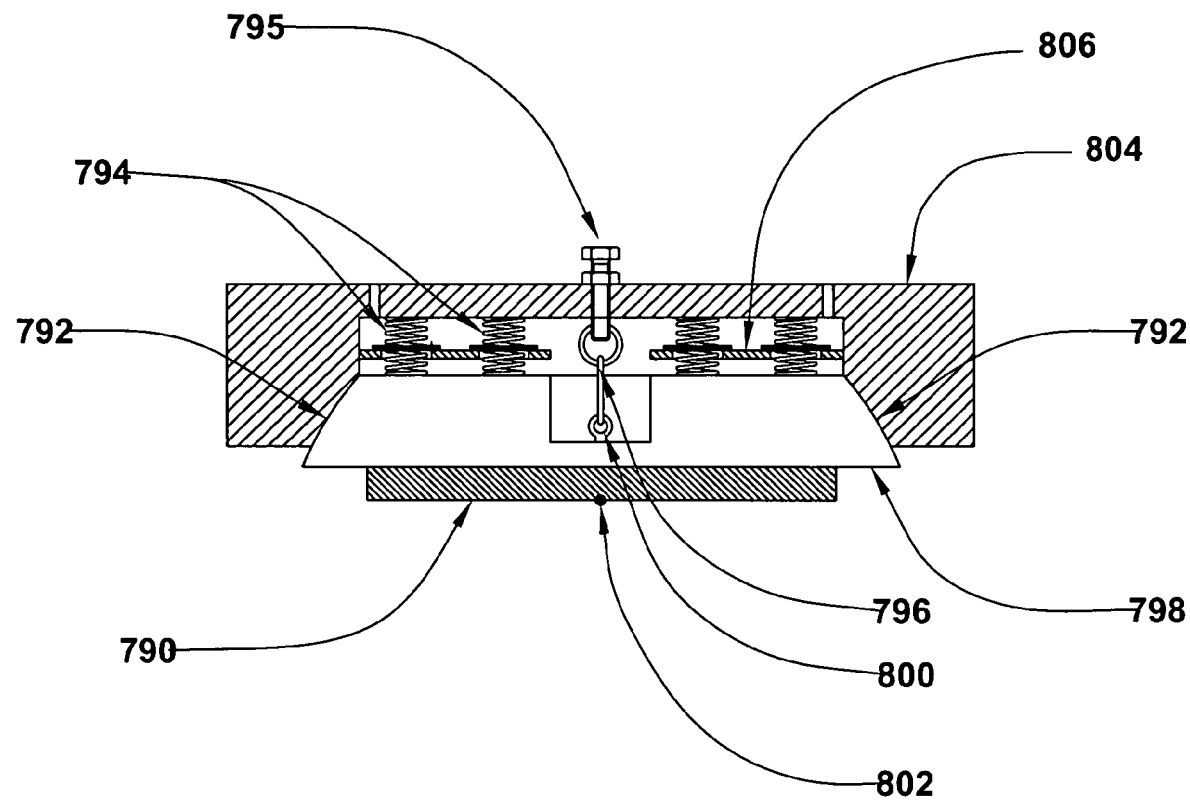
FIG. 44 is a cross-sectional view of a spherical workholder with rotor retaining springs.
Figure 45:
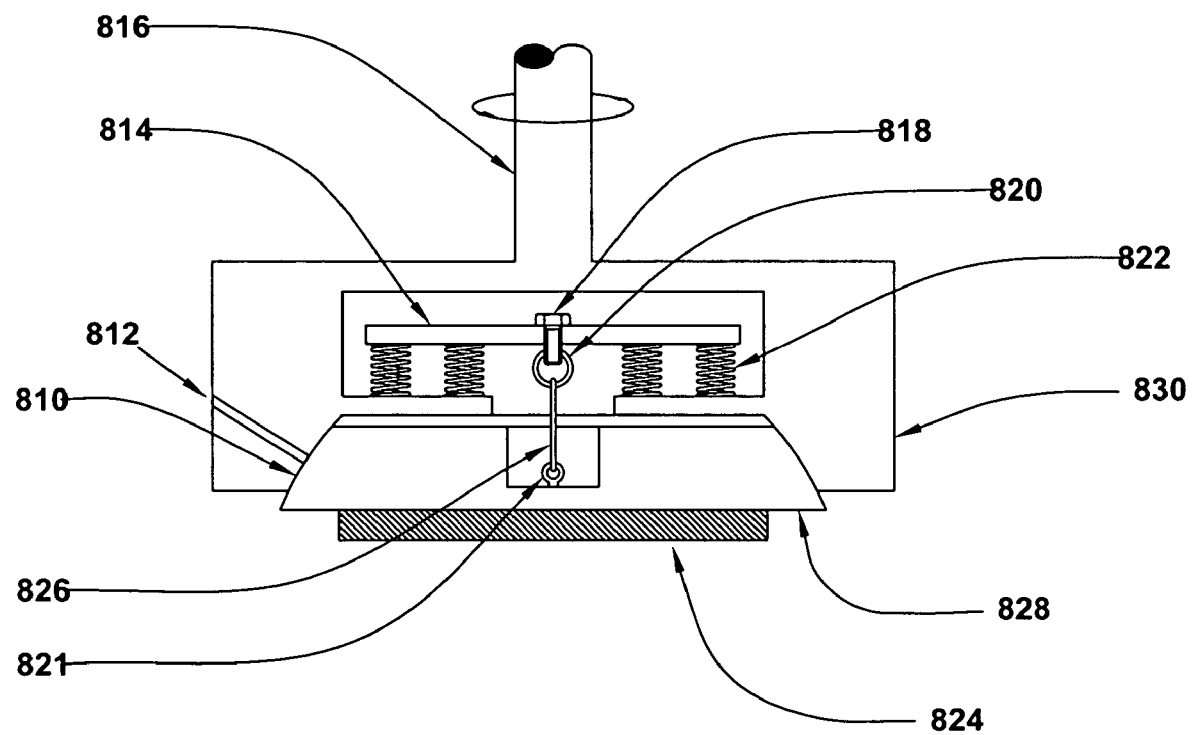
FIG. 45 is a cross-sectional view of a spherical workholder with a floating bar rotor spring retainer.

FIGS. 44 and 45 show two similar systems where compression springs are used to retain the spherical workpiece rotor holder onto a rotor housing. FIG. 44 shows a workpiece 790 that is mounted to a workpiece rotor 798 that is contained in a rotor housing 804, both of which have a spherical center of rotation 802 that is located on the abrasive contact surface of the workpiece 790. Compression springs 794 which are held in place by an extension plate 806 that is attached to the rotor housing 804 contact both the rotor housing 804 and the workpiece rotor 798. A floating, movable link 796 is attached to the rotor 798 by a coupler 800 and is attached at the other end to the rotor housing 804 by an adjustable screw 795. Water or air is applied to the spherical fluid bearing area 792 thereby separating the workpiece rotor 798 from the rotor housing 804. FIG. 45 is similar to FIG. 44 in that a spherical workholder has a fluid bearing joint 810 that is supplied with pressurized fluid at passageway 812 to effect a coupling between the spherical rotor 828 and the spherical rotor housing 830. Compression springs 822 are installed between a floating plate 814 and an extension shelf 811 which is an integral part of the rotor housing 830 and the springs 822 apply a restraining force to the link bar 826 which is connected to hoop rings 820 and 821 where one ring 821 is connected as close as possible to the workpiece 824. The restraining force applied to the rotor 828 is shown to be adjustable by a threaded screw 818.

35. Offset Spherical Part Holder Antirotation

Problem: When an offset spherical part holder is rotated during lapping of a workpiece, it is necessary to allow friction free spherical motion of the moving spherical rotor section but still prevent its axial rotation relative to the spherical rotor housing that is attached to the part holder assembly shaft. It is desired to apply a nominal restraining force to keep the moving spherical rotor component nested in the spherical rotor housing both to resist gravity forces on the workpiece and workpiece rotor which would tend to separate the rotor from the rotor housing and also to resist or counteract the air or water bearing present in the spherical fluid bearing joint. Most techniques, which can apply a restraining force and also prevent relative rotation between the rotor and the rotor housing introduce new geometric torque force components to the moving spherical joint part holder rotor. The force components are due to the friction contact forces present at the interface of the workpiece on an abrasive surface. One primary cause of these force components, which tend to tip the workpiece relative to the abrasive, resulting in nonflat grinding, is due to the fact that the part holder rotor rotates about a point projected away from the workholder device body. It is necessary that both the retaining and antirotation devices do not create forces which will tilt the workpiece part. It is also desired to lock the spherical pivot workpiece rotor action for flat grinding by remote control. Slack in the mechanical and fluid-bearing components can cause problems in flat lapping.

Solution: The solution is to provide an annular ring or three-point islands of spherical surfaces with a spring or air cylinder applying a retaining force to the end of a lever hinge which applies a retaining force nominally on the axis of rotation, which is concentrated at the exact centerline of spherical rotation aligned with the spindle shaft axis. The lever hinge allows an anti-rotation torque reaction of the hinge mechanism to grinding friction and the two separate universal gimbal joints allow spherical motion of the workpiece rotor component. The spherical rotor can be locked to prevent motion by removing the fluid pressure at the fluid bearing. All the bearing slack is eliminated with this arrangement.

Figure 46:
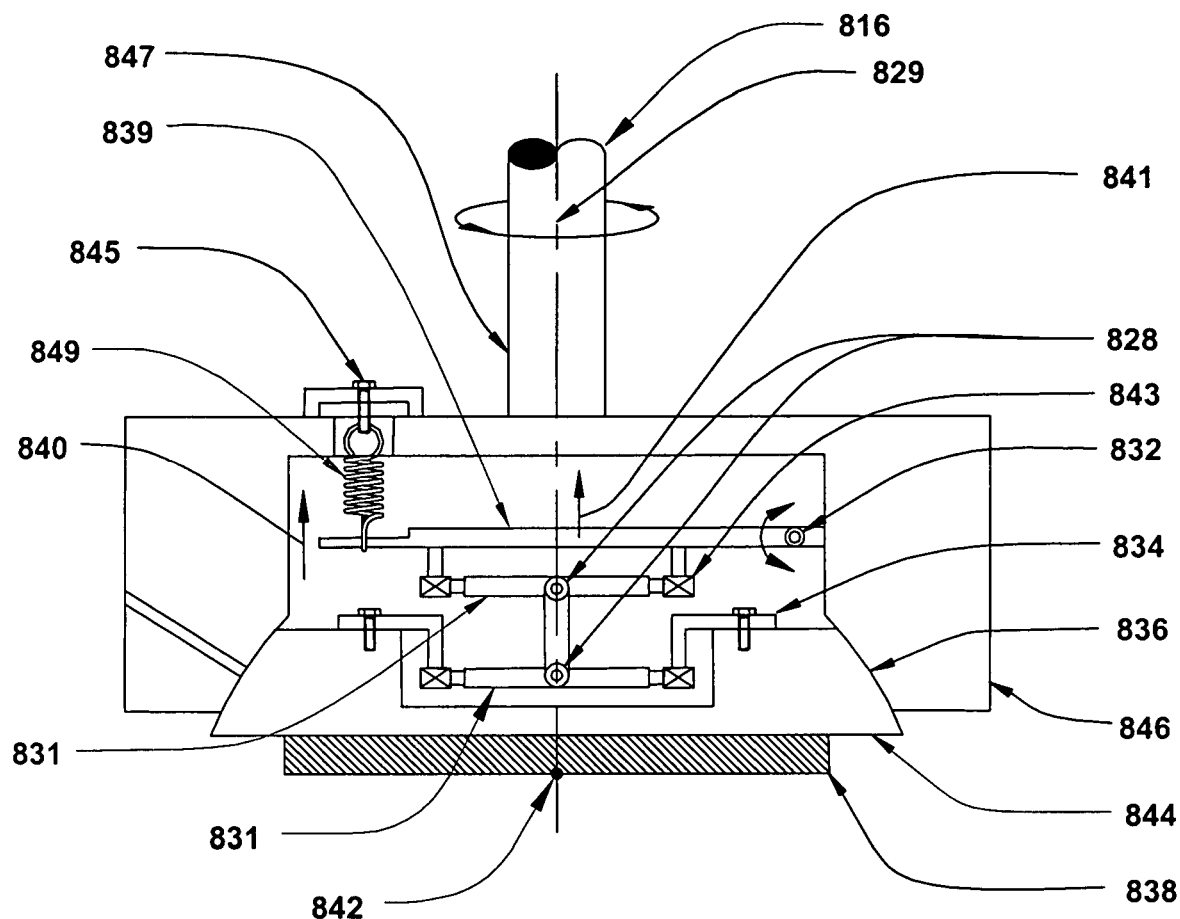
FIG. 46 is a cross-sectional view of a spring activated linkage bar system which is used to apply a force to retain a workpiece spherical rotor in the rotor housing.
Figure 47:
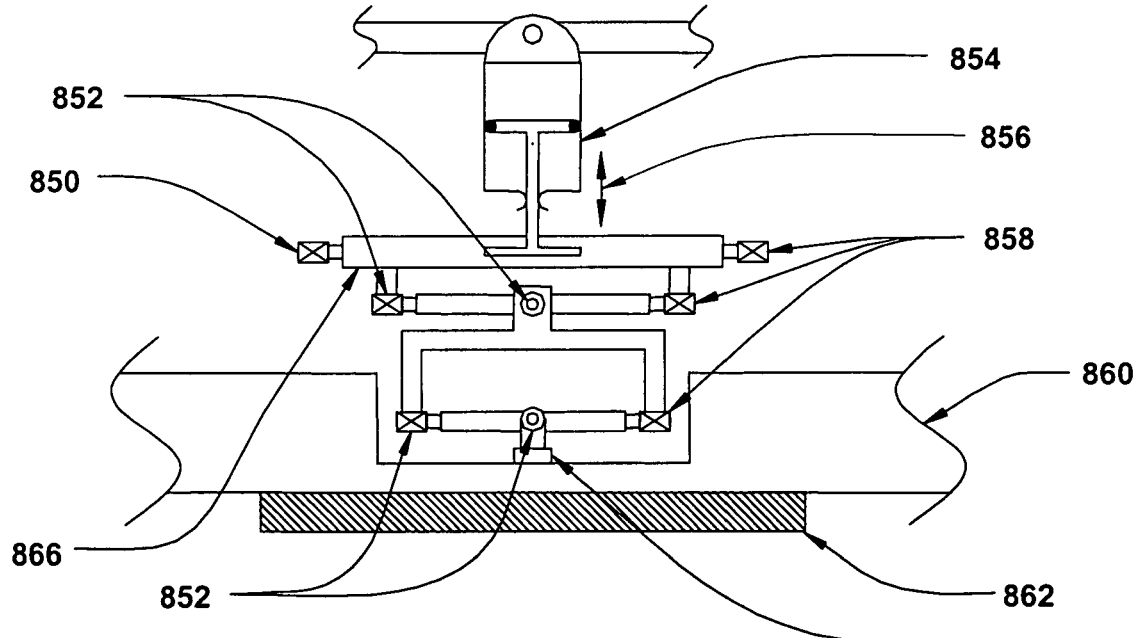
FIG. 47 is a cross-sectional view of an air cylinder force activated linkage bar system which is used with a workpiece spherical action holder.

FIGS. 46 and 47 show different workholder spherical linkage rotor restraint systems. FIG. 46 shows a spring 849 which is mounted to a spherical rotor housing 846 and applies a force 840 through a linkage bar 839 which rotates about a hinge pivot 832 which keeps the spherical workpiece rotor 844 from rotating relative to the rotor housing 846. The workholder spindle, not shown, has rotation 829 provided by a rotating shaft 847. Another two sets of hinge bearings 828 and 843 are required for two other pivot platforms having pivot bars 831 as shown to complete the transfer of the restraining force 841 from the rotor housing 846 to the rotor 844 without significant tilting forces applied to the rotor 844 when the rotor 844 is moved through a small spherical rotation angle. This same multiple linkage mechanism will provide workholder spindle axis rotation 829 from the rotor housing 846 to the rotor 844. The spherical joint rotates about a center position 842 that is located at the surface of the workpiece 838 through the action of the offset spherical joint 836. A clamp 834 attaches one of the pivot platforms to the workpiece rotor 844. The upper linkage bar hinges around a pivot point 832. Two of the linkage platforms are connected with linkage arms to form an equivalent universal joint gimbal device 828. The tension retaining force 841 is adjusted by threaded screw 845. FIG. 47 shows a workpiece 862 mounted to a workpiece holder rotor 860 which is attached by a universal joint clamp device 864 to another set of universal gimbal action joints 852 through the use of needle bearings 858 to a hinge pivot arm 866 similar to the system in FIG. 46 acting through a linkage arm connected to the hinge 850. A restraining force 856 is applied to the linkage system by an air cylinder 854 that is shown attached to the center of the hinge 866 arm.

36. Dynamic Work Holder Alignment

Problem: It is difficult to maintain the alignment of the vertically moving workholder spindle head, which holds a workpiece, so that the spindle axis of rotation is exactly perpendicular to the surface of a moving abrasive platen. A number of factors can change this precision alignment including thermal expansion growth of the machine members when a particular portion of the machine is heated up by motors, or other heat sources, in such a manner to tilt either the workholder spindle or the abrasive platen. Mechanical force disturbances can also change this critical alignment, resulting in nonflat lapped workpiece parts. During the lapping operation process, a wet abrasive particle contaminated atmosphere exists.

Solution: The lapping machine can be precisely aligned by use of a variety of laser, capacitance or other gage systems, typically by measuring the distance between the workpiece holder flat round surface and the flat round surface of the abrasive platen. The difficulty of providing a reflected signal from a laser source directed at a contaminated platen surface can be reduced by the use of special devices. For instance, a small glass mirror with the reflective metal coating side on the bottom side of the glass is installed as an integral part of the outer periphery of an abrasive platen. The mirror is installed with the glass surface flush with the top surface of the platen and the recessed reflective mirror, or opaque surface, is protected by the glass from abrasive swarf contamination. The small mirror device would be mounted somewhat outboard of a circular removable disk of sheet abrasive. Then, the platen is rotated so that a light source emitted by each one of three independent lasers mounted at 120 degrees from each other, about an axis coincident with the workpiece spindle axis, at a radius such that the light is reflected from the single mirror surface strikes a laser sensor in each of the three laser devices. The exact distance between the laser and the mirror is recorded for each laser position to represent an exact precise alignment of the workpiece spindle axis to the abrasive platen. At each independent laser position this reference distance is checked periodically during the lapping process operation, either when the platen is turning or stationary. The excess process water present supplied to the abrasive surface during the grinding or lapping operation will tend to keep the mirror glass surface clean. A closed-loop control system could be employed to mechanically adjust the lapping machine in alignment at periodic time intervals. Also, this system can be used to put an intentional angle into the workpiece spindle alignment to develop shallow angle cone features of the ground workpiece. A rigid support frame would be used to support the lasers in a stable position on the spindle housing to prevent the laser device to move relative to the spindle. Temperature control of the cross frame can be used to maintain this stability.

Figure 50:
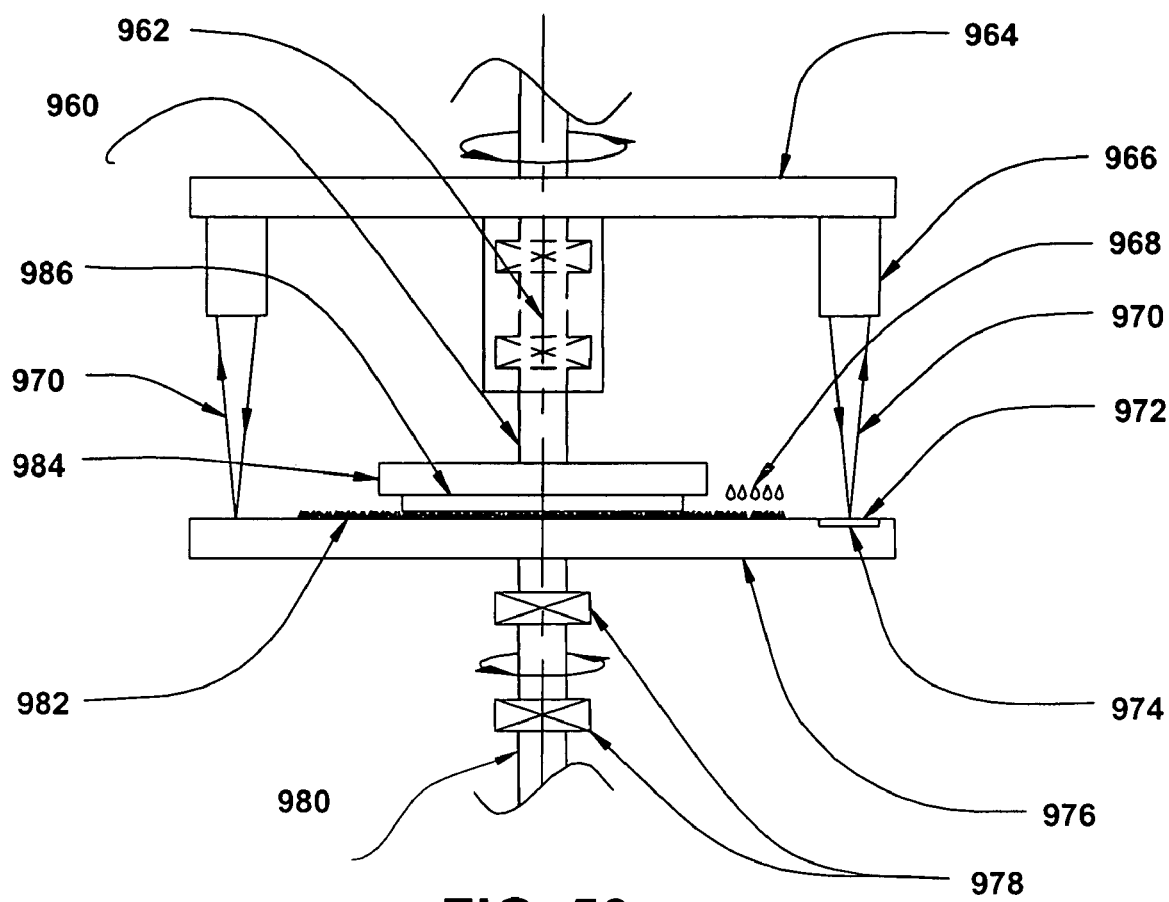
FIG. 50 is a cross-sectional view of a laser workholder alignment system.

FIG. 50 shows a laser workholder alignment system that aligns the workholder spindle perpendicular to a platen abrasive surface. A rotating platen shaft 980 is supported by bearings 978 to which an abrasive platen 976 is attached. The platen 976 holds an abrasive sheet 982 which contacts the surface of a workpiece 986 that is supported by a workpiece holder 984 mounted to a spindle shaft 960 rotating about a spindle axis 962. One or more laser source and sensor devices 966, with a preferred selection of three lasers 966, are mounted to a cross frame 964 which is attached to the spindle shaft 960. Each laser 966 emits a light beam 970 which is reflected from an opaque mirror reflector 974 having a glass protective top 972 which is self cleaned from grinding swarf, during the grinding operation, by water drops 968.

37. Work Holder Alignment to Platen

Problem: It is critical that a workholder spindle have its axis aligned perpendicular to a platen surface so that the abrasive on the platen abrades the workpiece to be precisely flat to within a few Helium lightbands on a lapping or grinding machine. Precision alignment is important at the start of a lapping process and is also to be maintained after the machine has been operating or some time. Small motions of the machine structure due to small disturbances such as thermal growth of portions of the machine due to heating effects from motors or other sources can easily change the initial precise alignment. Measuring and controlling the alignment to maintain alignment allows each workpiece part to be uniform in flatness on its ground surface.

Solution: A lapper machine can be constructed so that the structural assembly to which the workholder spindle assembly is mounted, has a three-point attachment to the overall machine frame. Adjustments made at these three independent attachment points allows the workholder assembly to be tilted about three mutually perpendicular axis which allow the spindle axis to be precisely aligned perpendicular to the platen surface. A three-point system of making machine alignment distance measurements can allow a spindle to be precisely aligned, reference distance measurements made and these initial measurements used to re-align the spindle in the future. The re-alignment can be made periodically or it can be made on a continuous closed-loop basis. To accomplish this ongoing alignment correction, the machine is first aligned with the necessary precision where the spindle is perpendicular to the platen. Then, exact reference distances are established between sensor devices that are mounted at each of three points that are positioned in an equal angular distance location array around the periphery of the platen and the platen surface. The procedure to establish these three independent reference distance measurements is to rotate the platen until a reflector device attached to the surface of the platen is positioned directly perpendicular to the first of the three distance sensor devices. Then a reference distance measurement is made at that sensor station. Next the platen is rotated 120 degrees to the next sensor station and a reference distance measurement is made. The platen is then rotated to the last of the three sensor stations and a reference distance measurement is made. These three independent distance measurements establish the position of the spindle assembly relative to the platen at the three sensor positions where the spindle is precisely perpendicular to the platen. Later, as the machine loses its initial precision alignment, due to a number of process or machine variables, new distance measurements are made at each three-point sensor location. The errors between the new measurements and the initial reference measurements are used to adjust the three-point alignment of the spindle frame until the spindle assembly is correctly realigned perpendicular to the platen.

A target reflector can be made an integral part of the outboard periphery of the platen. A light or acoustic or other type of sensor signal source and a signal sensor can utilize this reflective target to establish a precise distance from the sensor and a platen surface position. One such distance device would be a laser device where a light beam is directed against a diffusive target surface that is positioned to be in a fixed location that is slightly raised or lowered from the surface of the platen. The laser sensor would then be used to initially determine, for reference or comparison, the distance between the laser device that is mounted to the spindle assembly and the reflective target mounted on the platen surface. The measurement system described uses three independent distance sensors and a single platen surface reflective target. The lasers or other sensors could also be used to read the distances from each sensor to the whole tangential periphery of the platen by using the whole tangential surface of the platen as a reflector or multiple reflectors could be attached sequentially in a tangential surface pattern to the platen surface. Likewise, two, three or more independent reflectors could be mounted at different peripheral locations on the platen surface. Locating the distance at a single discrete point on the platen surface, as compared to using multiple points, may be required if the platen surface does not have sufficient accuracy in flatness or platen axis perpendicularity. A specific platen surface target reflector location can be identified by a distance sensor by mounting each fixed reflector target in a raised or lowered position from the platen surface at a known specific distance that is unique to each sensor. This known platen surface position offset creates a step input in the laser sensor distance readout that corresponds to the specific reflector location on the platen. Distance measurements can be made when the platen is stationary or when the platen is rotating. Error measurements between the reference distance measurements and the new distance measurements can be used as an input to a feedback control system that would drive a position adjusting system that could continuously re-align the spindle perpendicular to the platen surface as the lapping or grinding machine is operating. The reflective or diffusive targets may be given a glass cover shield to protect the reflector from grinding debris or swarf and to aid for self cleaning by the water that is applied during abrading action. Platen surface targets may also include, but are not limited to, metallic or ceramic devices. Distance sensors may include, but are not limited to, laser inferometer, inductive, reluctance, capacitance or other distance sensors. Spindle alignment systems include, but are not limited to, those described herein.

38. Water Film Spherical Work Holder

Problem: Cooling water used to promote abrasive grinding action, for a high speed lapping action, would tend to contaminate and render ineffective the porous carbon used as an air film bearing component in an offset spherical bearing workholder. When a fluid bearing is used to provide smooth friction free spherical action, it is also desired to operate this workholder in a rigid mode where no spherical motion is allowed. Changing the mode of operation of the workholder attached to the end of a rotating spindle is difficult. It is important to easily shut off the fluid flow to rigidly lock the bearing in place.

Solution: A series of air jets, each with a constant uniform airflow rate, governed by the use of small jewel restrictive orifices could be employed to give an air bearing support to the spherical rotor but they tend to generate dynamic mechanical vibration instabilities. Another method to create a fluid bearing would be to apply a constant flow rate of water, or other liquid solution, to an annular ring segment having a spherical shape. Also, a three-point arrangement of discrete liquid bearing islands positioned 120 degrees apart could be used for a distributed balanced load carrying capability of the spherical rotor. The liquid flow rate in each island could be controlled by a remote restrictor, precision small orifice. The liquid would be compatible with the abrasive liquid lubricant and it could be easily turned on and off when routed through a rotary union attached to the workholder shaft. A mechanical spring, or other air cylinder, or other device, could be used to apply a retaining force to hold the movable spherical rotor part of the workholder in its mating seat in the rotor housing. The force would also hold or balance against the imposed fluid pressure at the fluid-bearing interface when it is desired to float the workholder. The spring would clamp the workholder in its seat and rigidly prevent spherical rotation when hydraulic pressure is reduced sufficiently to the fluid bearing. Dynamic changes in the water pressure may be induced in the hydraulic system to provide a fluid bed vibrational floatation of the workpiece holder rotor. This oscillating pressure would diminish in strength over time as the workpiece is settled into the desired aligned position in flat contact with the abrasive surface when converting to the rigid workholder mode. Each island of the three point fluid bearing would have a circular section segment of a spherical shape with a center feed hole of fluid which would escape radially out of the island to provide a liquid floatation film of support. The center feed area may be enlarged to provide an outer slit land area periphery slot fluid flow orifice to evenly control the radial fluid flow. The movable spherical rotor can be restrained against spindle shaft rotation of the rotor housing by a universal joint system. The retainer spring may employ Belleville cupped spring washers with a link arm attached as close as possible to the spherical center of rotation.

Figure 51:
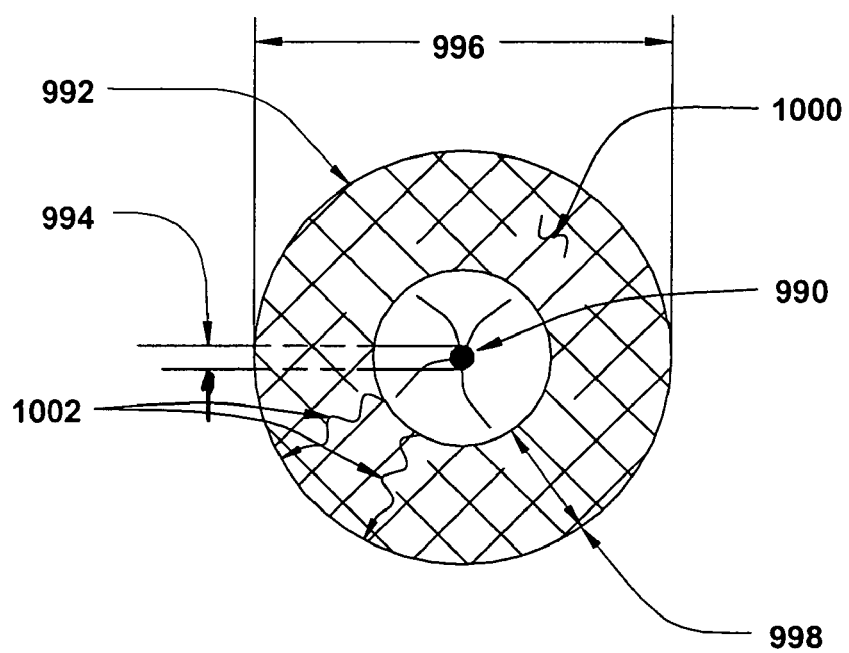
FIG. 51 shows a spherical shaped fluid island with an orifice restrictive circular land area which acts as a fluid bearing for a workholder.

FIG. 51 shows a spherical shaped fluid island with an orifice restrictive circular land area which acts as a fluid bearing for a workholder. Typically, there would be three of these fluid islands located with 120 degree tangential separation on a workholder rotor housing to provide a fluid bearing support of a workholder spherical rotor nested in the housing.

Fluid enters the annular island ring 992 having a circular shape at a fluid inlet pipe 994 (not shown) and emerges at the inlet hole 990 having a hole diameter 994 located at the center of the island, the island having a typical diameter 996 of 1.0 inch (2.54 cm), for example, or a diameter range of from 0.2 to 10 cm). A uniform thickness fluid gap exists across the full orifice restriction area which has a typical radial width 998 across the spherical surface 1000 which is an integral feature of the rotor housing, not shown, and which matches the localized spherical island area surface of the spherical rotor, not shown. The flow path of fluid currents 1002 is shown originating from the fluid hole 990 and moving radially across the spherical orifice land area 1000.

39. Three-point Spherical Workpiece Holder

Problem: It is difficult to maintain a precision gap in the continuous fluid bearing of a spherical offset circumferential annular seal abrasive workholder. Also, this type of bearing gap must have multiple sources of high pressure fluid along its relatively narrow annular shape to assure that sufficient fluid pressure and a minimum fluid film thickness is maintained along the whole surface of the annular spherical ring joint. If fluid pressure is lost at any point, the fluid film can disappear and physical high friction contact of the rotor to the rotor housing would be made. The mass inertia of a full annular ring prevents high frequency oscillations necessary to follow the moving abrasive surface of a high speed rotating platen. Keeping grinding swarf out of the spherical fluid bearing joints is critical to prevent wear and high friction in the spherical workholder.

Solution: The full annular spherical ring is modified to create a three-point version of the annular spherical shaped joint in the form of a spider shaped device which has three separate spherical joints that are supplied with high pressure air, water or other fluid at these localized sections. The fluid flow at each joint will tend to be circular in shape with a fluid jet source at the center of the fluid pad island. Elimination of the mass of material between the spider arms of the movable part holder rotor portion allows an increase in the speed of rotation of the workholder and correspondingly, the oscillation speed of the workholder rotor due to the mass inertia reduction. An adjustable tension spring or spring lever arm attached to the movable spherical rotor section can retain the movable section in the spherical socket of the rotor housing. The relative rotation of the movable rotor section within the rotor housing can be restrained in both clockwise and counterclockwise directions by use of a single lever arm attached to both the movable rotor and rotor housing of the spherical joint at a location close to the abrasive surface and parallel to the abrasive. This spherical workholder joint can be used both for rigid grinding and conformable spherical oscillation lapping grinding by turning on and shutting off the fluid pressure to the fluid bearing. Here, a workpiece holder can be presented flat to the abrasive surface, the fluid shut off and the spring will hold the movable spherical workpiece rotor rigidly at that established reference position flat to the platen abrasive surface. A workpiece can be mounted to the workpiece holder and the workpiece can initially be ground flat when the rotor is held rigidly. Then, the fluid pressure can be turned on to the fluid bearings while the workpiece is still in contact with the abrasive and free floating lapping can take place without the workpiece part leaving the surface of the abrasive. After lapping, the platen can be stopped, the workholder lifted and the lapped flat part removed. Fluid applied to the fluid bearing self-cleans spherical joints by blowing away or washing away grinding swarf that may have been deposited on the working surfaces. The spherical joint workholder support arms would be spaced 120 degrees apart.

Figure 52:
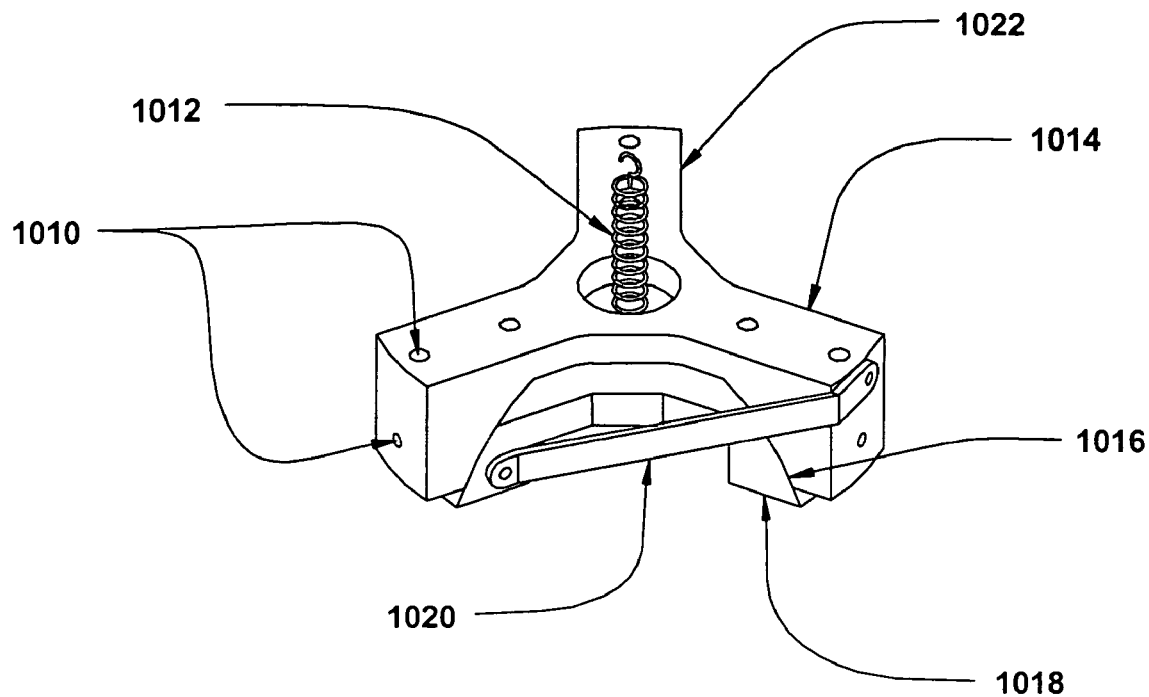
FIG. 52 shows a spherical motion workholder with a linkage bar anti rotation device for the rotor.

FIG. 52 shows a spherical motion workholder with a linkage bar anti-rotation device to prevent the rotor from turning relative to the rotor housing. Fluid 1010, which is either air or a liquid such as water, is injected from the rotor housing 1014 into a fluid bearing joint 1016 between the spherical rotor 1018 and the rotor housing 1014. With this fluid bearing 1016, limited spherical motion is provided to a workpiece, not shown, which is attached to the bottom surface of the rotor 1018 and brought into contact with the surface of a moving abrasive platen, not shown. The rotor housing 1014 is attached to a rotating workholder spindle, not shown, and the spindle rotating motion is transmitted to the rotor 1018 by an anti-rotation link arm 1020 which is loosely connected at both ends to the body of both the rotor 1018 and the rotor housing 1014 to provide low friction movement of the arm. It is preferred that the rotor housing 1014 pull the rotor 1018 as the workholder rotates, rather than push, on the arm for mechanism linkage stability reasons. A single link arm 1020 can be used on an assembly, or two separate arms can be used with very loose end coupling joints, which would allow one arm 1020 to transmit a pulling force in the workholder spindle clockwise rotation direction and the other arm to transmit linkage forces in the counterclockwise direction. The rotor 1018 is vertically restrained to tightly nest it into the matching spherical rotor housing 1014 by use of a retaining spring 1012. The three-point housing arm 1022 can be minimal in size to reduce the mass and the inertia of the rotor housing 1014 which can be constructed of stiff lightweight materials such as aluminum, graphite, plastic, ceramic and titanium which also are corrosion resistant in the typical high humidity environment of water lubricated abrasive grinding or lapping. Likewise, the rotor 1018 can be constructed of these same materials that would increase the dynamic frequency response capability of the rotor, and workpiece, in reacting to the contact surface variations of the rotating mounted platen abrasive sheets.

40. Spherical Work Holder with Water Suction

Problem: When a three-point island spherical workholder liquid bearing joint is supplied with water or other liquid, the liquid exits the joints and drops on the platen abrasive surface, which can result in excessive water for grinding action or it can contaminate the grinding lubricant. Water is desirable as a spherical joint lubricant because it tends to self-clean the film-bearing joint from abrasive swarf or particles generated by the grinding action that become locally airborne and deposit on the working surfaces. Uniform liquid flow, which maintains a uniform thickness liquid film in the joint, is necessary to prevent physical contact of the sliding joint surfaces for low friction.

Solution: Inject water into a center hole surrounded by an annular circular area of a spherical shaped joint to create a water film acting as a friction free spherical fluid bearing joint. This water can be injected from either the spherical rotor or from the rotor housing but it is preferred to inject it into the rotor housing. It is necessary to form three island legs, separated by 120 degrees relative to the workholder spindle axis, to form a spider-arm with independent spherical islands, all of which have a common surface with a single spherical ball shape. The spider-arm is attached to the rotating workholder spindle shaft. This three-point spider arm can then be brought in contact with an associated movable workholder rotor device having the same exact spherical shape which allows it to freely rotate with spherical motion as the two components are separated by fluid films at each of the three spider islands. Each island has a water film thickness of about 0.0005 inches (0.0127 mm) for air fluid and perhaps 0.002 inches (0.051 mm) or more for water film fluid. The two spherical rotor and rotor housing components can be precision machined and then finish lapped together using fine 600 grit or 30-micrometer abrasive slurry where one part is moved in spherical patterns against the other with the abrasive in the spherical joint areas. To collect the liquid that is supplied under pressure to the fluid joint, and then exhausted from the joint, a number of techniques can be employed. In one example, a circular groove having an annular shape can be created around the outer periphery of the fluid bearing and this groove moat shape, which is sealed by the same spherical matching shape of the two components, can have a port hole which is vented by a vacuum suction source. Liquid exiting radially from the fluid bearing can be given a common collection by the recessed groove moat and the fluid (either air or liquid) can be exhausted without contaminating the system. There are a number of other lapping or polishing systems which could benefit from the use of this type of spherical action workholder. This three-island system can be used to "float" or suspend parts in other workpiece support systems such as slurry lapping also.

Figure 53:
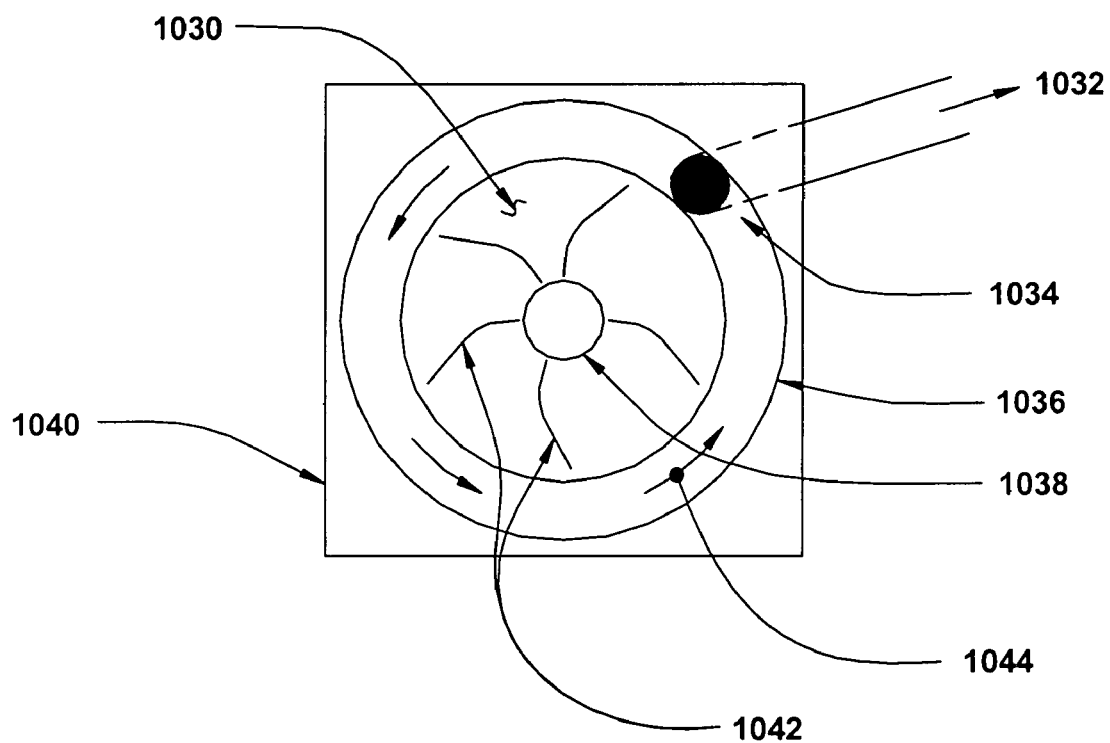
FIG. 53 shows a fluid bearing spherical workholder island with a suction ring to collect exhausted fluid.

FIG. 53 shows a fluid bearing spherical workholder island with a suction ring to collect exhausted fluid from the bearing before this fluid can contaminate the grinding or lapping process. The fluid bearing support island device 1040 of a spherical workholder rotor with a rotor housing, both not shown, can have many shapes, and also, these devices can be used at many locations on a workholder. If a single air-bearing device is used, it is necessary that this have a full annular ring shape. Three separate devices positioned at 120 degree intervals around the rotor housing are the preferred embodiment. However, 4, 5, or many more can be used to effect special spherical rotation, or other, characteristics to the rotation of the rotor or in response to forces that may be applied to unique portions of the rotor. Force loads due to abrasive contact with the workpiece exhibit shearing forces perpendicular to the workholder spindle and also have components directed along the axis of the spindle. Both these different forces nominally act on a section of the fluid bearing area and the fluid islands may be located in optimum positions to counteract unique forces or dynamic load reactions. In FIG. 53, the fluid bearing area 1030 has a fluid supply 1038 at its center with the fluid paths 1042 passing over the orifice land area located at 1030. An annular recessed moat collection ring 1036 routes the collected exhaust fluid 1044 into a collection hole 1034 where it is carried from the workholder head by an exhaust vacuum source 1032 which can be the same vacuum source supplied to the workholder for attachment of workpieces, not shown, to the workholder, not shown. Some other shapes of the island 1040 besides the square shape shown, can be circular, elliptical or other shapes as long as the fluid bearing support land area is spherical on both the rotor and the matching rotor housing.

41. Segmented Annular Abrasive Sheet Disk

Problem: It is desired to use thick flexible diamond or other abrasive disks with a diameter greater than the commonly commercially available 12 inch (30.5 cm) diameter disks as they are too small for many large work pieces. Generally, the work pieces are roughly matched in face width to match the width of the annular abrasive disk ring. Also, the resultant inner diameter of these small annular abrasive rings are too small to provide adequate surface speed for acceptable grinding material removal as compared to the annular ring outer diameter. Further, it is desired that the circular edges, of the precision thickness abrasive sheet located at both the inner and outer radius, be beveled for a gradual transition of contact with the work piece surface. Having a total variation of thicknesses not to exceed about 0.0001 inches (0.0025 mm) is critical for high speed lapping at 3,000 RPM to achieve good flatness of the work piece and to utilize most of the abrasive on the disk.

Solution: Commercially available abrasive sheets, having a nominal thickness of a total of 0.005 inches (0.127 mm), with the abrasive typically 0.002 inch (0.051 mm) thick on a 0.003 inch (0.076 mm) thick polyester backing, generally are very flat with a thickness variation of only 0.0001 inch (0.0025 mm). It is expected that a similar very precision accuracy can be maintained with a new disk made up of separate circular segments cut from an abrasive coated web that had the same quality of thickness control that disks are presently made of. The most short term uniform thickness in a continuous web is in a downstream direction, as opposed to cross-web, so precision air gauging or other devices could be used to select and group web segments with like-thickness. These segments could be cut from a web with a pattern of arc segments by use of a water jet, or other, cutter that would leave a smooth edge. Two, three, four, five or more abrasive arc segments can be placed end-to-end to form an annular circular ring. Serpentine, or other, patterns can also be cut to provide a nonuniform scalloped edge. Then, these segments can be taper ground for a short length, both on the leading and trailing edges, to create a smoother gradual transition from piece-to-piece segments instead of a sharp blunt end wall on each of the butting arc segments. Likewise, the inner and outer annular edges of each segment can be taper ground. Then, a larger master sheet of precision thickness polyester-like disk backing would be placed on a flat surface, a very thin adhesive applied between the annular segments and the master disk backing and each segment laid end to end to form an annular ring with the abrasive facing up. Then a rubber bladder would be placed over the disk and segments. A release liner would be used between the disk backing and abrasive segments. The bladder would be evacuated by vacuum to apply about 13 psi air pressure to hold the segments flat to the master disk backing while the adhesive cures or dries. A glass, or quartz, table base could be used to support the clear polyester disk backing to effect a photopolymer cure of the adhesive through the backside with an ultraviolet, UV, source. Also, a formed compressible annular die made of foam rubber or other materials could be used to progressively squeeze the excess adhesive from the segments by contacting the center of the segment and proceeding with compression to the inner and outer radius with a downward force.

42. Adhesive Coating Annular Abrasive Strips

Problem: It is difficult to apply a thin uniform adhesive coating on annular arc strip segments of abrasive, which have been cut from continuous web sheets of coated abrasive, to allow these curved segments to be attached end-to-end on a round plastic disk sheet. These arc segments mounted on a common backing would form an abrasive disk with a segmented raised outer annular abrasive plateau. Each arc segment would need tapered thicknesses at both the inner and outer edges and the ends.

Solution: A nipped coating roll mechanism, having resilient rubber-covered rolls, can be used to apply an excess of adhesive fluid binder to the backing side of the abrasive arc segmented strips, and remove the excess adhesive fluid by squeeze action. The power driven roll would pull the abrasive strip arc segment, along with a release-liner paper, through the nip rolls to coat the full length of the strip. Local deformation of the resilient rolls, at their nipped contact area, allows the squeegee action on the adhesive which results in it being applied uniformly over the whole surface area of the segment. The coating would be uniform even over the taper thickness portions at the front and back ends of the abrasive arc segments and also the long radial curved sides of these abrasive strip arc segments. Each of the arc segments would be taper reduced in thickness by grinding with the tapered thickness less, on a relative basis, when compared to the flat central area of the abrasive strip segment. A uniform coating adhesive thickness of 0.0001 to 0.0005 inches (0.0025 mm to 0.0127 mm) can be produced with low viscosity adhesives. There are a variety of adhesives which may be selected including ultraviolet light reacted, or other, adhesives. These thin-coated segments can then be laid end-to-end on a thin plastic disk substrate which also has been coated at the outer periphery only to a thickness of about 0.0001 inch (0.0025 mm) so that the two thin wetted adhesives are joined face to face. One method to coat the outer annular area of the backing disk would be to spin-coat it by centrifugal action. A bladder, or resilient top clamp, would hold the abrasive arc strips to a glass flat mounting plate while UV light is directed at the bottom, through the glass, to effect an adhesive cure. Other types of adhesive curing systems can also be employed.

Figure 54:
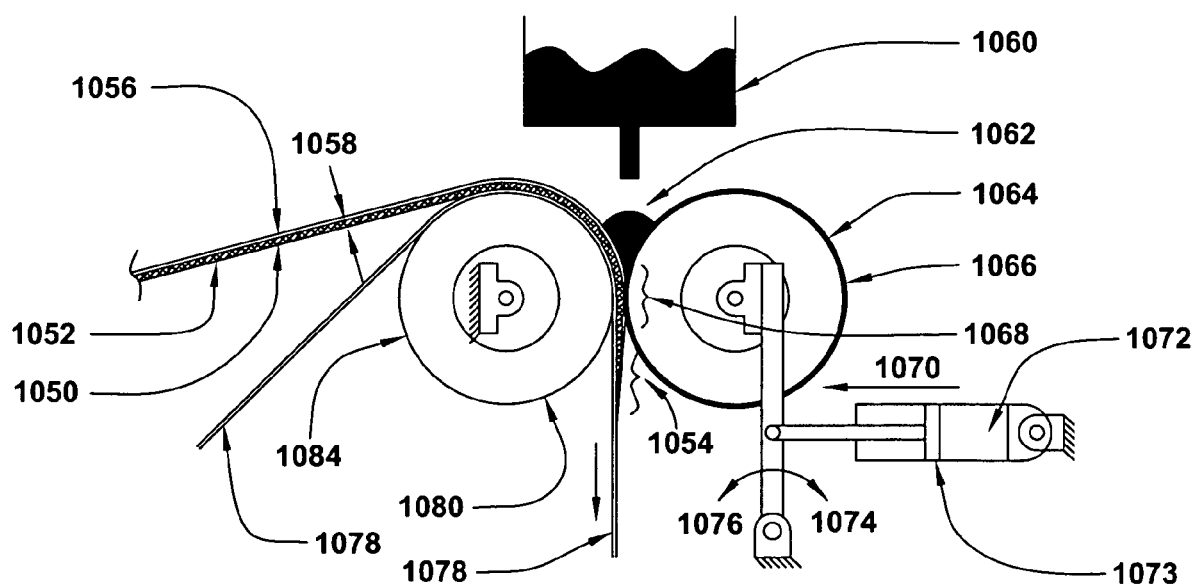
FIG. 54 shows a cross-section of an abrasive arc segment nip roll coater.

FIG. 54 shows a cross section of an abrasive arc segment nip roll coater. The abrasive side 1050 of a curved abrasive annular segment 1052 has a tapered thickness segment 1054 on the end of the arc segment 1052 and also a tapered thickness on the edge of the arc segment 1052. The backing side 1056 of the segment 1052 is typically 0.005 inches (0.127 mm) thick 1058 and it is coated with an adhesive coating fluid 1060 in a container which supplies it to an area at the upper mutual area of the nip rolls 1066 and 1080 to form a moving dam 1062 of coating fluid 1060 to form a wetted surface 1064 on the roll 1066. The motor drive roll 1080 is stationary and the medium-soft rubber covered idler roll 1066 form a nipped roll pair. To prevent the rubber roll 1066 from contaminating the driven roll 1080 surface with adhesive, a web type release liner paper or plastic 1078 is used in direct contact with the driven roll 1080. When the release liner 1078 is not present, the rubber roll 1060 is moved away in an open 1074 direction as compared to the closed direction 1076 by air pressure 1072 supplied to a spring-return air cylinder 1073. This cylinder 1073 creates a nip force 1070 which distorts the rubber roll 1066 to create a nipped area 1068 which squeegees out excess coating adhesive from the surface of the arc segment 1052. An adhesive non-wetted surface 1084 is maintained on the driven roll 1080.

Figure 55:
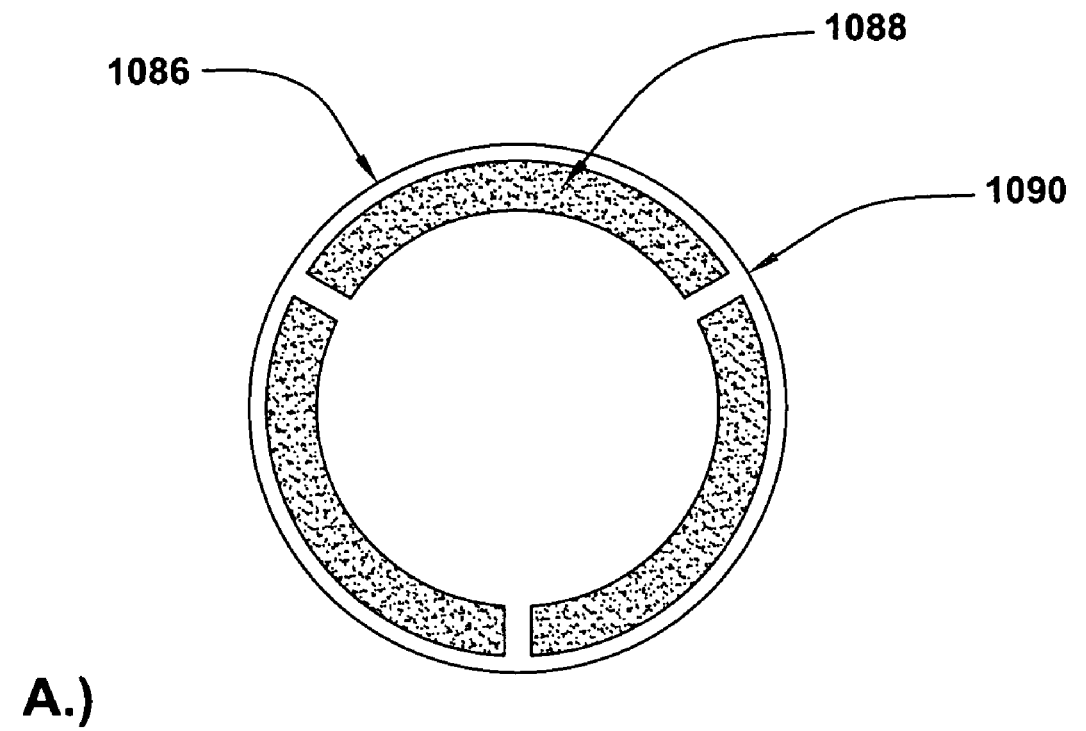
FIG. 55 shows a cross-section of an arc segment abrasive disk mounted on a rotary platen.
Figure 55:
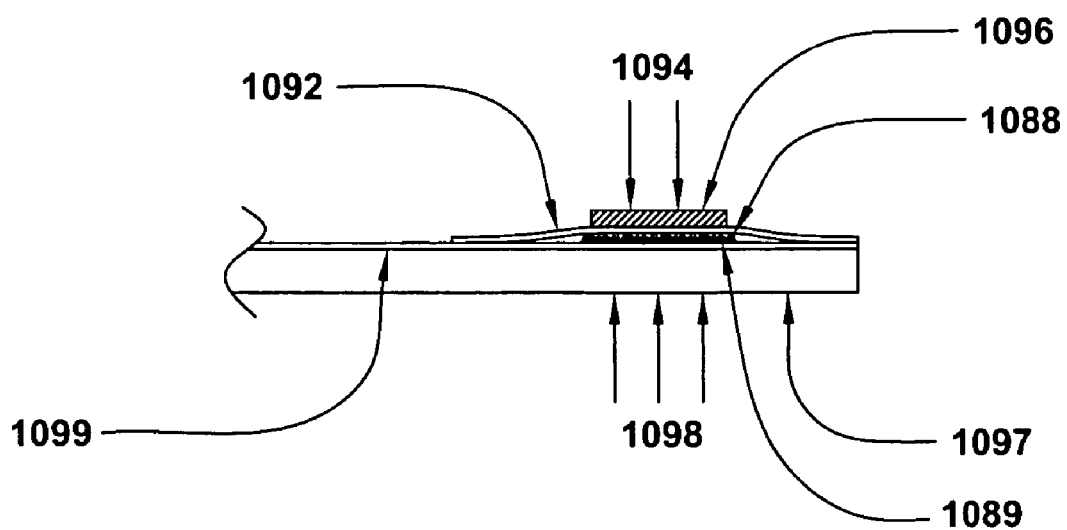

FIG. 55A shows a top and cross-sectional view of a segmented abrasive disk mounted to a rotary platen. A large 12 to 48 inch (30.5 to 122 cm) diameter, or larger, segmented abrasive disk 1086 is shown with annular abrasive arc segments 1088 which have been adhesively bonded to the large diameter disk plastic, or metal, backing 1099. FIG. 55B shows the disk backing 1099 installed flat on a glass, quartz or metal plate 1097 which has abrasive arc segments 1088 covered temporarily by a coated release protective paper 1092 covered with an inflatable bladder or resilient pad 1096 which applies a force 1094 creating a uniform pressure on the surface of the arc segments 1088. The uniformly distributed force 1094 drives out excess adhesive 1089 between the arc segment 1088 and the backing 1099 to create a very uniform thickness and thin layer of bonding adhesive. If the mounting plate 1097 is transparent, ultraviolet light 1098 can be used to effect a cure of the adhesive 1089 while the force 1094 holds the composite firmly together.

43. Workholder Spindle Alignment System

Problem: Obtaining precise parallel alignment of a workholder surface with the surface of an abrasive platen is critical for precision flat grinding or lapping of a workpiece. Maintaining this alignment over time, as a machine tool warms up is difficult due to thermal growth of the machine components.

Solution: One technique to initially align a workholder spindle with a platen and a method to maintain this alignment would be to attach a single measurement device, such as a capacitance gauge, to a workpiece holder head and rotate the spindle so that the gage traverses a localized area of the abrasive platen. The workholder head assembly can then be physically adjusted until the spindle mounted gage is at a uniform equal distance from the abrasive platen for the full circular range of movement of the workholder spindle. A high quality capacitance gage will give accurate readings within a few millionths of an inch, which is sufficient for precision alignment. To remove the affects of local surface deviations of the abrasive platen, particularly a raised annular edge, the platen can be rotated slowly or very fast at, say, 2,000 RPM, to either obtain an average reading, or a reading of the high or low points on areas of the platen. A marker can be used on the platen surface to define the characteristics of the platen variation as a function of their circumferential position. Likewise, the capacitance gage could be mounted on the workholder spindle and the spindle rotated continuously at slow or fast speeds. Electrical contact to energize and monitor the sensor would be by the use of an electrical slip-ring device mounted on the spindle shaft to obtain the measurement gage output dynamically. This technique of making dynamic precise gap measurements while the workholder spindle is actively rotating allows the variations of the spindle bearings to be eliminated from the alignment measurements. Another measurement technique would be to use a machine slide to establish that the workholder spindle is aligned with the full diameter of the platen. After the spindle is aligned with the platen diameter, it would again be realigned with the localized radial slope of the platen raised annular ring. This alignment procedure would first move the workpiece holder assembly spindle axis to be in concentric alignment with the platen axis which does a macro alignment of the two. Then, the gauge sensor mounted on the slide would be moved back over a localized radial sector of the annular ring to aid in completing the local alignment. If desired, an automatic alignment system could use gauging and control devices to position the different axes of the machine unit with feedback from the gage systems.

44. Workpiece Spindle Drive Link Arm

Problem: Ball or other mechanical bearings, which have moving parts which roll in contact with each other, have imperfections in their diameters and raceways. As the bearings are rotated, the spindle shafts that they support move axially and radially. The same motion is translated to a lapped workpiece from the out-of-round bearing balls or rollers as they rotate when the bearing is turned. These bearing variations are large compared to the dimensional variation allowed to achieve a lapping flatness of a workpiece held to 1 or less Helium lightbands (11.6 microinches or 0.25 micrometers). As a workpiece is attached to a workholder mounted on the end of a spindle shaft, the bearing variations can create significant grinding patterns on the surface of the workpiece. The workpiece spindle shafts are motor driven to rotate the workpiece during grinding.

Solution: The effect of ball tolerance on the workpiece can be eliminated by use of a spindle shaft, which is supported by radial air bearings, which allow the spindle shaft to move freely in an axial direction. There is no contact with a thrust bearing, and no other restraint on the axial shaft motion that allows free contact of the workpiece with an abrasive surface. Another method to avoid the perturbations of out-of-round balls is to use an air bearing, or fluid bearing, thrust bearing on the spindle shaft axis that has no rolling bearing components. Another, less desirable, technique would be to use a super precision class nine, or better, a ball bearing that is substituted for standard commercial ball bearings. To drive the spindle shaft, a motor with a hollow shaft can be installed along the length of the spindle shaft where it is positioned typically at the opposite end of the spindle shaft from the workpiece. There would be a space between the hollow motor shaft and the spindle shaft, which would allow the spindle shaft to move freely in an axial direction while the motor body is stationary. A simple link arm mounted perpendicular to the motor shaft axis would allow the motor to rotate the spindle shaft with little or no friction and the spindle shaft would be allowed to travel freely in an axial direction.

Figure 56:
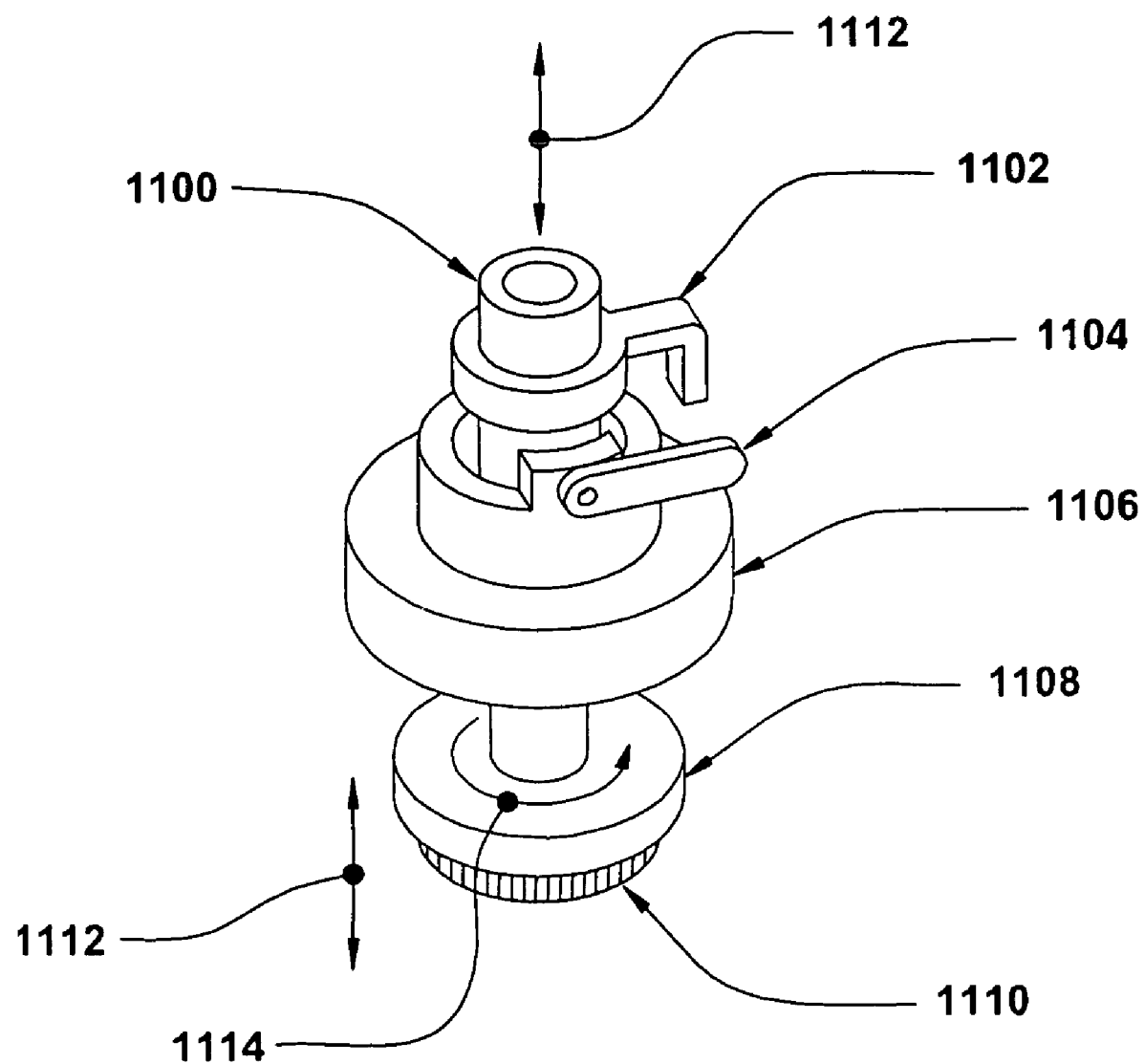
FIG. 56 shows a hollow shaft motor driving a workpiece spindle shaft.

FIG. 56 shows a hollow shaft motor 1106 driving a workholder spindle shaft 1100. The workholder 1108 has a workpiece 1110 attached and the whole assembly, including the workpiece, moves in a vertical direction 1112 and also rotates shown by the arrow 1114. A link arm 1104 can be rigidly fixed or pivot fixtured to the motor 1106 armature engaging a hub 1102 attached to the spindle shaft 1100.

45. Perforated Belt Abrasive Island Disk Coater

Problem: It is desired to have large diameter thin flexible disks of abrasive, where the abrasive is formed on small discrete islands on the outer annular ring, to be used in both low speed and high speed grinding and lapping. For high speed grinding, both the disk backing and the abrasive and the abrasive backing together must be precise in thickness. Preventing manufacturing waste, with expensive abrasive media such as diamond, is critical. Also, a large range of abrasive particle sizes and different types of particles joined together is desirable.

Solution: Fabricating a large diameter annular ring, from 6 inches (15.2 cm) up to 60 inches (1.53 m) or more, can be done using a disk backing of precision thickness polyester like material ranging in thickness from 0.002 to 0.020 inches (0.051 to 0.51 mm). This backing disk would be mounted on a small diameter platen with an outer annular ring portion of the backing, to be pattern coated, extending freely over the outer edge of the platen. A short idler or driven roller is then positioned under and level with the platen to support the annular free edge of the plastic disk backing as both the platen and the roller are rotated in the same direction and at the same surface speed. The roller axis is directed at the axis of the center of rotation of the platen which creates a straight line of contact of the backing on the underside of the disk. To compensate for the radial surface speed change as a function of the radius of the backing disk, the roller would consist of a number of individual bearing element cylindrical washers. Then, an endless metal belt having perforated holes corresponding to the desired round, or other shape, abrasive islands would be routed to nip press the backing free edge firmly to the segmented roller. A coating dam, which is narrow at the nip line, would contain an abrasive particle filled binder coating, to print out wet islands of abrasive on the surface of the backing as it travels over the driven roll system. A knife type or bladder type doctor blade would wipe off the excess coating as the backing exits the stationary dam. The wet coating thickness would be controlled by the thickness of the precision belt. Drying, curing or UV cure stations can be added downstream of the dam coater to strengthen or dry the wet coated abrasive islands. Multiple layers of abrasive can be applied to an individual abrasive island by continuing the rotation of the backing to the same coating station. Also, the abrasive size can be changed, with a new coating fluid or multiple coating stations may be used. A nip pressed roll calender station, either on the coater or off, may be used to precisely control the thickness of the coated disk and to impart special surface characteristics to the abrasive disk. Other secondary coating, to add abrasives, surfactants, lubricants and others, can also be applied.

Figure 58:
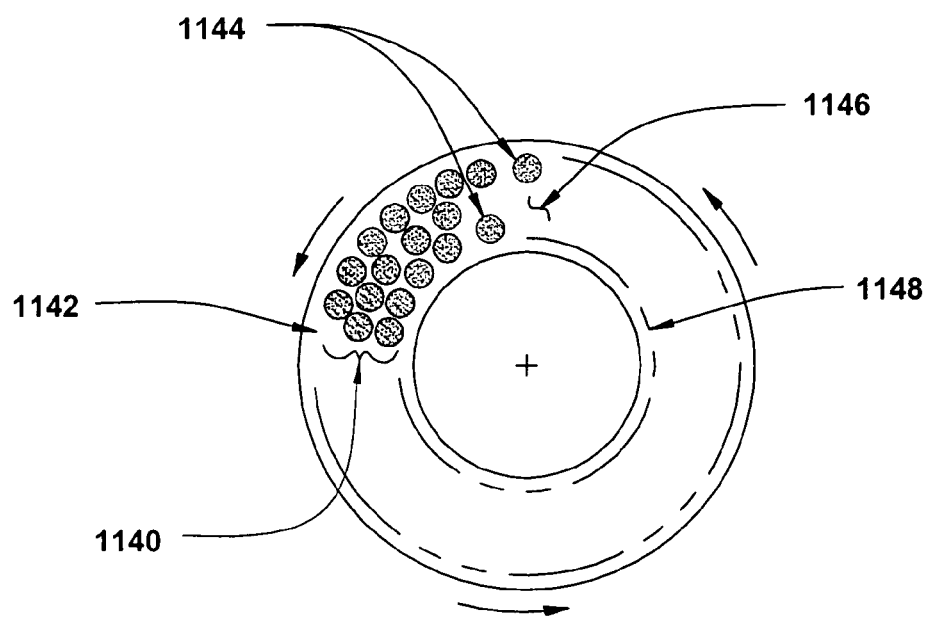
FIG. 58 is a top view of a large diameter abrasive disk with an annular ring of abrasive islands coated by a perforated belt coater.

FIG. 58 shows a top view of an abrasive disk that has the top coated with abrasive islands by a belt coater. The belt coater, not shown, can print these islands directly on this disk. An annular band 1140 of islands of abrasive 1144 have a position where the island printing starts 1142 on the disk backing 1146 which has been mounted to a platen 1148 which has an outer diameter less than the inner diameter of the annular band of abrasive islands 1140.

Figure 59:
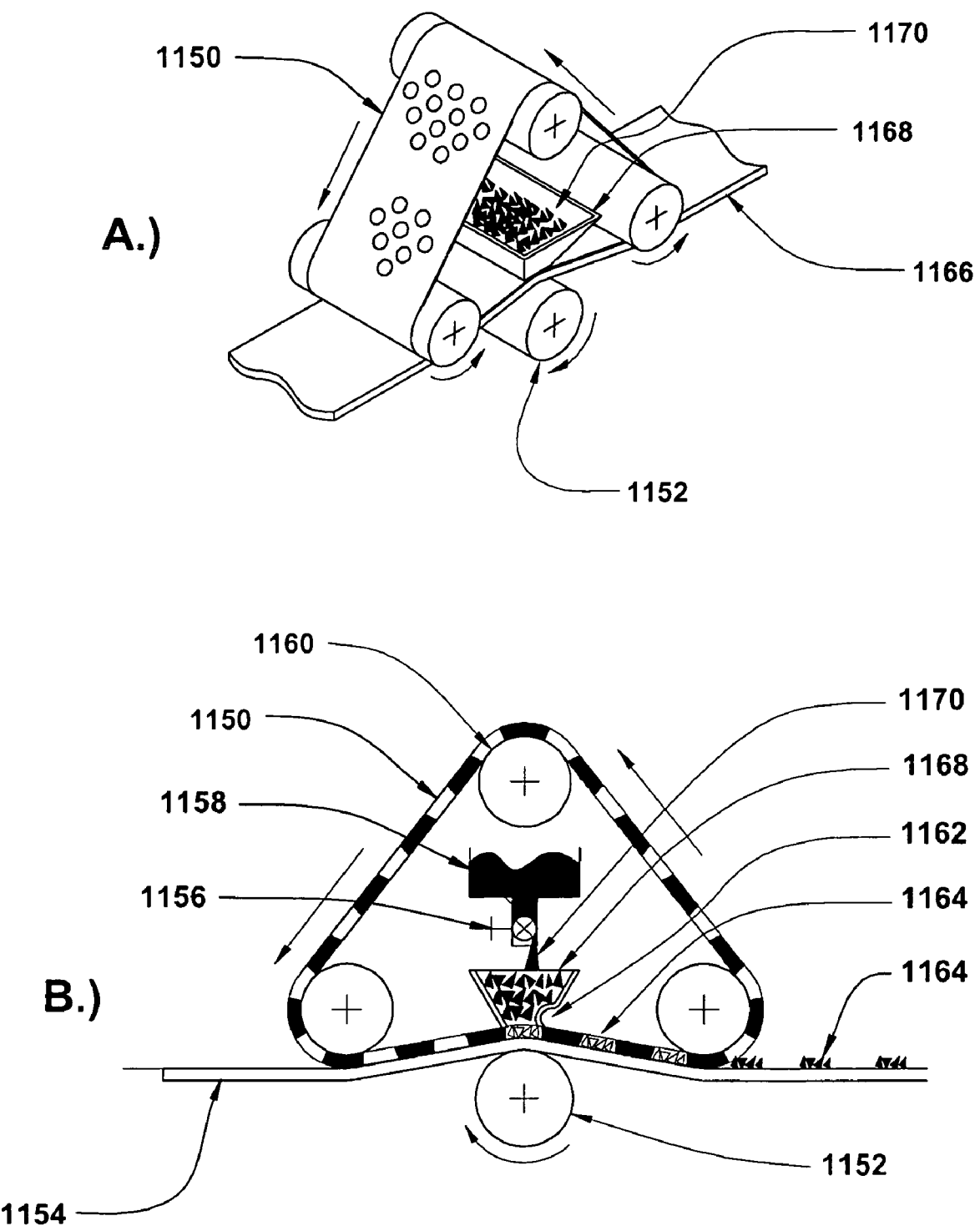
FIGS. 59A and 59B are two views of an abrasive belt coater

FIGS. 59A and B show two views of the belt island printer coating stations which may either be used to print abrasive islands on large diameter circular disks or on continuous flat web sheets which run in a straight line rather than rotating. A variety of binder systems could be used with the abrasive particles. They include those that can be cured with thermal energy, chemical reactions and radiant energy. Examples of binders include acrylated urethanes, acrylated epoxies, isocyanurate derivatives, vinyl ethers, epoxy resins, acrylates and methacrylates. The binder is preferably capable of being cured by radiation energy or thermal energy. Sources of radiation energy include electron beam energy, ultraviolet light, visible light and laser light.

FIG. 59A shows a strip of web backing on the outer annular radius of a backing disk 1166 with a metal, or plastic, perforated belt 1150 which is in contact with a straight linear surface, or a segmented roll 1152. A slurry mixture, consisting of a binder liquid and abrasive particles 1170 is contained in a hopper 1168 that allows the mixture 1170 to be deposited in island shapes on the backing 1166. FIG. 59B shows an end view of the belt coater with a support roll 1152 in contact with a free edge of backing 1154 which is contacted on the upper side by a perforated belt 1150 which is fed an abrasive coating 1170 through an abrasive hopper 1168 which deposits abrasive islands 1164 with the use of a doctor blade 1162 which scrapes off the excess height of the abrasive coating 1170 from the belt 1150 leaving the abrasive islands 1164 with a precise uniform height relative to the top surface of the backing 1154. A coating fluid valve 1156 is used to control the level of the abrasive coating fluid 1158 in the hopper 1168. The idler rolls 1160 rotate as the belt 1150 moves in contact with the backing 1154.

46. Very Large Flexible Abrasive Platen

Problem: A very large, 30 to 60 inch (76 to 152 cm) diameter, platen driven at a high rotational speed requires a very precise spindle so that the outboard annular edge is extremely flat for abrasive grinding. A variation in motion due to the out-of-round characteristics of the spindle roller bearings is multiplied at these outer diameters as the typical 6 inch (15.2 cm) diameter bearings are small in relation to the platen diameter. Extra precise air bearing spindles can be used but they are expensive and limited in capability for supporting grinding contact forces located at these large outer diameters. Thick, stiff platens have very high inertia and delay acceleration to the full rotational speed required for high speed grinding or lapping.

Solution: A very large diameter abrasive platen can be constructed from standard commercial components when used with a flexible platen plate having a precision thickness and which is supported on its outer periphery by air bearing pads. Here, a typical small diameter commercial spindle, having an 8 inch (20.3 cm) diameter top, or a simple shaft with pillow block bearings can be used as a center support for the flexible platen. A platen constructed of a thin flat plate, or even sheet metal can be coupled to the spindle. Another alternative would be to use a thin annular section of sheet metal that is connected to the spindle with spokes. The outboard annular platen section would then be supported at discrete positions around its circumference by use of hollow ring air bearing pads. A vacuum would be applied to the center of the pad to attract the bottom side of the platen toward the pad surface. High pressure air would be supplied to the narrow outer ring of the air bearing pad, made by the New Way Machine Company, Aston, Pa., to push the platen away from the attractive vacuum force thereby creating a stable vibration damped controlled support of the platen. Each pad would be mounted level and the flexibility of both the outer platen ring and its flexible inner support would allow the platen annular ring to travel fast and precisely when rotated at high speed. Further, this very large diameter platen would have a minimum inertia that would allow quick acceleration and deceleration of the platen. Grinding and lapping stations would be located above the air pad support stations for rigidity.

Figure 57:
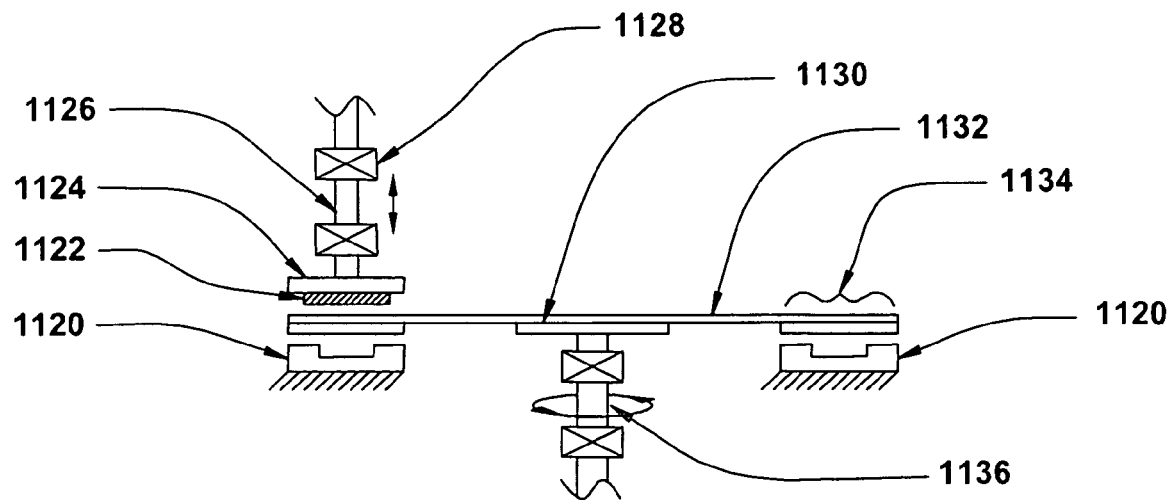
FIG. 57 shows a thin flexible platen supported by vacuum centered air-bearing pads.

FIG. 57 shows a thin flexible platen 1132 that is either a single continuous disk or an annular ring 1134 that is driven by a commercial small diameter spindle 1136 or center support bearing shaft which has a platen center hub 1130. The flexible platen 1132 is supported at discrete points around its periphery by vacuum centered air bearing pads 1120 which are positioned on the lower side of the flexible platen 1132. The workpiece 1122 is mounted to a workpiece holder 1124 that is positioned directly in line with and above one of the air bearing support pads 1120. The workpiece holder 1124 is supported by a spindle 1126 that is mounted in spindle bearings 1128 which allow spindle rotation.

47. Cone-shaped Disk Coater Belt

Problem: Using a precision thickness perforated belt to coat a circular disk with an annular band of abrasive islands presents unique difficulties for a traveling belt to match the localized surface velocities where it contacts the disk. A straight flat belt will not travel in contact with a rotating disk without a growing interference along a narrow radial line section where the coating deposition takes place due to the radial change in surface velocity of the disk as the disk is rotated during the abrasive island print coating. Starting and stopping the abrasive island dot printing on the annular disk is important to provide a continuous abrasive contact surface for the workpiece. When making a second print coating pass around the disk, the belt will travel on top of the first printed abrasive dots to create islands which have increased thickness as compared to a single-pass print deposition.

Solution: To compensate for the radial change of surface speed, a cone-shaped belt with angled idler rolls that would allow a speed match of the belt and the disk at the contact area with the disk where the dam coating is applied. Also, to compensate for the radial difference in tangential surface velocity of the disk at the belt coating station, a cone shaped idler disk support roll can be used as an alternate to the segmented bearing roll.

FIGS. 60, 61, 62, 63 and 64 show different views of a cone-shaped thin flexible perforated belt as it would be employed with a fluid abrasive coater station, not shown, which is positioned on the top side of the belt directly above a centrally located belt support idler roll. The general description and operation of the coater station was described in the presentation of the flat perforated belt coater.

Figure 60:
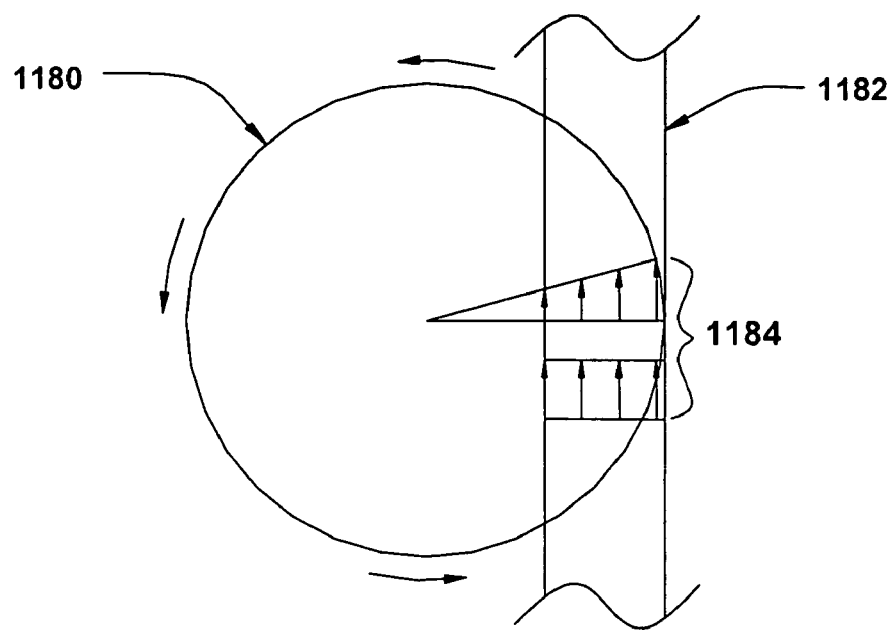
FIG. 60 shows the differential surface speed difference between a flat belt and a circular disk.

FIG. 60 shows a circular disk backing 1180 rotating about its center with a flat perforated belt 1182 in contact with the outer periphery of the disk 1180. The surface speed vectors 1184 show the equal linear surface speed of a flat belt and also the corresponding variable changing surface speed of the disk in the area of the mutual contact of the disk 1180 and the belt 1182. The surface speed of the disk changes proportionally to the radius location on the disk so that, even if, the constant lineal surface speed of the belt is matched with the maximum surface speed of the disk at the outer radius, there would be an increasing differential in surface speed as the contact moves to the inner radius of the disk. This differential speed, which is the localized subtraction of surface speed of the disk 1180 from the belt 1182, causes a scrubbing action between the belt 1182 and the disk 1180 which would prevent discrete islands of abrasive to be printed by the perforated belt.

Figure 61:
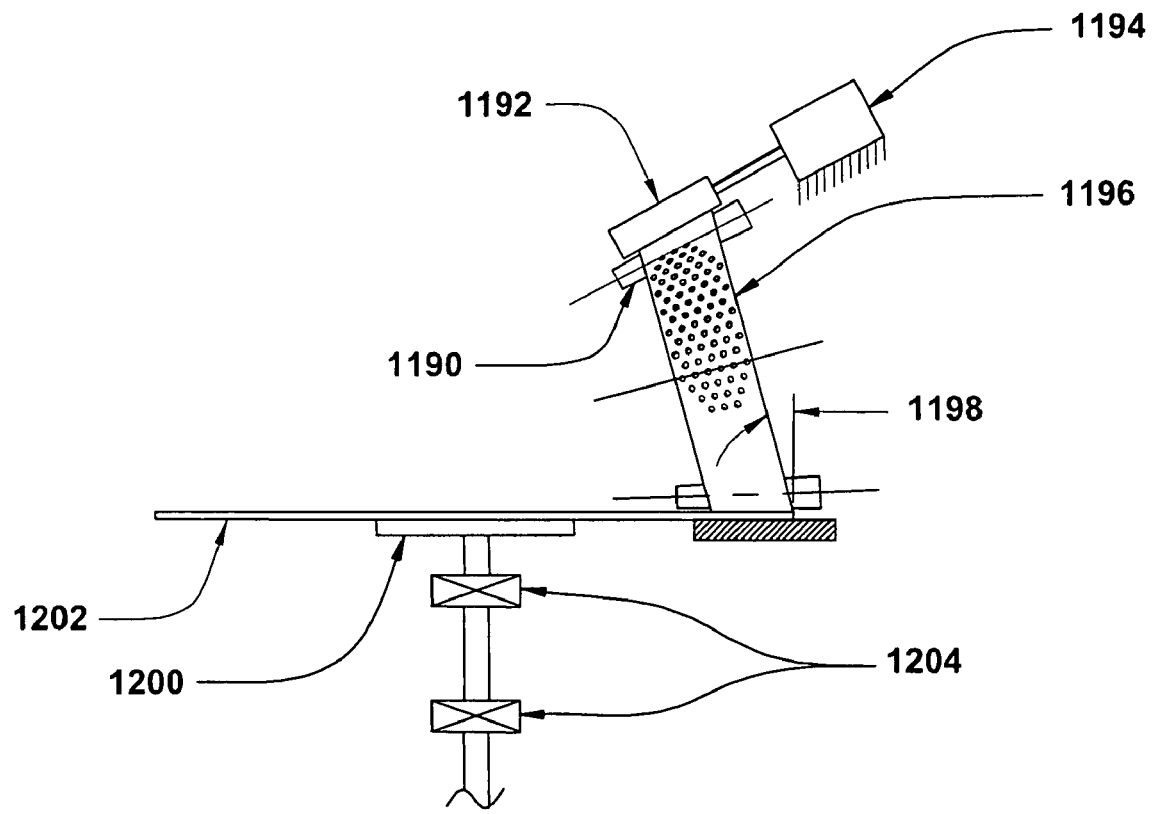
FIG. 61 shows a cone shaped perforated belt traveling in surface speed matched contact with an annular disk.

FIG. 61 shows a cone-shaped perforated belt in contact with a circular disk to allow coated islands of abrasive to be deposited on a disk backing through the perforated holes in the belt. An angled idler roll 1190 is positioned at the upper section of cone-shaped thin flexible perforated belt 1196 so as to be in nipped contact with a rubber covered belt drive roll 1192. Both the idler roll 1190 and the drive roll 1192 may be cone-shaped tapered along their axial lengths to aid in uniform surface speed contact with the belt 1196. A motor 1194 would drive the belt to be surface speed matched with the circular abrasive disk backing 1202 mounted on a small diameter platen 1200 having support by platen shaft bearings 1204. The angle 1198 of the belt is designed to match the relative radial surface speeds of the disk 1202 which will allow the system to be operated over a wide range of rotational or surface speeds.

Figure 62:
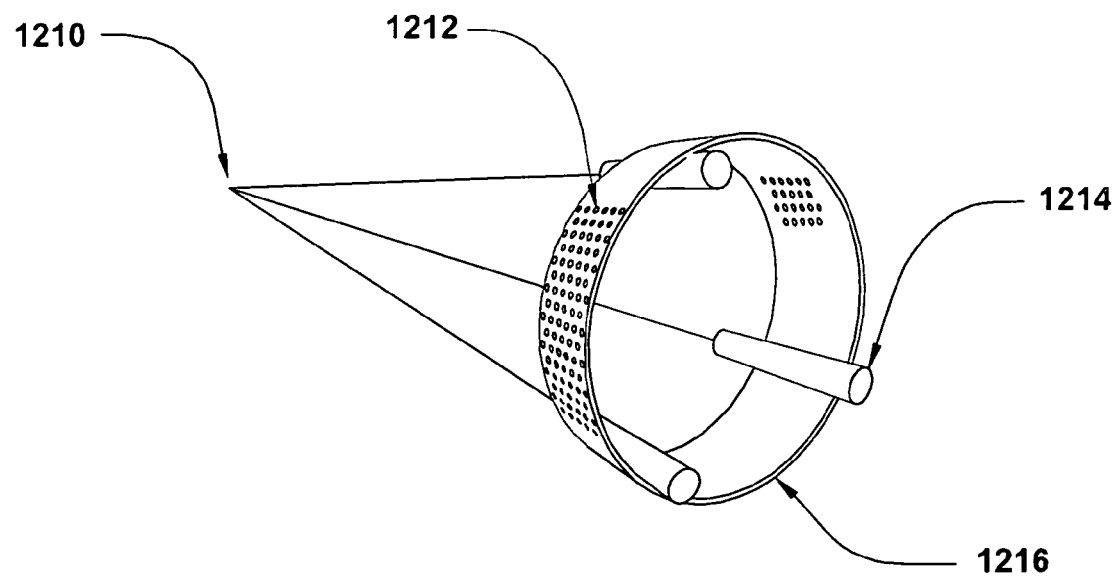
FIG. 62 shows the cone center location of a perforated cone shaped belt used to contact a circular disk.

FIG. 62 shows the relative location and alignment concepts used to design a cone-shaped belt. The cone belt apex "center" 1210 is the extended cone tip position of a belt 1216 with a pattern of perforated holes 1212 as supported by cone-shaped idler rolls 1214.

Figure 63:
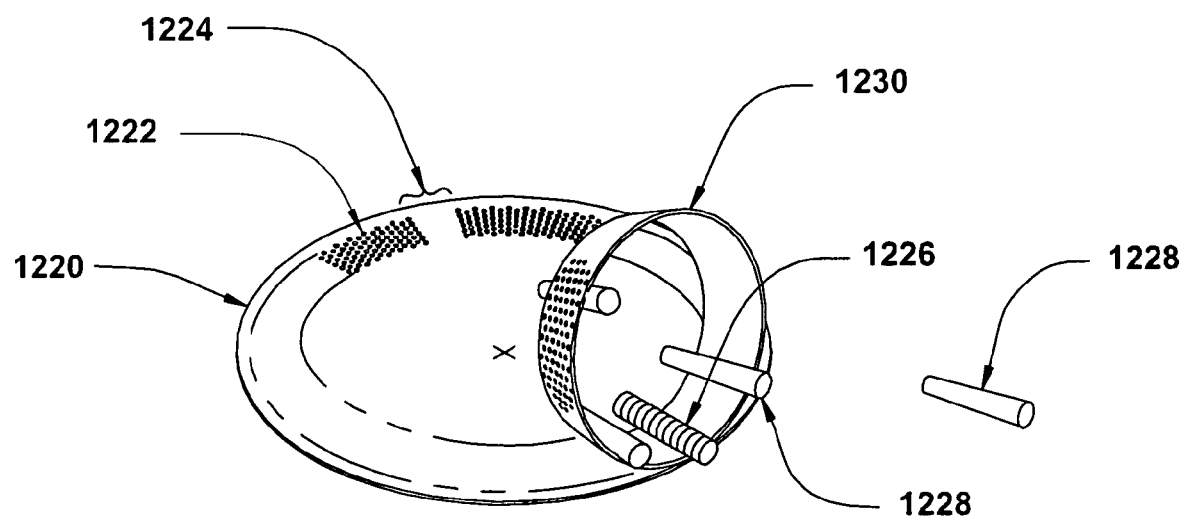
FIG. 63 shows a cone shaped perforated belt in contact with an abrasive island coated disk.

FIG. 63 shows an abrasive disk backing with abrasive islands as it contacts a cone-shaped belt. The disk backing 1220 has an annular band of printed island dots of abrasive 1222 created by use of the perforated belt 1230 supported by cone-shaped idler rolls 1228. A gap between the uncoated start and stop area 1224 of the abrasive annular band is minimized by a number of coating processes and coater design techniques. This includes the use of a very narrow, as measured tangentially on the disk surface of the coater station, application device and also raising the coater head at the end of a given printed abrasive band. A segmented idler support roll 1226 is shown incorrectly, for drawing clarity, in a position above the belt 1230 instead of its correct position just below the surface of the backing disk 1220 where it is used to support pressure forces applied by the coater station, also not shown for drawing clarity.

Figure 64:
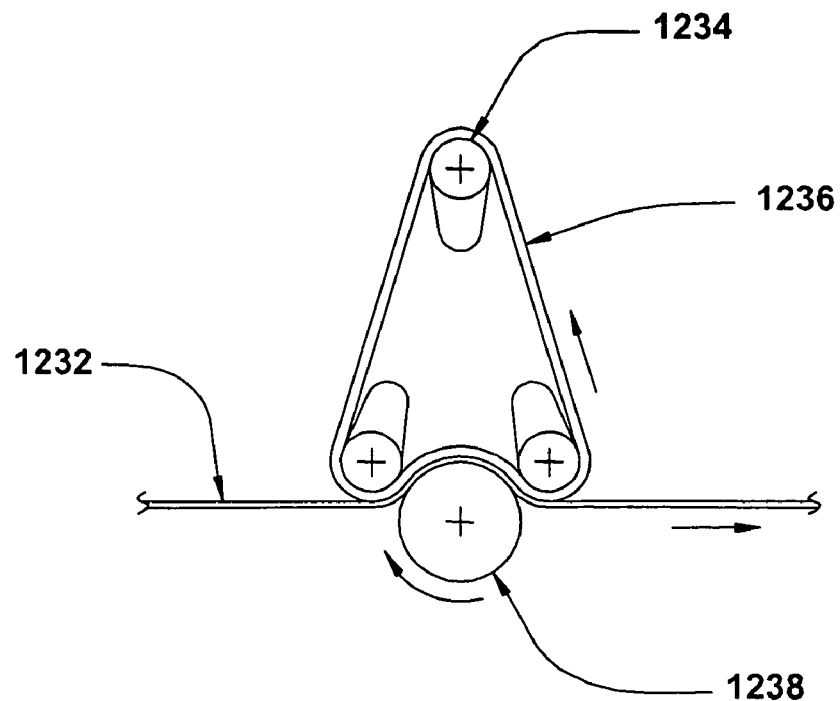
FIG. 64 shows a side view of a cone shaped perforated coater belt with a raised coater head idler roll.

FIG. 64 shows an end view of a perforated belt with a raised coater head idler roll minimizing the downstream coating land length for the coater head. The cone belt 1236 is supported at the top by an idler roll 1234 and the contact length of a coater, not shown, is minimized by use of a raised coater head bottom support idler roll 1238 holding the abrasive disk backing 1232 firmly in contact with the coater head. The idler roll 1238 may have a number of shapes, forms and materials including a tapered rubber covered roll of a small nominal diameter or it can be constructed of a series of disk washers, having equal or different diameters.

48. Print Coating of Abrasive Island Disks

Problem: It is desirable to create islands of abrasive particles or abrasive agglomerates in an annular ring band of a flexible circular disk with a precision overall thickness for the whole circumferential length of the annular ring. The thickness is measured from the exposed top of the abrasive islands to the bottom of the abrasive disk backing. It is also important to utilize all of the typically expensive abrasive particles or abrasive agglomerates, such as diamond, as the abrasive wears down on a disk. It is also desirable to create large diameter disks of 12 inches (30.5 cm), 18 inches (45.7 cm) and up to 24 inches (61 cm), 36 inches (91.4 cm) or 48 inches (122 cm) or more diameters so that the difference in surface speed is small at the inner and outer radii of the annular abrasive band.

Solution: An island type annular band of precision thickness can be fabricated by printing discrete islands of abrasive. Each island is then leveled by any convenient physical process to a precise height or thickness. Then, a coating fluid, made from abrasive particles or abrasive agglomerates mixed in a suitable binder solution, can be dispersed onto the desirable pattern of separate islands on a plastic or metal backing disk by use of a fluid injector which deposits controlled drop sizes when activated electrically or by other means. A large diameter circular disk backing can be laid on a flat mount surface and the backing can be driven by an X-Y positioning table, or a rotary table, in a series of steps under a single, or multiple, head stationary deposition injector(s) which is activated at each desired island position. The primary island base can be constructed at each island site by another coating injector station. A different material would be injected at the site to act as an island base or foundation by this station. This base deposition would be completed prior to deposition of the abrasive particle fluid drop. This double injection at each island site creates an abrasive top to each island, where the lowest abrasive particle in the island is raised off the backing disk floor, and all of the abrasive particles in an island are available for grinding or polishing action when the upper abrasive portions are worn away. Following the drop deposition of either or both the base material and the abrasive material, the height of each island can be adjusted, or leveled, by a precision gap roller. The roller would have an optional cone-compensated inner and flanges having flanged edges of different diameters. It can be rolled along the tangential path of the annular drop-island pattern so that each island top is contacted by the lowered portion of the roller, and thus the island is reduced in height by the roller. The outboard roller flange edges, where the inside portion that contacts the top of each island, would have a smaller diameter than the outside flange diameter. This would allow direct contact of the flange edge with the rotating disk backing. The roller would travel on the outboard and inboard portions of the backing disk that have not been island drop coated. The backing would be mounted on a stationary or rotating platen that is precisely flat in the radial direction. With a single or multiple pass of the roller height-leveling roller at different stages of curing or drying of the island components, the height of each island can be controlled to be precisely uniform to within 0.001 inches (0.025 mm) or less but preferably within 0.0001 inch (0.0025 mm) or less. Other substances, such as coatings, binders, surfactants, etc. can be added later to the disk.

Figure 65:
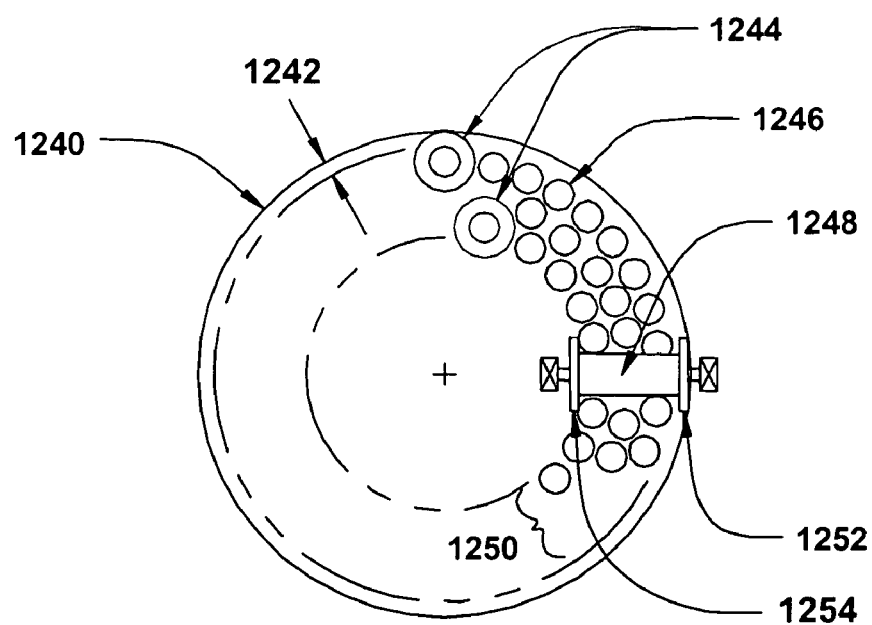
FIG. 65 shows an abrasive disk with injection deposited islands of abrasive leveled with an island height gauging roller device.
Figure 66:
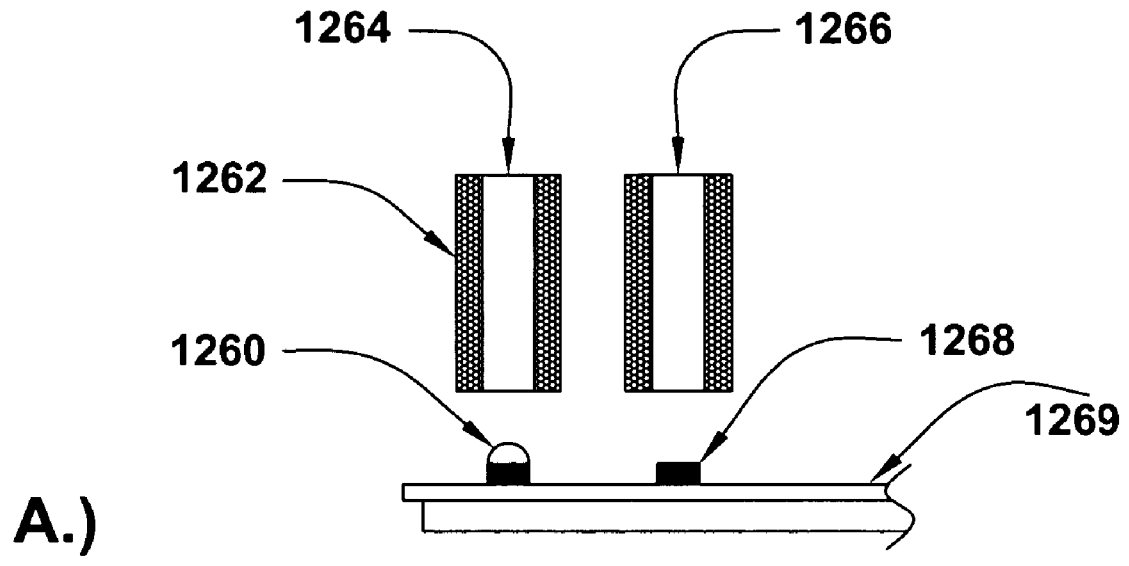
FIG. 66 shows a cross-sectional view of an abrasive drop injector and the function of a height adjusting roller.
Figure 66:
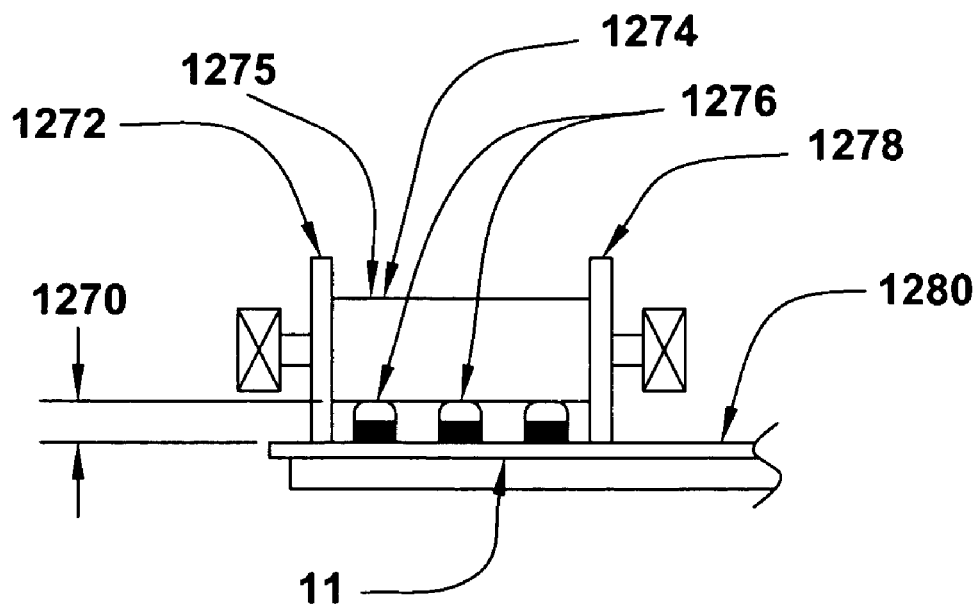

FIGS. 65 and 66 show an abrasive disk backing and an apparatus which would be used for injection drop coating of abrasive loaded binder onto an annular band of island shapes and a roller device to level the partially cured abrasive slurry binder coated islands to a uniform height. The absolute height of each island, past a minimum value to prevent hydroplaning of a workpiece, is not critically important to abrasive grinding but the relative height variation is important to utilize all of the expensive abrasive particles or abrasive agglomerates in the grinding or polishing events. Abrasive islands that are too high will have their tops broken off and islands that are too low will not abrasively contact a workpiece surface. The island height gauging roller can be constructed of a variety of metal or plastic or composite materials to achieve the precise accuracy and also to promote the release characteristics that prevent a buildup on it surface by the pickup of wetted abrasive binder. Special coatings can be applied to the surface of the roller including integral platings or coatings such as fused carbon, fused Teflon® coatings, and so on. Also liquid, or dry powders, or chemicals can be used with the roller as a coating applied to the roller or a coating applied to the surface of the wet abrasive islands to prevent sticking to the roller surface. Special binder systems can be used which allow the top surface of the abrasive island to become partially cured adequately well that the height adjusting roller can move the island bulk abrasive laterally without pickup of abrasive binder on its surface. These binders could be solvent based for drying and curing, could be thermally cured, catalyst cured (e.g., room temperature cured), radiation cured, ultraviolet cured and chemical reaction cured.

FIG. 65 shows a top view of a disk backing with abrasive slurry binder injector nozzles and an abrasive slurry island height adjusting roller. The abrasive disk backing 1240 is mounted on a platen, not shown, which rotates as a pattern of discrete abrasive drop-sized islands 1246 are deposited by one, two or more abrasive injector devices 1244 positioned relative to each other to best effect the desired island pattern. The islands 1246 are formed in an annular band 1250 positioned at the outer periphery of the annular disk backing 1240, which can have a variety of diameters from 1 inch up to 60 inches (2.54 cm to 152 cm) or more. This disk 1240 is circular and is shown being rotated while printed with the islands but it could also have been mounted to a two axis X-Y programmable movable table and the desired dot island patterns created on the circular disk in the same fashion. Backing materials that are commercially available have a precise uniform thickness with variations less than 0.0001 inch (0.0025 mm) would be adequate to produce the desired thickness precision of the completed abrasive disk. Variations in the drop sizes produced by the injectors are not of concern because a larger drop island 1246 would simply have a larger diameter than a smaller sized drop. It is desirable in some cases, for grinding or lapping performance, that different diameter drops coexist on a given abrasive disk, which can be easily accomplished by adjusting the sizes of the drops produced by each injector, either in a random or periodic basis. The location of each abrasive island can be staggered in a periodic or random basis to effect improved grinding or lapping speed and quality. Some of the benefits of random sized or random spaced islands are derived from the breaking up of vibration patterns that are established or induced with the use of completely uniform spaced or uniform sized abrasive media. An island height adjusting roller 1248 is shown with an outboard flange 1252 that is larger in diameter than the inboard flange 1254 to allow the cone-shaped roller to contact the surface of the circular disk backing 1240 as it rotates. The inboard and outboard edge 1242 of the backing extends past the annular abrasive band 1250 to allow free space for the flange 1252 to run freely on the backing 1240 without contacting the abrasive islands 1246.

FIGS. 66A and 66B show the print deposited islands of abrasive. FIG. 66A shows an abrasive topped island 1260 where a liquid slurry mixture of abrasive particles and a polymer 1264 is deposited on the top surface of the island foundation 1268 by an abrasive binder drop ejector 1262 filled with abrasive binder fluid 1264. The ejector can be of a variety of forms, shapes, and types and can be operated by a variety of mechanical or electrical means, including an electrical solenoid driven device. Drop size adjustment can also be accomplished by a variety of means, either mechanical or electrical. An island base foundation 1268 of base foundation material 1266 can be printed or ejected on the abrasive article sheet backing 1280 and this foundation base may be height adjusted prior to solidification of the foundation material. The foundation can also be free-deposited and used as a foundation structure for the subsequent injection application of a top-coat abrasive slurry binder to create the abrasive topped island 1260. Each island may have a unique pattern shape formed by the injector ejection head, not shown, to create round, oblong, star shaped, square, triangular, tapered wall or other island geometric shapes. The backing 1280 has a flat surface 1269 which may be preconditioned by corona treatment, or other mechanical means, or by chemical coatings to promote the adhesion of the islands 1260 or 1268. FIG. 66B shows raised islands flattened by a roller system. A roller element 1275 would have roller flanges 1272 and 1278 and an inside tubular diameter 1274 which is precisely machined where the inside diameter is precisely concentric with the outside flanges 1272 and 1278 and the vertical distance between the inside diameter 1274 and the two flanges 1272 and 1278 is precise with 0.0001 inches (0.00254 mm), or less, to produce a island forming height gap 1270 measured above the backing 1280 surface to provide the required accuracy of the height of each island. The flattened islands 1276 are shown in the position where they are contacted by the passing roller inside diameter surface 1274.

49. Thickness Control of Coated Abrasive Islands

Problem: The total precision thickness of a flexible thin abrasive disk is critical when used for high speed, 3,000 RPM or 9,500 surface feet per minute, grinding and lapping. It is desired that the abrasive on a disk be in the form of abrasive islands to reduce the possibility of the workpiece hydroplaning when water is used in the grinding operation. It is critical that each abrasive island have the same height or thickness. Abrasive islands deposited in a pattern to form an abrasive annular ring would optimize the configuration of the abrasive disk.

Solution: An abrasive island annular band disk can be constructed with the following technique. A binder coating, which is filled with abrasive particles or abrasive agglomerates, can be applied to a continuous round disk sheet of plastic, or metal backing. This would be done through an application hollow needle device, which has an offset skid or land area, to keep the applicator needle exit opening off the backing by a precise amount. An excess sized drop, or charge, applied to the disk backing through the use of a vibrating, or non-vibrating, applicator head. The vibrating head can assure the backing island target area is wetted for good adhesion. Also, this vibration can assure that the roof of the offset chamber is filled sufficiently that the excess abrasive filled binder solution material moves laterally or sideways when the fixed quantity is ejected. Then, the applicator head is raised directly, or moved laterally, somewhat along the horizontal surface of the backing to leave a drop, or bar shaped, abrasive island of a prescribed height. This abrasive island shape application sequence is repeated at many locations on the disk to form an annular ring on the outer periphery with some margin distance of about ½ inch (1.27 cm) at the uncoated outboard edge. Many solvent-free, solvent based, hot melt, UV cure based, radiation cured, room temperature cured, or reaction based binder adhesives may be used with a variety of abrasive particles or abrasive agglomerates including diamond particles. After each oversized island is deposited and enough cure has been effected to create a non-wetted top surface, each island or group of islands can be further lowered to an improved precision accuracy height by use of vibratory bars. These bars, which have height control land areas on each end, would contact the upper exposed inner and outer radius of the backing away from the annular band of islands. Also, these bars could be vibrated vertically, with some horizontal motion also, at from 30 HZ to 20,000 HZ while the disk table is rotated slowly. The precision height on the underside of the bar would contact the highest portion of each island, driving it down to a controlled reference distance from the backing. That portion of each island, which is too high, is simply moved laterally by this action, which would tend to have a fluidized bed free motion that still maintains the original shape of-the island. This vibration action would tend to promote adhesion of the island to the backing by the scrubbing action of the wet binder on the backing surface. The underside of the gage bar may be tapered upward, at the island inlet side, to better capture incoming over-height islands.

Figure 67:
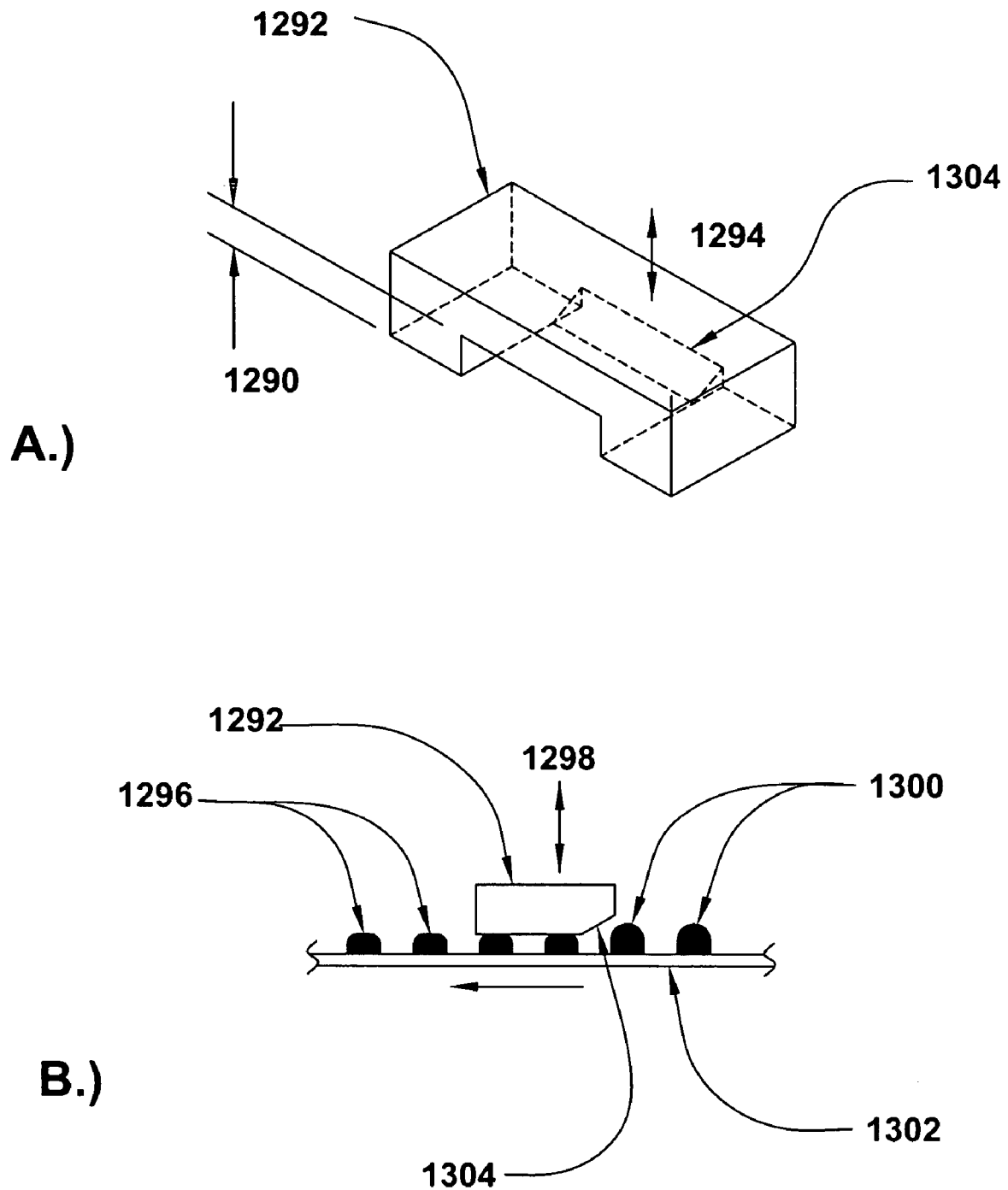
FIG. 67 shows two views of a vibrating gauge bar that would control the heights of deposited islands of abrasive.

FIGS. 67A and B show two views of a vibrating gage bar that would precisely control the height of islands of abrasive that have been deposited on a backing sheet. This gage bar is preferred for use with a narrow band of deposited abrasive on a circular continuous sheet backing having a space margin of uncoated areas on either side of the annular band. These space margins are used as contact landing areas for each of the two flat feet at the ends of the bar. Other forms of abrasive island coated backing can use this same approach of height adjusting of discrete islands of abrasive which would be narrow strips of continuous abrasive web that would have islands deposited by a single or by multiple injector heads. The islands can be periodic in relative location or they could be positioned in random locations. Likewise, the size of each island could be changed on a give web process manufacturing line, either on a periodic or random basis. Further, both the relative spacing and the relative sizes of the islands could be periodically or randomly changed to effect improved abrasive cutting, grinding or cleaning action. Further, special non-abrasive materials may be mixed with the abrasive particles or abrasive agglomerates in the binder system which would aid in the breakdown of an abrasive island which is many particles thick. This breakdown would aid in self-cleaning the abrasive surface and also supply a fresh exposed surface of new particles which have sharp edges to replace those particles with worn edges.

FIGS. 67A and 67B show an abrasive island height-adjusting gage bar 1292 that has a precision gap of height dimension 1290 and a tapered front entrance section 1304. The as-deposited "tall" abrasive islands 1300 are attached or deposited on a sheet backing 1302 which is moved under the bar 1292 which is nominally stationary but which is vibrating vertically 1298. As the bar 1292 vibrates, it is only in contact with the moving backing 1302 for very short impulse periods of time, therefore the translational motion of the backing is not impeded by the gage bar 1292. The oscillation of the bar 1294 due to the vibration 1298 shows how the tall abrasive islands 1300 approach the tapered bar inlet which hammers them down to the desired precision height 1290 as they pass under the bar 1292 as flattened islands 1296. The amplitude and frequency of the bar can be changed over a wide latitude and also a variety of natural-frequency spring-mass excitations can be employed to generate the oscillations 1298.

50. Workholder Spindle Motion Sensors

Problem: It is important to sense the variation in motion of a workholder slide and spindle support system as it responds to steady state and dynamic inputs such as out-of-round bearings and abrasive surface contact forces. Slide and spindle bearing imperfections cause surface flatness and smoothness defects on workpiece surfaces being lapped. Static and dynamic forces are generated at a grinding surface due to many variables such as: abrasive type and size, abrasive speed, amount of water used and contact friction changes. The contact friction, which acts parallel to the abrasive surface, can increase as a workpiece surface is progressively lapped flatter and smoother. Knowledge of the presence of, and the magnitude and the vector direction of these dynamic forces, can be used to change and optimize process variables during the lapping process. Also, knowledge of the variation in the associated displacements, which occur across machine element gaps can be used to gain useful knowledge of the machine performance and the state of condition of a workpiece being processed. Perturbations from the spindle drive belt that transfers rotation from the drive motor to the spindle shaft should be minimized to reduce the occurrence of speed variations which are duplicated on the workpiece.

Solution: Special sensors can be added to a lapping machine which can indicate the relative motion between moving component parts in a number of machine locations. The very small but accurate gap measurements can also be used to infer or calculate the forces on the machine components.

Sensors, including non-contact gap measurement sensors can be mounted to the spindle assembly to sense the movement of component parts relative to adjacent parts, which are stationary, slow moving, or moving at high speed during the grinding operation. Capacitance sensors can be obtained from the Lion Precision Company, St Paul, Minn. that can measure changes of a few millionths of an inch at full spindle speeds of 3,000 RPM which can indicate bearing run-out variations. They can also be used to determine the reactive forces applied by the abrasive to a workpiece surface. Determining these forces, which result as a function of motions caused by out-of-round bearings, or from abrasive induced reactions, can be deduced from the stiffness of each joint. Each bearing joint, including a fluid or mechanical joint, generally has a consistent stiffness characteristic. Knowing the equivalent spring stiffness of a joint and the displacement of this spring joint allows the resultant force to be calculated from data provided by the gap sensor. To obtain abrasive contact forces, a gap sensor probe would be positioned parallel with the abrasive surface and tangential to the abrasive annular band. The sensor would be set up to determine the gap change between a spindle shaft and a slide. Alternatively, the gap change the displacement that is between a slide assembly and the machine frame, or between the frame and the spindle shaft could be measured and used to control the process. Dynamic gap variations can be determined for both vertical and horizontal directions to indicate the quality and performance of the spindle shaft and slide assembly bearings. These bearings can either be roller bearings or air bearings. The status of the lapped smoothness, or flatness, of the workpiece surface can be predicted by the characteristics, defined by measurements of the magnitude of the amplitude of the component part excursions from each other, and also, by the frequency of the oscillations of the parts relative to each other. Some sources of excitation of rotational variations in spindle speed can be reduced by using flat, or smooth, drive motor belts and also by using motors that have many electrical poles. There are a variety of other gap sensors that can also be used, including reluctance gap sensors, laser sensors and inductive sensors.

Figure 68:
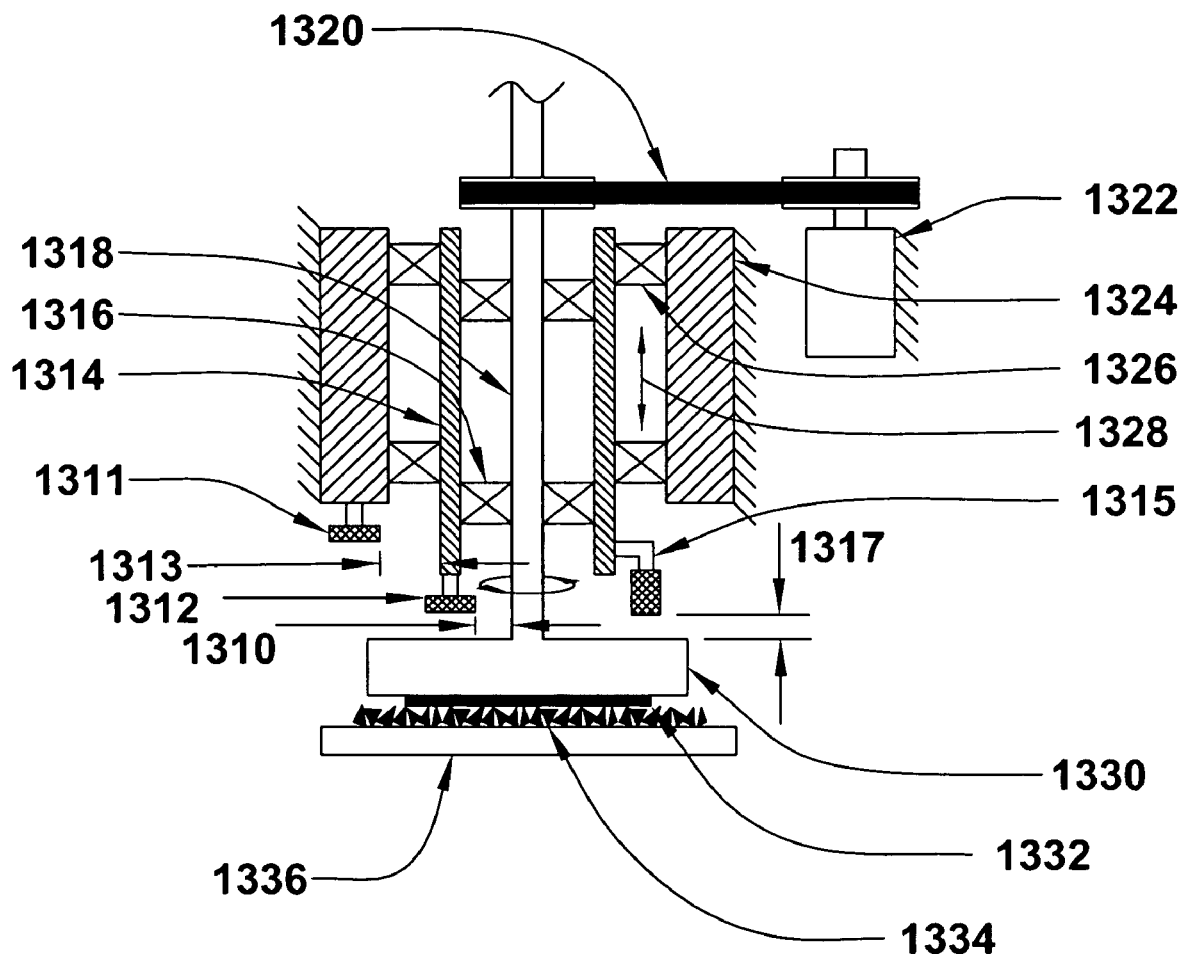
FIG. 68 shows a cross-sectional view of a workholder spindle head with gap sensors mounted at various locations.
Figure 69:
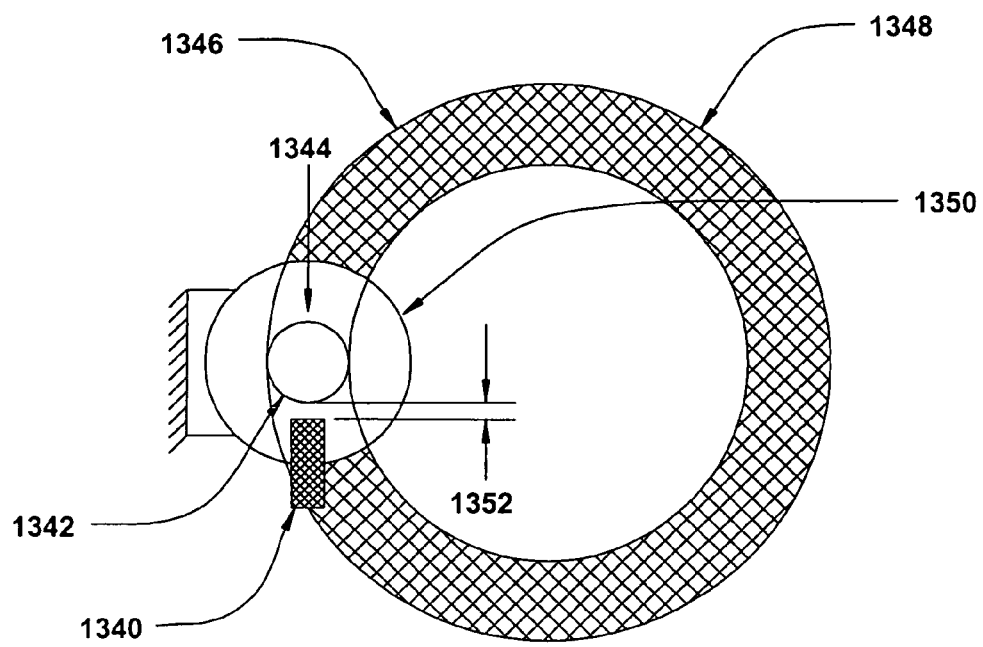
FIG. 69 is a top view of a gap sensor mounted to a workholder spindle head.

FIG. 68 is a cross-sectional view of a workholder spindle head with gap sensors installed in various locations. A gap sensor 1312 measures the gap 1310 between a slide housing 1314 and a spindle shaft 1318 supported by spindle bearings 1316. The spindle shaft 1318 that is rotated by a spindle drive motor 1322 coupled with a smooth action drive belt 1320. The spindle assembly frame 1324 supports a slide bearing 1326 to provide slide vertical motion 1328 to the workpiece holder 1330 which supports a workpiece 1332 which is brought into grinding contact with a abrasive sheet 1334 mounted on a rotating platen 1336. Different gap sensors 1311 and 1312 are mounted horizontally on the machine, perpendicular to the shaft 1318 axis, to measure gaps between the machine elements including the frame 1324, the slide housing 1314, the spindle shaft 1318, the workpiece holder 1330 and different combinations of the said machine elements. Gap sensors including 1315 can also be mounted vertically to monitor the gap between, for instance, the slide housing 1314 and the workpiece holder 1330 for indication of motion induced by the spindle shaft bearings 1316. FIG. 69 shows the top view of a platen with an annular ring of abrasive and also with a gap sensor measuring the gap change of position of the workholder spindle shaft as workpiece grinding or lapping action is taking place. The gap sensor 1340 is mounted to the workholder assembly slide 1350 and measures the movement of the spindle shaft 1342 by monitoring the gap 1352 as the workpiece, not shown, contacts the abrasive 1346 which produces an abrasive contact force 1344. The vector force 1344, which is parallel to the surface of the abrasive 1346 and which also, tends to be directed tangentially with the annular abrasive ring 1346 mounted to a rotating platen 1348. The vector direction of the contact force 1344 may shift somewhat as a function of the rotation of the spindle shaft 1342 and the sensor 1340 mount location may be changed to compensate for this so that the sensor 1340 is in nominal alignment with the force vector to maximize the sensor 1340 output signal.

51. Diamond Coating of Abrasive Islands

Problem: When constructing an abrasive disk with a band of annular islands which have a liquid abrasive-free adhesive binder deposited at individual island sites it is difficult to top-coat, with loose abrasive particles or abrasive agglomerates, only the top of wetted binder spots to form abrasive coated islands. It is desired that only a single layer of abrasive particles or abrasive agglomerates be wetted and bonded to the binder-wetted island without an excess of binder liquid from the islands to contaminate the loose abrasive particles or abrasive agglomerates.

First Solution: Liquid drops of adhesive binder can be deposited at island sites on a thin plastic or metal disk backing to form an annular band of island sites. When the binder adhesive is still wet at the top of each island, abrasive particles can be applied to the surface of the disk backing. The particles can be poured, or dropped, on the top surface of the disk which has been mounted flat with the wet binder islands upward so the whole disk surface is coated with abrasive particles. Those particles which contact the wet island tops will be bound to the top surface of the island and any excess will not be attached. The excess abrasive can then be collected by a variety of methods such as shaking it off, vacuuming it off and recycled for use on the next abrasive disk. By using this technique, the use of very expensive abrasive particles, such as diamond, can be used with a maximum of abrasive grinding utility on the top surface of the islands. Very little loss of this expensive abrasive media would occur in the manufacturing of the abrasive disks. Many forms, shapes, sizes and types of abrasive can be used which includes aluminum oxide, diamond, cubic boron nitride, CBN, and others.

Another technique of top coating the wet binder islands is to use a "bank" of loose diamond particles that cover only the tops of the wet binder islands.

A sheet disk backing can be spot coated with liquid adhesive binder in island shapes. While the binder is still wet at its top surface, the backing sheet would then be directed into a "bank" of loose diamonds that is maintained in place by a rotating roll. The roll can be force nipped against the backing to drive the particles into the wet island binder to achieve better attachment of the binder to each abrasive particle. This nipped roll action will also tend to level out the height of each abrasive coated island that performs the function of a thickness control device where all of the islands are precisely of the same height. To accomplish this bank coating of loose abrasive particles, there are a number of coater design configurations that could be used. In one configuration, an island coated backing disk can be mounted on a rotating platen that is operated at an angle with a horizontal position. A cone shaped roll can be mounted with its surface parallel to the surface of the platen and also has its surface speed matched to the platen surface speed at the platen radial contact line of the roller. The roll may be an idler roll that is rotated by the platen but it is preferred that the idler roll be driven at a low rotational speed against the surface motion of the platen to maintain a fluidized bed characteristic of the bank of abrasive particles. This opposite-direction motion also prevents the abrasive particles from jamming between the roll and the platen.

Figure 70:
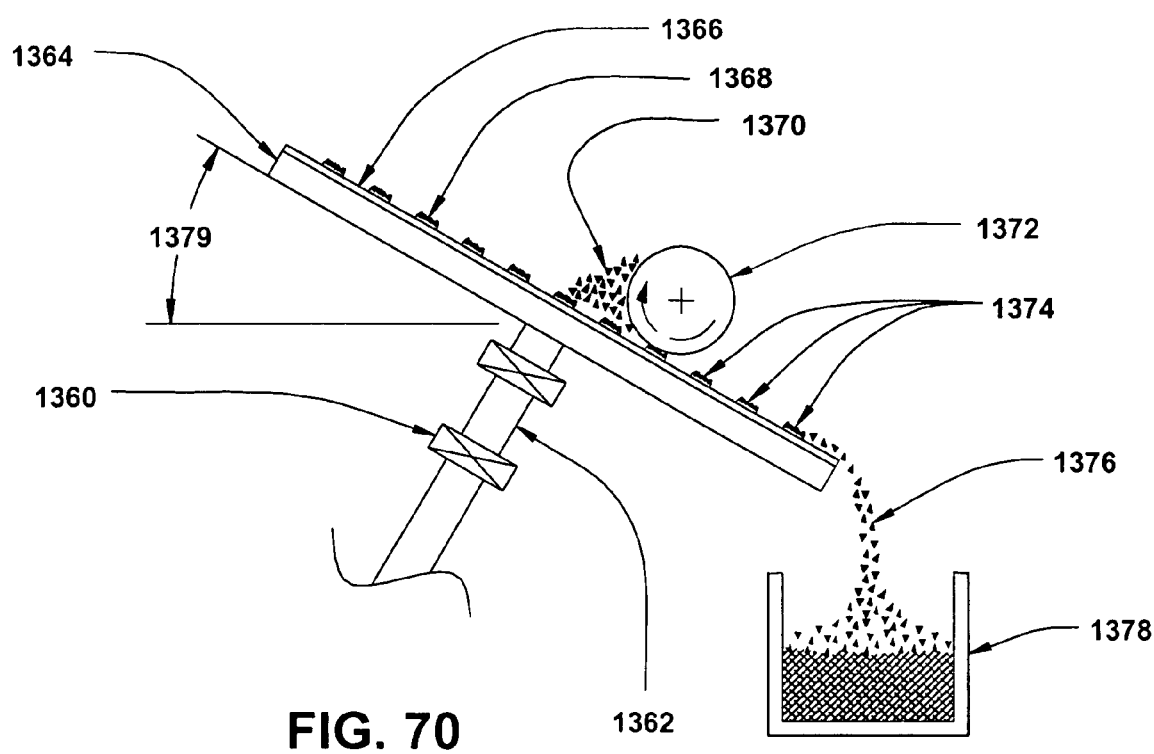
FIG. 70 shows a side view of an abrasive particle coating station for a sheet disk with wet adhesive islands.

FIG. 70 shows a side view of an abrasive particle coating station for a sheet disk with web adhesive islands. An abrasive disk backing 1366, made of thin plastic or metal, is mounted on a platen 1364 which is supported by a platen shaft 1362 which is rotated as supported by shaft bearings 1360. Islands of adhesive binder 1368 are printed in an annular band on the outer periphery of the disk backing 1366 and the wet adhesive islands 1368 are presented to a bank formation of abrasive particles 1370 that is located in the position between a roller 1372 and the backing 1366. There is a natural pocket formed along the radial width of the annular band of islands, not shown, between the roller 1372 and the backing 1366 as the platen 1364 is mounted at an angle 1379 with the horizontal. The roller 1372 can be rotated in a direction that opposes the surface motion of the platen 1364 or the roller 1392 can be rotated in the same direction as the platen 1364. As the disk backing 1366 passes through the bank of abrasive particles 1370, abrasive coated islands 1374 are created and the excess abrasive particles 1376, principally from the areas between the islands, fall into a container 1378 and are recycled.

Solution #2: A disk backing can be coated with wet adhesive binder and it can be attached to a metal base mount which is grounded electrically. Then, electrically charged abrasive particles are supplied in excess to the environment close to the surface of the wet adhesive binder. These abrasive particles become attached to the plastic, or metal, backing. Once in contact with the wetted binder, the particles remain attached to the binder wetted islands. Then, a device is used to collect the unattached abrasive particles and are recycled. The disk coating unit can be positioned vertical, upside down.

Figure 71:
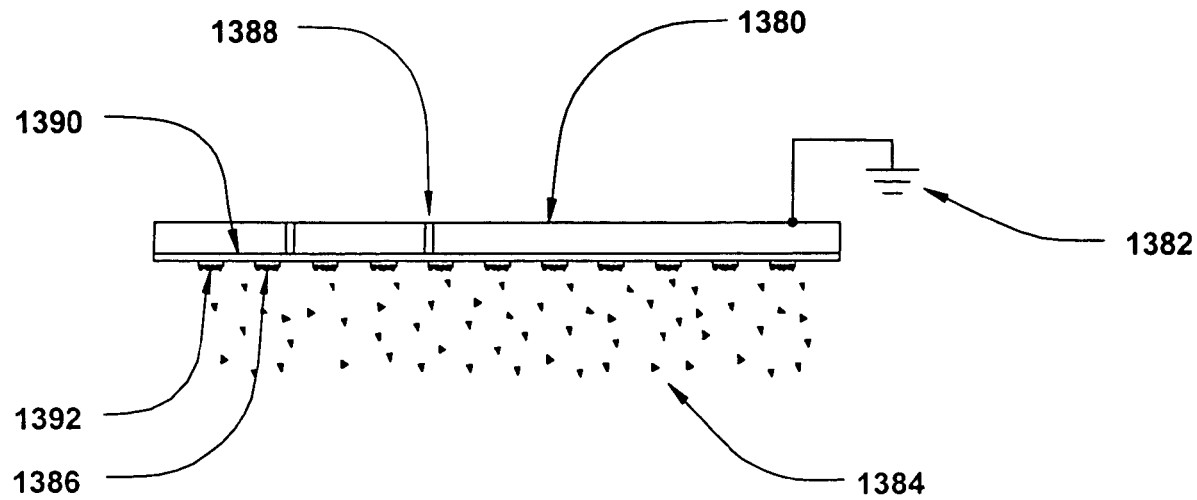
FIG. 71 shows a side view of an abrasive particle coating station with electrostatically charged abrasive particles.

FIG. 71 shows a metal base 1380 with vacuum port holes 1388 which are used to attach a thin circular abrasive sheet metal or conductive plastic or plastic backing disk 1390 with wet coated adhesive binder 1392 islands exposed downward toward an environment of electrostatically charged abrasive particles 1384. The metal base 1380 is electrically grounded 1382, or given an electrical polarity charge opposite to the charge on the particles, to attract the abrasive particles 1384 to the surface of the backing 1390 where they become attached to the wet surface of the adhesive binder 1392. The excess abrasive particles 1384 are collected by a variety of methods, including a vacuum suction filter system for reuse in the disk coating process. Abrasive coated islands 1386 are formed on the backing sheet 1390. After coating the islands with abrasives, a variety of methods can be used to improve the height uniformity of each island.

52. Pin Head Dip Coating of Abrasive Islands

Problem: It is difficult to make an array of abrasive island sites of either unfilled binder, or abrasive particle filled binder, that is precise in thickness, has uniform island sizes and has islands which are spaced evenly. Abrasive filled binder systems can create significant wear on binder liquid drop injector heads which have moving parts in contact with the abrasive binder.

Solution: A liquid drop-forming pin system can be used to create drops of liquid binder adhesive which are simultaneously deposited on a disk backing sheet. The system would use a pin head assembly which has a number of independent pins which are allowed to slide vertically in a pinhead pin holder. The free ends of pins are immersed in a "lake" or an open flat container of binder, or an abrasive particle filled binder, and then, withdrawn from the lake to form a drop at the free end of each pin. The pin head, which contains a number of these pins that have binder wetted ends, is transferred from a position above the open binder liquid container to a position above a disk backing sheet. Then, the pin head is lowered, where all the pins make individual contact with the backing sheet. Each pin is allowed to freely slide vertically in the pin head assembly so either the weight of the pin, or a spring, drives the wetted end of the pin in contact with the backing even if the backing is not exactly parallel with the traveling pin head. As the wet binder contacts the backing, a drop of liquid coating is deposited on the backing where the desired island is located. When the pin head, and the pins, are withdrawn from the surface of the backing, a liquid drop of a precise volume is left attached to the backing. The pin head is then moved back to the binder open tank container, and lowered so that the pin ends are wetted again. Then, the head is moved back to the disk backing to deposit another array of binder, or abrasive filled binder, islands which are offset or circumferentially transposed from the first set. This array segment deposition process is repeated until a complete annular ring band of abrasive islands is deposited on the circular backing disk. In the case where a binder adhesive is used which is not filled with abrasive particles, the liquid binder islands can be "salted" or drop-coated on their wet tops with a variety of abrasive particles or abrasive agglomerates. These semi-dry particle coated island top surfaces can be height leveled to a precise uniform height over the full annular surface of the abrasive disk by a variety of means. The tops of the islands are quite dry as the abrasive particles or abrasive agglomerates, which are bound by the wet binder, are dry before contact with the wet binder. A number of mechanical leveling devices can be brought in contact with the abrasive top-coated islands without the wet binder contaminating the leveling device surface. For leveling, a precise thickness coated release liner sheet can be laid on top of the islands, and left in place, while thickness leveling techniques are employed. Then, when the binder is partially cured, dried, or solidified, the release liner can be easily removed without distorting the height of the islands. In a similar fashion, abrasive filled binder can be applied on top of the islands, and the exposed surface of the binder dried or cured first on the top surface of the island to reduce the wetness of the island top while the bulk of the binder layer remains soft and flexible. When the top island surface is sufficiently cured or dried so that adhesive contamination of a leveling tool will not occur, the thickness or island height adjustments are made.

A single pin can be used or 2, 4, 8, 10, 100, 200 or 500 pins or more can be used to apply drops of abrasive binder or abrasive particle filled binder to a disk backing or a segment of a continuous web backing.

Special geometric shapes and sizes can be given to the fluid attachment ends of the pins to optimize the size and shape of the adhesive binder which is formed by this print action.

Multiple layers can be used to build an island with numerous drying, curing, or solidification time periods between the application of new drop materials on each island site. These different materials can promote the structural integrity of each island with a wider base than the abrasive top. Also, special coatings may be applied for improved adhesion to the backing materials prior to applying a particle binder coating. This primer coat would be formulated to be compatible with the make-coat binder and enhance bonding to the backing material. Special strength and adhesive characteristics are required of the coating used for the binding of abrasive particles together to resist dynamic impact loads and thermal effects especially with diamond particles which are typically more difficult to bond than other types of hard abrasive materials such as aluminum oxide. The make-coat binder also must properly adhere to wear promotion additives used to enhance abrasive particle contact and grinding effectiveness.

Other secondary top coatings can be applied to the island tops to provide special chemical effects that promote faster or improved grinding of specific materials by breaking down the workpiece chemically during the physical affect of localized grinding action. Also, size coatings may be added to strengthen the bond of abrasive particles or abrasive agglomerates to each other and to the backing.

Special additives or materials may be added to the abrasive particle filled binder mix to promote breakdown of the island for obtaining newly exposed sharp abrasive particles.

Large diameter clustered particles made up of small abrasive particles, which are partially fused together as larger diameter balls or beads, may be used as abrasive particles for the make-coat binder system.

The binder may contain abrasive grits or the binder may simply consist of an organic adhesive fluid. The binder functions to bond the abrasive grits together to form a precisely shaped abrasive particle. The abrasive grits typically have an average particle size ranging from about 0.1 to 1500 micrometers, preferably from about 1 to about 1300 micrometers, more preferably from about 1 to about 500 micrometers, and most preferably from about 1 to about 150 micrometers. It is preferred that the abrasive grits have a Mohs' hardness of at least about 8, more preferably above 9. Examples of materials of such abrasive grits include fused aluminum oxide, ceramic aluminum oxide, white fused aluminum oxide, heat treated aluminum oxide, silica, silicon carbide, green silicon carbide, alumina zirconia, diamond, ceria, cubic boron nitride, garnet, tripoli, and combinations thereof. The ceramic abrasive grit comprises alpha alumina and, optionally, a metal oxide modifier, such as magnesia, zirconia, zinc oxide, nickel oxide, hafnia, yttria, silica, iron oxide, titania, lanthanum oxide, ceria, neodynium oxide, and combinations thereof. The ceramic abrasive grits may also contain a surface coating.

The abrasive grit may also have a metal, organic or non-organic material surface coating. A surface coating can improve the adhesion between the abrasive grit and the binder in the coated abrasive disk article and can alter the abrading characteristic of the abrasive grit.

A binder precoat used to attach particles to a backing material can contain a single type of abrasive grit, two or more types of different abrasive grits, or at least one type of abrasive grit with at least one type of diluent material. Examples of materials for diluents include calcium carbonate, glass bubbles, glass beads, greystone, marble, gypsum, clay, $SiO_2$, $KBF_4$, $Na_2$, $SiF_6$, cryolite, organic bubbles, organic beads, wood particles, and the like.

The binder used in this invention can further comprise optional additives, such as, for example, fillers (including grinding aids), fibers, lubricants, wetting agents, surfactants, pigments, dyes, coupling agents, plasticizers, antistatic agents, and suspending agents. Examples of fillers suitable for this invention include wood pulp, vermiculite, and combinations thereof, metal carbonates, such as calcium carbonate, such as chalk, calcite, marl, travertine, marble, and limestone, calcium magnesium carbonate, sodium carbonate, magnesium carbonate; silica, such as amorphous silica, quarts, glass beads, glass bubbles, and glass fibers; silicates, such as talc, clays, feldspar, mica, calcium silicate, calcium metasilicate, sodium aluminosilicate, sodium silicate; metal sulfates, such as calcium sulfate, barium sulfate, sodium sulfate, aluminum sodium sulfate, aluminum sulfate; gypsum; vermiculite; wood flour; aluminum trihydrate; metal oxides, such as calcium oxide, aluminum oxide, titanium dioxide, and metal sulfites, such as calcium sulfite.

A grinding aid is defined as particulate material the addition of which to an abrasive article has a significant effect on the chemical and physical processes of abrading, thereby resulting in improved performance. Grinding aids are used to decrease the friction between the abrasive grits and the workpiece being abraded, prevent metal particles from becoming welded to the tops of the abrasive grits, decrease the temperature if the workpiece surface, and decrease the grinding forces and increases the useful life of the coated abrasive article. Examples of grinding aids include waxes, organic halide compounds, halide salts, and metals and their alloys. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metal include tin, lead, bismuth, cobalt, antimony, cadmium, iron, and titanium. Other grinding aids include sulfur, organic sulfur compounds, graphite, and metallic sulfides. A combination of different grinding aids may be used.

Antistatic agents include graphite, carbon black, conductive polymers, and vanadium oxide, and may be used on the abrasive article. The binder can optionally include water or an organic solvent.

For larger diameter fused particles which are made up of small abrasive grits, it is preferred that the particle be capable of breaking down during abrading. The selection and amount of the binder, abrasive grits, and optional additives will influence the breakdown characteristics of the particle.

When abrasive particles are premixed into a slow solidifying mixture or a binder precursor, the mixture is coated on the backing and then solidification is initiated by a variety of means including chemical reaction, UV cure, heating, and so on.

53. Abrasive Island Height Adjusting Belt Vibrator

Problem: When a vibrating bar is used to contact abrasive coated islands to create an equal height of each island, the bar surface in contact with the abrasive particles tends to wear away the contact surface of the bar. This wear changes the precision offset metering dimension of the bar which results in islands of greater height in the areas of greater bar wear. It is desired to control the height of the islands within 0.0001 inch (0.0025 mm) which allows very little wear to take place before some islands have unacceptable variations in height. Also, contamination of the vibrating bar with abrasive binder liquid is a potential process problem with height accuracy as some stray particles would tend to attach to the working surface of the bar.

Solution: A precision height metering bar can be constructed with an active center cylindrical island abrasive particle contact section which is of a slightly smaller diameter than the two outside support gage flanges located at both ends of the inside active height leveling center of the bar. The difference in elevation of the active center and the outer flanges represents the desired height of the leveled abrasive coated island as measured above the top surface of the backing that contacts the abrasive sheet backing. Then a band, or belt, of precision thickness hardened steel is routed around the inside diameter of the height metering bar to allow the surface of the belt to be in contact with the abrasive particles. A vibrating pivot bar will drive the abrasive particles deep into wetted contact with the wet abrasive binder adhesive to promote adhesion of the abrasive particles by the binder adhesive. The center active section of the vibrating bar which is covered by a wear resistant belt of a small thickness approximately 0.002 inches (0.051 mm) thick will also precisely control the height of each island as the outer flanges of the bar will contact non-abrasive coated portions of the annular ring of an abrasive disk or web. The belt would be held in a stationary position relative to the height gage bar until significant wear occurred on the hardened steel belt surface at the line-band area of contact with the abrasive particles. Then the belt would be advanced an incremental step equal to the line-band abrasive contact width to provide a fresh non-worn surface to contact the island particle tips. Secondary powder or mold release liquids can be added to the diamond or abrasive particle tops prior to flattening or after flattening to reduce the possibility of adhesive or abrasive particles from adhering to the vibrating bar and to move the abrasive particles with lower friction.

Figure 72:
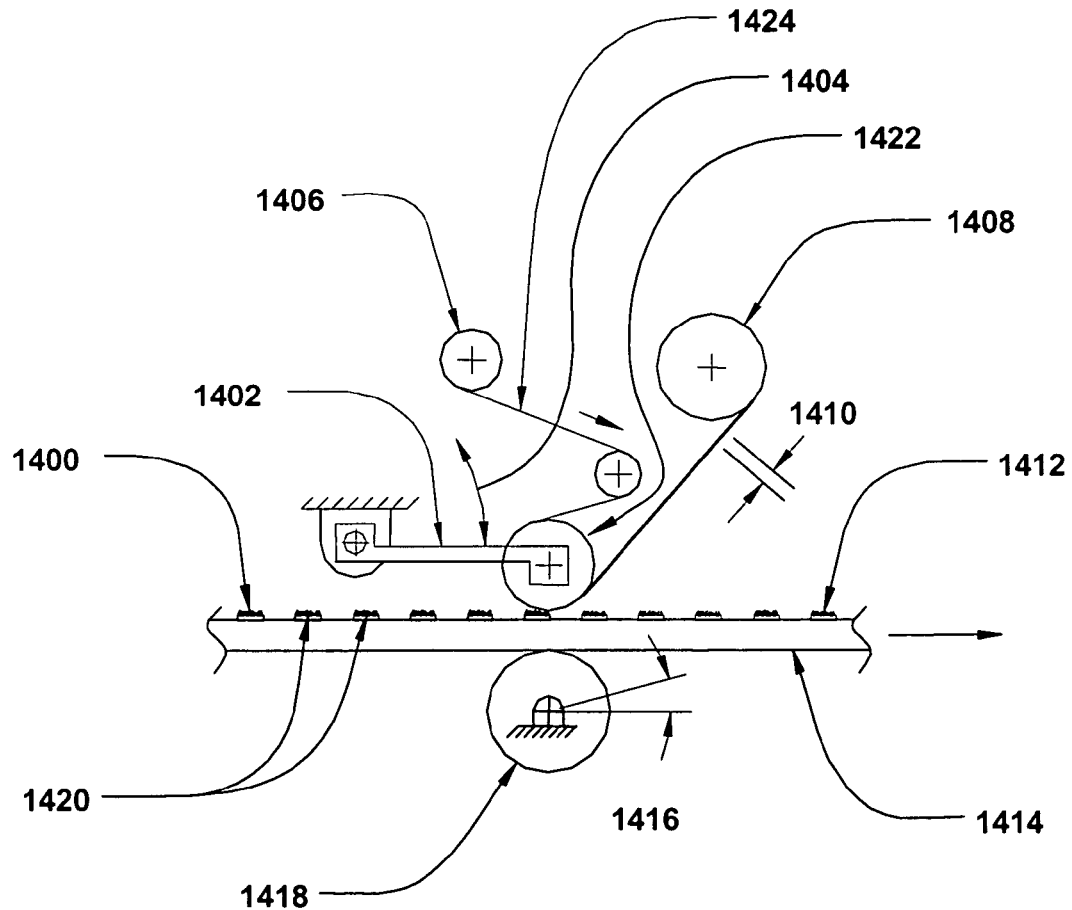
FIG. 72 shows a side view of a vibrating bar abrasive island height adjusting system.

FIG. 72 is a side view of a vibrating pivot bar used to level island coated abrasive particles. A backing support roll 1418 provides a support for an abrasive backing cylindrical sheet 1414 to which precision height adjusted islands 1412 are attached in an array pattern. Adhesive binder coated islands 1420 are coated with loose abrasive particles to form abrasive particle topped islands 1400 which are contacted with a particle leveling roll 1422 mounted on the free end of a pivot bar 1402 to which is applied an oscillating or vibration force 1404 which dives the roll 1422 into the non-cured binder surface of the abrasive topped island 1400 to precisely level all of the particles relative to the back side of the backing 1414 which is also on the surface of the support roll 1418. The support roll 1418 is advanced in angular increments 1416 and the roll metal belt 1424 is occasionally advanced in incremental distance 1410 to prevent an unworn belt surface to the abrasive particle coated island 1400 with the use of a belt winder 1408 and a belt unwind 1406.

Figure 73:
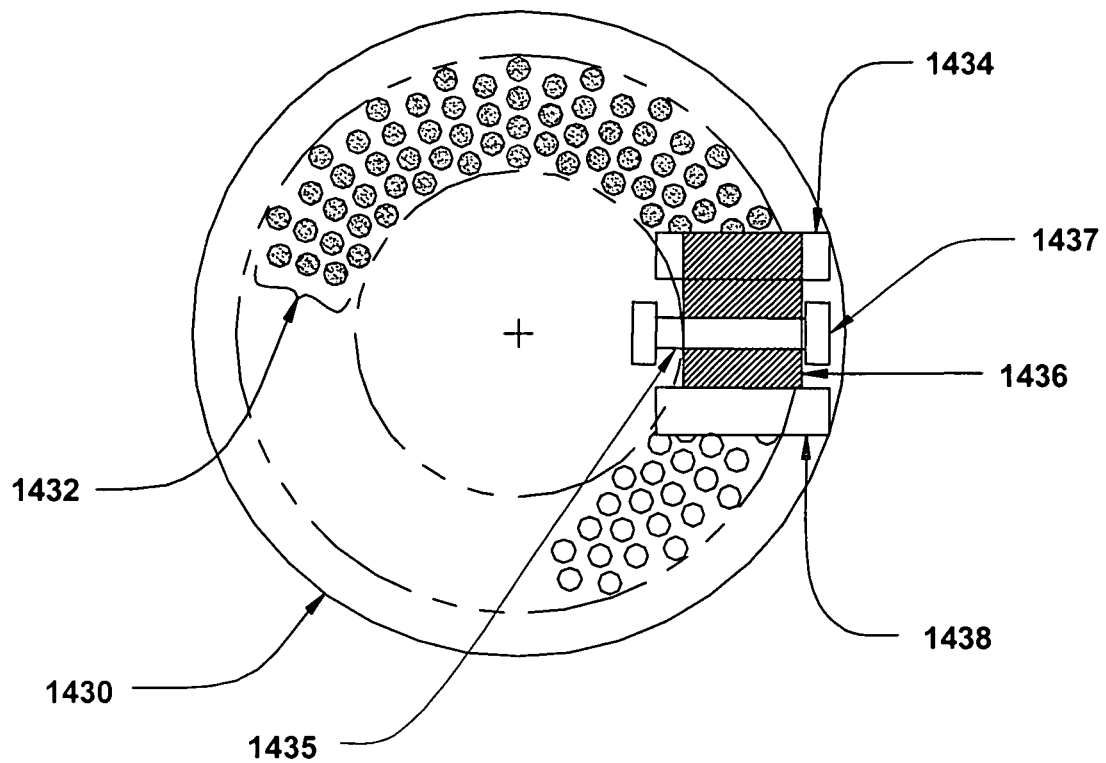
FIG. 73 is a top view of a belt island height leveling mechanism.

FIG. 73 is a top view of a belt island height leveling mechanism. A disk backing 1430 mounted on a rotating platen, not shown, would have an annular band of abrasive islands 1432 which have a liquid adhesive binder which has been top coated with loose abrasive particles. A vibrating belt 1436 contacts a flange sided height metering roll 1437 that is used to vibrationally level the abrasive particles would have a belt unwind roll 1438 and a belt winder 1434.

54. Abrasive Island Nipped Roll Height Adjuster

Problem: It is critical that the height of abrasive islands on a sheet of abrasive be controlled very precisely to be of uniform height for effective use of the abrasive material. This is required for sheets of abrasive, long strips of abrasive, abrasive belts and circular disks of abrasive with or without annular rings of abrasive. The thinner the coating of abrasive, and, the higher the abrasive surface speed, the more precise the required height of the islands. If the abrasive backing material is not precise in thickness, then the overall thickness of the abrasive island sheet needs to be precisely controlled as measured to the back side of the backing which contacts a rotating platen located on a grinding or lapping machine. In the case where an island foundation is formed prior to deposition of the abrasive particle media, the height of the island foundation must be controlled accurately to allow a thin topcoat of abrasive to be used effectively. The accuracy of commercial bearings used in an island height leveling mechanism device can affect the height or thickness of the abrasive islands or total sheet thickness.

Solution: A system can be used where two precisely ground nip rolls can be operated in rolling contact with each other where one roll has raised flanges on both ends of the roll. These flanges would be precisely ground with a raised offset from the center portion of the roll equal to the thickness of the island coated abrasive sheet or continuous web material. Liquid coating fluid islands are deposited on the sheet backing, the top surface of the island foundation material is partially cured or solidified and the sheet backing with the deposited island coated material is passed through the dual roll system which levels each island to the roll gap thickness. If the island foundation material is precisely leveled relative to the back side of the backing sheet, a thin layer of abrasive can be deposited on top of the islands by various coating means. Then, the abrasive island sheet can be finish leveled by a roll gap gaging system. The precision of the gap width is controlled by contact of one roll against the surface of the other roll and the accuracy of the roll bearings does not affect the accuracy of the island thickness metering and controlling station. Also, one or both rolls can be vibrated to enhance island abrasive leveling.

Figure 74:
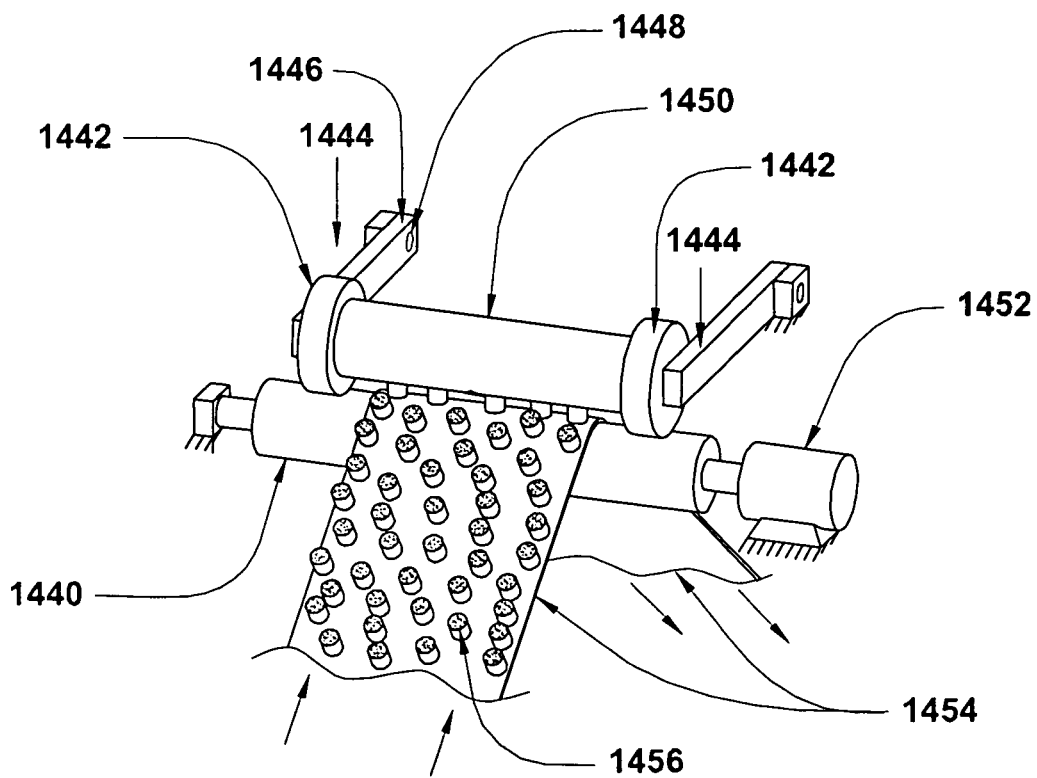
FIG. 74 is an orthographic view of an abrasive island roller height adjusting device.

FIG. 74 shows uncured fluid slurry coated abrasive islands 1456 on a web backing 1454 adjusted in height by a nip roll gaging system. A motor 1452 drives a bottom web pull roll 1440 which pulls the continuous web backing 1454 through the nip area formed by roll flanges 1442 of an upper roll 1450 which is held in contact with the lower roll 1440 by nip forces 1444 acting on a roll support pivot bar 1446 which has a fixed pivot point 1448.

Figure 75:
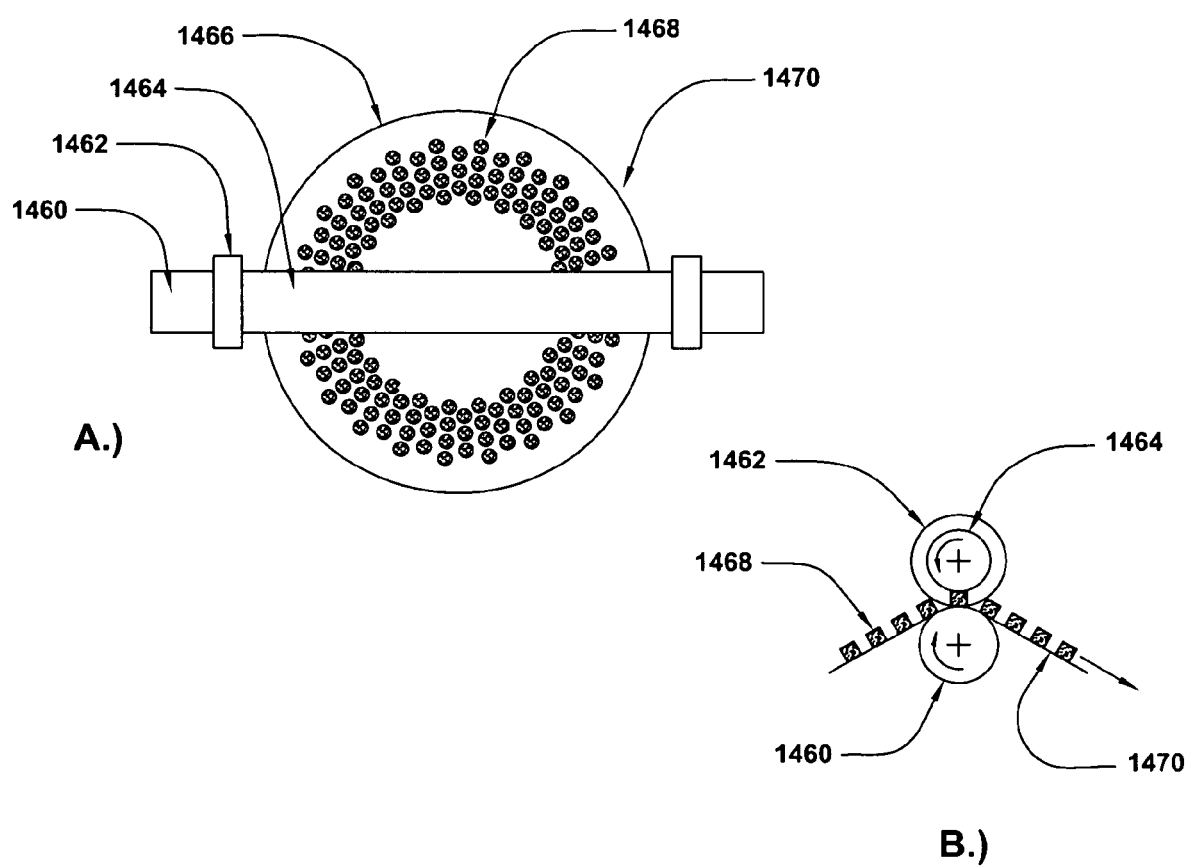
FIG. 75A and FIG. 75B are top view and side views respectively of a round abrasive disk processed in an island height gauge roller system.

FIG. 75A shows a top view of a complete round annular disk of abrasive positioned midway through an abrasive island height adjusting nipped roller system. The abrasive disk backing 1470 has an annular band of abrasive islands 1468 deposited on the surface of an abrasive disk circular sheet 1466. A top gage roll 1464 has roll flanges 1462 on each end which ride in contact with the surface of a bottom roll 1460 to form a precise roll gap through which all the fluid uncured abrasive islands 1468 pass as the disk 1466 is processed through the nip roll system. All islands 1468 are somewhat taller than the gap formed between the two rolls, 1460 and 1464 which results in all islands 1468 being adjusted to the same height.

FIG. 75B shows a cross-sectional view of the circular disk backing 1470 passed between the bottom roll 1460 and the top roll 1464 with the height nip gap equal in size to the thickness of the roll flanges 1462 which is the nominal height (total thickness including the backing 1470 thickness) of each island.

55. Abrasive Island Air Bearing Height Controller

Problem: It is necessary to provide a foundation base for each abrasive island, which has a precisely uniform height, so that a thin top coat of abrasive can be applied for use in high speed lapping or grinding. Island height adjusting mechanisms, which have physical contact with an abrasive circular disk sheet having an annular ring of abrasive coated islands, experience differential surface contact velocities at different radial positions on the disk backing when the platen supporting the abrasive disk is rotated. These differential contact velocities experienced by the inboard and outboard portions of the leveling mechanism in direct contact with the backing can tend to wrinkle the disk backing sheet as the support platen rotates. Any wrinkles will distort the backing and cause inaccuracies in the height of the individual islands being leveled.

Solution: An island height leveling mechanism can be constructed which has two air bearing support pads which contact the abrasive disk sheet both inboard of the annular abrasive ring and also outboard of the ring. It is desired to have an outer periphery band of the disk backing free of abrasive islands to better effect the vacuum hold-down of the disk to an abrasive grinding platen. Vacuum holes in the platen would be located under this outer peripheral edge of the backing which assures that the free edge of the backing is firmly attached to the platen. Also, as the vacuum holes do not lie directly under the abrasive, any backing distortion caused by the open vacuum holes is eliminated. The air bearing pads can be of different widths and lengths and also can be constructed from porous carbon or have discrete orifice air jet support holes. High pressure air, or other fluid, such as water, will maintain a precise small fluid gap between the bearing and the disk backing sheet. The fluid film pressure will counteract the weight of the mechanism assembly and the nominal fluid gap width, or thickness, can be adjusted by changing the fluid pressure. Increasing the fluid film pressure will increase the fluid gap and raise the mechanism assembly that allows the cutting height of the island leveling system to be changed by changing the fluid gap pressure. Oversized island foundations would be deposited on the backing disk and these islands would be reduced to the precise desired height by use of a vibrating bar or by a rotating cutting or grinding tool. The island foundations may be uncured or cured or partially cured or solidified during the time of the height leveling operation.

The same system can be used for height leveling the abrasive particles coated on the top surface of the islands by using a vibrating bar.

Figure 76:
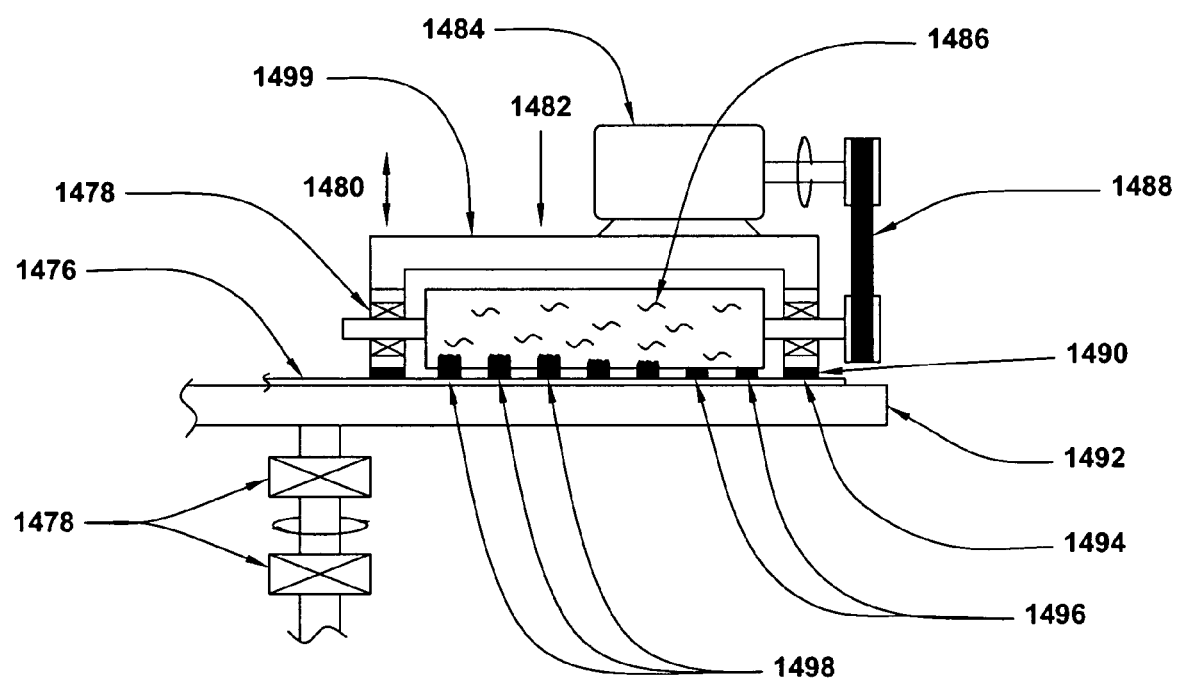
FIG. 76 is an end view of an island height adjusting rotary table station

FIG. 76 shows an end view of a cutter or grinding head 1486 reducing the height of tall islands 1498 by removing material from the top of the islands and creating shortened islands 1496 as an abrasive sheet backing 1476 is carried under the grind head 1486 by a rotating platen 1492 supported by platen shaft bearings 1478. A rotating motor 1484 uses a drive belt 1488 to rotate the cutting head 1486 which is supported by cutter shaft bearings 1478 mounted in a support frame 1499 to which steady pressure forces 1482 or vibratory forces 1480 are applied to hold the cutter 1486 against the islands 1498 and 1496. The support frame 1499 is held away from the surface of the abrasive sheet backing 1476 by air bearing pads 1490 which develop an air bearing film 1494 which allows the backing 1476 to pass without wrinkling or inducing friction forces to the frame 1499.

Figure 77:
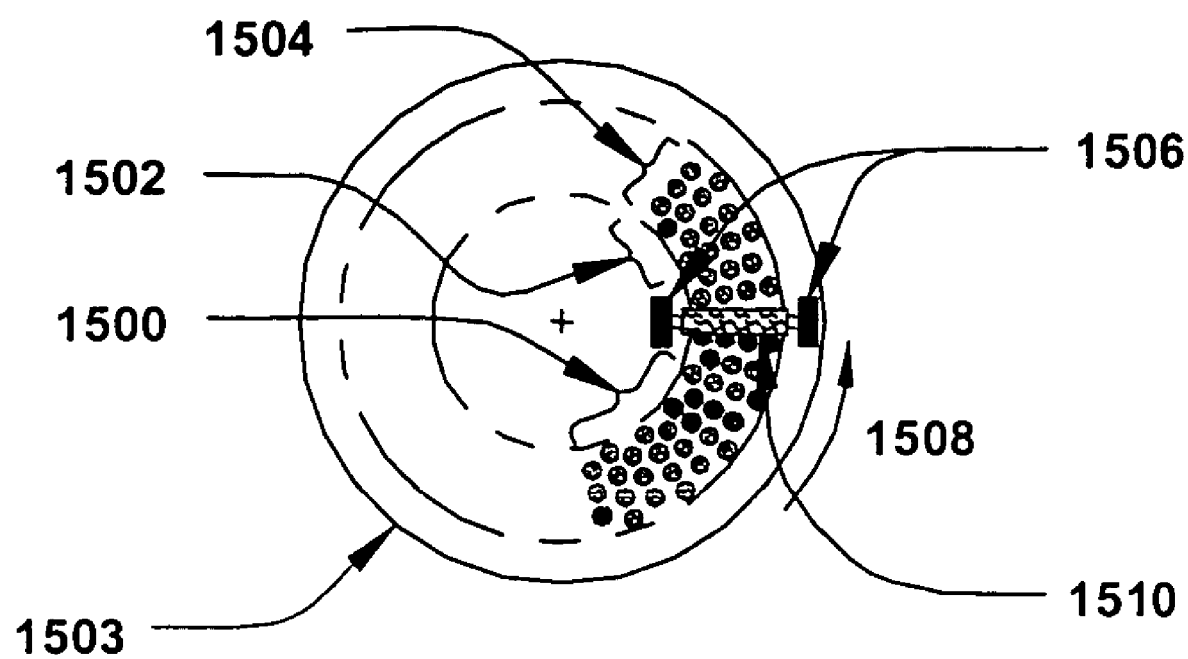
FIG. 77 is a top view of an island height adjusting rotary table station.

FIG. 77 is a top view of a circular abrasive disk 1503 rotating in direction 1508 having an annular ring of abrasive islands 1504 having a section of tall islands 1500 which are cut at the top surface to form shortened islands 1502 by a grinding or cutting head 1510 supported by fluid or air pads 1506 riding in fluid film contact with an outboard area of the abrasive backing annular ring of islands 1504.

56. Island Height Grinding System

Problem: It is important to precisely control the heights of abrasive coated annular rings of abrasive disks to be uniform in height relative to each other. Variations in the thickness of the abrasive backing material can result in some abrasive islands having a taller height relative to contact with a workpiece ground surface. Even if an abrasive disk supporting platen is perfectly flat, the areas of higher islands will contact the workpiece at high rotational speeds of the platen while the lower islands will not contact the workpiece at all. A precise thin coat of abrasive is applied to the island tops.

Solution: A disk sheet of thick plastic or metal backing having an annular band of abrasive island foundations can be print-coated, with a periodic or random pattern of the island base foundations. The island coated backing sheet can be mounted on a precisely flat platen having a significantly larger diameter than the disk backing. Air bearing pads would be mounted on both ends of a support mechanism structure frame which spans across the center of the abrasive disk and which can be fixtured to the platen by vacuum. The two air bearing support pads would contact the outboard edge of the platen that is not covered by the disk sheet. An island-top grinding head would be mounted on the mechanism support frame positioned directly above and centered on the annular band of disk islands. The grinder head would nominally be positioned on a centerline between the two air bearing pads. Rotation of the platen will cause the annular band of islands to progressively travel under the grinding head that is held in a stationary position relative to the rotating platen. Using a precision ground hard steel or carbide grinding head, which has a width greater than the radial width of the annular island band, assures that each island tip is ground off to the same height both along a circumferential path and also in a radial direction. This grinding mechanism creates an island height uniformity as measured from the top of the island to the bottom of the backing which reduces variations caused by changes in the thickness of the backing. All grinding thickness control of the islands is accomplished locally at any tangential position on the disk as the grinding contact line of the grinding wheel with the island tops is referenced to the corresponding tangential outboard flat surface of the platen. The air pad nearest to the grinder travels up and down with the platen surface and also raises or lowers the grinder head as the outer platen surface raises and lowers. The effect of variations of the slow, or fast, rotating platen surface variations on the opposite end of the support frame are diminished by the long length of the remote air bearing pad location. An alternative technique of grinding with a grinding head wider than the annular island band would be to move a narrow grind head radially as the platen is rotated.

Figure 78:
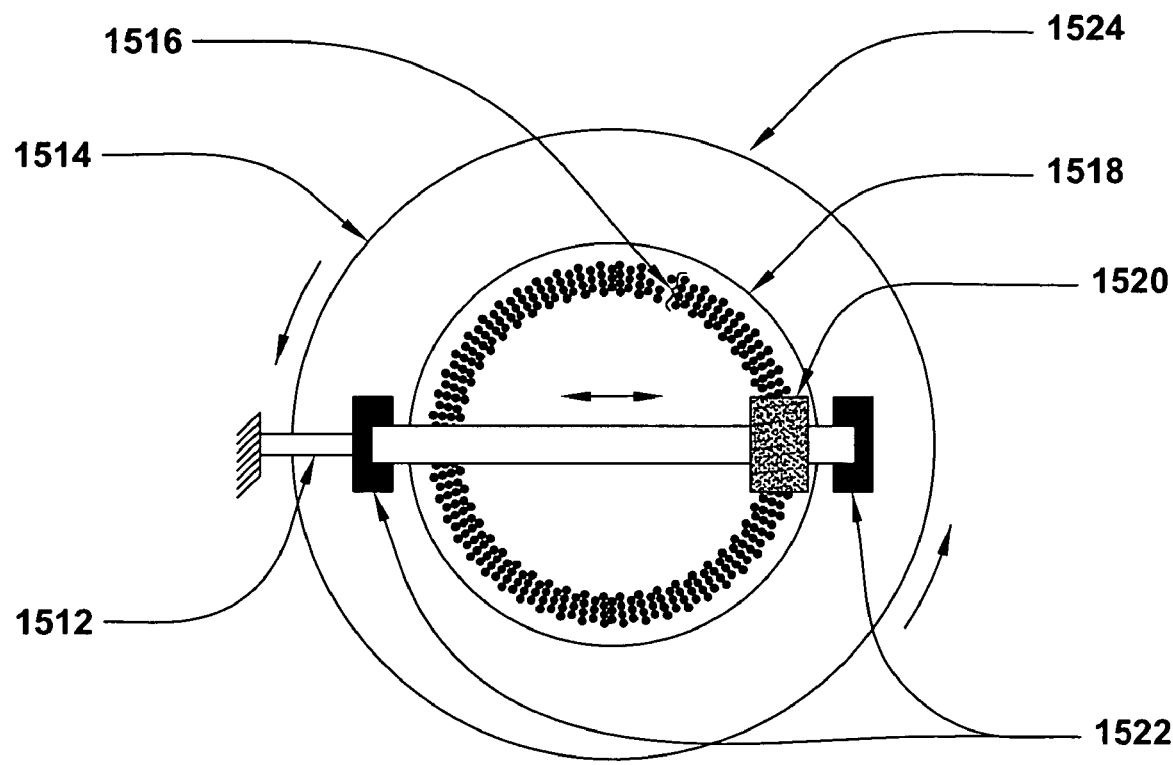
FIG. 78 shows the top view of circular island disks with the island foundations ground to a precise uniform height.

FIG. 78 shows a top view of an annular ring of abrasive island foundations 1516 deposited on an abrasive disk backing 1518 which is attached to a precision flat rotating platen 1514. A grinding head 1520 which spans the radial width of the annular ring of abrasive islands 1516 is supported on both ends by air pads 1522 which float on a pressurized air film located between the pads 1522 and the platen 1524. A stationary linkage arm 1512 having a single degree of freedom motion capability allows the grind head to float on the platen surface but restrains the grind head assembly from other motions, particularly to resist motion induced by the grinding contact forces.

57. Abrasive Island Grinder Slide System

Problem: Use of an air bearing pad which contacts a moving platen surface to establish the grind height of abrasive island foundation bases subjects the pad to both grind swarf and water. Water can contaminate the air bearing and reduce its lift support capability. Grinding swarf can enter the air bearing film gap causing wear and also result in lifting of the grind head mechanism during the grinding operation. The ability to sharpen a narrow grind wheel and adjust its grind height is important as the grinding wheel will wear over a period of time.

Solution: A water film bearing which is not sensitive to grinding water contamination and also which would not be as sensitive to grinding swarf can replace the air bearing. Also, an air orifice jet bearing can replace the porous carbon air bearing element. Another technique would be to use grinder mechanism support slide pads contacting stationary flat surfaces located outboard of the rotating disk platen on the machine frame structure. These slide pads would be aligned parallel with the platen surface and would be protected from both the swarf and water. A motor driven slide can be attached to the grinder spindle head pivot arms to provide radial movement of a narrow grinder wheel which would traverse the annular ring of island tops as the platen is rotated. The fluid bearing pads or linear roller bearing pads, would be mounted in-line through the center of the platen. They would also be adjustable in height elevation to control the level height of different thickness islands or different thickness backings. A number of different measuring or gauging techniques can be employed to obtain a height reference from the line contact of the grind wheel to the platen surface at that circumferential location. A single slide pad could be used at the platen side where the grinder is located, or two pads positioned 180 degrees apart can be used to bridge across the width of the platen. Also, a precision mechanical roller bearing slide could be used in place of the contact fluid pads. A motor driven transverse slide can be used to oscillate the narrow grinding wheel across the width of the annular band of islands. Simple threaded screw devices could be used to adjust the grind height of the abrasive grinding wheel, or for a sharpened mill cutter wheel. An abrasive grind wheel could be re-sharpened periodically while it is mounted on the machine device.

Figure 79:
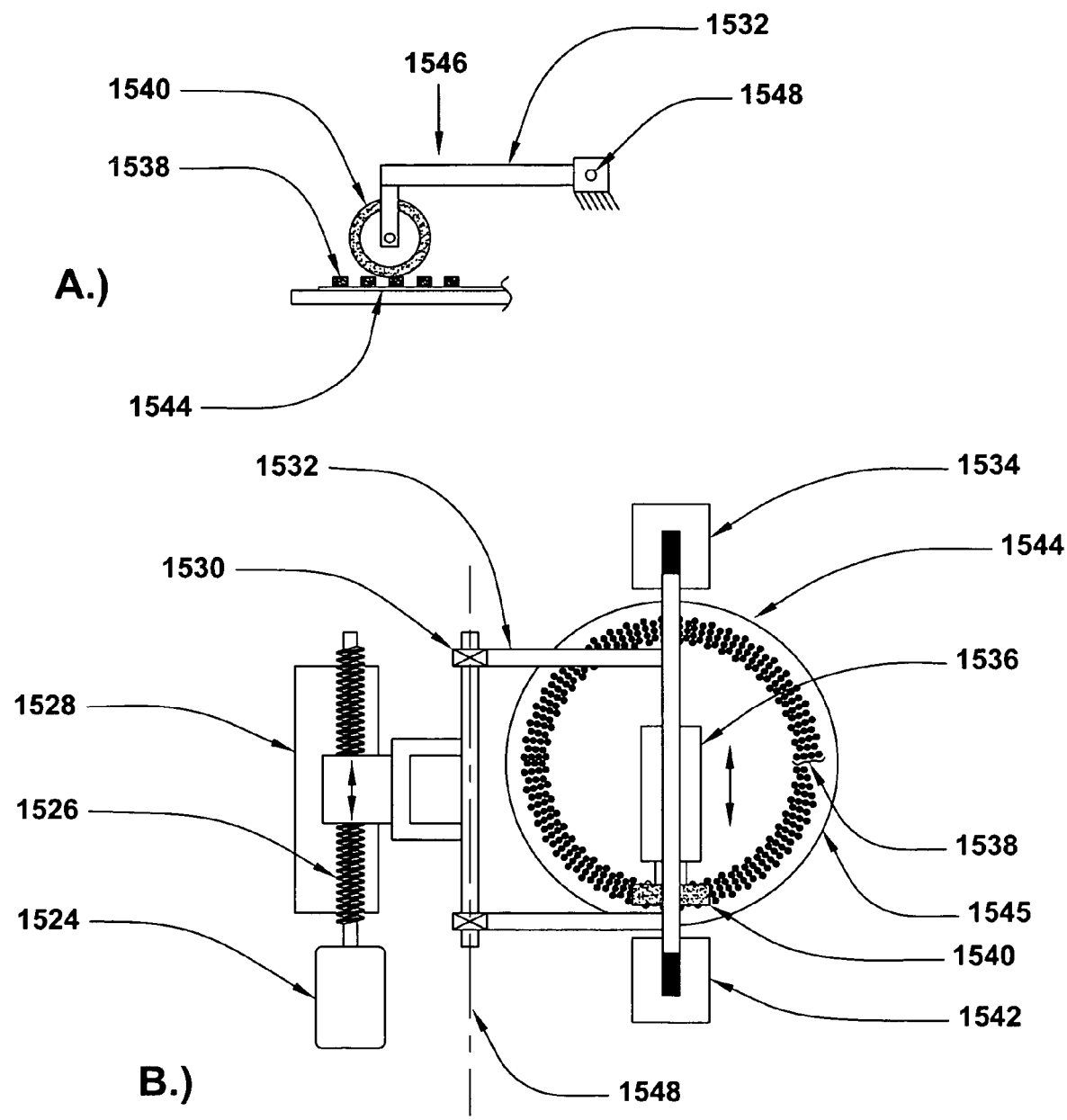
FIG. 79A and FIG. 79B show a side view and a top view respectively of a pivot arm traversing island height grinding mechanism.

FIGS. 79A and B show a side view and top view of a pivot arm traversing island height grinding mechanism. An abrasive grinding wheel 1540 is attached to a driven spindle 1536 which is attached to a pivot arm 1532 that is supported on both ends by roller bearing slides 1534 or fluid bearings 1542 which are mounted to a machine frame, not shown. The pivot arms 1532 are supported by arm bearings 1530 which pivot about a pivot axis 1548 and are mounted to a transverse slide assembly 1528 which is driven parallel to a rotating platen, not shown, to which is mounted the abrasive disk 1544 which has an annular ring of abrasive island foundation bases 1538 attached to an abrasive disk backing 1545. A motor 1524 can drive a slide screw 1526 to oscillate the abrasive wheel 1540 across the annular ring widths of abrasive islands 1538 with a nominal abrasive wheel contact force 1546 which acts against either a roller bearing slide 1534 or a fluid bearing slide 1542.

Figure 80:
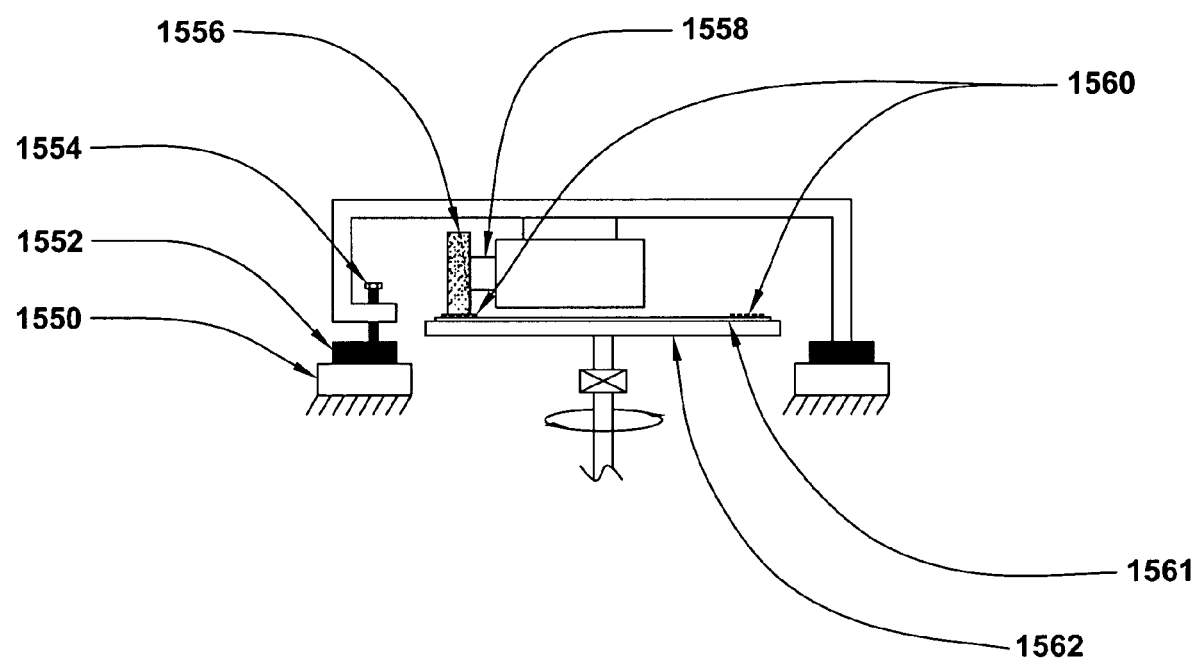
FIG. 80 is a side view of an abrasive wheel used to oscillate across the annular width of abrasive island bases to grind them to a precisely uniform height.

FIG. 80 shows island solidified foundation bases 1560 deposited on a disk backing 1561 which is attached to a rotating platen 1562 ground to a precisely uniform height by a rotating abrasive wheel 1556 mounted to a spindle 1558. The exact height at which the island base foundations 1560 are ground is controlled by a height adjusting screw 1554 which raises the abrasive wheel 1556 from a nominal level established by the traversing mechanical or fluid bearing slides 1552 which travel on the surface of machine frame, not shown, mounted slide bases 1550.

58. Annular Ring Printing of Abrasive Islands

Problem: Manufactured abrasive disk sheets with hundreds or thousands of discrete raised abrasive particle coated islands which are strongly bonded to a backing sheet should have uniform sized islands which are coated with liquid adhesive binders. Generally, a liquid binder is applied to the top of an island and loose abrasive particles or abrasive agglomerates are added to the binder. In some cases, the abrasive particles or abrasive agglomerates are premixed in the binder before application to the island tops. Liquid abrasive coating fluid used in a coating device must be replenished with the continuous flushing out of old fluid and replacing it with fresh new fluid to prevent buildup of the coating binder on the apparatus components.

Solution: A flat annular ring having many pins protruding from the bottom side can be lowered into a matching annular ring that has an individual liquid well for each pin. All of the wells would be uniformly filled with an unfilled organic binder adhesive or an abrasive particle filled binder adhesive. Each individual well would be filled to the top by use of a doctor blade coating application system. As the pins are withdrawn, each contains a drop of abrasive binder on its free end that is transferred to the abrasive backing sheet when the pins are lowered to come into contact with the sheet. A resilient sponge pad can be used below the backing to assure each pin has the same pressure contact with the backing. The pin end may have a number of configurations, including a coiled compression spring which would hold a large drop and which would create a binder fluid pumping action when the spring is compressed against the sheet backing. An alternative system would be to insert hollow pin needles into a vat of abrasive binder, withdraw a solid center pin enclosed in the hollow pin and which action pumps a drop into the hollow pin, and then slide the inside pin down to eject a drop onto the backing sheet. A complete disk could be printed in arc sections or could be completed in one step.

Figure 81:
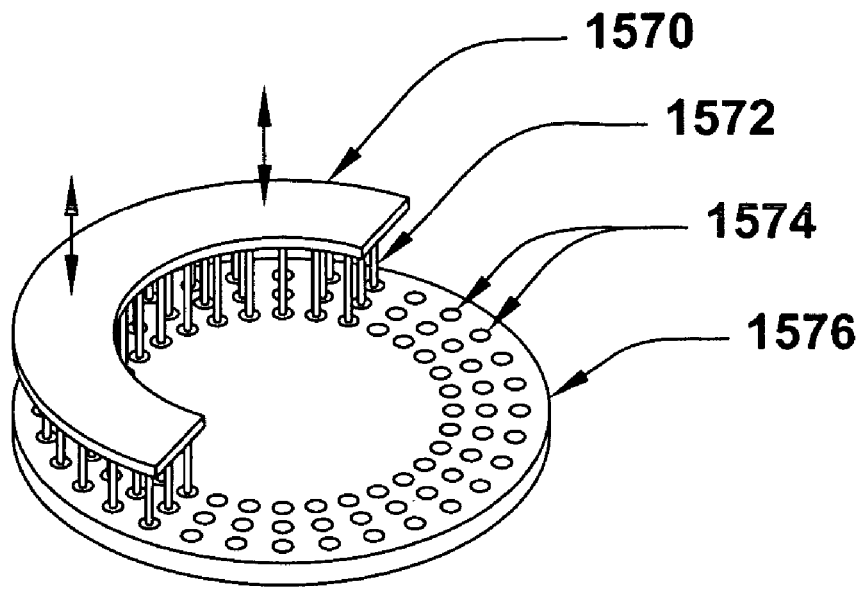
FIG. 81A and FIG. 81B are orthographic views of a print head used to deposit abrasive islands.
Figure 81:
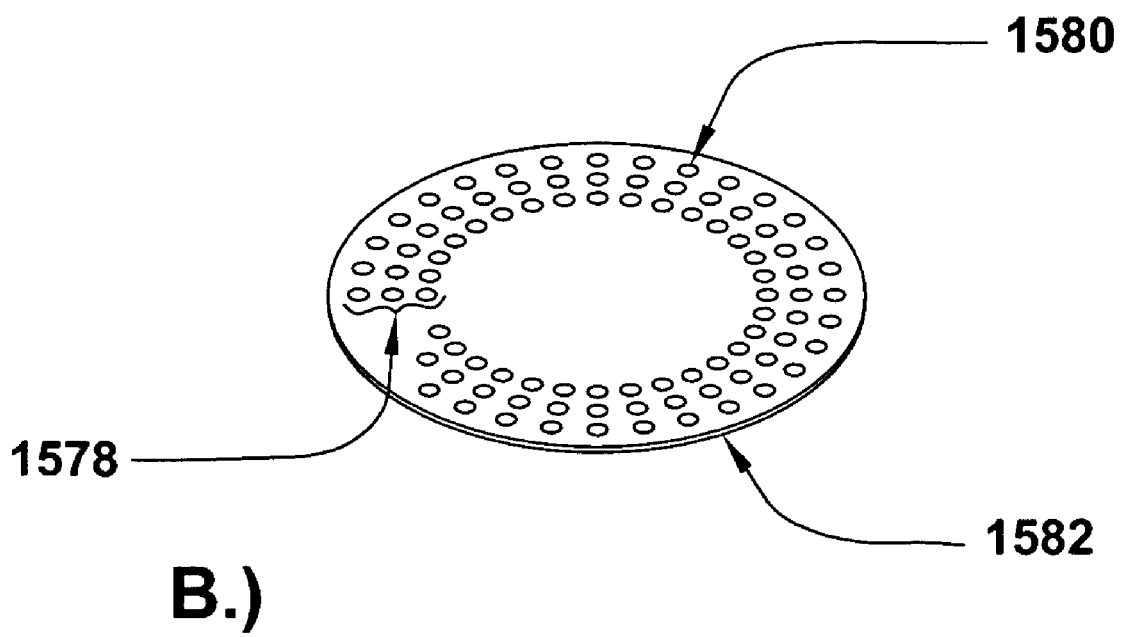

FIG. 81A shows a semicircle print head 1570 with individual pins 1572 positioned in an annular ring which picks up a binder liquid from a print head well 1576 which has individual well pockets 1574 positioned to match the pins of the print head 1570. The print head 1570 can be a semicircle configuration, as shown, or a smaller arc segment, or it can be a full circular section which would be used to print all the islands in one motion instead of using the smaller arc segment multiple. FIG. 81B shows an abrasive disk backing 1582 with an annular array of disk islands 1580 to form an annular abrasive island disk 1578.

Figure 82:
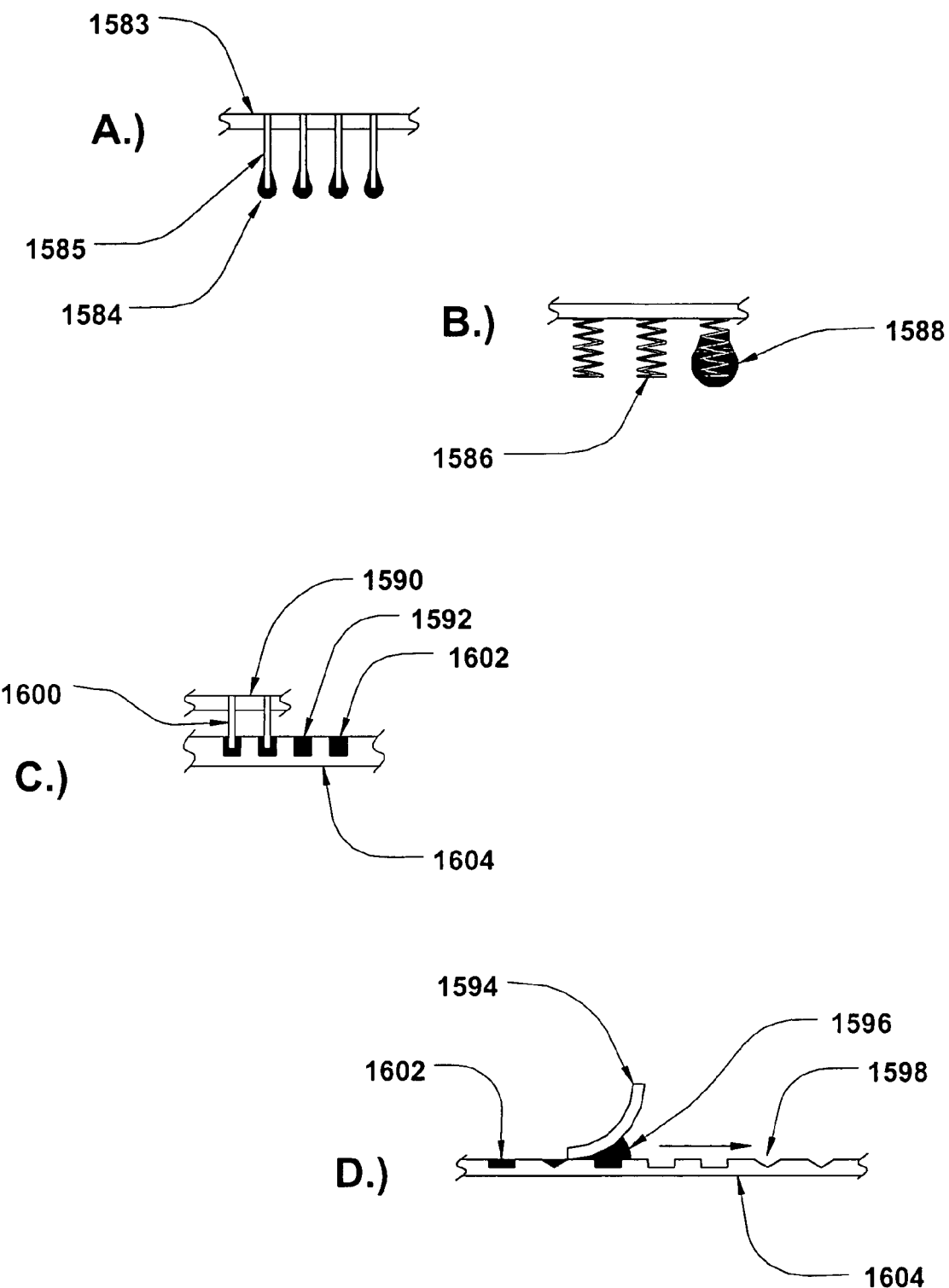
FIGS. 82A, B, C, and D are side views of print head and print well devices which are used to print abrasive islands.

FIG. 82A shows typical print head pins which have a slender pin shank 1585 which encourages the abrasive or adhesive binder coating drops 1584 to travel vertically down the vertical shank after removal of the pin rack 1583 from the fluid filled pin well to attach itself to the end of the pin in a single drop form. The drop 1584 is formed and stabilized at the end of the pin and the attachment stability and free-form shape of the drop is a function of the geometry of the end of the pin, the speed of the pin withdrawal from the well, and the theological characteristics of the binder fluid, including the viscosity, the chemical makeup and the filters used to formulate the binder. A flat bottom on a pin element will tend to hold a drop while a slender shank will tend to shed the drop which will move down the pin shank by gravity until it is held by the geometry of the pin bottom. The shape of the pin shank and the bottom are optimized for the specific binder fluid being deposited by the pin head.

FIG. 82B shows a coil spring 1586 configuration end of a pin which is used to increase the contact surface area of the pin head to retain a larger sized and larger circular diameter drop. Also, a self-cleaning action of the fluid filled spring 1588 end of the pin is induced by compressing the spring somewhat when contacting the abrasive backing due to the localized fluid pumping action of the compressed spring. FIG. 82C shows a pin holder rack 1590 where the pin 1600 ends are inserted into a well head 1604 having fluid filled well holes 1592 to wet the pin 1600 ends with binder fluid 1602. FIG. 82D shows a number of different configurations of shapes of the pin well holes, including a V-shaped hole 1598 which can be filled with binder fluid 1602 by use of a thin flexible doctor blade 1594 pushing a fluid bank 1596 of binder coating ahead of it to fill the holes and also to wipe the surface of the print well head 1604 clean as the doctor blade 1594 passes each well hole.

Figure 83:
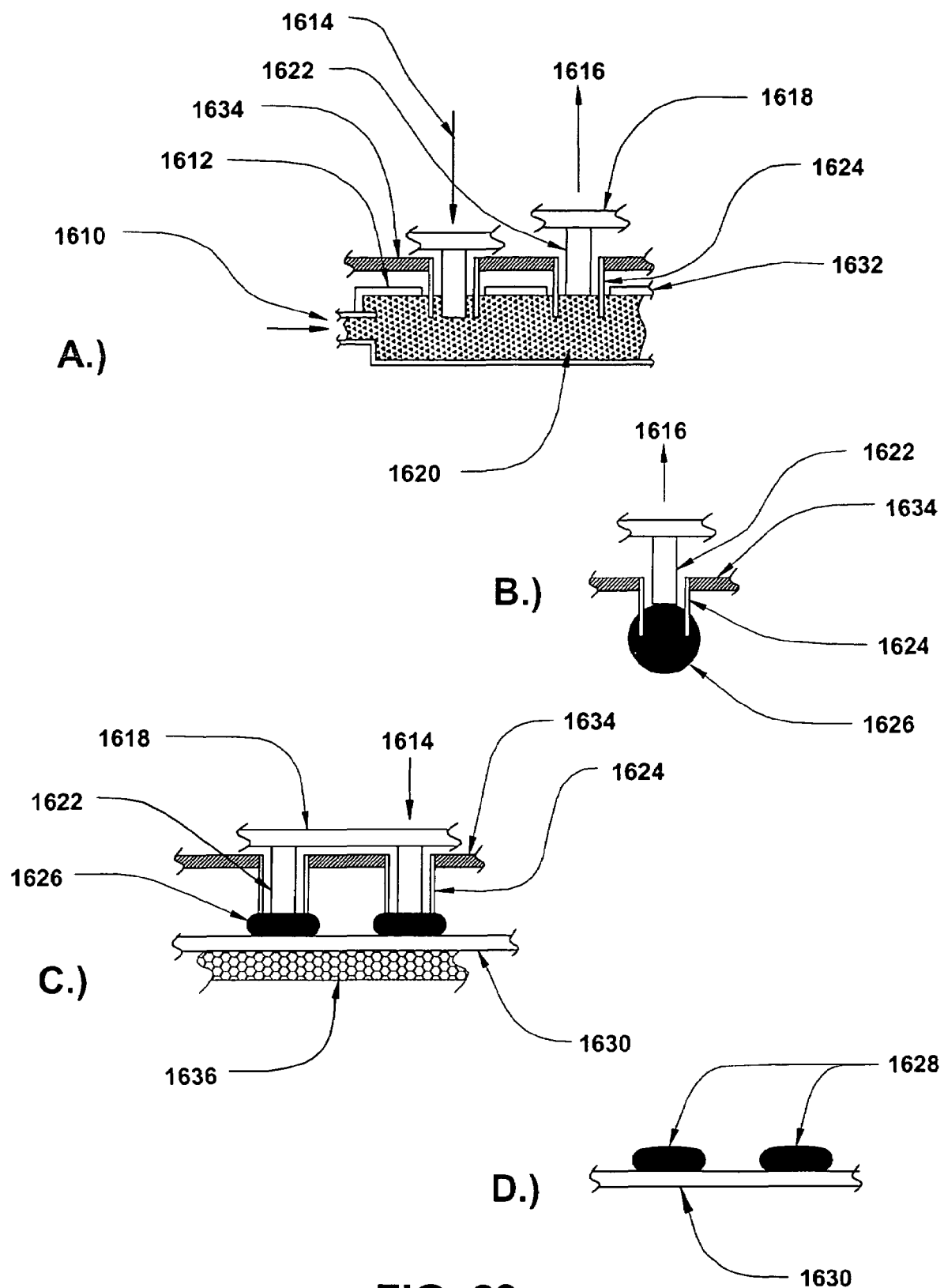
FIGS. 83A, B, C, and D are side views of different types of hollow needle pin head pins.

FIG. 83A shows a side view of a print well head 1632 which is filled with a liquid binder 1620 filled with abrasive particles from a side inlet 1610. A cover 1612 has individual access holes to allow the pins 1622 attached to the pin holder 1618 to penetrate into the binder fluid 1620 as shown in the pin-down position 1614 and then withdrawn upward as shown in the pin-up position 1616 while the hollow tubes 1624 held by the tube holder plate 1634 remains stationary. FIG. 83B shows a binder fluid drop 1626 attached to the end of the hollow tube 1624 which is attached to the tube holder 1634 with the pin 1622 in the up position 1616 which draws the drop up onto the hollow tube 1624. FIG. 83C shows the tube holder 1634 in a down position 1614 to bring the drop 1626 in contact with an abrasive sheet backing 1630 which is supported by a resilient pad 1636 which assures uniform contact of all pins 1622 with the backing 1630. The pin rack 1618 drives the pins downward within the hollow tube 1624 to force the drop 1626 flat against the backing 1630. FIG. 83D shows the flattened drops that are now raised elevation abrasive islands 1628 or abrasive island bases on a backing sheet 1630.

59. Continuous Dot Island Web Printing

Problem: Printing of dot islands of coating fluids on a continuous web must be accomplished with uniform dot sizes and a constant replenishment of new coating fluid with a steady flushing out of old fluid. It is necessary to print both 100 percent liquids and also particle filled liquids using abrasive particles or other filler materials. Raising the elevation of the primary drop coating away from the backing surface is desirable to utilize all of the drop coating materials, especially for expensive abrasives such as diamond. Also, a method is sought to apply an abrasive particle filled coating, or a non-filled coating to the top surface of existing islands attached to a web backing.

Solution: A pin wheel device can be used to continuously pick out drops of coating fluid from matching pocket wells in a well-wheel traveling in synchronism together. Each well hole would be of a precise size, filled level to the top surface of the wheel by use of a doctor blade leveling off fluid supplied by a fluid bank. The geometry of the well holes would be configured to allow penetration of the pin ends which would pick out drops of coating liquid. Web backing material would be brought in contact with the pin ends to effect a transfer of the coating drop from the pin end to the surface of the backing. Individual pins would continue to rotate back into contact with a new fluid well to both scrape away residual coating from the last well filling event and to pick up new coating material. A number of techniques can be used to enhance the pin contact with the backing, including the use of resilient material under the backing as it passes the pin wheel. Also, a compression spring can be used as a pin head end. Special islands with recessed cone shaped tops can be formed with different pin head designs with offsets from the backing. These cone cups can be filled in another similar operation with different binder materials such as abrasive particles mixed with other compounds such as hollow glass beads, vinyl plastic particles, clay, wood chips or powder. Many layers of materials may be built up progressively for special effects for abrasive grinding or lapping. There are many other applications which could utilize this type of pin-wheel drop coating of continuous web material where special chemical, light source or reaction effects could be sensed with other materials that are brought in contact with the drop islands. Many different types of coating fluids can be applied by this technique including water-based phenolics for use as one coating binder system for diamond abrasive sheet products.

Figure 84:
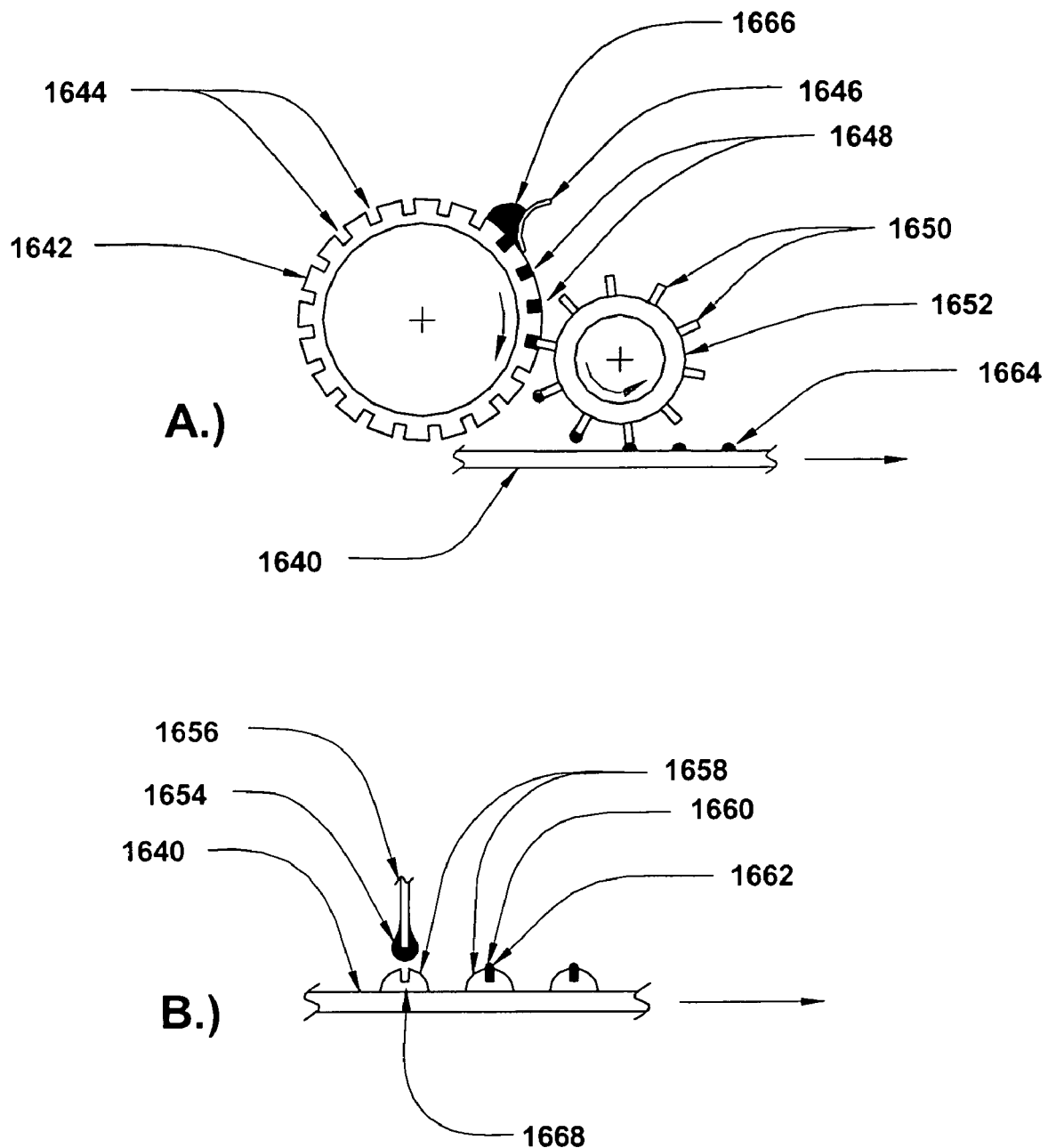
FIG. 84A and FIG. 84B show side views of a print wheel used for continuous printing of abrasive islands on a web.

FIG. 84A shows a pin wheel 1652 with radial pins 1650 that penetrate into coating binder fluid filled holes 1648 in a well wheel 1642 to transfer drops of binder to form islands 1664 on a web backing 1640. Empty well holes 1644 in the well wheel 1642 are filled by use of a doctor blade 1646 pushing a fluid binder coating bank 1666 into each hole 1644 as the well wheel 1642 rotates. FIG. 84B shows a continuous web backing 1640 traveling horizontally as pins 1656 deposit liquid abrasive particle filled binder 1662 coating drops 1654 into notch indentations 1668 formed on the tops of island foundations 1658 to create an abrasive particle top coated island 1660.

60. Spring Pin Drop Island Coater

Problem: Coating each raised island foundation on an annular band of islands deposited on a circular disk with a controlled sized drop of abrasive particle filled binder to create an annular abrasive disk must be accomplished with good abrasive particle bonding strength, resulting in proficient grinding performance and having sufficiently low production costs to have a cost competitive product. Abrasive coated islands can reduce or eliminate hydroplaning effects when grinding at high surface speeds of 5,000, or more, SFPM. Elimination of the excess coating fluid from the pin coater fluid well supply head which is surface leveled by a doctor blade and skived off by a scraper blade is particularly important at the position on the well head where the scraper blade motion is stopped.

Solution: A bent spring wire pin can be used to transfer drops of binder coating where contact of each pin head to the disk backing is assured by a small deflection of the spring when making drop application contact. A variety of different sized and shaped drop attachment ends can be mounted to the free end of the spring which would allow different diameter islands to be located in periodic or somewhat random patterns on the disk backing to prevent the occurrence of grind induced vibrations. Two types of raised island foundations can be used. One type of island would be solidified and rigid with a precise height and it may be flat topped or topped with identical indented surface patterns. The other type of island would be the use of a soft, partially cured island top into which the abrasive drop-coated pin body would be plunged into to provide an anchor indentation for improved adhesion of the abrasive particles to the island top surface. The coating well can have a variety of well shapes including individual pocket holes for each pin or an open V-shaped trench or a pocket trench. When a doctor blade is used to fill the fluid wells, it can be lifted from the well ring and the remaining excess coating fluid from the coating bank can be scraped off the well ring surface by a scraper blade which is also lifted off the surface prior to insertion of the pins into the wells. The primary path of the scrapper blade would be along the path of the annular array of well indentations which dimensionally match the location of the islands on the abrasive sheet backing. When the tangential motion of the scrapper blade is stopped, a wetted radial coating line will exist at the free end of the scrapper blade. This fluid line can also be scrapped off by a radial direction scrapping action of the blade at this position.

Figure 85:
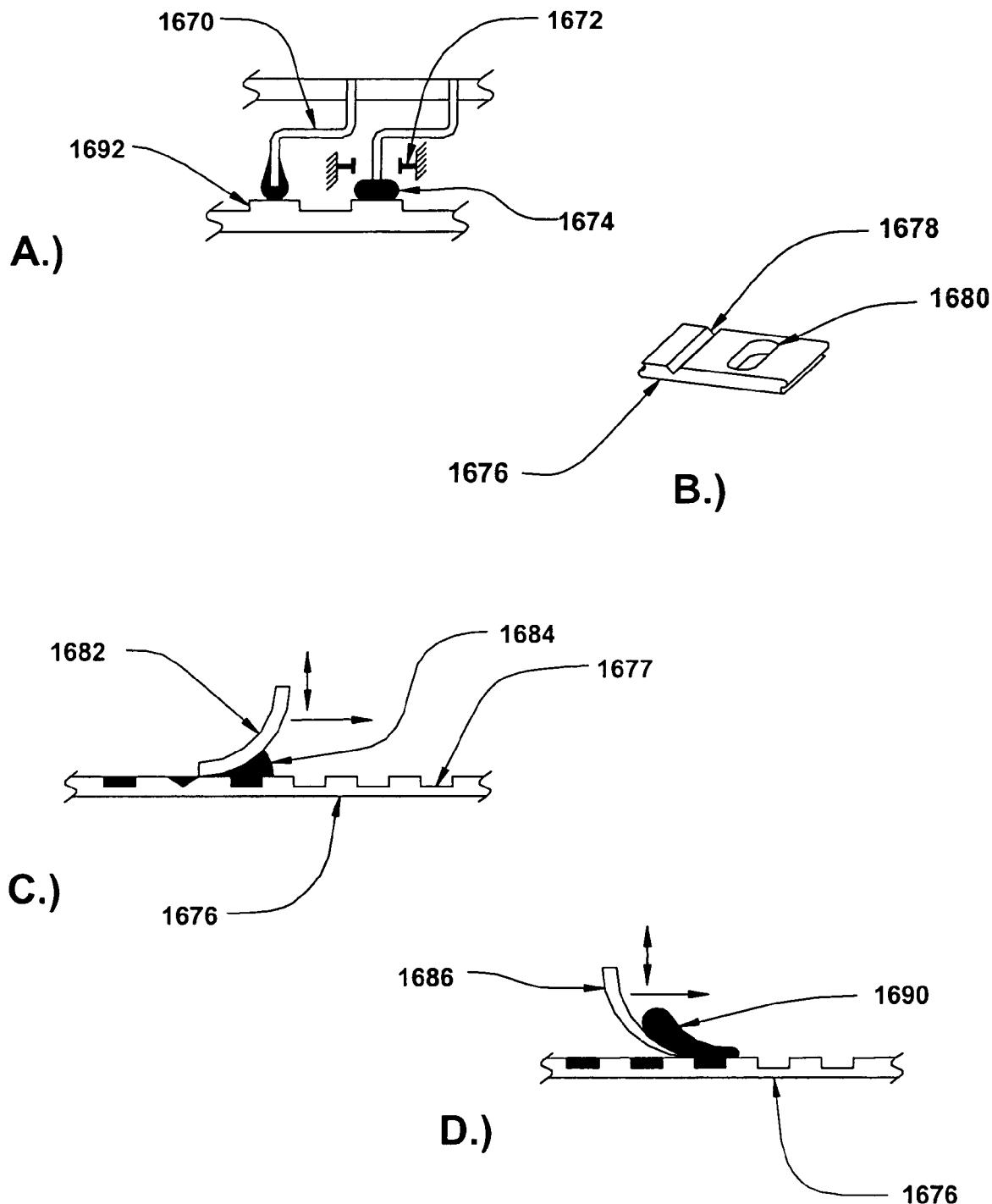
FIGS. 85A, B, C, and D show views of different types of pin end configurations and the effect on drop formation for transfer deposition.
Figure 86:
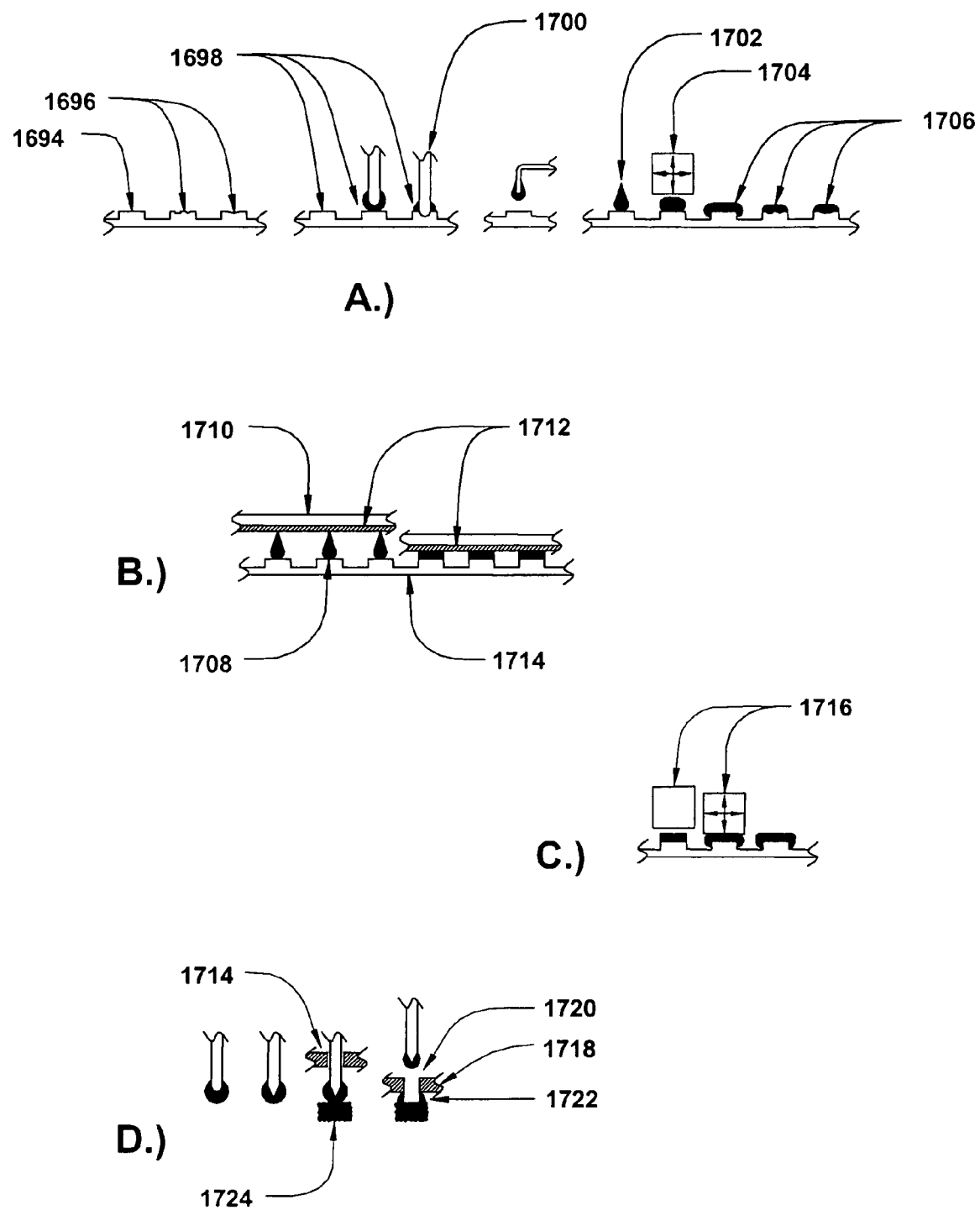
FIGS. 86A, B, C, and D show different steps in height adjusting abrasive slurry pin-head coated raised island tops.

FIG. 85A shows a side view of a spring wire 1670 pin with a drop size-collar 1672 depositing an abrasive particle filled coating drop 1674 on the top of a raised island foundation 1692. FIG. 85B shows a segment of a pin head fluid well 1676 with a v-trench 1678 well hole and also a pocket trench 1680 well hole. FIG. 85C shows a cross-sectional view of a pin head well 1676 which has different geometric shaped well holes 1677 filled with a moving flexible doctor blade 1682 which drives a coating bank of coating fluid 1684. Different hole filling action can be obtained by the use of different materials, sizes and thicknesses of the plastic or steel doctor blade 1682 which can be forced toward or away from the pin well 1676. FIG. 85D shows a scrapper blade 1686 used to remove excess coating fluid 1690 by positioning the blade 1686 toward and moving it along the surface of the well head 1676. FIG. 86A shows a solid island top flat surface 1694, and island indented top surface 1696 and a soft resilient top surface 1698 with a pin head pin 1700 penetrating the soft top during the disposition of an abrasive particle filled binder drop. A free form binder drop 1702 is shown as being processed flat by a vibrating head 1704 to result in the drop 1702 either extending over the island top edge, or conforming to an indented island top 1706 for improved abrasive coating adhesion to an island foundation as compared to simply coated on a level island surface 1694. FIG. 86B shows an island foundation 1708 having drops deposited on the surface which are flattened to a reference height by a flat plate 1710 which has a release liner covering 1712 made of silicone coated paper, wax paper or other materials which presses down against the islands which are attached to the abrasive sheet backing material 1714. FIG. 86C shows the final precision height of the abrasive particle filled binder that is established by use of a vibrating bar 1716 that is brought into contact with the drops. FIG. 86D shows different geometry shapes of pin ends including spherical, and coned shapes and which can be used in conjunction with a pin guard 1718 which has through holes 1720 which act to limit the size of the drop as the drop laden pin is withdrawn through the pin guard hole 1720 to remove excess binder fluid 1722. A minimum depth of coating fluid 1724 is maintained in the pin guard covered pin well.

61. Annular Ring Island Coating Font Sheet

Problem: It is desired to create discrete islands on a thin annular disk, to be top coated with abrasive particles or abrasive agglomerates, which islands are precise in height, have different geometric shapes and are inexpensive to manufacture. It is important to minimize excess binder resin coating fluid, when using a font, at the stop position where the rotation of the font has stopped under a resin supply dam device.

Solution: A thin precise thickness metal or plastic full circular disk or an annular disk can have a variety of hole shapes drilled or cut into it to form a pattern of holes in an annular band. This hole font sheet can be laid on a circular plastic or metal backing sheet which is mounted to a flat surface. A low-tack temporary bond adhesive can also be applied to one side of the font sheet to assure it stays flat to the backing during the coating process. Then an excess of island foundation forming coating structural adhesive liquid is applied to the annular hole band portion of the font sheet by a variety of techniques including spray coating or flood coating. The island foundation material may be sprayed into the desired thickness by rotating the backing under a fixed position spray nozzle. After application of the island foundation adhesive, the font sheet is removed and the islands either are height adjusted, or abrasive particles can be applied to the wet island abrasive binder to form abrasive coated islands. Abrasive particle binders or island foundations coatings can be based on a number of different organic or non-organic materials including phenolics, polyimides, epoxies, ceramics and so on. Many island shapes including circles, triangles, star shapes, and so on, can be formed with this font-based screen printing technique. If flood coating or a rolling bank is used to apply the coating material to the font holes, the excess coating can be removed without a stop event thick excess coating band by moving an angled doctor blade or angled scraper or flat roller or cone-shaped roller either inward or outward radially as the font sheet is rotated. This radial squeegee action, from a flexible roller or blades, would progressively drive the excess coating binder off the annular hole area, leaving each island site to be coating leveled with the top surface of the font sheet. Multiple coatings, with similar or smaller diameters can be applied to the island base or added as a top coat to the abrasive particles in sequential stops. Rollers may have soft open cell sponge surfaces such as a paint roller or they may have smooth hard or soft surfaces and have a variety of cone or reverse-cone shapes. Typical island foundations would be from 0.030 inch to 0.200 inches (0.76 mm to 5.1 mm) in diameter, be from 0.001 inch to 0.060 inch (0.025 to 1.52 mm) in height and would be top coated with a layer of abrasive particles or abrasive agglomerates which is from 0.0005 inch to 0.010 inch (0.0127 to 0.25 mm) in height measured above the island surface.

Figure 87:
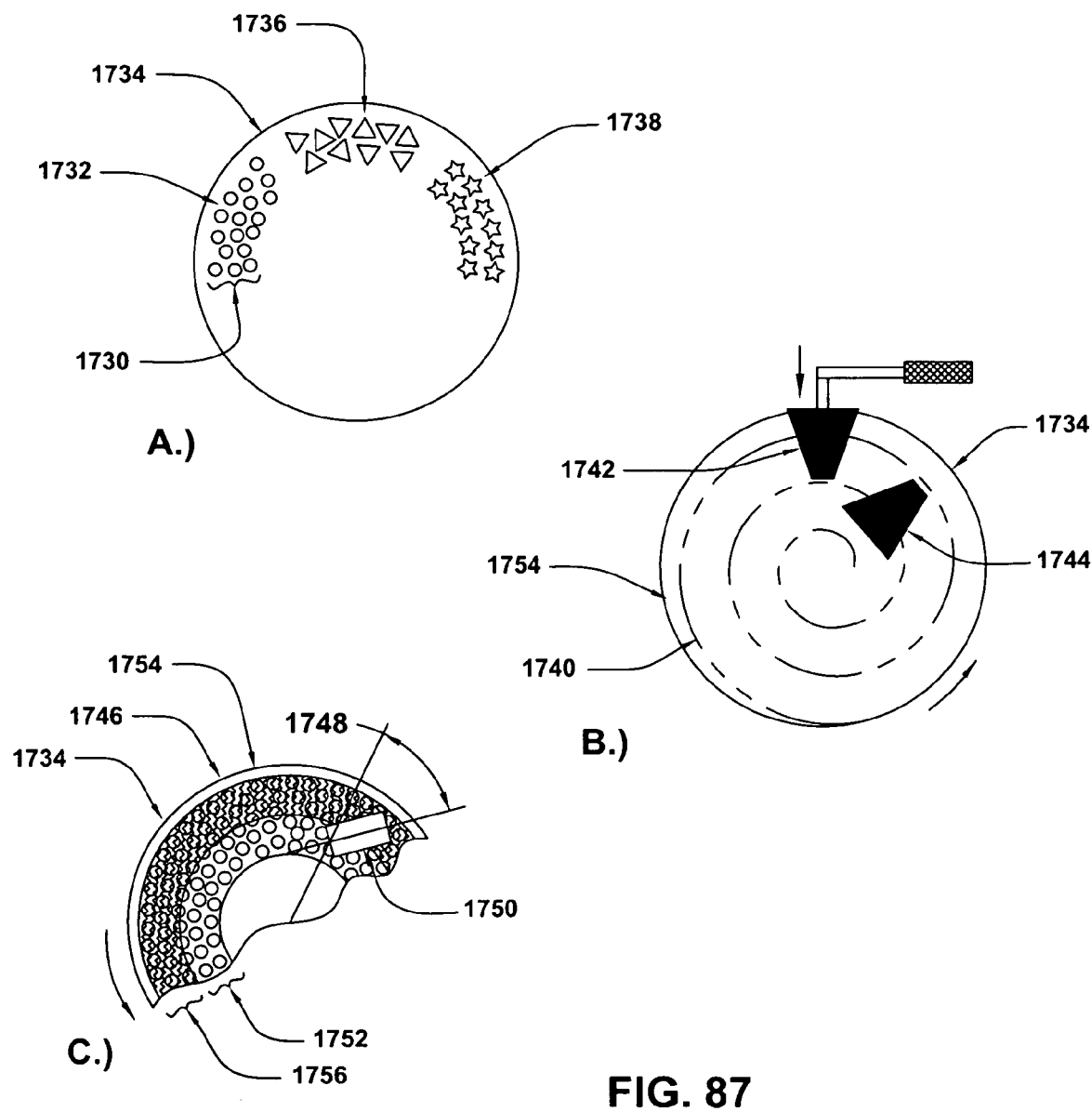
FIGS. 87A, B, and C show a print font sheet and methods of applying binder fluid to form abrasive islands.

FIG. 87A shows a print screen font sheet 1734 with a variety of island shaped holes cut into the font sheet 1734 including round holes 1732, triangular holes 1736 and star holes 1738 while other shapes such as radial bars and chevron shapes are not shown. These island holes are formed in an annular ring pattern 1730 in the font sheet 1734 to create an annular pattern of islands on a circular abrasive disk. FIG. 87B shows the font sheet 1734 laid on an abrasive disk backing 1754, and structural adhesive coating fluid is applied over the face of the sheet 1734. A reverse cone roller 1744 is used to progressively travel in a serpentine path 1740 and is used to progressively move the excess binder 1746 radially outward off the surface of the font sheet 1734. Binder coating penetrates each of the font sheet holes, 1732, 1736 or 1738 to replicate their geometry with a like shape of fluid on the surface of the abrasive disk backing 1754. A cone roller 1742 can also be used to move the excess binder fluid radially toward the inside area of the font sheet 1734 and which area does not have the island hole pattern. FIG. 87C shows excess binder 1746 moved off the outboard radial surface of the disk backing 1754 by a flat roller 1750 which runs at an angle 1748 set to drive the excess binder 1746 outward as the font sheet 1734 is rotated on a platen, not shown. A band area of the font sheet 1734 which has the excess binder squeegeed away 1752 is shown adjacent to an area radially positioned outward which still has an excess of binder 1756.

62. Metal Font Sheet for Screen Print Abrasive Disk

Problem: A durable and accurate font system is required to enable fonts to be used repetitively in manufacturing abrasive island grinding disks where more than one font can be used on the same abrasive disk. Abrasive islands tend to break loose from the disk backing during grinding. Abrasive particles have a wide range of size which makes it desirable to have a coating two or more particles deep for small abrasive particles of 0.1 micrometer to 2 micrometer diameter but to have a single or mono layer for particles 3 micrometers and larger.

Solution: A metal annular ring font can be used which has an island hole pattern which has a post, or other, registration device located to allow the font to be used, removed for cleaning and reinstalled on the disk backing holder to be used again. This type of registration system would allow other fonts to be used for multiple coatings or island composition buildups to be achieved. An iron or steel disk font can be mounted on top of a thin disk backing sheet and both can be mutually clamped to a magnetic flat chuck. Special preparation of the backing surface at the island base hole area, to promote better island adhesion, can be accomplished by sand blasting, abrasively scrubbing the island foundation location area in the presence of a solvent, acid etching or primer coating the backing disk surface through the font island holes. Metal font materials include precision thickness tempered spring steel and brass shim stock. Islands can be built up with successive layers to form straight walls, narrow topped cone-shaped walls, or even reverse cone shapes with the tops having a larger diameter than the base. Top-plated diamond particle islands can be produced by filling the font holes with a mixture of metal particles such as steel, copper, brass and others with a fluxing agent and particles of low temperature melting point metals such as tin or lead, and also a binding agent. After depositing the islands on thin sheets of metal disk backings made of brass shim stock or steel, the font would be removed and the island coated backing placed in a moderate temperature oven or furnace to mutually fuse the island components together and also to the backing. Then the disk could be spray coated with an electrical insulator such as epoxy and each island top ground to expose the metal foundation and diamond abrasive particles can be metal plated on top of these precise height islands. Another technique would be to use a thin metal or plastic font to coat the tops of islands with a binder paste filled with abrasive particles, snowplow off the top excess abrasive filled coating with an angled skive scraper blade, remove the font and height adjust vibrate the top of the island to drive the exposed surface of abrasive particles down into the depth of the island top coating. Diamond particles can be mixed with hollow glass beads to form a mixture with a bonding resin adhesive which can be used in the island top coating so the beads can break during abrading use to expose new diamond particles. The tops of islands can be coated with a slurry mixture of diamond particles, clays and other fine particles mixed with a resin binder to form small layers of coated diamonds on top of the islands for diamonds 3 micrometers and larger in diameter. Stacked layers of diamond particles can be used to provide coatings having coated abrasive layers that are 2 or 3 abrasive particles deep for particle sizes ranging from 0.1 micrometers to 3 micrometers in diameter.

63. Plated Abrasives on Raised Foundation Islands

Problem: Providing water lubrication to abrasive disks used with high speed 10,000 SFPM grinding or lapping results in hydroplaning of workpiece parts which prevents grinding workpieces to precision flatnesses of 1 to 2 Helium light bands (11.6 to 23.2 microinches or 0.3 to 0.5 micrometers). Breaking of raised island structures from the annular disk backing sheets or loosening of individual abrasive particles from the binder adhesive can result in scratches to the workpiece surfaces during abrading action.

Solution: Islands of abrasive particle coated raised structure foundations can raise the nominal 0.001 to 0.005-inch (0.025 to 0.127 mm) thick abrasive particle layer a minimum distance of 0.002 to 0.020 inches (0.051 to 0.51 mm) from the backing surface. Cooling water lubricant is free to move between the abrasive islands yet allow the abrasive particles to be in intimate contact with a workpiece during lapping. Metals including brass can be used as an abrasive disk backing. Island foundations can be built up by a variety of methods including plating, use of metal particle filled adhesives, flux soldering of powdered metals with use of an oven or furnace, by TIG or torch welding or brazing and by metal spray deposition or other techniques, or a combination of the described techniques. Island site locations, size of islands and depths or heights of island foundations can be easily established by use of plastic or metal, such as stainless steel, island-hole font sheets that can be temporarily attached to an abrasive disk backing. Iron based font sheets can be temporarily attached to the backing sheet by use of a magnetic chucking clamp systems where the backing sheet is flat-sandwiched between the iron font sheet and a flat magnetic chuck surface. Fonts may also be attached to a backing sheet with the use of release-type adhesives. After the font sheet flat surface is in close intimate proximity to the font sheet flat surface, island structural base foundations can be formed in the font sheet island shaped holes. The fonts may be left in place during the process of bonding the foundation base material to the backing sheet and solidifying the material. Also, the fonts can be separated from the backing sheet after the base foundation material has become bonded and the foundation material can then be fully solidified in a different process step. The foundation base material may be solidified by material drying action, resulting from the extraction of solvents, or the material may be cured by thermal or other energy sources to effect a partial or full solidification. Each island base may be left in its fused form, or, if desired, an electrically insulating thin coating can be applied to the backing surface over the islands and then, the insulating coating can be ground off the island top surfaces which results precisely controlled island heights. After this, a thin layer of abrasive particle coating can be applied to the top surface of the island either by use of adhesive binder systems or by metal plating the individual abrasive particles to the island tops. Also, a mixture of abrasive particles, metal particles, hollow glass spheres, flux and a soldering metal can be fused to the island top. The island base foundations may be plated in steps with different materials at each layer including the use of powdered metal. Other energy sources such as E-beam, radiation, ultra violet cure, ultrasonic welding, vibration, friction spin welding, explosive impact welding, and arc welding can all be used to solidify the bonding of the abrasive particles to the island tops.

64. Extended Coating of Abrasive Particle Disk Islands

Problem: Abrasive coated annular disks need to have islands of abrasives to minimize hydroplaning at high operation speeds due to use of water cooling during the grinding or lapping process. Also, the preferred form of coated diamond abrasive is to have a single or mono layer of abrasive particles or abrasive agglomerates on the surface of the disk so that each individual particle can be brought in contact with a flat workpiece surface. Use of a mono layer of abrasive particles or abrasive agglomerates prevents the top particles of a stacked layer of particles from shielding workpiece contact with adjacent or lower-level particles which lay deeper within the abrasive particle coating layer. Also, when the particles are stacked in layers, and the top layer becomes worn down partially, the worn top surface of the diamonds acts as a smooth bearing surface which prevents cutting or grinding action on the workpiece. The topmost sharp edges of all of the particles must lie precisely flat in a plane parallel to the bottom surface of the disk backing so that all of the typically small, 25 micrometer (or about 0.001 inch) diameter particles successfully contact the workpiece at 8,000 SFPM (surface feet per minute) speeds when using a precision flat surface platen system.

It is desired to have a mono layer of diamonds when using either an adhesive binder coating or a metal plated system where the abrasive particles are attached to a disk backing by entrapment with deposited metal.

Electroplated diamond particles sometimes lay on top of each other, to form an equivalent intermittent stacked particle layer, which prevents formation of the desired single or mono layer of abrasive particles. Premixing a slurry of abrasive particles or abrasive agglomerates with a binder adhesive prior to applying an abrasive particle coating to a backing disk tends to result in multiple stacked layers of abrasive particles or abrasive agglomerates particularly with very small particles of 6 micrometer or less diameters. Also, when a stacked layer of particles is worn away, the wear tends to create an uneven top surface of the abrasive unless special methods are employed in controlling how the workpiece is presented to contact the abrasive. If the workpiece overhangs the width of the abrasive coating, and if the workpiece is rotated in the same direction as the abrasive platen, or if the workpiece is oscillated across the abrasive surface, it is possible to create precisely uniform wear across the full top surface of the abrasive. These conditions of having non-uniform wear of thick coats of abrasive slurries having stacked layers of individual abrasive particles or abrasive agglomerates results in the non-flat uneven wear of workpiece surfaces. The uneven workpiece wear occurs for both abrasive sheet articles having the thick abrasive slurry coated directly on the flat surface of a backing sheet or for articles where the thick abrasive slurry is coated on the top surface of raised island structures. As the diamond abrasive particles or abrasive agglomerates are typically 0.001 inch in diameter (for a 25 micrometer particle) the removal of some discrete areas of abrasive particles or abrasive agglomerates can lower the abrasive in that region by a factor of ten times the desired 0.0001 inch (0.0025 mm) flatness of the abrasive surface. Variations in the abrasive surface due to uneven wear can translate into significant uneven wear of the workpiece surface. Applying a wet coating of liquid adhesive binder, followed by a dusting or sprinkling of a top coating of loose abrasive particles or abrasive agglomerates, with an option of another top sizing coat of liquid adhesive, does not necessarily produce an abrasive disk with a precisely flat top surface. This problem of non-flat or uneven abrasive coating can occur as the typical coater head device may not have a total thickness measurement reference to allow the height of the abrasive to be accurately controlled. Uneven surface coating can occur especially when solvent-based coatings are used as these coatings shrink in size when they are dried or cured. Most of these coater processes are used to coat continuous webs and do not address discrete coating of the top surfaces of abrasive islands. A further source of height, thickness, or flatness error occurs because abrasive particles or abrasive agglomerates vary in shape and size, even when screened, so they are difficult to level. Wetting of diamond particles by an adhesive binder for good bonding can be a problem because of the smoothness of the surface of individual particles and the surface energy characteristics of the diamond material. A liquid slurry mixture of abrasive particles or abrasive agglomerates mixed with a polymer resin can be applied to a flexible transfer sheet and this sheet can be pressed against the surface of a array of raised islands that are attached to a backing sheet, where the liquid slurry is in pressure contact with the surfaces of uncoated raised island structures, to wet-coat each island surface with the transfer sheet abrasive slurry. Then the transfer sheet can be separated from the raised islands with the result that at least 5% or up to 50% or more of the thickness of the slurry originally coated on the transfer sheet is transferred to the island structure surfaces. New abrasive slurry can be spread as a even coating on the original transfer sheet and this transfer sheet then used again to coat another array pattern of raised island structures with abrasive slurry. Different coating process variables including, but not limited to, the viscosity of the slurry, the thickness of the slurry and the speed at which the transfer sheet is separated from the raised islands can be optimized to provide a consistent abrasive particle slurry thickness being coated on the top surface of the island structures.

Adhesive binders must be cured within a time period suitable for the abrasive disk manufacturing process. The binder must be sufficiently strong to resist all the different types of forces or stresses present in the grinding action, and also, must remain dimensionally stable at the localized high temperatures created by grinding friction.

Uneven wear of vibrating height leveling bars used for controlling the thickness of the abrasive sheet can affect the precise height level of abrasive either radially on an annular disk or tangentially along the surface of the abrasive disk.

The plated diamond system of raised island abrasive media that is presently available from Company® in the flexible metal product line which is available either in belts, sheet form, or round disks have a number of disadvantages for smooth flat grinding or polishing of workpieces. One source of problems is that the diamond particles are plated to the top surface of a woven mat of loose plastic or cloth strands that have plated formed circular islands that have diamond particles plated to the island tops. This mat sheet of a mesh material is then attached to a backing web sheet by a laminating process. The resulting laminated abrasive sheet product is not flat with uniform height of the abrasive particles and the product does not have rigid islands that have a strong structure bond to a backing sheet.

Solution: An annular pattern of raised island foundations can be formed on a backing sheet. This annular group of islands can be ground precisely flat on the tops with all islands having the same precise height from the bottom surface of the backing. These islands can be formed with straight walls or they can also be formed with tapered walls having a wide base and a more narrow top to provide better structural support to the islands and improved water lubricant flow around the island top. A number of methods can be used to transfer a liquid adhesive coating to the top surface of the independent islands. Various coating techniques include transfer of coating liquid from a transfer sheet that has been coated as an intermediary step for transfer of a portion of the coating liquid to the top surfaces of the islands. Also, a rotogravure roll can be used to top coat the islands. For transfer sheet coating, a relatively thick coating of up to 100 percent solids adhesive can be applied to the whole top surface of a web coating transfer sheet of web material, which is larger in surface size dimensions than the outer diameter of the annular ring of raised abrasive islands formed on the circular disk backing. This adhesive coated transfer sheet can be brought in contact with the annular ring of island tops so as to transfer about 50 percent of the wet adhesive binder uniquely to the tops of the islands but not to the island valleys. Abrasive particles or abrasive agglomerates can be separately prepared for transfer to the adhesive coated islands. Here, a thin layer of diamond or other abrasive particles or abrasive agglomerates are uniformly distributed within a shallow grooved annular shape cut out of a container plate with the use of a scrapper blade, and if necessary, a spreader blade. The top adhesive wetted surface of the annular patterned islands backing disk sheet is then brought into contact with the loose abrasive particles or abrasive agglomerates laying flat in the shallow annular grooved container plate. Then the adhesive binder surface of the island tops is lightly pressed into the loose abrasive particles or abrasive agglomerates to transfer a single layer of abrasive particles or abrasive agglomerates to the adhesive binder wetted island tops. Then after the diamonds or other abrasive particles are coated on the island tops, the disk is processed by use of a vibrating bar to precisely height-level the exposed tops of each particle. The abrasive particles can be driven sufficiently deep into the adhesive binder by vibration to level the exposed particle tops to the same uniform height from the bottom of the backing sheet. It is desired that the particles are not driven deep enough into the binder adhesive to contact the backing surface which results in a uniform thickness of the abrasive particle top surfaces. A low shrink or zero shrink abrasive particle adhesive binder is one of many binder adhesives which can be used. The binders can be cured or solidified by a variety of methods including a two-part chemical polymerization reaction, UV cure, heat cure, E-beam (electron beam) or a laser cure to fixture each particle at its precise height. Other particles or powders can be added to the diamonds or other abrasive particles in the trench to act as spacers between the diamond particles when they are brought in contact with the wet island adhesive binder.

Use of a vibrating bar to level the tops of the abrasive particles can have a wide range of frequencies and motion excursion amplitudes. Low frequencies of 20, 60 and 120 cycles per second (Hertz) can be used with excursions of 0.0001 to 0.005 inches (0.0025 0.127 mm), as long as the bar always has a constant lower position, to drive each particle level with the other adjacent particles. Frequencies can be much higher, up to 20,000 Hertz, where the corresponding amplitudes can be only 0.0001 inch (0.0025 mm) or less. Use of a hardened steel bar with precisely ground diameters can be used as a vibration leveling bar where the rounded leading edge of the round bar can aid in leveling extra high abrasive particles. Even though the total excursion of the vibrating bar is less than the variation in excess height of the individual particles, which are being leveled, the rounded bar would aid in bringing all particles to a nominal equal height. Wear on the bar due to moving contact with the abrasive particles can be easily compensated for by occasionally rotating the round bar a small angular increment so that a new unused surface of the bar is in contact position with the abrasive particles.

Special techniques can be employed to promote adhesion of the binder to the diamond particles and also to improve adhesion to the island top surface areas. The surface energy of the particles can be increased and the adhesion characteristics of the particles and the adhesion characteristics of the island top surfaces can be enhanced by methods or processes including: sand blasting; coating the individual abrasive particles; applying sputtered metal coatings to the abrasive particles; using flame treatments, corona treatments and surfactant coatings, and so on. The backing surface may be conditioned by various techniques to promote adhesion of the raised island foundation material to the backing surface.

A number of different binder adhesives can be used including ultraviolet (UV) or light-cure acrylics, polyimides, light-cure cyanoacrylates, acrylics, cyanoacrylates, polyurethanes, one part or two part epoxies, different types of phenolics and two part acrylics. A preferred binder is methyl ethyl keytone (MEK) solvent diluted phenolics. The abrasive particles would be fixtured stable to the backing adhesive binder in their precise height position soon after the leveling action of the vibrating bar by partially solidifying or curing the binder before the particles can move relative to their precision height controlled position. Subsequently, the binder can be fully cured or solidified for full strength over a longer period of time and the binder cure can be enhanced with the use of light sources, lasers, heat, electron beam energy and moisture reactions.

Creating island type abrasive media by this technique of forming island base foundations, making the island tops flat, applying an adhesive binder, attaching loose abrasive particles, precisely height leveling the particles and effecting a strong stable cure of the binder with perhaps the addition of top sizing coats of materials results in the production of very precise grinding media. These thin, flexible abrasive sheets, disks and belts would have superior grinding and polishing capability compared to existing abrasive products and they would be less expensive than existing commercial products. These disk articles can have large fixed abrasive disk nominal diameter sizes, have annular ring abrasive shapes and these products can also be formed as continuous web abrasive material which can later be fabricated into continuous belts.

The coatings and the powder type of abrasive particles as described here, of which many have been traditionally used in the abrasive industry to surface-coat flat web materials or to manufactures abrasive articles, can also be applied in a sequence of process steps to form raised island structures that are attached to flexible backing sheets or to coat the top flat surfaces of raised island structures with abrasive particles or abrasive agglomerates. The particles are attached to the island flat top surfaces. The island flat surface coating process steps or procedures may be similar to old traditional procedures or the procedures described may be new and unique or they may be a combination of old and new procedures. Various binder systems and coating techniques that are commonly used in the abrasives industry for surface coating non-raised island flexible web backing material are described in some detail to provide information that can readily be utilized to provide similar abrasive particle coatings on the surfaces of raised islands that are attached to flexible backing materials. The backing materials, the resin binders and the backing surface preparations or the backing surface conditioning that are commonly used for the manufacture of abrasive articles can also be used for backings, to prepare backing sheets for the attachment of island foundation materials and to form the flat topped raised island foundation structures that are attached to the backings.

All polymers, including epoxy and phenolics, that are used as abrasive particle or island structure binders area are cured with a time-and-temperature relationship. With phenolics, if they are cured at a low temperature, they will stay soft for a period of time ranging from minutes to hours or even to days.

Generally, a thin 10 micrometer binder coating is applied to a web backing and the mineral powder, which is larger than 10 micrometers in diameter, is applied or "powdered" onto the wet binder surface. These abrasive particles are too large to sink into the coating binder and become fully covered. Generally, the particles are only adhesively wetted on their bottom surface, especially for particles which are 30 micrometers or larger in diameter. It is possible to apply a very thick binder coating and then partially cure it to form a thin skin on the top surface which is sufficiently strong to support abrasive mineral particles so they do not sink into the depth of the binder and the particles become completely enveloped in the binder coating.

In order to achieve the full highest temperature glass transition temperature of a binder, the binder must be cured at a high enough temperature that exceeds the maximum rated binder material glass transition temperature. When a binder coating has been heated to a low, or modest, temperature sufficient to have developed enough strength to support the abrasive particles, then, when the temperature is raised somewhat higher, the coating will tend to become liquid or wet and it will adhesively bond the abrasive particles to the backing surface. After this, the particle coated backing can be given additional curing to further strengthen the bond between the particles and the backing. At this "B stage" of intermediate cure, a size coat can be applied to the article and it will tend to create a superior strength, more integral bond with the make coat as compared to applying a size coat to a fully cured make coated abrasive sheet. The size coat will also tend to bridge across from particle to particle and thus provide the primary structural support of a particle to withstand forces generated by grinding action.

The abrasive disk can be clamped in place during oven high temperature curing to prevent shrinkage distortion of the backing by use of a vacuum platen. Likewise, a deposited island continuous web can be held under web span tension in an oven to prevent longitudinal relaxation of the backing due to elevated temperatures which may approach the glass transition temperature of the web backing material.

The make coat would typically be about 10 micrometers thick. The abrasive particles would typically be from 0.1 to 150 micrometers in diameter. The diamond, cubic boron nitride, silicone carbide or aluminum oxide abrasive particle coatings would be either coated as a particle powder onto a wet make-coat binder resin or the abrasive particles or abrasive agglomerates would be coated as a abrasive and resin slurry mixture coating. The abrasive coatings can be applied directly onto a flat web backing (for the production of traditional abrasive articles) or the abrasive coatings can be applied onto the top flat surfaces of raised islands that are attached to a flexible backing material. Various other powdered materials can be used as a filler material along with the abrasive particles in the slurry mixture to assure a minimum gap exists between individual abrasive particles after the slurry has been coated. The slurry coating of abrasive particles or abrasive agglomerates can be applied as a single binder coat as a make coat, or alternatively, a size coat of binder resin can be subsequently applied over the make coat to structurally reinforce the bond of the individual abrasive particles or abrasive agglomerates to the backing or to the island top surfaces.

The size coat may contain particles of clay or feldspar additives that have traditionally been used as grinding or lapping action aids. Another candidate mineral additive, that can be used in place of feldspar, is minsper. A super size coating can also be applied over the size coating to prevent the buildup of grinding swarf, to improve lubrication qualities of the abrasive surface, and perform other functions. These lubricants can include fluorine based additives or silicone based additives. The web backing may include polyester, PET (polyethylene teraphalate). If desired, a Kapton based material may be used to provide a backing with a high glass transition temperature which can be used for processing an abrasive disk or belt article for high temperature, above 150 up to 200 degrees C., cures without experiencing shrinkage or backing sheet relaxation shrinkage which would unevenly change the backing and abrasive disk thickness.

A number of different types of binders may be used with or in place of solvent based phenolics which is preferred as binder to provide good abrasive particle bonding strength for attaching particles to backings or island top surfaces. Water based phenolics can be used, but more care must be exercised in the binder formulation process and the binder cure process to achieve the same particle bond strength and bond durability characteristics that is achieved when using solvent based phenolics. Often an effective binder solvent such as MEK (methyl ethyl ketone) is used. Other non-phenolic polymers may be used as abrasive binders. For example, a polymide binder system can be used as an abrasive particle binder system. Many of the different solvent based polymide adhesive binders were developed for application in adhesively bonding metal or composite articles strongly together for use in high speed aircraft which experience high temperature operational environments. Some solvents which can be used for polymide binders include DMAE or dimethylacetamide, NMP, N-methylpkrrolidone, which is a preferred solvent, and DMSO, Dimethylsulfoxide.

Many different types of binders can be used to either attach abrasive particles or abrasive agglomerates to the top surface of the raised islands or they can be used to form the foundations of the raised islands.

Primer coatings can be applied to the smooth surface of backing films or to island top surfaces to increase adhesion of the make coat or other coatings to the backing. Also other chemicals, or dry mechanical or solvent wetted mechanical abrasion treatments or corona treatment, UV treatment, electron beam treatment, or flame treatment, may be applied to a smooth backing to enhance the adhesion of raised island foundation materials.

Different dye coloring agents can be added to either the pre-size, make or size coat binders to allow an easy method of classifying or sorting the different raised island abrasive articles. Each color could represent a specific nominal size of abrasive particle or type of abrasive particle. For instance, a light pink coloring agent could be used for a 30 micrometer diameter diamond abrasive and a light brown color could be used for a 50 micrometer diamond disk.

Figure 88:
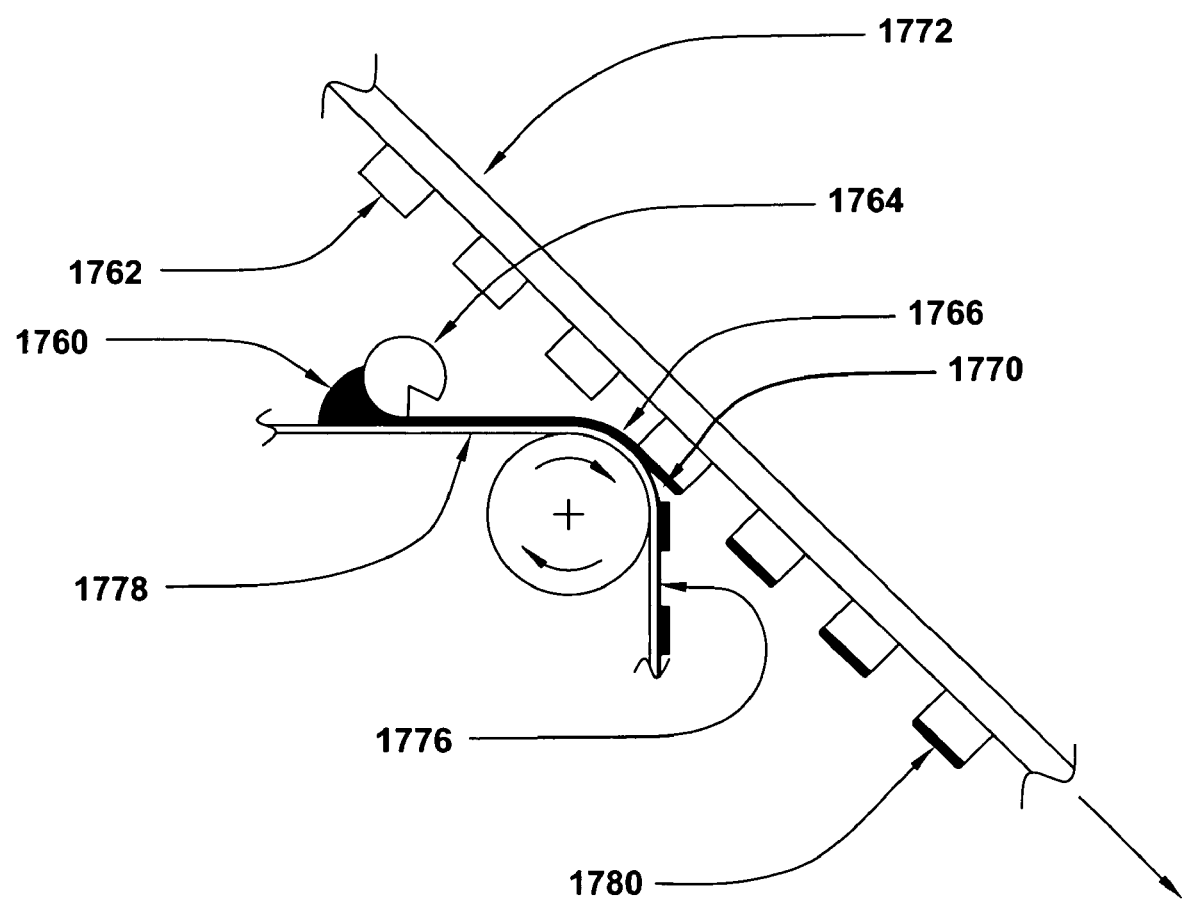
FIG. 88 shows transfer coating of adhesive binder to island foundations on a disk or belt.
Figure 89:
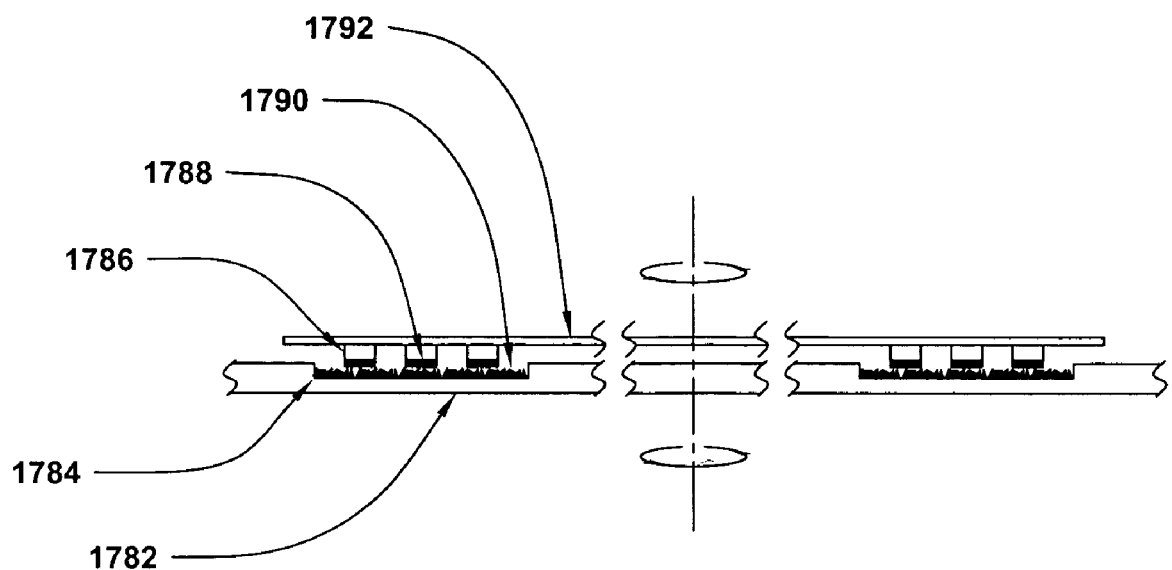
FIGS. 89A and B show an adhesive binder coated island disk top coated with abrasive particles.
Figure 89:
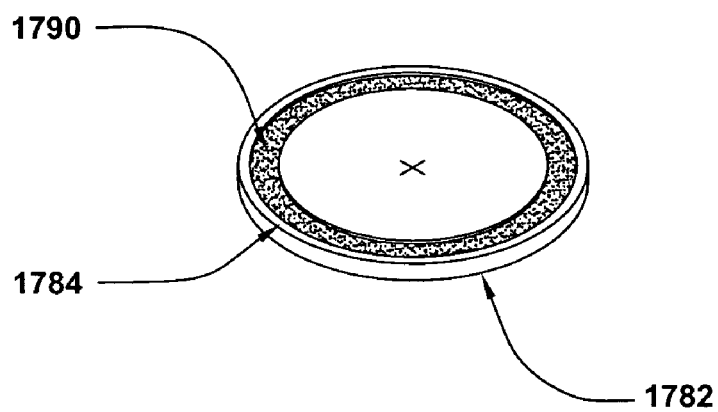
Figure 90:
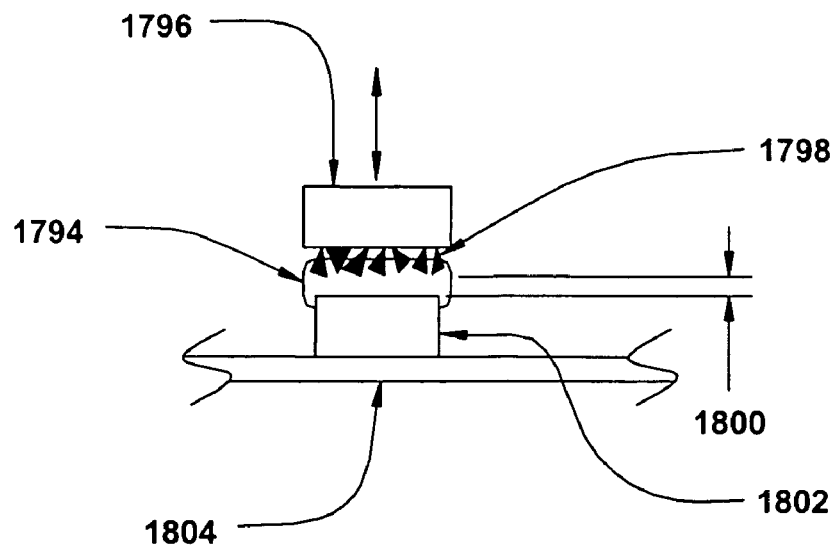
FIG. 90 shows abrasive particles gage depth set into adhesive binder by use of a vibrating bar.

FIG. 88 is a side view of an adhesive binder coating being applied to the top surface of abrasive island foundations by a transfer coating system where the binder is first coated on a web sheet and then a portion of this coating is transferred to the island tops. A notch-bar knife 1764 meters binder fluid from a fluid coating bank 1760 to apply a layer of adhesive binder 1766 to a transfer web backing 1778 which can either be a discrete disk or a continuous web. The adhesive layer splits at the region 1770 after making contact with the island tops with the result that approximately 50 percent of the binder coating 1776 remains on the transfer web 1778 and 50 percent of the binder 1766 becomes bonded to the island top 1762 which is attached to the abrasive backing sheet 1772. FIG. 89A shows a sheet of abrasive backing 1792 which has islands 1786 coated with a wet adhesive 1788 which is turned upside down so that the adhesive 1788 is pressed into a shallow trench 1784 which contains loose abrasive particles 1790 so that the particles 1790 become bonded to the web adhesive 1788. FIG. 89B shows an orthogonal view of the abrasive particle container plate 1782 which has a shallow annular trench 1784 formed into a particle container plate 1782 used to contain loose diamond, or other, abrasive particles 1790. FIG. 90 shows a cross-sectional view of abrasive particles 1798 which are imbedded into a liquid, or wet, adhesive 1794 coating on a raised island 1802 attached to an abrasive backing 1804 by use of a vibrating bar 1796 where the imbedded particles 1798 are located a minimum distance 1800 from the top hard surface of the island 1802.

65. Precise Height Top Coated Abrasive Islands

Problem: Round islands or bar shaped islands having raised plateaus which are coated with a thin layer of hard precise sized fixed abrasive particles are required for high speed, 8,000 SFPM, grinding or lapping, with coolant water used as a lubricant, act to prevent localized abrasive hydroplaning relative to the contacting workpiece. A feature of a abrasive sheet article having raised metal plated islands supported on a mat base having flexible arced woven fibers is that each of the raised islands has some capability to move relative to the mat base. The group of individual fibers located at the periphery of each island site act as a compression or extension spring for each island structure. The island spring action allows the uppermost plated diamond particles attached to each individual island to contact a workpiece at high surface speeds even though the top surface of each island is not typically level or at the same height as the other islands that form the abrasive article. Abrasive sheet products sold by the 3M Company having a fibrous strand mat which has metal plated diamond islands attached to a thin backing, referred to as flex metal bond abrasive disks, belts and sheets cuts workpiece materials effectively and is long lasting but has a number of flaws which prevent its successful use for creating smooth lapped surfaces at high surface speeds. Round islands of nickel are first plated on discrete areas of a loose non electric conducting woven plastic fiber strand material. Then, diamond particles are suspended in the liquid plating bath and these particles are brought into contact with the mat fiber strands by gravity dropping them out of suspension in the plating bath liquid whereby they are dropped onto the irregular surface of the woven strand mat fibers. The abrasive particles are attached to the upper exposed arc segments of the woven strands and are attached to them by surrounding the particle, and the plated strand, with further plating metal deposition material. The fiber strands, individually and collectively, act as springs to force individual particles of abrasive into contact with a workpiece surface when the abrasive disk or belt is held firmly against the workpiece, with the abrasive moving relative to the workpiece. Each fiber strand tends to be curved or arc-shaped at the top surface of each circular shaped island site that is located at a exposed surface of a electrically conductive fiber mat support drum. Abrasive particles are attached at random positions along these upper arc segments of the strands with the result that some abrasive particles are located higher on the abrasive island surface than other discrete abrasive particles. When the abrasive islands attached to the fiber mat abrasive article are pressed against the workpiece, each island top is compressed into the abrasive article toward the attached backing sheet by the spring action of the fiber matrix which compensates for the island-to-island height variation, as measured from the bottom surface of the abrasive sheet flexible backing. The islands tend to have significantly irregular or indented surface due to the interlacing of individual fiber strands which makes up the fiber mat. Plating tends to bridge from higher strand loops to lower loops and rigidizes the whole uneven island top surface with distinct differences in the elevation of discrete diamond abrasive particles on a typical island. There is some possibility of the freedom of movement of one strand top-loop arc-segment from another. Typically, however, a diamond particle coated fiber strand, which is located lower in the woven mat, is blocked from reaching a height level equal to that of an upper loop arc abrasive particle-coated strand. The only way that the diamond particles on the lower strand can be utilized for grinding is either by wear-down of the upper most diamond, the metal plating material and also, the strand material, to expose the second lower level strand abrasive particle. Another mechanism to present the second lower level abrasive particle to the workpiece is the spring displacement of the particle upward to a level equal to the elevation of the first raised particle, which is not likely, because of the integral stiffness of the metal plated bond rigidization of the whole fiber mat island top. Further, the localized force necessary to deflect the upper strand downward relative to the lower strand, enough to allow contact of the nominally lower strand and particle, would create a very large abrasive contact force on the upper particle driving it into the workpiece with a great force relative to the small or weak contact force on the lower particle. This localized spring compression would result in large material removal rate by the upper particle and small material removal by the lower abrasive particle. Unique or more aggressive abrasive action by scattered individual high surface elevation abrasive particles tends to create scratches on the surface of a workpiece. Use of woven interlaced mats composed of plastic fiber strands allows the diamond particle plated bonding action to occur only in the areas of island shapes due to the geometry of the resist insulation coated plating sheets. These metal electrically conductive plates have arbitrary circular shapes with exposed metal while the remainder of the plate is coated with an electrically insulating resist coating so that metal plating action takes place only in the areas of the island forming circles in the electroplating liquid bath tank. However, these plastic strands, as in the case of all plastics, are made of a highly vibrationally damped material which prevents the quick spring-back of the islands required for compliant contact with a workpiece surface when operated at very high grinding speeds. A significant contact pressure force can be used to spring-force uneven adjacent islands against a workpiece, but then, the surface of the abrasive sheet is distorted by the large contact compression forces required to hold adjacent islands flat against a workpiece. The typical distortions in the elevation of adjacent abrasive particles is typically an order of magnitude greater than the very flat two Helium lightband (23.2 microinches or 0.51 micrometers) flatness desired for many lapping or grinding operations. Also, it has been found that it is necessary to provide a very light abrasive contact force for successful high speed lapping which prevents the use of a significant downward force on the abrasive sheet to force a whole area of the abrasive flat against a workpiece surface even if the contact area is a narrow "land" area typically present for roller contact of the abrasive to the workpiece. The net effect is that the flexible metal bonded abrasive island material makes good use of individual diamond particles for rough grinding but is difficult to use for lapping or polishing in a high speed lapping procedure without inducing scratches on the workpiece. The thickness variation of a typical 12 inch (30.5 cm) diameter strand mat flex diamond abrasive sheet is a total of about 0.003 inch (0.076 mm), far more than the desired 0.0001 inch (0.0025 mm) variation required for effective smooth high speed lapping or grinding. The raised abrasive island formation is effective in controlling hydroplaning at high speeds but scratch patterns on the workpiece surface are difficult or impossible to eliminate.

Plated flex metal-island abrasive is typically produced in a linear web form and circular disks are cut from this material. The disk form-cutting action tends to distort the islands located on the circular cut edge that tends to result in raised and weak thin slivered moon shaped arc segment partial island sections. Weak island segments which break off during grinding tend to scratch the workpiece surface. Also, those islands having abrasive particles raised by the disk-shape cutting process also tend to scratch the workpiece as it contacts the abrasive sheet edge.

Attaching diamond particles to an abrasive disk or belt surface, or an island surface, is critical in many respects. There are only a few polymer-based binders which can be effectively used to attach or bond a diamond particle to a backing without pull-out where a diamond particle is plucked or shelled from the abrasive sheet. Some binders are too weak to hold the diamond well enough that it can be split apart by abrasive contact forces to allow new sharp edges to be exposed for continued aggressive cutting action. Binders must also hold the abrasive particles as they are being worn down during abrading action without the particles becoming dislodged from the binder. Each abrasive particle, diamond, CBN or others, need to be at a precise level, or thickness as measured from the mounting surface of the backing, at the same elevation level as the other particles to utilize the cutting action of many particles at the same time to produce a smooth workpiece surface. Metal plating, typically using a hard nickel, holds diamonds well, but the technique of applying particles to a surface by dropping them out of suspension in a liquid plating bath during the plating process can result in particles becoming stacked on top of other particles instead of having a single layer of diamond particles. Use of electrostatics to apply abrasive particles to a backing adhesive results in the vertical attachment of long-ended particles where long particles tend to stick up from the abrasive surface more than short particles, which are also attached on their thin "long" ends. There are a number of different types of diamonds that are used for abrasive grinding. Solid block type diamonds wear well but they do not shatter and produce new sharp cutting edges. Mono crystal diamonds or block type (blocky) diamonds produced as industrial diamonds by General Electric Company® are used often with good results. Polycrystalline diamonds produced by DuPont Company® are effective in self sharpening as they can break or shatter during abrasive action to form new sharp surfaces. These coated and uncoated diamonds can be effectively bonded by use of phenolics, water-based phenolics, epoxies, polyimide and other organic material binders. Some diamonds are fused together into ball or sphere shapes within a ceramic or metal oxide matrix. These ball or sphere ceramic agglomerates, which progressively break apart during grinding to present new sharp diamond particle cutting edges for high rates of material removal. However, the relatively large size ceramic balls can wear down unevenly across the surface of the abrasive sheet and the flatness of the workpiece can be affected with uneven wear of the sheet abrasive material.

Abrasive particles or abrasive agglomerates can be separated from each other to provide a gap between particles for cooling water lubricant and for the temporary collection of grinding swarf by a number of techniques. It is important to prevent the spacing between particles to be too close for effective cutting action. Metal, plastic, organic or non organic particles, or powders, or hollow glass spheres can be mixed with the abrasive particles at different stages of the abrasive disk manufacturing. Also, a variety of coating techniques can be employed. For instance, a "make" coating of binder only can be applied to a backing and particles are electrostatically applied or drop coat applied to the wetted binder adhesive. Also, a particle filled coating slurry can be used as the first coat on a backing. Then a "size" coating can be applied to strengthen the particle bond. A single coating of mixed abrasive and filler particles slurry can be applied. If a binder-only coating is applied, followed by a dusting or drop coating of abrasive particles, and other materials, for separation or release of buried new sharp particles, there is a typical problem of the dry surface particles not laying level with the surface. Applying a premixed particle filled coating creates difficulties with producing a layer that only has a single layer of abrasive particles, or even to create a abrasive coating that has a uniform thickness of stacked layers of abrasive particles. Coating the top surface of an array of discrete islands with abrasive particles or abrasive agglomerates is generally much more difficult than the continuous web-line coating of abrasive material. Many coating parameters of a continuous web line can be adjusted to reach equilibrium conditions of the coating process. Coating a flexible sheet with island tops is more a series of discrete coating events as compared to coating a continuous flat-surfaced web, particularly for the example of where a circular disk having a annular ring of raised islands is coated. The shrinkage of the particle binding adhesive coating must allow the sharp top surface edges of the diamond particles to be exposed for contact with the workpiece surface.

Solution: Island foundations can be formed with the desired precision height, width, size and shape by a variety of methods. An island forming font sheet having tapered through-holes, which are sharp or narrow at the top surface, can be easily removed from an annular abrasive disk backing after applying island foundation adhesive material in the font holes because of the tapered holes that can be used to form truncated "mountain shaped" island foundations. To further aid in the font removal, the font can be coated with a release agent, such as mold release spray, which does not affect the curing of the island foundation material. The island foundation structural material may be formulated to have sufficient bonding strength to resist separation of the foundation from the backing by grinding forces but yet the foundation material may be friable enough that diamond particles may be driven into its surface by the contact action of a vibrating height leveling bar. The abrasive particles would be vibration-driven into the foundation material after the particles are wetted by the coating-binder. This vibration action would result in the particle being adhesively attached to the newly formed island top surface particle crater that has a shape that matches the end of the abrasive particle driven into the foundation surface. All abrasive particles would then have their exposed top ends leveled to a uniform height relative to the backing base. The vibrating height-leveling bar may be round and made of a hard material, including carbide, and which bar has a precision ground diameter along its length. The round bar may have a wide variety of diameters, may be hollow and operated at an angle with the vertical to affect a horizontal component to the vibration excursion motion in addition to the primary vertical motion, to enhance the particle leveling action.

Raised island foundation structures can also be freeformed in island site arrays by depositing drops of foundation mix material from dispensing systems such as hypodermic syringes onto one flat surface of a disk flexible backing sheet. The backing sheet having the array of raised island drops of structure material would be mounted in flat (non-drop side) contact on the flat surface of a stationary mounting plate. Gap spacers, having the same mutual precise dimensional thickness, would be attached at a tangential position outboard of the island disk backing disk to the surface of the same stationary mounting plate. These liquid drop formations can be precisely leveled by a single-step procedure where another precisely flat structural surface plate is lowered, to progressively come into contact with the drop surfaces and the plate lowering action would be continued until the surface of the lowered plate comes into contact with distributed edge gap spacers. The lowered flat plate that contacts the exposed top surfaces of the liquid island site foundation material formed drops would act to squeeze the island site liquid foundation material drop shape top surfaces down to a uniform desired height that is established when the lowered plate flat surface contacts all of the gap spacers that are attached to the stationary plate. In the final rest position, the lowered flat plate acts against the stationary plate and the two plates and the backing sheet would be in a mutual flat and parallel position to each other. The island foundations that are attached to the backing sheet would each have the same height measured from the backside of the backing sheet to the top surface of the islands. All of the island top surfaces would also be flat and parallel to the backside of the backing sheet. Release coatings can be applied to the flat height adjusting surface plate that contacts the wet liquid island foundation material top surfaces. The flattening top plate can be left in place while the island foundation material partially or fully solidifies and then the plate can be separated from the backing sheet island foundations. The plate can be removed just prior to the final set-up cure of the island foundation base material, when these types of cured materials have very little tack attractive strength. Another technique which can be used to create these raised islands of precise equal height, where the same island foundation heights can be established on a given disk, or a continuous web, can be accomplished by running a continuous web with the non-cured island foundations through the gap between two calender rolls, or through a series of calender roll sets. These calendar rolls would have precision diameters and they can be run in a journal fluid bearing to achieve great accuracy of the roll gap spacing, as compared to the use of commercial quality roller bearings to support the rolls which could produce a less precise roll gap spacing. The height of the islands would be established between the top surface of the formed island and the backside of the flexible backing sheet. The rolls would be driven at a speed to match the traveling disk or web. The solidified or cured tops can also be finish ground to height. The resin binder adhesive can be applied to the island tops by applying a pre coated sheet of liquid binder to the tops of the islands, pulling the sheet away and leaving about 50 percent of the liquid binder on the tops of the islands. Further, another method would be to apply a binder coating to the knurl pocket-roughened surface of a roto-gravure coating roll which has been fluid leveled with the use of a flexible doctor blade knife held in contact with the surface of the knurled gravure roll. Then, the web, or disk backing, would be nipped against the rotating knurl roll to allow the top surface of each island to be coated uniformly across its surface by lifting, or transferring, the liquid binder from each knurl roll pocket to the island surface. Following the fluid coating transfer to the island surfaces, a doctor blade flexible wiper can be held at an angle against the surface of the array of islands to smear-level the deposited minute binder adhesive drops, created by the pocket surface indentations in the gravure roll, across the full surface of the island. The result is a uniform coating of binder material across the surface of the island. Then, a preparation of the mixture of diamond particles would be presented to the surface of the wetted islands. Following this, a vibrating leveling bar system would be used to thickness-level all of the abrasive particles prior to the cure stiffening or solidification of the binder coating. This leveling bar system could bridge a web width, or a disk platen, and would be level adjusted at both bridge ends by use of a stepper motor screw drive slide system. A precision gap sensor can be installed close to both ends of the bridge support, and also, above some of the islands to accurately determine the nominal height of the abrasive islands, and further, the height of both of the bridge ends. Both screws can be adjusted vertically with the stepper motor or other drive motor controllers to bring the vibrating bar into initial contact with the loose top abrasive and also to maintain a flatness across the whole width of the annular ring of islands or across the whole width of the abrasive island web sheet. The whole island leveling bar assembly can be lowered for multiple passes on a round annular ring of islands on an abrasive disk, or, multiple height leveling stations can be used on a continuous web line. There would be mechanical reference stops at both ends of the vibrating leveling bar which would independently maintain the lowest level of the vibrating bar relative to the bridge support bar assembly structure. The web backing sheet would be mounted on a structural apparatus such that the thickness control established by use of the stepper motor or servo motor driven screw translation mechanism would control the height of the tops of the abrasive particles relative to the bottom mounting side of the abrasive sheet backing. A flexible doctor blade can also be used to smooth out and partially level the abrasive particles located on the island tops. Release binder paper, such as wax or silicone coated paper, which can be used on the flat island foundation height adjusting plate or bar, can be attached to the plate or bar with vacuum port holes. The island base foundation site areas of the backing at the location of the island sites can be prepared for improved adhesion of the foundation adhesive by sand blasting or by abrasively scrubbing each island site area in the presence of a solvent or other liquid agent. Use of metal particles in the island foundations can: increase the island strength; act as an electrical conducting media for electroplating diamond particles to the island tops; and to increase the thermal conductivity of the island foundation material which is useful for maintaining a low temperature of the abrasive by water cooling effects during grinding.

It is desired to use strong binder resins to attach diamonds to the backing in the make coat. Examples of these binders include phenolic resins, amino resins, polyester resins, aminoplast resins, urethane resins, melamine-formaldehyde resins, epoxy resins, acrylated isocyanurate resins, urea-formaldehyde resins, isocyanurate resins, acrylated urethane resins, acrylated epoxy resins, flexible phenolic resins and polyimides. Size coat adhesives include the binder adhesives used for the abrasive particle make coat binder described above. The size adhesive layer can contain other materials that are commonly utilized in abrasive articles. These materials, referred to as additives, include grinding aids, coupling agents, wetting agents, dyes, pigments, plasticizers, release agents, or combinations thereof. Other fillers might also be used as additives in these layers. Examples of useful fillers include calcium salts, such as calcium carbonate and calcium metasilicate, silica, metals, carbon, glass, clays, hollow or solid microspheres of various materials such as glass, various powders and man organic materials including wood products.

Slurry coats of mixtures of abrasive particles or abrasive agglomerates and binders may include a combination of all the above binders and fillers. These abrasive slurry coats can also be applied to the surfaces of the raised islands attached to the backing sheets.

Figure 91:
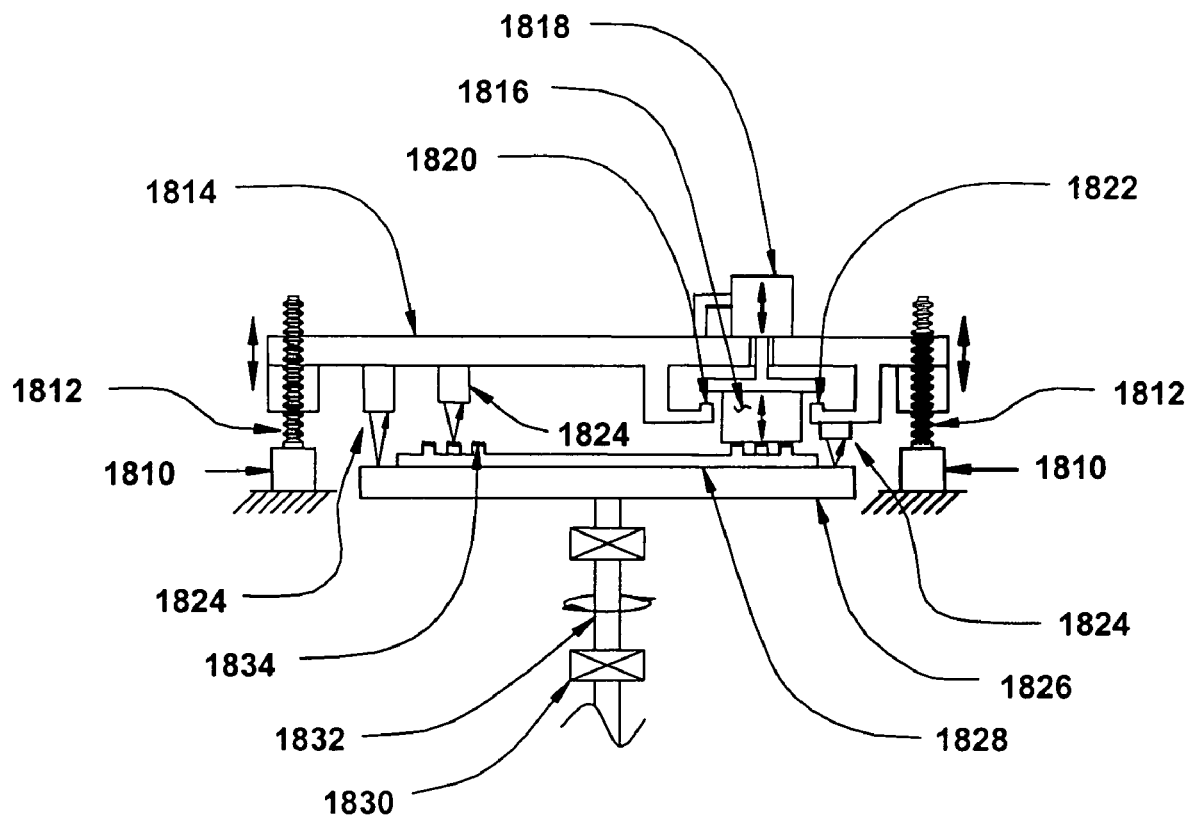
FIG. 91 is a side view of an annular island disk height leveling mechanism.

FIG. 91 shows a side view of an annular disk island height leveling mechanism. An abrasive disk backing 1828 having diamond particle coated islands 1834 is mounted on a rotating platen 1826 which has a platen spindle 1832 which is supported by precision spindle bearings 1830. A vibrating head 1820 vibrates perpendicular to the island face, as shown, or parallel to the island face, or a combination of both. A vibration bar 1816, which is attached to the vibrating head 1818 contacts the abrasive particles and is restrained in its downward motion at each end by vibration stops 1820 and 1822. The whole vibration mechanism is attached by a bridge support frame 1814 which is raised or lowered to nominally contact different nominal thickness abrasive disks 1828 by use of position screw mechanisms 1812 which are driven by stepper motors 1810 as a function of the gap or distance position indicated by a gap sensor 1824.

66. Abrasive Slurry Coated Backing Islands

Problem: Abrasive particles or abrasive agglomerates coated on the top of islands attached to abrasive backing sheet material must be initially flat relative to the backside of the backing, must wear down uniformly, must be strongly bonded to the backing, must be uniformly separated from each other, and must be bonded with an adhesive which will not break down in the presence of water, chemical lubricants, intense heat generated by grinding friction, and which will not sustain burning or release toxic fumes when burned. Typical coating thicknesses of 0.5 to 2 thousandths of an inch (0.0005 to 0.002 inch or 0.013 to 0.051 mm) are far in excess of the diameter of 2.5 micrometer (0.0001 inch) particles which means small fine abrasive particles must be stacked in layers.

Solution: Use of diamonds that are metal plated to metal flex bond abrasive disks or to the flat surface of a wheel or to the peripheral round surface of a grinding wheel are known to be tough, have high material removal rates but are not capable of polishing smooth surfaces. Coated fine diamond particles from 0.1 to 80 micrometers provide good polishing media. Two methods may be used to apply an organic binder abrasive coating. The first method is to apply a binder adhesive coating first to a backing and then dust on diamond particles. The second is to premix diamond particles and other fillers in a slurry and coat this mixture on a backing. The backing may have a precoat and a size coat also. The preferred binder system would be one of a variety of the commonly used phenolics for abrasive articles. Here a phenolic resin with about 70 percent solids would be diluted with MEK or other solvents to about 50 percent solids. Then, mono crystal diamond particles would be mixed in the resin along with clays and other powdered materials and this mixed slurry coating would be applied to the island top surfaces. The slurry would be spread flat and polymerized to a solidified state with the use of an oven which has low velocity air currents and progressively increased temperature heating. Heat would first drive off the solvents that reside deep within the interior portions of the coated slurry resin layer by diffusion flow of the solvent to the resin surface without disrupting the slurry resin surface. A final slurry resin cure temperature of approximately 250 degrees F. may be used for the final cure. Large sized friable hollow glass bubbles can be used in the mix which would act as surface rollers to establish the thickness of the coating with a doctor blade. Some limited shrinkage of the resin binder, due to the volume loss that occurs with the evaporation of the contained solvent, reduces the volume of the residual resin which tends to expose the top surfaces of the individual diamond particles. Clay particles and other glass microspheres or other materials can be used as a filler which would control the wear rate of the diamond particles and also structurally support the diamonds. New sharp edges of new exposed diamond particles would be continuously presented as the clay and other fillers that surround the particles are eroded away during lapping. The slurry coating can be applied to island foundations which have the upper island plateau edges eroded by sandblast or other means to eliminate the abruptly sharp edges of the abrasive particles located at the raised peripheral edges of each island surface. The sandblasting would also provide a better structural anchor by improving the adhesive bonding of the abrasive coating to the island surface. The rounded edges provided by the sandblasting would allow the slurry coating to hang down over the rounded edges which would increase the strength of the bond of the abrasive coating to the island top surface in resisting abrading forces as the rounded edge of the coating would tend to mechanically lock the abrasive coating island cap to the island top. A trailing coating edge caused by a doctor blade can provide more overhang and the disk could preferentially be operated or rotated in a direction opposite the overhang.

Figure 92:
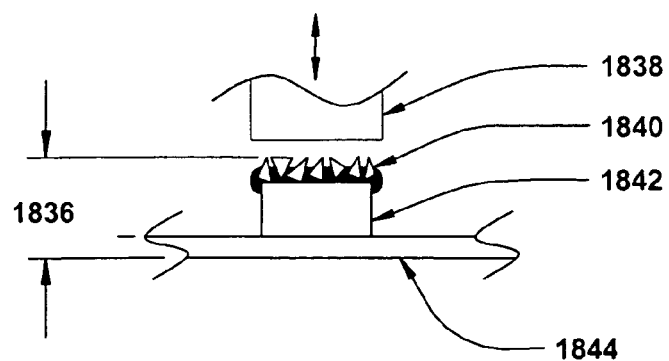
FIG. 92 shows a side view of a raised abrasive island height leveled with a vibrating bar.
Figure 93:
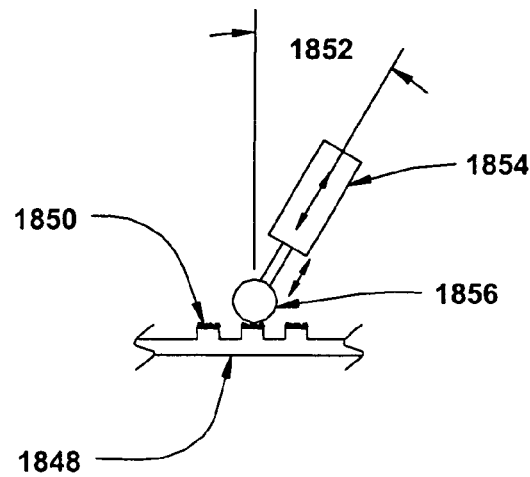
FIG. 93 shows a side view of a cylindrical vibrating bar angled at the surface of a diamond particle coated island.
Figure 94:
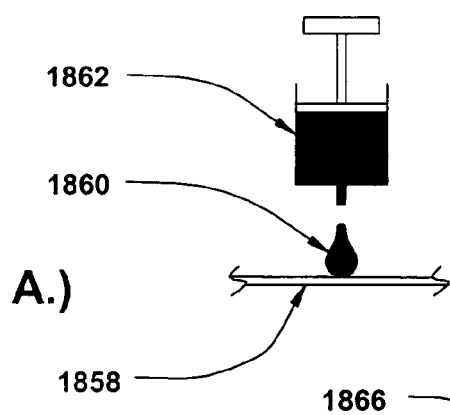
FIG. 94A shows a side view of a hypodermic needle and syringe used to deposit abrasive slurry or an island foundation slurry on a disk backing.
FIG. 94B shows a side view of fluid drops flattened to a precise height by a lined flat plate.
Figure 94:
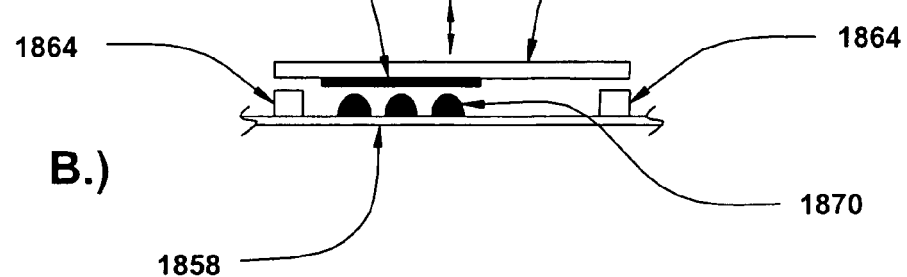
Figure 95:
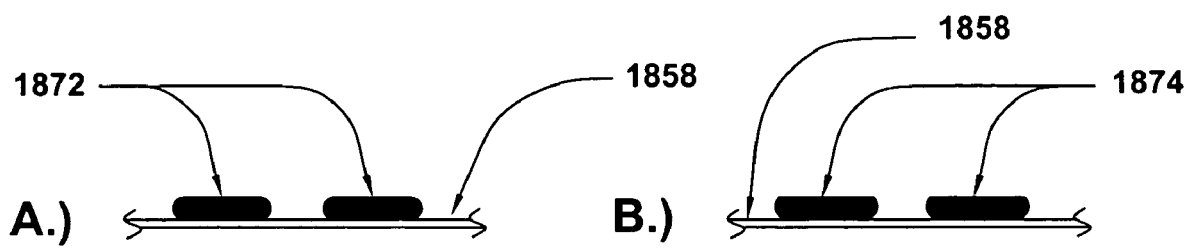
FIG. 95A and FIG. B show bar flattened drop islands and bar flattened drop islands ground precisely flat.
Figure 96:
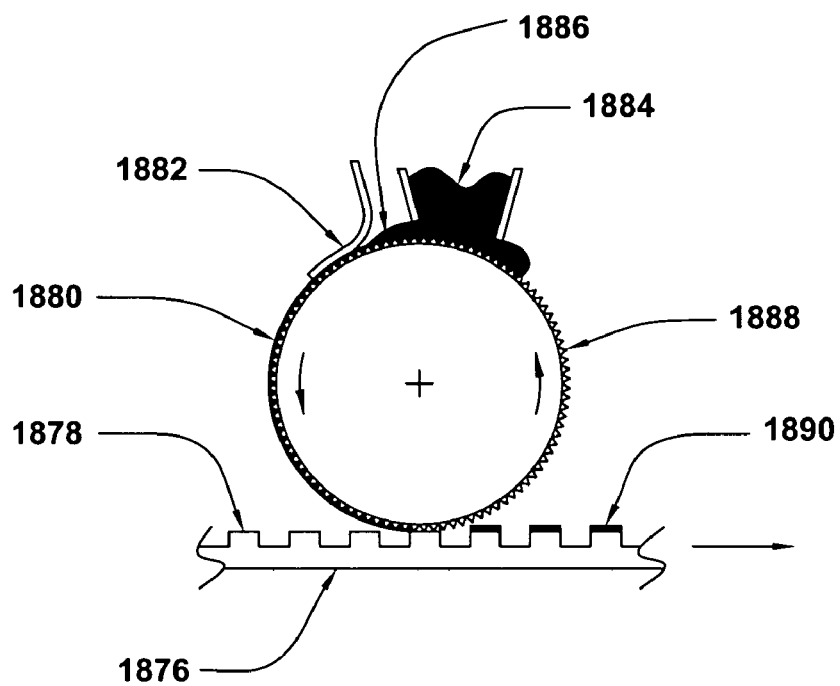
FIG. 96 shows a side view of a knurl roll transfer wheel depositing a coating of abrasive particles on a disk or a continuous web of backing island tops.
Figure 97:
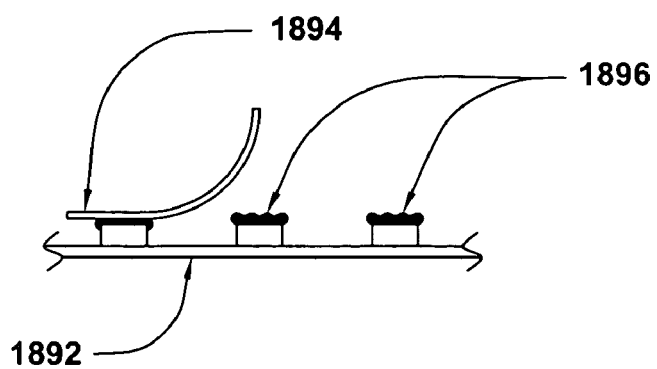
FIG. 97 shows a side view of transfer coated island tops fluid leveled by a doctor blade.

FIG. 92 shows diamond particles partially driven into or imbedded into the top surface of a raised island foundation. An abrasive disk backing 1844 having island foundations 1842 have diamond particles 1840 imbedded into the island foundation 1842 surface by use of vibrating bar 1838 to control the height 1836 of the exposed diamond particles to be uniform across the whole surface of the disk backing 1844 where the height 1836 is measured from the backside of the disk backing 1844. FIG. 93 shows a vibrating bar angled into a diamond particle coated island. An abrasive disk backing 1848 has diamond particle 1850 coated raised islands that are impacted by a vibration head 1854 which is angled to the abrasive particles and the backing 1848 by an angle 1852. The vibrating head 1854 is shown with a cylindrical shaped hardened steel or carbide material contact cylinder 1856. FIG. 94A shows a hypodermic needle and syringe 1862 filled with a slurry fluid adhesive binder 1860 containing abrasive or metal or ceramic particles. A drop of this binder 1860 is deposited on a disk backing 1858 to form an island or an island foundation base. FIG. 94B shows a side view of a disk backing 1858 with drops 1870 of island foundation material deposited with a raised platen plate 1868 which has been covered with a wax paper, or a release liner paper, or a hard sprayed-on coating of Teflon® filled tungsten carbide, supplied by Plasma Coatings Company® of St. Paul, Minn. or other release liner material 1866. The platen plate is lowered to height or gap control stops 1864 which are mounted here on the top surface of the precision thickness backing 1858. FIG. 95A shows a drop 1872 of filled abrasive that is attached to a backing 1858 that has been bar flattened and solidified. FIG. 95B shows the bar flattened island 1874 that is attached to a backing sheet 1858 after it has been ground flat to a precise height. FIG. 96 shows a side view of a disk or a continuous web backing 1876 with integral bare islands 1878 which have either a liquid adhesive coating or an abrasive particle filled liquid adhesive slurry coating 1884 applied to the top of the islands 1878 by rolling contact of the knurl roto-gravure roll 1888 with the linear moving backing 1876. Coating fluid 1884 is supplied to the surface of the knurl roll by use of a liquid coating dam 1886 to create a knurl roll surface that is level-filled 1880 with liquid coating binder 1884 by use of a flexible smoothing knife blade 1882 to create transfer roll coated islands 1890. FIG. 97 shows a web backing 1892 which has transfer fluid coated islands 1896 leveled by a smoothing blade 1894 which moves along the surface of the islands 1896. FIG. 98 shows a salt shaker device 1904 used to spread and deposit abrasive particles 1902 onto wet adhesive binder coated islands 1900 which are integrally attached to an abrasive backing sheet 1898 to produce abrasive particle coated islands 1906.

67. Sintered Powder Metal Islands and Abrasives

Problem: Abrasive disks that have round raised islands with diamond particles metal plate bonded on a fiber mat have a large variation in disk thickness in different areas of the disk. These disks are limited in diameter size and are expensive. Separation of any of the individual abrasive coating particles from an island top surface or the catastrophic breaking of the whole abrasive island foundation structure away from the abrasive disk backing causes scratches to a workpiece surface during grinding or lapping.

Solution: An array of liquid abrasive slurry top coated islands can be formed on the surface of a thin metal flexible disk backing and the disk processed in a high temperature environment to fuse the islands to the metal backing. This abrasive disk can be formed in two steps, or, in a single step. For the single-step process, a mixture of a flux agent, a powdered metal, such as A6 tool steel, and powdered copper can be mixed with an epoxy binder which is combined with a compatible diluent fluid. This combined slurry mixture can be deposited in a variety size of island site drops or island shaped forms on the surface of a disk backing made of a thin sheet of metal such as stainless steel. After the epoxy is partially solidified to rigidizes the island shapes on the backing, the abrasive island coated metal sheet disk would be placed in a furnace using air, an inert gas, or a hydrogen-gas reducing environment for the furnace processing of the slurry coated disk or sheet. By use of a fluid mixture of epoxy and diluent fluid to coat all of the component particles, the epoxy will tend to accumulate at the common contact areas that exist between adjacent particles. The epoxy will bond the particles rigidly together and the epoxy will also bond the particles to the surface of the metal backing sheet. The diluent fluid will come out-of-phase with the epoxy and it will progressively evaporate from the mixture upon heating, thereby leaving a matrix of attached A6 particles. As the furnace temperature is further increased, the A6 particles will be bonded principally at the particle common contact points, located where the particles touch each other. The matrix of A6 particles then form an raised island structure. Higher furnace temperatures will cause melting of the copper material and cause it to infiltrate the spaces between the A6 particles. The copper would add to the A6 particle-to-particle bond strength and also increase the bond attachment of the island structure to the backing sheet. The copper bonds the A6 particles together to form a rigid raised island base foundation structure, and the top surface of the raised island can be ground flat, if desired. Then, a mixture of diamond particles, a similar chemical epoxy based binder and copper powder can be thinly coated on the island top and high temperature fused together to firmly bond diamond particles to the island top. A second method would be to form an island base of a powdered metal binder adhesive and partially cure or solidify the binder to form a solid island foundation base. Then a coating with diamond particles and copper particles, or other low melting temperature metals, are mixed with a flux and applied as a thin coating on top of the solidified island base. The abrasive top coated island foundation disk would be then processed in a furnace to fuse the abrasive top and the island base as an integral strong structure with the metal backing. For the two-step process a mixture of A6 or other powered metal can be mixed with a epoxy-diluent mixture and the resultant slurry can be applied at island sites which are then processed in a high temperature furnace. After the raised island foundations are formed, copper or other metals or combinations of metals can be applied to the sintered A6 formed islands and upon heating, the new copper or other metal can infiltrate the A6 matrix of particles to form a continuous solid raised island where the copper surrounds the A6 particles.

FIG. 99 shows a side view of an island foundation structure that is formed of sintered powder which has been coated on its top surface with a thin layer of abrasive particles. The top coat of abrasive particles is either thermally fused or soldered as an integral layer on the raised island surface. The abrasive disk backing 1908 has diamond or CBN abrasive particles 1910 which are attached by a melted copper metal infused binder coating 1912 to an island foundation 1914.

68. Annular Ring Abrasive Island Height Plate Fixture

Problem: It is critical that abrasive slurry top coated islands positioned in an annular ring shape have precisely the same height from the backside of each thin flexible disk backing to allow abrasive particles on each island to contact the ground surface of a workpiece at high and ultra high grinding speeds of 10,000 to 20,000, or more, surface feet per minute (SFPM). Larger disk outside diameters of 16, 24 and 36 inches (40.6, 61 and 91.4 cm) allow wider annular abrasive band area radial widths to obtain practical uniform surface speeds across the radial width of the annular band where the abrading surface face speeds are within 30 percent for the inner and outer annular band radial locations. Also these larger diameters which exceed the present commercially available disks which are limited to 12 inches (30.5 cm) diameter allow the rotating platen to be rotated at slower speeds and yet obtain the same SFPM. It is desired to eliminate variations in thickness of web backing material and also the variation in island foundation heights to better utilize all of the expensive abrasives that are bonded onto the surface of a disk when the disk is used in high speed grinding or lapping.

Solution: A slurry of diamond or other abrasive particles or abrasive agglomerates can be mixed with clays, and other filler particles, with a methyl ethyl ketone, (MEK) solvent thinned phenolic binder. Then, free-formed drops of this abrasive particle slurry can be deposited on the top surface of rigid raised island foundations that are attached to a thin flexible backing made of polyester or metal sheet material. The backing sheet having raised island foundations that are top-coated with an abrasive slurry can be laid or mounted on a large fixture plate with the uncured viscous slurry top coated islands positioned away from the plate surface. The plate would have a raised annular ring that is of a larger annular radial width size than the abrasive island annular ring pattern radial width. This fixture plate, which has been ground or lapped precisely flat on the annular area, can be round, square or hexagonal shaped to allow the attachment of precision gap spacers located radially outboard of the circular abrasive disk backing. Another similar shaped flat upper plate can be coated with a release agent, and brought into surface contact with the viscous non-solidified abrasive slurry top coated raised islands. A slight clamping pressure is applied to the abrasive slurry contacting the upper plate where the contact pressure is applied directly in-line with the outboard gap spacers to avoid bending distortions of the plate fixture system. At the same time, the upper contact plate can be rotationally oscillated or vibrated to spread the abrasive slurry evenly across the island tops with a minimum of clamping force until the two plates are in direct contact at each gapspacer post. The annular disk mounting plates can be constructed of MIC-6 cast aluminum tooling plate and can be heated locally by surface heaters or in an oven to partially cure or fully cure the abrasive slurry binder. A slight excess of abrasive slurry will form a distinctive smooth rounded flat abrasive cap on each island.

FIG. 100A shows a side view of a mold plate set used to level flatten the top coat of an abrasive particle slurry mixture of particles 1915, that may contain powdered copper and a flux agent, which has been deposited on the top surface of an island foundation 1917. The upper mold plate 1930 is height positioned above the lower mold plate 1916 by use of spacer posts 1918 which are positioned around the periphery of the mold plates 1916 and 1930 to effect a precision gap 1924 at all peripheral positions around the mold plates 1916 and 1930. Both of the mold plates have raised annular rings 1920 which are used as height gage blocks only on the annular ring of raised abrasive island bases 1917 that are integrally attached to an abrasive disk backing 1932 and which raised island surfaces have a deposited coating of liquid abrasive particle slurry mixture 1922. A modest clamp force 1926 is applied normal or perpendicular to the face of the upper mold plate 1930 to hold it against the abrasive coated islands 1922 and disk backing 1932 that are sandwiched between the upper plate 1930 and the lower plate 1916. A vibration is applied to or an oscillation motion 1928 is given to the upper mold plate 1930 in either one or more of the tangential, radial or circular orbital oscillation directions of the upper plate in the horizontal plane of the plate 1930 to effect a simultaneous height leveling of all of the abrasive coatings 1922 on the abrasive raised islands.

FIG. 100B shows an abrasive disk backing 1932 with integral attached raised abrasive islands 1934 mounted on a lower mold plate 1916 with an upper mold plate 1936 shown in direct contact force 1926 with a spacer post 1918. The abrasive slurry particle mixture is shown flattened due to contact with the surface of the upper mold plate 1936 to produce a raised island with a smooth rounded cap 1938 of abrasive slurry that slightly overhangs the surface of the raised island 1934. This overhung non-solidified abrasive slurry cap 1938, which conforms downward around the surface of the raised island structure, provides a natural top-trapped shear strengthening characteristic for the abrasive particles or abrasive agglomerates to resist shearing forces induced by the horizontal direction abrasive grinding action contact forces. These forces occur when the abrasive disk article is used in grinding or lapping workpiece products.

69. Island Height Adjusting Plate System

Problem: Use of precision flat plates to adjust the heights of abrasive slurry coated islands requires that the plate surface contacting the slurry does not wear locally at the island locations or at the locations of the gap stop posts which separate the two plates very precisely around its periphery. The plate assembly must also allow the slurry binder to be partially or fully cured to accurately establish the island heights before the plates are separated. Adhesion of the slurry binder to the plate surface during binder cure needs to be minimized.

Solution: Flat height gap plates with annular raised platforms can be constructed of many materials including aluminum, steel, brass, glass, quartz, or stainless steel and may be coated with liquid or dry release coatings to minimize bonding of the plate surfaces to the slurry binder during cure or solidification of the binder. Special hard coatings such as titanium nitride or CVD (chemical vapor deposited diamond) and many other coatings can be applied to the plate to minimize wear of the plate surface. Typically, an island slurry coated disk backing would be mounted to a lower gap plate, and the upper plate would be lowered to contact the island tops. Then, the upper gap plate would be oscillated or vibrated either vertically, tangentially, or radially or given an orbital motion path of limited excursion, to horizontally move abrasive particles with a range of motion not to exceed 50 percent of the diameter of an island top. Combinations of these motions may be employed at a wide range of frequencies from 10 to 20,000 cycles per second with the intent to maintain 90 percent of the slurry on top of the island after flattening. Also, it is desirable for a small overhang of slurry to extend downward toward the backing, from the island top, to form a mushroom shaped island cap which will resist horizontal abrasive contact forces which would tend to shear the abrasive particle filled coating from the flat island top surfaces. The abrasive island cap may contain a single layer or multiple layers of abrasive particles on the island top surface. Cure, or partial cure, or solidification of the slurry binder may be effected by radiation or UV cure through a glass gap plate. Also, the lower gap plate may be heated by a variety of means including surface resistance heated foils, convection or radiant sources. Typically, a partial binder cure would take place and at that time the upper plate would be separated from the disk island tops. Adhesives such as epoxy have a very low tack adhesion strength at the partially cured state but the adhesive is structurally stable and will not substantially change in thickness after cure or solidification has progressed this far. The height of the islands would not be affected by the separation of the top plate from the island tops and full cure of the abrasive binder could be completed by other means at another time. The upper plate could be supported by air bearing posts to eliminate gap post wear caused by plate vibratory or oscillating motions. Air film pressure gauges can be used to monitor the height gap distance during the vibrating leveling action. Another method to enhance leveling of the islands would be to include steel or magnetic particles in the abrasive slurry and oscillating variable electrical magnetic fields could be used to give motion to these magnetic particles which would help level the abrasive slurry mix.

70. Flat Molded Abrasive Island Disks

Problem: Preventing hydroplaning and utilizing all of the expansive diamond abrasive particles or abrasive agglomerates coated on the top surface of an annular array of islands during high speed lapping requires precise height control of both the island base foundations and also the island top surface which has a thin coat of abrasive particles or abrasive agglomerates. It is important that this multi-layered island coated abrasive disk be produced with cost efficient manufacturing techniques. Further, island foundations with various base heights, depending on a wide range of disk products, or also, variations from one disk backing sheet to another, must be coated with an exact thickness of abrasive top surface coating.

Solution: Using abrasive disks where each island is precisely the same height as all the other islands on that disk allows a thin coat of abrasive particles or abrasive agglomerates to be applied to the island tops with the result that all the coated diamond particles contact the workpiece with even wear of each diamond abrasive particle. Generous amounts of cooling lubricant water applied to the disk during lapping can freely pass between the island tops but not build up a continuous boundary layer of fluid film between the abrasive and the workpiece. These island valley passages are flushed with water moving outward in a radial direction, due to centrifugal forces, to carry grinding swarf away from the workpiece lapped surface. A continuous boundary layer film tends to increase in thickness as length of continuous fluid contact with a workpiece surface increases until it reaches an equilibrium fluid film thickness. This thickness of water boundary layer exists between the workpiece surface and the abrasive disk and the water film boundary layer prevents contact of the very small abrasive particles or abrasive agglomerates from penetrating through the water film and having cutting or grinding contact with the workpiece surface. The method used to manufacture island disks can be simple, efficient and effective. Two matching plates, with machined or lapped annular ring raised surfaces, can be used to act as a flat molding press. A metal, or plastic, disk backing sheet can be abrasively scrubbed with 3M Company Scotchbrite® material when wetted with a solvent to improve adhesive bonding of the islands to the backing material. Then a slurry of metal, or nonmetal, particles mixed with an adhesive binder is deposited into a pin-head well head. The foundation slurry is transferred to the free ends of a pin-head device which has a single pin for each desired island foundation base by inserting the free ends of the pins into the liquid fluid foundation slurry filled wells. The pin-head then is moved to deposit the island foundations on the disk backing. Then, the top flat annular mold plate is lowered parallel at the island top locations with the bottom plate to mold-form the tops of each deposited island drop to the same height, relative to the top annular surface of the bottom mold plate. After the slurry is partially or fully cured or solidified, the upper mold plate is removed and another pin-head deposits a drop of abrasive slurry binder to the top of each island. Then, the upper mold plate is lowered onto the abrasive slurry and given a limited excursion orbital motion during lowering. A variety of gap sensing devices such as; pressurized air gauges, or capacitance gauges or machine tool gauges can be used throughout the process to control the height of the island foundations and also, the thickness and height, of the diamond or other abrasive material abrasive coating. The upper mold plate would be removed from contact of the island foundation material, or the abrasive slurry binder, upon solidification of the island foundation island top surface abrasive slurry or island foundation material and a final solidification cure can be completed. Then, or at a later time, the disk sheet can be handled without changing the height of each island or the thickness of the abrasive island coating. The upper mold plate can be forced down against the lower mold plate by use of a variety of techniques including; by the use of one or more air cylinders or by the use of stepper motor driven screw slides. The upper mold plate can be offset positionally, preferably in a incremental tangential direction, from the nominal location of the islands for each disk which is coated by this technique to distribute mold plate wear on the contacting plates at the plate island site locations. If the mold plates are used repetitively with the same relative locations, the mold plate surfaces will tend to have concentrated wear at the island site locations.

71. Island Height Gage Matching Plates

Problem: Island height molding plates used to produce a precisely even thickness of abrasive coatings on the top surfaces of an annular pattern of islands attached to a thin flexible disk backing sheet must be wear resistant and have a precise gap distance between the plate matching surfaces. Machining or flat lapping large plate annular surfaces is expensive when producing plates flat enough they can be rotated and used in any circumferential position to form an island height molding gap which is flat within 0.0001 inch (0.0025 mm).

Solution: The abrasive island media disk backing is thin and flexible so the overall sheet thickness only has to be height controlled locally at any given sector of the disk. The precise thickness flexible abrasive disk is used on a grinding or lapping machine by conforming to a flat rotary grinder platen. Because of how the thin flexible abrasive disk is mounted to a flat grinder platen, the disk can be manufactured by height gage mold plates that may not be perfectly flat. Instead, it is only necessary that a precise gap distance be maintained along the annular ring contact surface of two matching mold plates. Plates that are machined to inexpensive commercial tolerances can be used as the base parts to produce a mold plate assembly having a precision annular height gap with the use of inexpensive thickness sheet stock material. Both shim stock metal, and also plastic web backing material, are inexpensive to purchase and which can have a thickness uniformity well within the desired 0.0001 inch (0.0025 mm) tolerance. A piece of this hardened stainless steel shim stock material can be used as a wear surface for oscillation contact of the upper mold plate with the abrasive island slurry by adhesively bonding shim stock to the raised annular ring of one mounting gage plate. Then another piece of precise web precision thickness polyester web material, or shim stock, can be used to conformingly replicate and match the surface of the shim stock covered mold plate directly to the surface of the matching second mold plate. This conformal duplication of the upper mold plate surface to the lower mold plate is accomplished by laying the gap spacer web piece across the surface of the steel covered plate, applying a coating of adhesive to the raised annular ring portion of the matching mold plate and lowering it in alignment with the first mold plate. A small force is applied to clamp the two plates together which then forms a matching surface replica of the steel covered plate on the matching mold plate after the adhesive solidifies. The thickness gage sheet (or spacer web piece) is removed, and discarded, leaving an adhesive plastic coated mold plate that precisely conforms to the steel covered mold plate at the original registration or orientation of the two plates. When abrasive island height gaging is accomplished by use of the mold plate assembly, the plate with the plastic adhesive surface is used to contact the backside of the abrasive disk backing and the hardened steel covered plate is used in contact with the abrasive slurry. Both plates would be positionally registered to each other in the position they were originally replicated together.

Figure 101:
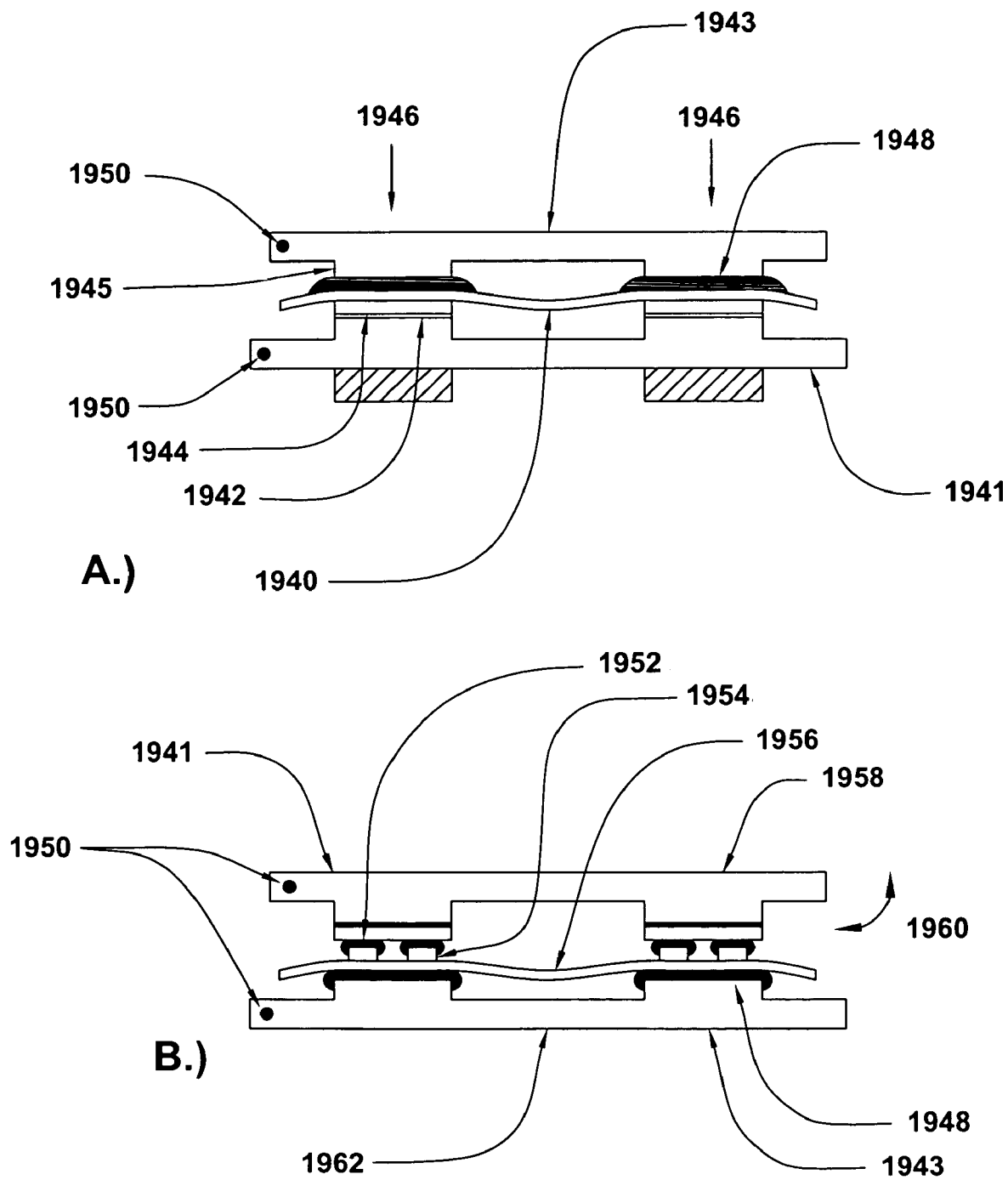
FIG. 101A shows a side view of a precision thickness sheet used to create a matching set of island height mold plates.
FIG. 101B is a side view of a matching set of mold plates used to adjust and control the height of a sheet of raised island abrasives.

FIG. 101A shows a side view of two mold plates, each having annular raised surfaces, with a precision matching surface created by use of a precision thickness sheet of flexible metal or plastic material. As shown, a hardened steel annular top surface 1944 typically made of smooth finish shim stock has been attached to a non precision commercial finish first mold plate 1941 with the use of an adhesive 1942 to obtain a hard smooth surface which has a reasonable but non-super precision flatness. Then, this new hardened steel surface of the first mold plate 1941 is duplicated on the surface of a second mold plate 1943, again, with the mold plate 1943 having a initial flatness of only a reasonable non-super precision flatness. However, the surface contours of the first mold plate 1941 and second mold plate 1943 will match each other within the tolerance of the thickness of a precision gage sheet 1940 of steel or plastic which is commonly available in commercial form with a thickness tolerance well within the desired variation of less than 0.0001 inches (0.0025 mm). The gage sheet 1940 is loosely or tightly mounted on the surface of the first mold plate 1941 and a coating of liquid replication adhesive 1948 is applied to the raised annular surface 1945 of the second mold plate 1943 and this liquid adhesive 1948 coated second mold plate 1943 is brought in contact with the hardened steel top 1944 of the first mold plate 1941 with a concentric alignment, as shown. Match points 1950 are made at the same tangential position of both the first and second mold plates 1941 and 1943 to allow the plates to be separated and returned to the original replication matching position at will. A modest clamping force 1946 is applied around the circumference to encourage the adhesive 1948 excess to flow out of the common ring annular 1945 contact area, leaving a relatively thin adhesive 1948 layer deposited on the surface of the second mold plate 1943. The adhesive is partially or fully solidified, or cured, by a variety of means, and the two mold plates 1941 and 1943 are separated and the gage sheet 1940 is removed. The creation of the matching mold plate set is completed and some other cleanup steps can be used, such as the removal of sharp edges of the replication adhesive 1948 located at the inboard and outboard radial edges of the raised annular surface 1945. FIG. 101B shows the two surface matching mold plates 1941 and 1943 used to create precision thickness abrasive particle slurry 1952 coated islands 1954 on an abrasive disk backing sheet 1956. The first mold plate 1943 having the replication adhesive 1948 coated surface to form a replicating plate 1962 is used as the bottom plate for the sandwich flattening of the liquid or fluid state coated islands 1954. The flexible disk backing 1956 is placed in a sandwich fashion between the two plates 1941 and 1943 which are tangentially positioned at their match points 1950 which forms a precisely uniform thickness gap between the plates with the use of plate spacers, not shown here. The second mold plate with the bonded steel top 1958 is placed in contact with the abrasive particle slurry 1952 and is given an oscillation or vibration motion 1960 to level the abrasive slurry 1952 in conjunction with the spacer posts, not shown. It would be obvious to use different variations of this technique of using a temporary disposable precision thickness plastic or metal web sheet to replicate the flat surface of a first mold plate in forming a matching parallel flat surface on a second mold plate. The surface of a first mold plate only needs to be substantially flat and the surface does not need to have a integral sheet steel covering.

72. Printed Abrasive Island Interface Film

Problem: Wear on the surface of abrasive island flat molding plates can cause a precision lapped or precision flat mold plate surface to be distorted due to rubbing contact with abrasive slurry coated islands. Also, diamond particle adhesive binders tend to stick to the mold plate surface which contaminates the surface for the next abrasive disk island height adjusting procedure. It is desirable to separate and remove the mold plate assembly from the abrasive island sheet prior to the full cure or solidification of the abrasive slurry binder to allow the reuse of the mold plate with another abrasive island disk sheet during the time the abrasive binder on the previous sheet is being fully cured or solidified.

Solution: A protective thin film sheet of plastic such as Saran® kitchen food wrapping material can be used as a temporary covering of the mold plate surface that is facing the abrasive slurry coated island top surfaces. This film sheet typically may be from 0.0001 to 0.002 inches (0.0025 to 0.051 mm) thick and have a sheet thickness which varies less than 0.0001 inch (0.0025 mm). The disposable cover sheet protective film can be attached to the mold plate surface by vacuum or by a static charge or by other means that provide a clinging temporary bonding action. Then, the protective film-covered mold plate can be brought into contact with non-solidified abrasive particle binder slurry that is coated on the top flat surfaces of raised island structures that are attached to a disk backing sheet. The mold plate and the attached protective film can be oscillated horizontal against the abrasive slurry to level the abrasive slurry deposited on each flat island to provide an equal height to the top surface of the abrasive coated islands. Any surface contact wear that takes place at the island site areas during the island height leveling procedure would take place on the surface of the film. This abrasive particle induced contact wear would not occur on the precision flat surface of the of the mold plate at the island site contact surface areas because these contact areas would be protected from the abrasive particles or abrasive agglomerates by the disposable protective film sheet material. The abrasive disk sheet having attached raised island structures that are top surface coated with an abrasive particle binder slurry mixture would be sandwich-positioned between the two parallel mold plates, of the mold plate assembly, for a process time period until the abrasive slurry is wholly or partially solidified. After the slurry solidification, the abrasive-side mold plate would be separated and removed, leaving the thin protective cover film sheet attached to the slurry binder adhesive. At a preferred cure stage, or partial solidification, of the slurry adhesive, the protective cover film sheet would be peeled from the abrasive slurry coated island surfaces without disturbing the established height of individual islands or the thickness of the abrasive slurry that is coated on top of the islands. The film cover sheet would then be discarded. After the cover sheet is removed, solvent can continue to evaporate from the slurry binder and the binder volume reduction that accompanies the loss of the solvent would tend to expose a larger portion of each abrasive particle, particularly if a mono or single layer of abrasive particles or abrasive agglomerates is coated on the surfaces of the raised island structures. Both of the matched sets of mold plates can be removed from the abrasive disk and a new protective plastic film sheet can be attached to the abrasive slurry side face of the mold plate. This new protective sheet allows the mold plate assembly to be reused to height-level a new abrasive slurry coated island abrasive disk while full cure or solidification of the abrasive slurry binder takes place on the previous abrasive disk. This same technique of applying a protective cover sheet as a temporary covering for the contact surface of a mold plate that is in contact with a wet abrasive slurry island top coating can be used to create the island base foundations. If desired, island base foundation material can be pin-drop coated on the surface of the protective cover sheet film and then these island forming drops can be transfer-coated to the surface of a backing sheet. The protective disposable sheet is thus used as a transfer sheet to apply an array of drops of island foundation material to a backing sheet. The transfer sheet having liquid island formation material drops can be placed into direct contact with the backing sheet to contact-wet the backing sheet at each island site and then the mold plates brought can be brought into contact with both the transfer sheet and the backing sheet. Alternatively, the protective film transfer sheet can be attached to the surface of one of the mold plates, liquid island foundation material drops can be applied to the transfer sheet and then this mold plate can be positioned to allow the liquid drops to contact-wet a backing sheet. In either case, the two mutually flat mold plates are positioned in plate geometry alignment and separated with a desired gap so that the parallel plates establish a uniform height to each of the island structures until the island foundation material is partially or fully solidified. After partial solidification of the island base foundation binder adhesive, the film cover sheet is stripped away.

By using this formed-drop transfer technique, drops of island foundation material can be deposited at island sites on a release liner type of cover film sheet material and this film sheet can then be brought into contact with a abrasive backing sheet whereby the non-solidified foundation adhesive material is in wetted adhesive contact with the backing sheet. After the sheet is sandwich-clamped between parallel mold plates by using techniques to maintain the mold plate contact surfaces parallel to each other with a desired gap distance, raised island structure foundations are created whereby the solidified island foundations are adhesively bonded to the backing sheet. The thin material drop transfer sheet can be peeled off from the island surfaces without dislodging the island foundation structures from the backing sheet. The raised island structures would tend to remain integrally bonded to the backing sheet in part because of the weakness characteristics of the very thin transfer film sheet; and also, due to techniques of peeling the transfer sheet film from the island top surfaces. The peeling action can be enhanced by moving the free end portion of the thin transfer sheet in a direction parallel to the plane of the island surfaces as would a pressure sensitive tape, such as masking tape, be peeled from a wall surface. A release liner film including Saran® wrap film may have release characteristics as an integral component of the film. They may also be due to the film manufacturing techniques that provide release liner characteristics which allow preferential separation of the film from the islands tops. Also, other materials such as mold release coatings may be applied to the adhesive binder side of the transfer film sheet.

The same technique of transfer coating drops that are used to form the raised island foundations can be used to transfer-coat drops of a abrasive particle slurry mixture, comprised of abrasive particles or abrasive agglomerates mixed with a polymer resin and solvents, to the top flat surfaces of raised island structures that are bonded to a backing sheet. Drop formations of the abrasive slurry would be deposited on a thin flexible transfer sheet with a slurry drop deposition pattern that matches the geometric pattern of the sites of the raised island foundations. The transfer sheet would be aligned with the raised islands backing sheet with a method that allows the abrasive slurry drops to be transferred in whole to the center of each island flat top surface. After the abrasive slurry fully contacts the islands, the island backing sheet and the slurry transfer sheet would be placed in a sandwich fashion between the two parallel mutually flat mold plates. The plates would brought together with a force where the plates contact both the abrasive slurry transfer sheet and the raised island backing sheet in a manner where the plate surfaces are mutually parallel and also parallel to the plane of the island surfaces. One of the plates can be oscillated to spread the abrasive slurry across the full flat surface of the raised island structure. After the abrasive slurry has partially solidified, the plate can be removed and the abrasive slurry transfer sheet can be peeled away from the island top surfaces, leaving a layer of abrasive slurry spread across the top surface of each island. The abrasive slurry and the island foundation materials can be fully solidified by polymer chemical curing reactions or by the evaporation of binder solvents or a combination of both polymerization and solvent evaporation. Gap spacers are typically used to hold the parallel surfaces of the two plates apart a prescribed distance to assure that both mold plates are mutually parallel and to provide a consistent height of the island foundation structures. Other techniques or systems can be used in place of the gap spacers to adjust the gap between the mold plates for establishing the island foundation heights and the mutual planar flatness of all of the island structures. When mold plates are used to establish the flatness of a abrasive slurry that is coasted in a thin layer on the top surface of an array of raised islands, it is not necessary to use gap spacers between the two mold plates; however, the mold plate gap spacers may be used if desired. Mold plates may also be used to spread a layer of non-abrasive particle filled resin adhesive to the top flat surfaces of raised islands. After the resin has been spread over the full flat island flat top surfaces, abrasive particles can be drop coated or otherwise deposited onto the top surface of the non-solidified coating to adhesively bond the particles to the island tops.

Figure 102:
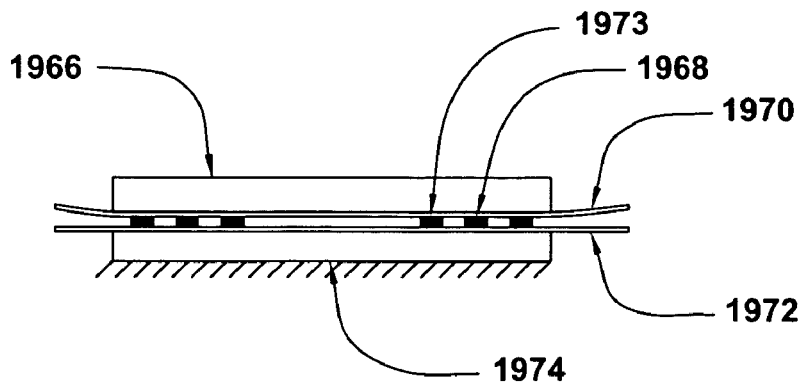
FIG. 102 is a side view of a set of island mold plates with a disposable interface film.

FIG. 102 shows a side view of a matching set of island mold plates with a disposable interface film. A thin interface film 1970 of precision thickness is attached to an upper mold plate 1966 to contact the top surface of abrasive islands 1968 which are coated with a wet liquid abrasive particle slurry 1973. The islands 1968 are attached to an abrasive disk backing 1972 which contacts the surface of a lower mold plate 1974. After, the abrasive slurry is height leveled, the mold plates 1966 and 1974 are separated and the backing 1972 is removed with the interface film 1970 loosely attached to the abrasive coating 1973. The film 1970 can be removed from the island 1968 tops prior to curing or solidification of the abrasive slurry 1973 binder or after solidification of the abrasive slurry 1973, depending on the type of interface film 1970 material and the type of slurry 1973 curing or solidification process.

73. Abrasive Island Disk Mold Plates

Problem: It is expensive to grind or lap 18, 24 or 36 inch (46, 61 or 91 cm) diameter plates within 0.0001 inch (0.0025 mm) flatness for use in mold forming the height of abrasive islands which are deposited on thin flexible disk backing sheets, where the sheets are typically 0.005 inch (0.127 mm) thick.

Solution: A matched set of mold plates can easily and simply be constructed using a sheet of precision thickness web stock material such as polyester, which is inexpensive and readily available, with a typical thickness variation of less than 0.0001 inch (0.0025 mm). Two arbitrary round or square mold plates made of common commercial quality aluminum or steel which have a flat size larger than the desired abrasive disk diameter are marked or loosely pinned so the two plates can be consistently assembled with the same relative tangential and radial positions. Then, the matching side surfaces of each mold plate are coated with an adhesive bonding agent, for example an epoxy material. A sheet of the precision web stock material, having a size approximately equal to the mold plate surface, is also coated with the same epoxy on both sides. This sheet is sandwiched between the two epoxy coated mold plates so that the four independent non-solidified epoxy adhesive layers are mutually joined to form two epoxy bond layers that attach both mold plates to the common web sheet. Vacuum can be applied to the whole sandwich assembly that consists of the two mold plates and the spacer web sheet to eliminate air void spaces in the epoxy adhesive material. This type of mixed two-part epoxy adhesive will typically not have a strong bond to the smooth surface of a polyester web sheet but the epoxy would tend to bond strongly to the flat surface of a metal mold plate, when the epoxy is partially solidified. After solidification of the epoxy adhesive bonding material, but typically prior to a full epoxy cure solidification, the two metal mold plates can be separated from the polyester or other material web sheet that is joined in common with the two mold plates. The plates can be separated from each other without affecting the thickness of the partially cured epoxy adhesive bonded to each of the two mold plate surfaces. At this stage of partial cure of the epoxy, the epoxy adhesive will easily separate from the polyester web spacer sheet. To promote better preferential release from the polyester sheet, the polyester sheet can be coated with a thin mold release agent that will have little, if any, effect on the variation of the thickness of the sheet. The thickness of a mold release coating is typically much less than 0.0001 inches (0.0025 mm). Also, if the mold release coating is spread uniformly across one or both surfaces of the polyester sheet, to allow ease of separation of the sheet from both mold plate surfaces, the effective thickness of the polyester sheet will be increased somewhat but the uniformity of the polyester sheet thickness will be unchanged. The absolute, or nominal, thickness of the polyester sheet is not important to creating a matching and mutual flat surface to the two mold plates. A final cure is given to the epoxy or other type of adhesive material that is bonded to each matching surface of the mold plate. The adhesive cure can be a time based cure or the cure can be speeded up by subjecting the mold plates to modest temperatures of approximately 200 degrees F. which will not affect the dimensional stability of the mold plates. Then, the epoxy coated mold plates can be used to mold the abrasive islands to a precise height by using a variety of mold process techniques. In this process of island height molding of an abrasive disk, it is an advantage to use a precision thickness disposable layer of web sheet between a wet abrasive particle slurry binder and the epoxy coated mold plate to prevent contamination of the mold plate by the slurry binder or another abrasive particle binder adhesive, or an abrasive particle top coat. A variety of sheet materials can be used, including very precision thickness wax sheets that are commercially available to mount workpiece parts for lapping. Also, a thin layer of Saran® kitchen wrap, or another sheet of thicker polyester web can be used as a temporary barrier coating between the thin flexible disk backing sheet with abrasive slurry coated islands and the epoxy coated mold plate. After a partial cure is effected on the abrasive island binder slurry, the mold plates can be separated and the temporary spacer release liner sheet removed and discarded.

74. Island Abrasive Coating Leveling Mechanism

Problem: It is desirable to coat the top flat surface of round, or radial bar shaped, raised islands with abrasive particles, which are only a single abrasive particle thick, for particles greater than 9 micrometers in diameter. For diamond or CBN abrasive particles less than 9 micrometers, to 0.1 micrometers or less, it is desirable that the total coating thickness range from 0.0003 to 0.002 inches (0.0076 to 0.051 mm) thick, which can result in the abrasive particles being stacked a number of particle diameters thick in the adhesive binder coating that is used to bond the abrasive particles to the island flat top surfaces. Pressing two mold plates together where one mold plate acts against the exposed top of abrasive slurry that is coated on the top surfaces of flat raised island structures can result in a local group of stacked particles acting as a bridge-structure raised hill of particles. This abrasive particle hill can be composed of a number of levels of interlocked abrasive particles or abrasive agglomerates that are pressed down rigidly onto the flat surfaces of the raised islands. The upper mold plate may be held upward in a raised gap position, from the desired position, by a few of these abrasive particle raised hills that are located at different positions on the mold plate surface even when a mold plate static clamping force, or a mold plate vibrating force is applied to the plate. The mold plate that is positioned upward from the desired elevation from the raised island surfaces by these abrasive particle hills may have its flat surface not parallel to the back of the raised island sheet backing which would result in abrasive coated islands that are not flat and parallel to the backside of the island backing sheet. These uneven height raised islands may occur even when the parallel plate clamping force, or vibration, acts normal or perpendicular to the surface of the mold plate. It is necessary to impart some motion, or action, to prevent the formation of the stacked particle hills, or to level out the particle hill, so that only single layer of abrasive particles or abrasive agglomerates are bonded to the flat surfaces of the raised islands, thereby creating a mono layer of abrasive. It is desired that manufacturing techniques be used to produce abrasive sheets having raised islands that are top coated with abrasive particles or abrasive agglomerates to create abrasive articles that effectively utilize expensive abrasive particles or abrasive agglomerates including diamond or CBN particles. Abrasive slurry coating techniques usually employed for coating continuous web abrasive material cannot typically be used for coating abrasive articles having flat island tops. Problems can occur when using common web coating techniques for coating sheets having raised islands. Excess diamond particle coating material can be pushed off the island top surfaces by these traditional coating techniques and this excess abrasive material wasted for abrading use as it does not contact a workpiece surface.

Solution: Two mold plates can be brought against the abrasive particle coated island disk backing sheet with a nominal clamping force to hold the upper plate against the fluid uncured abrasive particle slurry. A driven double-eccentric rotating mechanism can be used to impart a limited excursion oscillation action of the whole upper mold plate relative to the lower mold plate. This oscillation action would act in the plane of the contact surface of the plates. Two independent eccentric oscillation excitation mechanisms can be employed for a single top mold plate. Operating both oscillation mechanisms simultaneously assures that the whole mold plate will move across its full surface to impart the same oscillation action to the full abrasive disk sheet. A total side-to-side excursion of from 0.002 to 0.050 inches (0.051 to 1.27 mm) which would be sufficient lateral motion to prevent the buildup of particle hills or to flatten existing hills. Use of a timing belt connection to the two widely spaced rotating eccentric hubs assure that the whole plate will be moved with the same limited excursion oscillation action. The eccentric cams or their bearings would fit sufficiently loose in the plate socket cam holes to allow the normal plate clamping force, used to pressure the upper mold plate against the island tops of the abrasive disk which is sandwiched between the plates, to be independent of the oscillating forces used to move the top plate laterally. Also, the lower mold plate could be moved incrementally in either an "X", "Y" or radial direction, or be oscillated in either of these directions at the time the top plate oscillation is imparted, to further enhance the hill leveling action. Both the upper and lower plate can also be vibrated perpendicular to the plate surface to produce leveling for either circular or bar shaped or chevron bar shaped islands.

Figure 103:
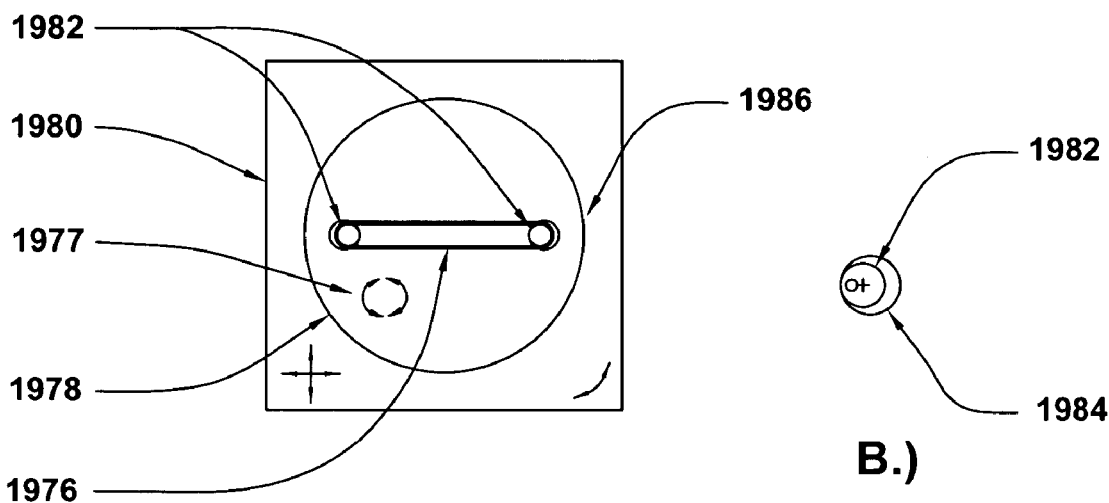
FIGS. 103A, B, and C show a dual cam activated mold plate oscillation system.
Figure 103:
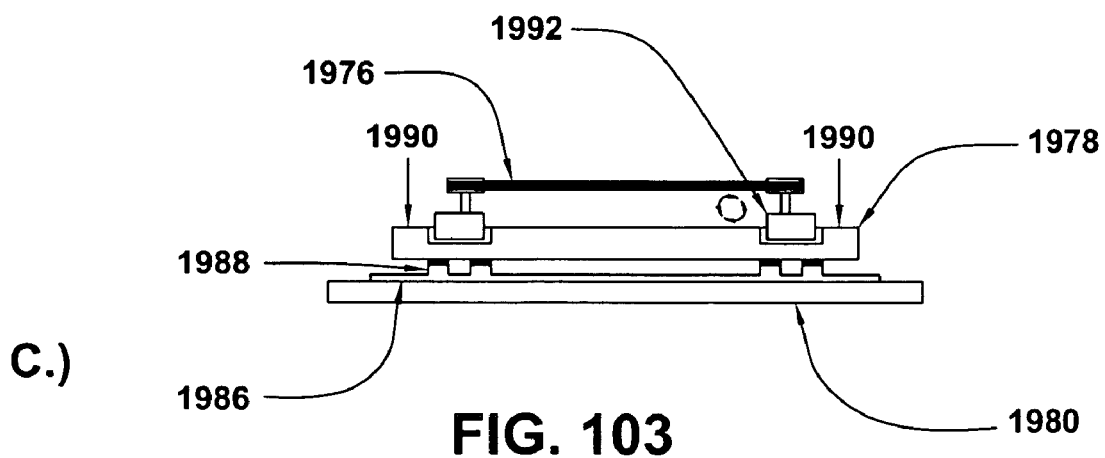

FIG. 103A shows a top view of a cam operated upper island mold plate oscillation system. An upper mold plate 1978 is moved in a circular oscillation pattern 1977 relative to a lower mold plate 1980 by two independent eccentric cams 1982 which are driven by a belt 1976 which is rotated by a motor, not shown. A raised island disk backing 1986 is mounted on the surface of the lower plate 1980. FIG. 103B shows an enlarged view of an eccentric cam 1982 which rotationally travels in a cam socket hole 1984 which is of a sufficiently tight fit to the cam body as to impart the horizontal motion to the upper mold plate 1978 but allows free vertical travel of the upper plate 1978 toward the lower mold plate 1980 to effect a uniform island top height leveling action across the full surface of all the abrasive disk backing 1986 islands. FIG. 103C shows a side view of the eccentric cam oscillating plate mechanism where the belt 1976 driven rotating cam mechanism 1992 imparts an oscillation action 1977 to the upper mold plate 1978 relative to a stationary lower mold plate 1980. A light clamping force 1990 is employed to aid in the precision height leveling of the abrasive slurry coated islands 1988 that are attached to the abrasive disk backing 1986.

75. Grinding with Water Lubricant Under Vacuum

Problem: When hard workpiece parts are ground or lapped at high speeds of 10,000 SFPM there is a tendency for the workpiece surface to be overheated, or even cracked, due to the heat which is generated by grinding surface contact friction. Typically water is used as a lubricant for grinding or lapping. Cracking is a particular problem with hard materials including altic, aluminum titanium carbide, and other ceramics.

Solution: Grinding can be done under vacuum conditions to promote the boiling heat transfer of water by lowering the temperature at which water boils by lowering the environmental pressure of the water. A slight vacuum, of a few inches of water column pressure, or of mercury column pressure will lower the water coolant boiling temperature considerably. Increasing the vacuum to about minus 10 psi or about 20 inches (51 cm) of mercury will lower it even further. Boiling heat transfer where water is changed from a liquid to a vapor provides one of the best cooling heat transfer coefficients known in heat transfer. Use of raised islands of an abrasive article will provide island valley passageways for the relatively large volume of water vapor that is generated when a volume of liquid coolant water is converted to steam. The valleys allow the vapor to pass out from the area of contact between the island abrasive surface and the workpiece surface. The heat transfer under vacuum would be so effective that it would tend to hold the whole workpiece surface at the temperature corresponding to the vacuum vapor pressure of the water at that reduced pressure. Heat removal would be most effective at the ground, or lapped, areas where the most heat was generated. Special additives such as alcohol could be added to the water to further enhance the vacuum boiling workpiece cooling.

76. Abrasive Island Base Foundation on Backings

Problem

It is necessary to have raised island base foundations which are flat on top and where all of the island tops are precisely uniform in height across the full surface of an annular band of islands positioned on a circular disk backing sheet so that a precise thickness abrasive particle coating can be applied to the island tops with the result that the finished coated disk has an overall precise uniform thickness. The overall thickness is measured from the top surface of the abrasive coating that is bonded to the raised islands to the back mounting side of the abrasive article backing sheet.

Solution

Relatively thin 0.020 inch (0.5 mm) thickness disk backing material can be reduced in height, or thickness, by a variety of methods to leave only discrete islands raised in height above the backing surface. One method would be to use a metal backing, such as brass or aluminum, and coat the top surface with a chemical photo resist layer which is cured by exposure to a light source to leave island areas only covered with the electrically insulating resist coating. Then a chemical etch or chemical machining would be used to remove the remainder of the backing top surface, leaving a metal base having a thickness of about 0.005 inches (0.127 mm) with the island areas standing about 0.015 inches (0.38 mm) above this etched surface. The island areas that are protected by the insulating resist material would not be etched or chemically dissolved away. The etching process would result in island structures that are raised in respect to the metal base material. Enough material would be etched or removed from the metal backing having integral raised island structures that the backing disk would be flexible enough that the disk could be flat-conforming mounted to a flat platen surface. If desired, the etched disk backing can then be subjected to precision lathe cutting with a diamond cutting tool to level off the island tops smoothly where each island top has a height variation of only 0.00005 inches (0.00127 mm) as measured from the base of backing. Other techniques can be used to produce these raised islands on a backing sheet. For instance, a thick light curable polymer adhesive can be coated on a thin plastic or metal backing. The polymer can be exposed to a light source to polymerize the coating at the location of the island sites. Solvent would then be applied to the coated backing sheet to wash away the coating material that exists between the light-cured island shapes to produce an array of raised islands on the backing sheet. The raised island structures would be adhesively bonded to the backing sheet. These raised abrasive islands can be produced on a continuous web. Here, individual circular or round disks can be cut out of the continuous web that has annular island array shapes. Again, the island structures that are attached to a continuous web backing can be height machined. The island tops can be continuous web transfer coated with resin and abrasive particles drop coated on the wet resin to produce abrasive coated islands. Alternatively, a slurry of abrasive particles or abrasive agglomerates mixed with a polymer binder adhesive can be transfer coated or gravure roll coated onto the island tops.

77. Spin Coat Annular Band on Transfer Sheet

Problem:

It is desired to apply a thin resin make coat on the top surfaces of an array of raised abrasive island foundations attached to a disk backing sheet. First, a thin precise thickness annular band of resin can be coated on a thin flexible sheet round disk to create a resin transfer coat carrier disk. This wet resin coated transfer sheet disk would then be brought into surface contact with the annular raised islands located on and attached to another thin flexible sheet disk to transfer a portion of the wet resin from the coated transfer disk to the island surfaces. It is preferred that both the transfer sheet disk and the raised island disk would have a nominally the same matching diameters. After the transfer disk sheet is removed from the raised island disk, a thin make coat of wet resin would be now coated onto the top surface of each island. Then loose diamond particles would be drop deposited on the thin precise thickness layer of wet make coat resin coated island surfaces. After partial or full cure of the resin, the diamond particles are bonded to the island surfaces.

Solution

A thin plastic or metal sheet disk can be mounted on a flat rotatable platen and attached to the platen by vacuum or other hold down means. A low viscosity liquid resin can be applied to either the center surface portion of the disk sheet, or the resin liquid can be applied only to an outer periphery of the disk sheet by rotating the platen at a low speed while pouring therein onto the disk. After the resin coating has been applied to the disk, the platen speed can be increased to spread the resin over the annular band area which is desired to be coated. After this band area is fully wetted with resin coating, the platen speed is again increased to about 1,000 rpm for a 18 inch (46 cm) diameter platen to develop a precision thickness and very thin (approximately 10 micrometers thick) resin coating across the full radial width of the annular band. Different rotational speed profiles, where the platen acceleration, topspeed, intermediate speeds and deceleration are optimized as a function of the rheological characteristics of the resin, which can be viscosity adjusted with the use of various solvents. A typical resin coating used would include phenolic or polyimide resins. Immediately after spin coating the disk sheet, it can be used to transfer (typically 50 percent) of the thin resin coating to the raised island surfaces of another disk sheet having attached raised island structures by pressure contacting the two disks together. Here the annular ring of wet resin would be concentrically aligned with the annular band of raised islands and the wet make coat resin would be brought into pressure contact with the island top surfaces. After the wet resin has fully wetted the top surfaces of each raised island, the resin transfer sheet would be separated from the raised islands resulting in approximately 50% of the thickness of the resin that was coated on the transfer sheet to become deposited as a resin coating on the island surfaces.

78. Daisy Wheel Abrasive Article

Figure 104:
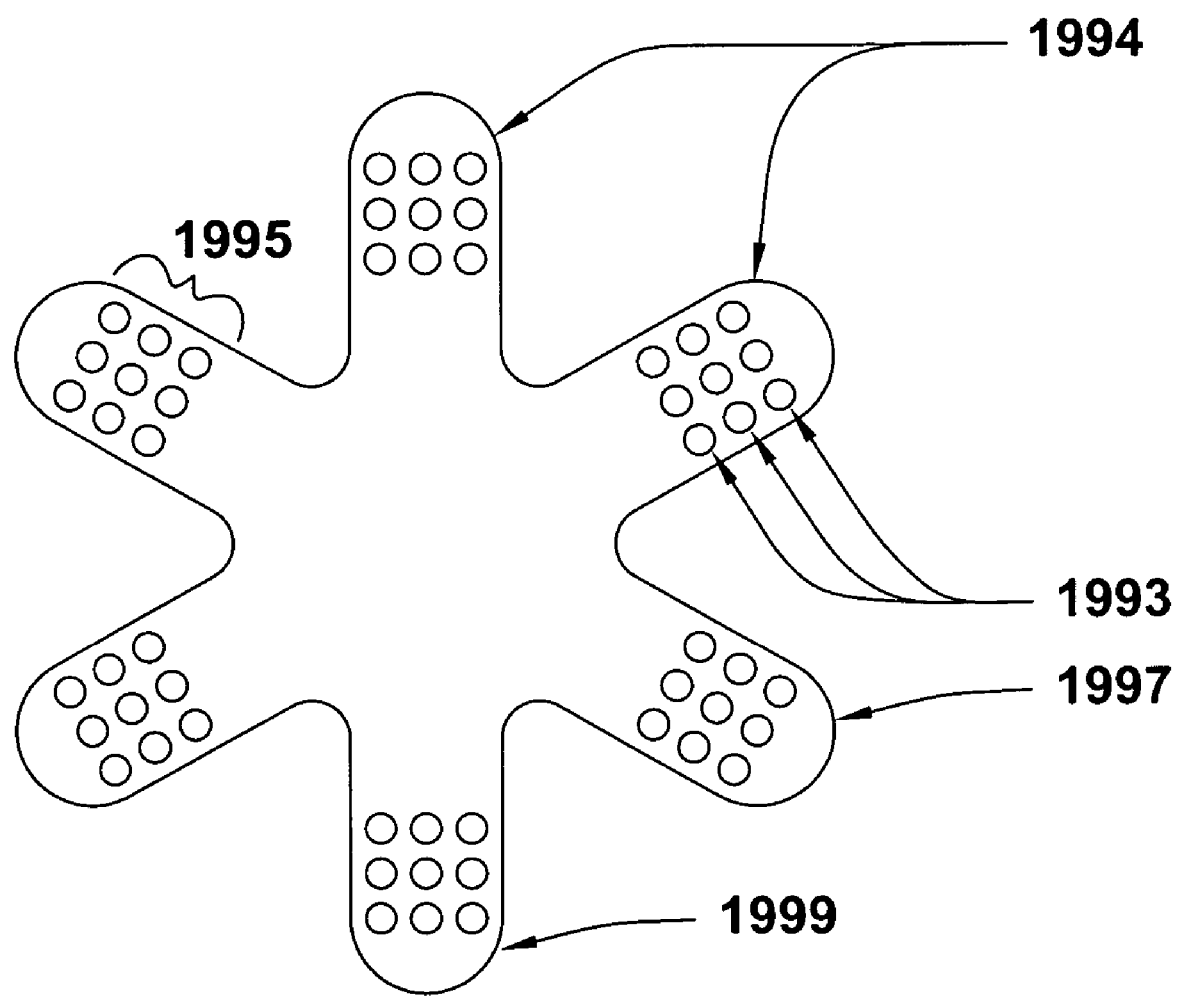
FIG. 104 is a top view of a daisy wheel abrasive article.

FIG. 104 shows a top view of a daisy wheel abrasive article. The daisy wheel 1997 has a flexible backing sheet 1999 having spokes 1994 that have attached abrasive particle coated raised islands 1993. The islands 1993 are located in annular arrays 1995.

79. Font Sheet for Abrasive Islands

Problem:

It is desired to construct a font sheet for use in creating raised island foundation bases on an abrasive backing sheet. The font sheet would typically have approximately the same thickness as the desired height of the raised islands. Individual through holes located in the font sheet can be positioned in a variety of different array location patterns to produce an annular band of raised island structural foundations that are bonded onto the surface of a circular backing disk sheet. The island foundation bases would be formed by clamping the font hole sheet flat to a backing sheet disk. Then the holes would be level filled with an island base foundation adhesive fluid material such as a particle filled resin. After solidification of the foundation material, the font sheet would be separated from the backing sheet thereby leaving the island base foundation material attached to the backing sheet. The tops of the raised island bases can be machined level and the island top surfaces coated with abrasive particles or abrasive agglomerates to create an abrasive disk article. It is desired to have an arrangement of raised island foundation forming holes in a island-hole font sheet where each hole has consistent gap distances between adjacent holes for those holes located at the same relative radial position within the annular band. For annular bands of raised islands it is preferred that each font hole should be followed in a tangential path by another adjacent hole that is offset radially by approximately one half the diameter of a island shaped hole. The alternating radial hole offset pattern on an annular disk is difficult to achieve for the case when there are close spaced island-site holes. It is further desired that an equal number of holes exist in each circumferential row of holes that are positioned at different radial positions in the annular band. This spacing problem is due to the geometry effect where a smaller disk circumferential distance exists for a tangential row of holes located at the inner radius of an annular band as compared to a larger circumferential distance for a tangential row of holes that is located at the annular band outer radius.

Hole or island site location problems also occur when a rectangular array of raised islands, as formed on a continuous web sheet, are used for the construction of an annular abrasive disk. First, one problem occurs when cutting a circular disk from a web sheet having a rectangular array of raised islands where each island is offset geometrically in two right-angle directions to form an orthongonal matrix or square matrix of island sites on a backing sheet. The outer radius edge curvature of an abrasive disk will intersect some of the raised island structures that are located in a rectangular array pattern. Cutting the circular outline of the disk from these island structures results in the raised abrasive coated islands having portions of individual island structures that can be cut away during the die cutting process. Further, a geometry factor inherent in the use of the rectangular grid spaced array disk results in four "once-around" workpiece grinding events for a single rotation of the abrasive disk where an open non-abrading gap line, which exists between rows of abrasive islands, is rotationally presented to a workpiece surface. This open-line gap effect of the rectangular island array continues for a substantial portion of an abrasive disk rotation. Due to the slower wear of the abrasive islands at the slower surface speed inner radial positions, it is desired to have fewer islands, per square surface area, at the inner radius portion of the annular island band.

Solution

The four "once-around" line gaps inherent in a rectangular array island disk can be eliminated with the use of an offset radial column annular band island pattern. The benefit of improved island rotational array occurs because of the very short rotational distance of one radial column of islands that is followed directly by another offset row column of islands. Here, an annular band hole pattern can be established where the gap spacing between islands, or font holes, progressively increases along a radial line column, from the outer annular band radius toward the inner band radius, to obtain increased radial separation between holes at the inner radii. Then a duplicate of this radial column of islands is made at a typical small incremental angle of 1.5 degrees for ten each 0.125 inch (3.175 mm) diameter islands spaced with an annular band extending from 7 inches to 11 inches (17.8 to 28 cm) diameter. This duplicate radial column row of islands is radially offset from the first radial column with a radial offset equal to about one half of the spacing between the two outermost radially positioned holes. Adjacent font holes, or islands, have a typical gap between them of 0.030 inch (0.76 mm) at the outer radius and this spacing gap progressively increases to a 0.110 inch (2.8 mm) gap at the inner annular band radius. Then, the original column of font holes and the offset column of font holes are duplicated in a rotational array to fill the complete annular raised island disk band. This rotational-array pattern results in a sequential overlap of each successive adjacent island in a tangential direction when grinding or lapping with a disk having an annular band array of islands. The annular band can contain 2,400 islands or font holes. A fairly uniform gap spacing exists between adjacent holes, or islands, due to the shorter circumferential path at the inner band radius. Similar spacing techniques can be employed and optimized for different sized annular rings used with a variety of hole, or island, diameters.

Figure 105:
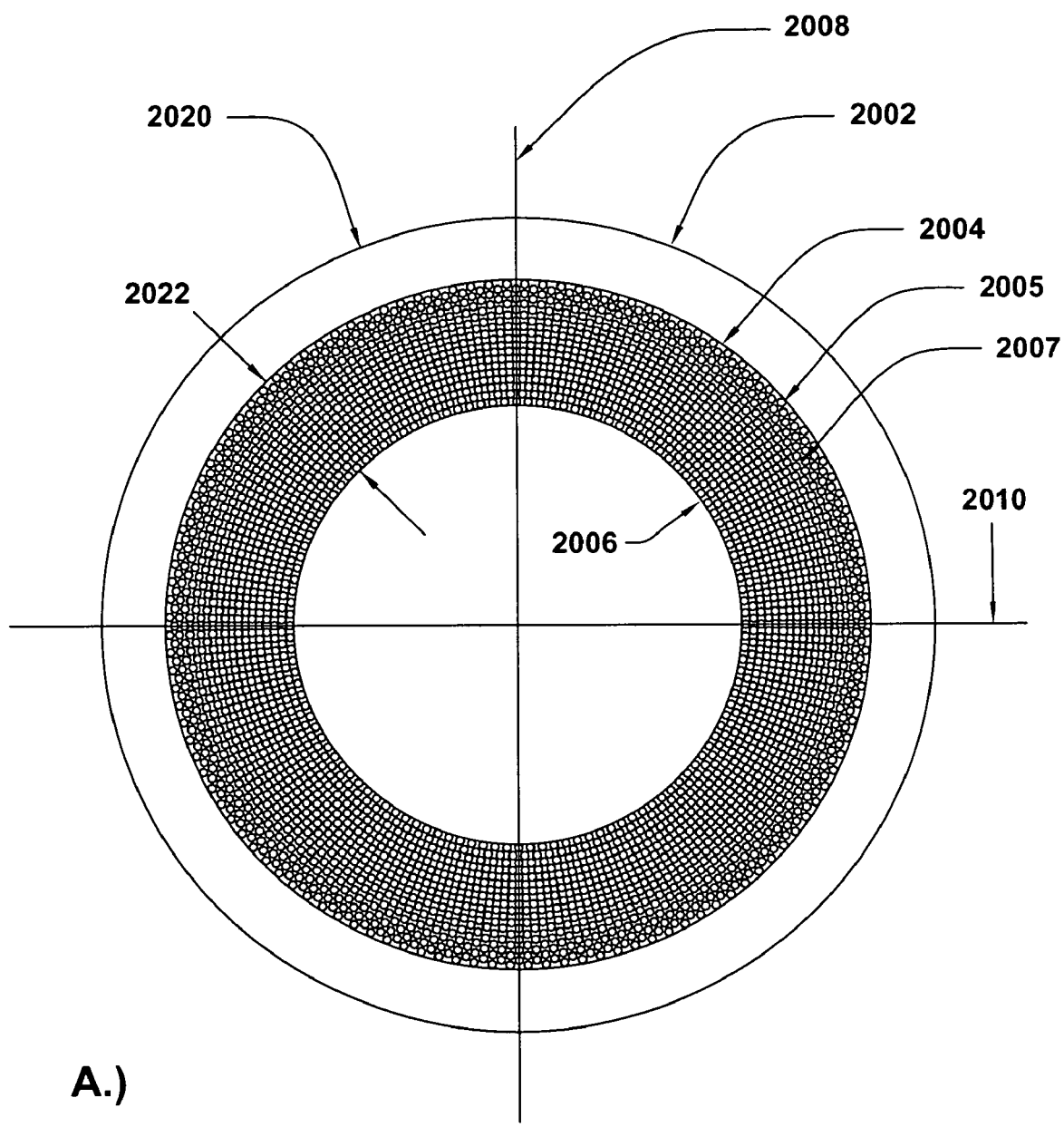
FIGS. 105A, B, C and D show top views of a hole font sheet used to deposit island base foundation material on disk backing sheets.
Figure 105:
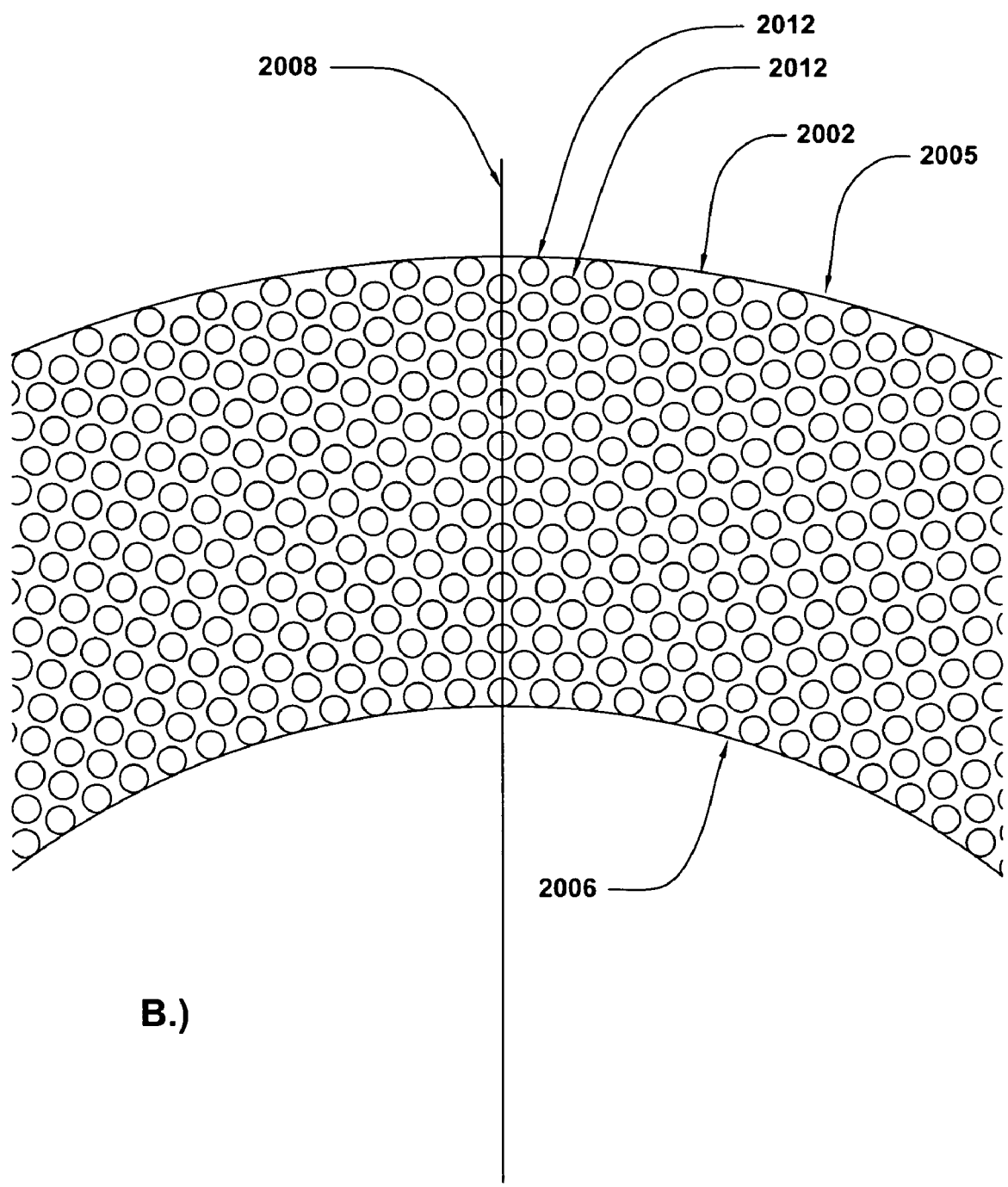
Figure 105:
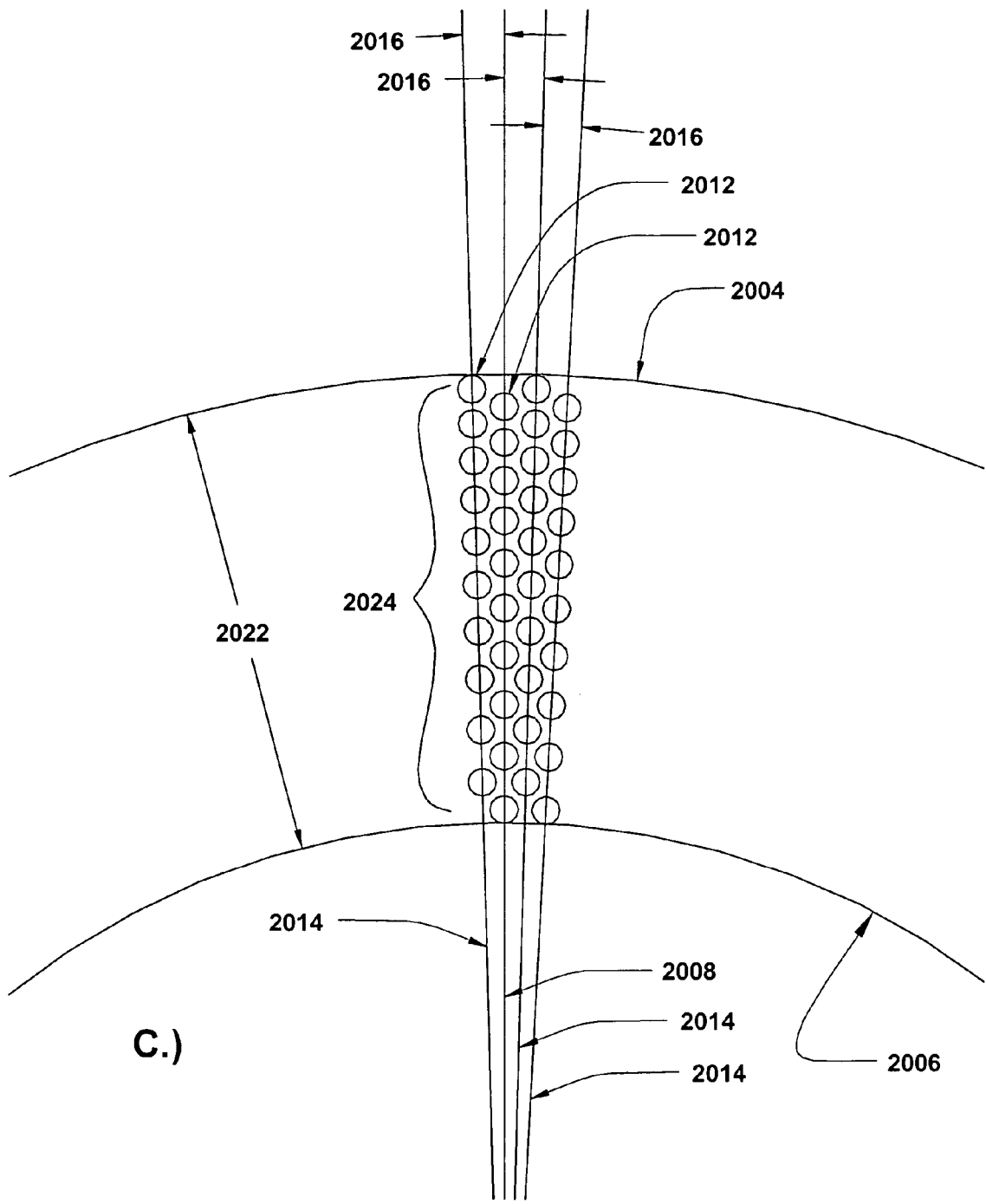
Figure 105:
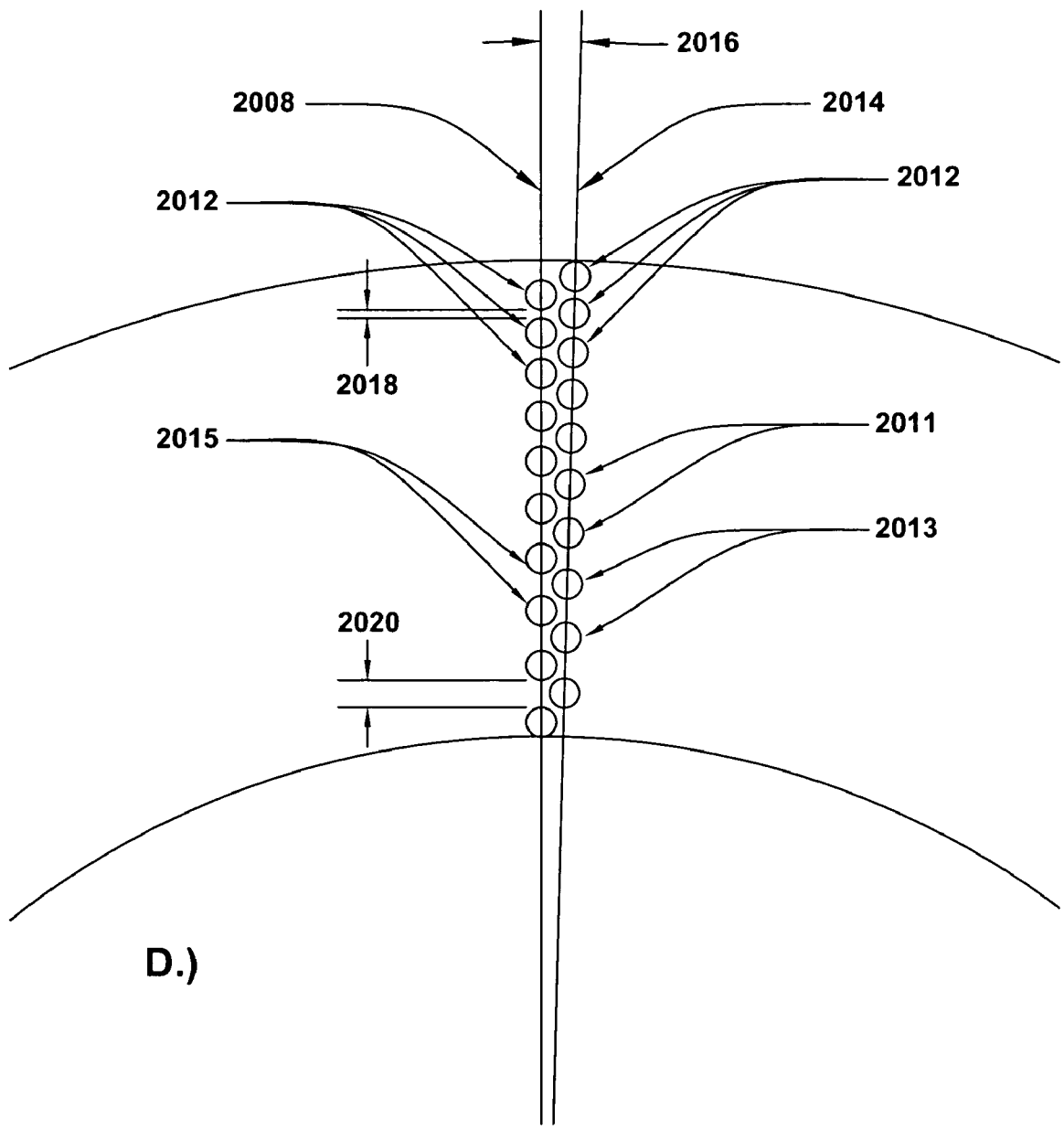

FIGS. 105A, B, C and D show views of a radial offset array of islands on an annular disk. FIG. 105A shows a top view of a circular abrasive disk 2002 consisting of a thin continuous flexible backing sheet 2020 having an annular band 2005 of raised abrasive islands 2007 where the annular band radial width 2022 is bounded by an inner radius 2006 and an outer radius 2004. The disk vertical centerline 2008 and the horizontal centerline 2010 define the geometric location of the annular band 2005 of islands 2007 on the abrasive disk 2002. FIG. 105B shows an expanded top view of the annular band of islands where the circular abrasive disk 2002 has an annular band 2005 of circular islands bounded at the inner radius 2006 and has circular island areas 2012 shown positioned relative to the vertical centerline 2008. FIG. 105C shows a top view of radial columns of circular island areas 2012 where the radial island column centerlines 2014 are spaced relative to the vertical centerline 2008 as shown by circumferential angles 2016. The radial column of islands 2024 extends over an annular island band width of 2022 between an outer radius 2004 and an inner radius 2006. Four radial columns of islands are shown circumferentially adjacent to each other with each row approximately offset radially from the adjacent column by one half the radial gap between any two radially adjacent islands on a column. FIG. 105D shows two columns of islands as they are positioned relative to each other. First, one radial column of islands 2012 is created with a small radial gap spacing 2018 between the first two islands at the outer radius of the annular band. The radial spacing between the islands 2012 is increased progressively toward the inner radius of the annular band to a maximum radial gap spacing 2020. Then, this first radial column of islands 2012 located on the centerline 2008 is duplicated and offset tangentially by an angle 2016. This new second column of islands 2013 located on the radial centerline 2014 is also offset radially outward from the first column islands located on centerline 2008 so that each island 2011 in the new second island column 2013 is positioned radially halfway between the two closest adjacent islands 2015 located in the first island column 2012.

Figure 106:
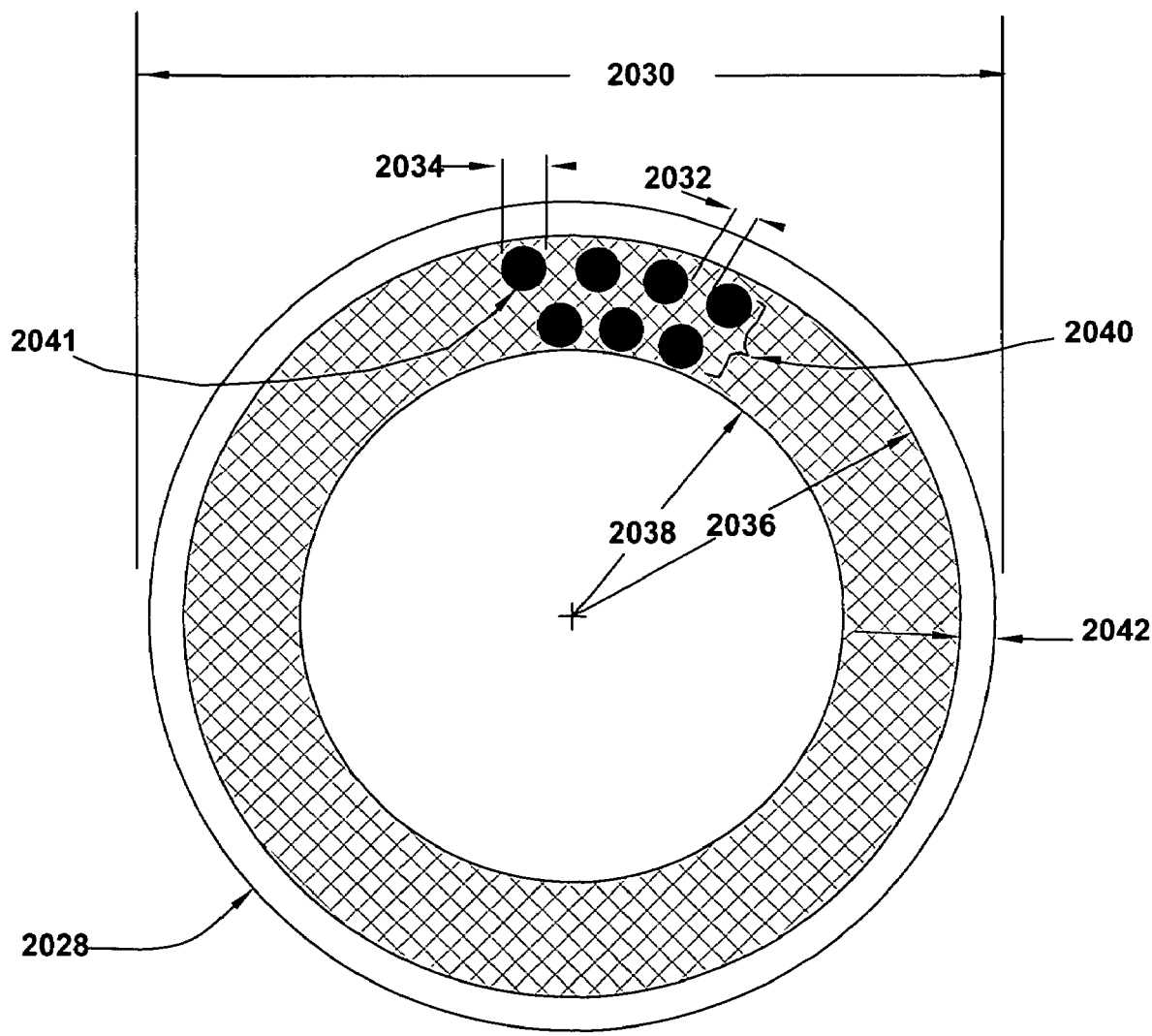
FIG. 106 is a top view of a disk having an annular band of raised islands.

FIG. 106 is a top view of a disk having an annular band of raised islands. The abrasive disk 2028 has an annular band 2040 of raised island structures 2041 where the annular band 2040 has a inner radius 2038 and a outer radius 2036 and a outer border area band 2042 that is free of the raised islands 2041. The islands 2041 have island diameters 2034 and gap spaces 2032 between the islands 2041. The disk 2028 has a disk diameter 2030.

Figure 107:
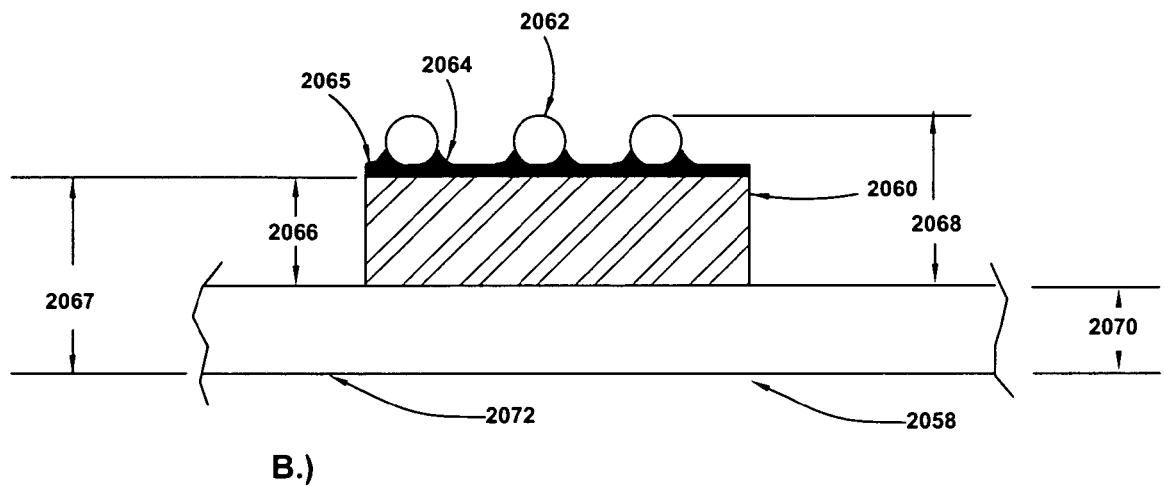
FIGS. 107A and 107B are side views of abrasive raised islands on a backing.
Figure 107:
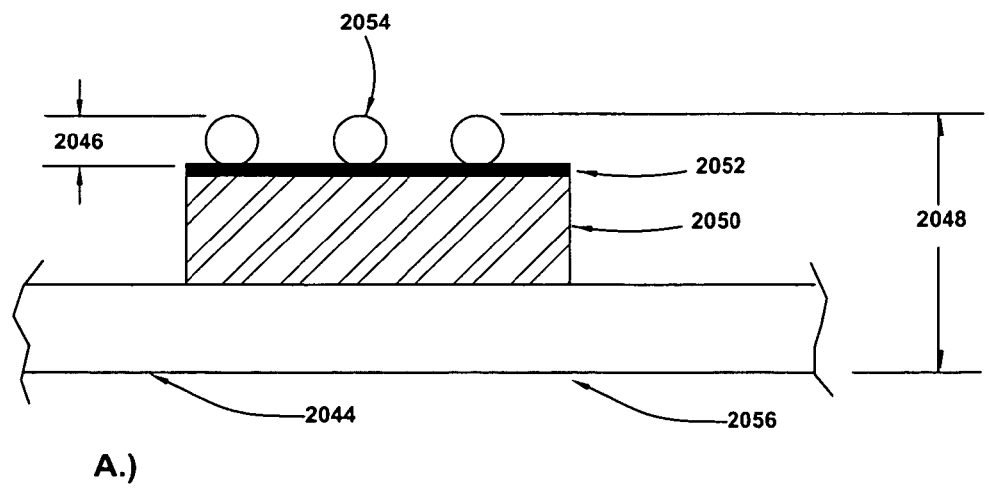

FIGS. 107A and 107B are side views of abrasive raised islands on a backing. FIG. 107A shows a raised island 2050 having a resin layer 2052 that supports abrasive particles or abrasive agglomerates 2054 having a diameter 2046. The islands 2050 are attached to a backing sheet 2044 to form a abrasive article 2056 which has a abrasive article thickness 2048. FIG. 107B shows a abrasive article 2058 having an attached raised island 2060 having a abrasive slurry coating 2064 made up of abrasive particles or abrasive agglomerates 2062 supported in a resin 2065. The thickness 2067 of the article 2058 island structure 2060 is shown measured from the top surface of the uncoated island structure 2060 to the bottom support surface of the backing 2072. The abrasive coated island height 2068 is measured from the top of the abrasive 2062 to the island 2060 side of the backing sheet 2072 and the island structure height 2066 is measured from the top of the island 2060 to the island 2060 side of the backing sheet 2072. The backing sheet 2072 has a backing thickness 2070.

Figure 108:
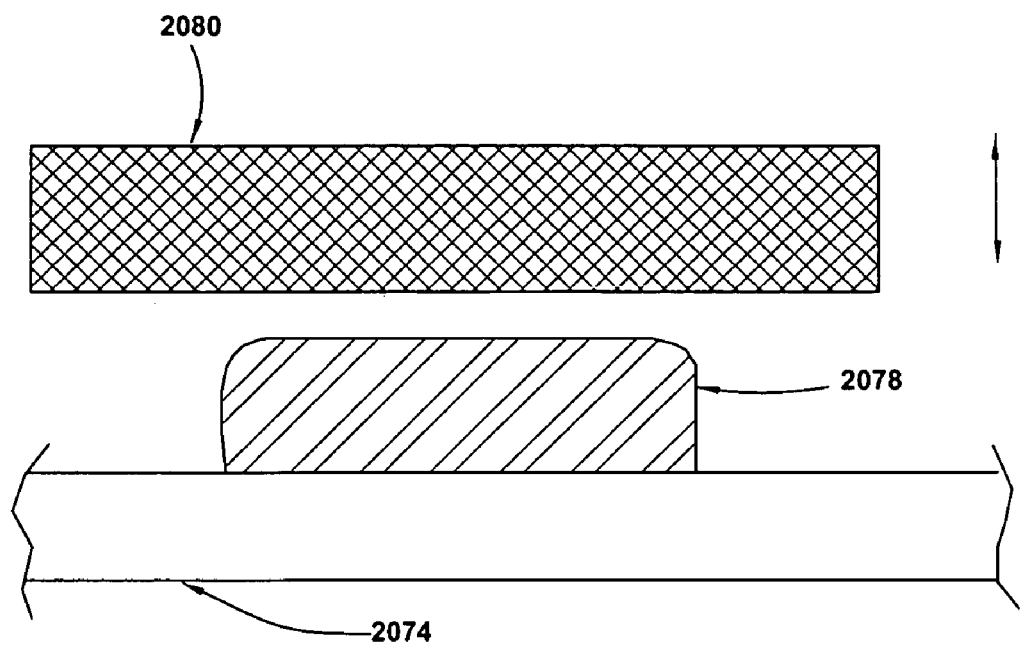
FIGS. 108A and 108B are side views of resin drop raised islands on a backing.
Figure 108:
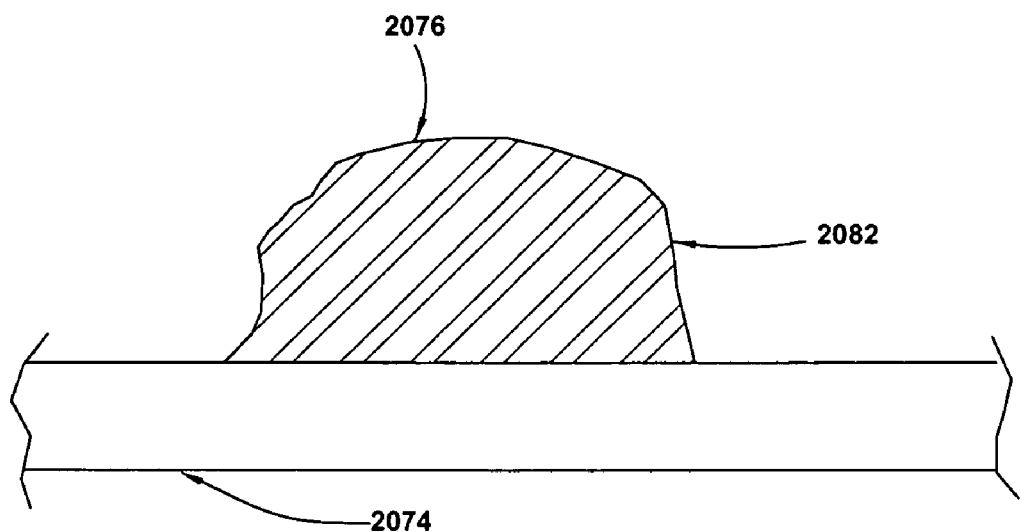

FIGS. 108A and 108B are side views of resin drop raised islands on a backing. FIG. 108A is a side view of a resin-drop 2082 raised island 2076 that is attached to a backing sheet 2074. FIG. 108B is a side view of a flat-topped resin-drop raised island 2078 that is attached to a backing sheet 2074 where the resin drop 2082 is flattened by a mold plate 2080 to create the top flattened drop island 2078.

Individual raised island abrasive articles can be cut out from web backings without disturbing the structural integrity of either the raised island structures or the abrasive coatings on the structures by cutting out the article with a cutting pattern that avoids cutting through the thickness of the raised island structure, but instead, by cutting through the thickness of the backing sheet adjacent to the raised islands.

The preferred method of manufacturing a abrasive article having abrasive particle coated raised island structures that are attached to a flexible continuous-web backing sheet material is to first produce a web having non-coated raised island structures that have island top surfaces that are precisely located in a plane that is parallel to the flat mounting side of the backing sheet. Then, it is preferred that an abrasive coating be applied to the flat surfaces of the raised islands. The same preference exists for manufacturing raised island abrasive articles from individual sheets of non-continuous-web backing material. Precisely flat abrasive island structures that are attached to a backing sheet are first manufactured and then these island structures are coated with abrasive particles or abrasive agglomerates. If uncoated island structures can be produced sufficiently flat in a common plane that is precisely parallel to the back mounting surface of a backing sheet the structures can be coated with a monolayer of abrasive particles or abrasive agglomerates where the coated abrasive article will also have a precision thickness as measured from the top surface of the abrasive to the backside of the backing if each equal sized abrasive particle is attached directly to the planar surface of the island structures with no resin gap space between the particle and the island surface. The required flatness of the uncoated island structures is related to the size of the abrasive particles or agglomerates that are coated in a monolayer onto the structure surfaces. A very large particle diameter size allows the possibility of having less accurate island structure height or thickness control as most of a particle would be consumed by abrading action before a workpiece contacted the uncoated portion of the surface of a raised elevation out-of-plane island structure. The thickness tolerance of the allowable variation of island structure thickness can be defined as a percentage of the diameter or equivalent diameter of the abrasive particles or abrasive agglomerates that are coated on the island structures. The goal is to coat a structure with a monolayer of abrasive particles or abrasive agglomerates and then to utilize most of the volume quantity of hard abrasive material that is contained in each abrasive particle. Spherical shaped abrasive particles or abrasive agglomerates offer an advantage over square block or truncated pyramid shaped particles in that the sphere shape presents the volume bulk of abrasive material to a workpiece at a distance equal to the sphere radius at a elevation removed from the top surface of the island structure. These spheres all tend to consistently contact the structure surface at a sphere contact point that provides a uniform height location of each sphere above the structure surface. Most of the sphere abrasive material volume is located at the center of the sphere that is positioned above the sphere island structure contact point by a distance equal to the sphere radius. It is preferred that the standard deviation in the uncoated island structure thickness which is measured from the top of the uncoated raised island surface to the back mounting side of the backing sheet be less than 80% of the equivalent diameter of the abrasive particles or agglomerates that are to be coated on the structures. It is more preferred that the standard deviation be less than 50% and even more preferred that the deviation be less than 30%. If a thin resin coat is first applied to island structure surfaces and abrasive particles are drop coated or electrostatic propelled into the resin coat it is important that the particles have a consistent penetration into the resin coat material to maintain the uniform flatness and described thickness of the abrasive article coating. Drop coating abrasive particles into thick resin coatings or into non uniform thickness resin coatings can create abrasive article thickness control problems as some particles may penetrate deeply into the resin and some other particles may reside on the top surface of the thick resin coating which can result in non precise abrasive article thickness at portions of the article abrasive surface. If a slurry mixture of a polymer resin and abrasive particles or abrasive agglomerates is coated on the island structures, it is important that the coating is applied with techniques that provide a uniform precision thickness of the finished abrasive coated article. It is difficult to adjust the precision thickness of the abrasive coatings to compensate for non-flat surfaces of the island structures. There are many different methods and combinations of methods that can be used to manufacture flexible sheet abrasive articles having raised island structures that can have many article forms including but not limited to continuous abrasive surfaced disks, annular abrasive surfaced disks, rectangular sheets, long strips or bands, and continuous belts that have precision thickness abrasive coated islands which allow them to be used in precision low or high speed grinding and lapping operations. Some methods and combinations of methods of manufacturing are described here in detail but many other combinations that are not described can also be used create these precision thickness raised island abrasive articles.

The invention may be summarized as including at least a workpiece holder for supporting a workpiece during lapping or grinding of a surface of the workpiece, the workpiece holder having a recess in a rotating gimbal that has a spherical center of rotation with a diameter of rotation, the workpiece being supported in the workpiece holder so that a geometric center of a surface of the workpiece that is to be lapped lies in a plane that is within 20% of the diameter of the spherical rotation as measured from the spherical center of rotation during initiation of abrasion of that surface. Another aspect of the invention includes a process for lapping a workpiece on a circular or annular abrasive sheet, rotating the abrasive sheet at a speed of at least 500 revolutions per minute while a surface of the workpiece is in contact with the abrasive sheet, wherein the outside diameter of the abrasive sheet in contact with the workpiece is at least 25 cm, and the width of an area of abrasive on the sheet that may contact the workpiece is at least 3.5 cm, wherein abrasive action on a surface of the workpiece that is being abraded is equalized between portions of the surface of the workpiece that are more exterior with respect to the abrasive sheet and portions that are more interior with respect to the abrasive sheet, the equalization being increased by rotating the workpiece so that rotation of a radially outer edge of the workpiece rotates in the same direction of rotation as the rotation of the abrasive sheet, the rotation of the workpiece effectively bringing the relative tangential speed of movement between the abrasive sheet and the workpiece at the radially outward portion of the workpiece surface closer in relative tangential speed between the abrasive sheet radially interior portion and the sheet radially exterior portion, as compared to the relative tangential speeds when a workpiece is not rotated.

Also included is a process of lapping a surface on a rotating workpiece on an annular band of an raised island abrasive on a support surface of a sheet mounted on a rotating platen by rotating the sheet at a speed of at least 500 rpm to provide a moving platen abrasive surface, wherein the surface of the rotating workpiece is less wide than the width of the annular band of the abrasive mounted to a rotating platen, the workpiece is oscillated across the surface of the annular band back and forth between or slightly in excess of the inner and outer radial edges of the annular band while the workpiece is in lapping contact with said moving platen abrasive surface, using a gimbal or spherical action workpiece holder rotatable spindle to support the workpiece. That process may include a workpiece holder rigidly fixing the workpiece to the workpiece holder rotatable spindle axis.

An apparatus is described for providing spherical motion to a workpiece being supported during a surface abrading procedure, the apparatus comprising:

a) a workpiece holder mechanism that rotates about a center of rotation of spherical action, the center of rotation being offset from the mechanism and a surface of the workpiece that is to be abraded lies within 20% of a diameter of the spherical rotation;

b) the workpiece attached to a rotor having a three-point construction of a set of at least three separate island legs that define a spherical support area underneath the island legs, the spherical support area having a common center with the workpiece holder mechanism spherical center;

c) a rotor housing having a three-point construction with a set of at least three separate island legs that define a second spherical support area by at least three arc segment areas under the at least three legs, with the second spherical support area having a common center with the workpiece holder mechanism spherical center;

d) leg defining edge boundaries of the island legs of both the spherical rotor and the island legs of the rotor housing being aligned, where the leg boundaries for the two sets of island legs are in alignment;

e) a fluid passageway in the center of each of the three rotor housing support island leg arc area segments to allow injection of a fluid into the arc segment area surfaces common to both the rotor and the rotor housing to create a separation of the rotor from the housing by a very thin layer of fluid that is less than 0.2 mm in thickness, when the fluid is injected by high pressure into the joint areas, through the passageway;

f) the spherical rotor is restrained from single degree of freedom motion, with respect to the rotor housing, about an axis extending through the workpiece holder spindle rotation axis anti-lineal rotation by use of a linkage arm which has a low friction pivot joint at one end of the arm attached to an outer portion of the spherical rotor and the other end of the linkage arm attached to an outboard portion of the rotor housing by a low friction low friction pivot joint. That apparatus may include a construction where the spherical rotor is restrained in direct contact with the spherical rotor housing at all three island leg mutual spherical arc segment contact surface areas by an extension spring, sufficiently strong to overcome the forces of gravity on both the rotor and the rotor mounted workpiece, which is attached at one spring end to the rotor at a position close to the workpiece and which is attached at the other spring end to the rotor housing on an axis located at the center of the spring length aligned coincident with the workpiece holder rotating spindle axis. That apparatus may also have pressurized gas is injected into each of the three spherical area arc segments for all of at least three island legs to create a gas bearing fluid film between the rotor and the rotor housing, or where pressurized liquid is injected into each of the spherical area arc segments of the at least three island legs to create a liquid bearing fluid film between the rotor and the rotor housing. That apparatus may also have a rotor retention spring is strong enough that the rotor is rigidly locked into the rotor housing by friction forces on the three island leg arc segments, when pressurized fluid is not injected into the rotor housing island fluid bearing joints, so that no movement of the rotor relative to the rotor housing occurs when a rotor mounted workpiece is polished or ground as it contacts a moving abrasive. The apparatus may have the spherical rotor is constructed of aluminum, titanium or composite material. That apparatus may also have a moat style groove is created around the arc segment area center feed hole is surrounded and water or other fluid exiting the fluid bearing joint is collected with the use of a vacuum suction line. The apparatus may be used for use in abrasive slurry grinding or lapping of a workpiece or is employed as a workpiece holder for use in chemical mechanical polishing material removal from the surface of a workpiece.

A method is also described of leveling a platen on an annular lapping ring area on a rotatable platen, wherein the annular lapping ring area has an inner radius that is greater than 30 percent of an outer radius of the annular lapping ring area, wherein the platen is periodically, in between uses, machined flat after the platen has been mounted on a lapping machine platen spindle. That method may have the platen is machined flat by use of a lathe cutting tool or by use of an abrasive grinding apparatus.

A lapping system of the invention comprises:
a) a rotary workpiece holder which is mounted on a rotating spindle which is attached to a vertical slide;
b) a lapping machine frame;
c) an abrasive sheet mounted on a rotary platen attached to a lapping machine frame;
d) position sensors are attached between machine members to sense the deflection of members relative to other members during lapping, polishing or grinding to determine the status of the lapping or grinding procedure as it is applied to a workpiece.

This system may have process variables that are changed or the lapping process is terminated as a function of the movement or displacement between machine members during the lapping procedure during lapping as a function of the movement or displacement between machine members changed during the process procedure. That system may include a process where the process variables are selected from the group consisting of abrasive particle material type, width of abrasive annular ring, type of abrasive sheet including island type or flat coated type, rotation speed of the platen, rotation speed of the workpiece, contact pressure between the workpiece and the abrasive sheet, the length of time of the operation of the process, type of lubricant used, amount of lubricant applied, amount of fluid flow, and rate of fluid flow. The system where a non-contact sensor measures the deflection of a workpiece holder spindle away from a workpiece holder vertical slide, to which said holder is mounted, in a direction of the vector representing the abrasive platen speed at a location of the abrasive contact with the workpiece surface or a sensor measures the deflection of said workpiece holder mechanism vertical slide away from the machine frame during the workpiece lapping process procedure. In that system, there may be displacement sensors present and the displacement sensors used are a) capacitance gauges or b) air gauges using a constant air flow rate acting against gage components attached to two different machine component members to produce air pressures which reflect the positional relative change of displacement between two machine members, machine tool displacement sensors, laser gages, and other gages.

Another aspect of the invention is a flexible, continuous abrasive sheet disk comprising a flexible backing sheet with an annular band of raised abrasive particles where inner said band radius is greater than 30% of the outer said band radius, the abrasive particles comprising islands of a first structural material having a top surface, the top surface having at least a monolayer of abrasive particles supported in a polymeric resin, the height of all islands measured above the surface of a backing has within all 1 cm width annular bands having a standard deviation in height of less than 0.03 mm, and a total thickness of the abrasive island measured from a top surface of the abrasive to a support surface of the backing sheet within all 1 cm width annular bands has a standard deviation in thickness of less than 0.03 mm.

That abrasive disk may have a standard deviation in said height and said thickness is less than 0.01 mm, and the annular array of islands may be made up of circular island shapes. Alternatively, the annular band of raised abrasive particles is made up of narrow serpentine shapes extending radially outward or chevron-bar shapes or diamond configuration shapes.

Also described is a thin flexible abrasive disk with an annular band of raised abrasive top-surface coated particle islands which are positioned with less than 0.5 cm gap spacing between the edges of islands measured in a tangential direction islands, the islands positioned at least around the outer periphery of the disk, wherein the annular band of islands is made up of island shapes that are arranged with a tangentially non-uniform or tangentially non-repeating spacing between individual islands. That disk may have spacing between islands varies among at least 10% of islands on the tangential path by tangential spacing by at least 10% of average spacing between island edges on that tangential path. The abrasive disks may have a single shape configuration is used but certain of the island shapes are smaller in size than others.

Also described is an abrasive disk having an array of raised, shaped islands positioned in an annular ring on a backing sheet with the disk outer peripheral gap border area free of the raised island array and with the array of islands extending to within 0.2 cm to 3.0 cm of the outer radius of the disk, leaving an outer annular border ring free of abrasive islands. The abrasive disks may have islands having widths measured in a tangential direction ranging from 1 mm to 7 mm or where the open gap measured in a tangential direction between adjacent islands is between 0.2 mm to 4.0 mm. The disks may have plateau heights of the islands measured from the top of exposed abrasive particles to an upper surface of the backing, on a backing side closest to an island foundation, is 0.1 mm to 1.0 mm. The flexible abrasive disks may have the backing sheet is made of a metal, composite or polymeric material.

A process of making a disk backing having non-abrasive island foundations thereon comprising providing a flexible backing continuous over its full diameter with a layer of material thereon, chemically machining or chemically etching of islands onto the layer of material, forming a disk backing with an annular ring distribution of islands having flat top surfaces, leaving an annular array of islands raised above the backing surface in an annular array.

The process of some embodiments of this invention may have vertical edges of island walls are tapered to provide that the top surface of the island is smaller than the base of the island at the location where the island base joins with the backing. Also, the process may use uncoated island base foundations that are flat and the thickness has tolerances (standard deviations) to within ±0.02 mm, measured from the backside of the backing, and then applying abrasive particles to the surface of the islands. For example, island base foundations are precision thickness resin coated by a web transfer coating process where a coated transfer web is pressed into conformation in uniform contact with the nominally flat top surfaces of the array band of raised islands until the resin wets a top surface on each island, after which wetting the coated web transfer sheet is removed, leaving at least 5% of the resin attached as a uniform layer on the island top surfaces. Such coating process may, for example only, include the coated transfer webs manufactured by knife, gravure, roll or other coating process technique.

An abrasive disk is described with an outer annular array of raised island shapes where the island disk foundation is top coated with a monolayer of diamonds or other hard abrasive particles at least 7 up to 400 micrometers in average particle diameter. Also described is an abrasive disk with an outer annular array of island shapes where each island base foundation is top coated with a layer of diamond or other hard abrasive particles that are smaller than 10 micrometer, where the diamonds are stacked or partially stacked into a single coated layer that is approximately 10 micrometers thick. That abrasive disk may have hard abrasive particles are attached to the island base foundation top flat surfaces by drop coating onto or electrostatically coating a wet surface partially cured state make coat resin, followed by a size coat coated over and surrounding the diamonds attached to the make coat, and the abrasive disk may have the size coat applied by a transfer coat process or a spin coat process or a spray coat process. Also in that process, a supersize coat may be applied by spin coating or by transfer sheet coating or a spin coat process or a spray coat process.

Another abrasive disk of the invention is where raised island base foundation material comprises a particle filled resin or a non-particle filled resin. Also described is an abrasive disk having a metal backing thickness of 0.05 mm to 0.5 mm thick with an outer annular array of island shapes with small enough diameters and wide enough spacing between the island shapes over a range of metal material modulii of elasticity stiffness characteristics so that the disk maintains the nominal flexibility of a thin disk backing to successfully conform to the flat surface of a abrasive rotatable platen where said disk has precision height, electrically conductive island foundations and a thin layer of diamond or other hard abrasive particles electroplated to the island top surfaces. Also described is a flexible, continuous abrasive sheet web comprising a flexible backing web sheet with an full web width band of raised abrasive particles, the abrasive particles comprising island of a first structural material having a top surface, the top surface having at least a monolayer of abrasive particles supported in a polymeric resin, the height of all islands measured above the surface of a backing is within all 1 cm width web-length strands having a standard deviation in abrasive particle coated islands height of less than 0.01 mm and a total thickness of the abrasive island measured from the top surface of the abrasive to the bottom of the backing sheet within all 1 cm width annular bands having a standard deviation in thickness of less than 0.03 mm. That abrasive disk may have the height of fluid non solidified island foundations precisely controlled relative to the backside of the abrasive flexible backing sheet by use of two mold plates having matching surfaces precisely flat relative to each other wherein the backside of the abrasive backing sheet is attached to the precise flat surface of one matching mold plate and the precise flat surface of the other matching mold plate is brought into contact with the non solidified island foundations thereby driving the top of the island foundation down in height until the precision surface of one of the mold plates is in direct contact with precision thickness gap spacers attached to the precision surface outer periphery of the other matching mold plate to effectively establish the height of all of the island foundations such that the height of the island foundation measured above the surface of the backing sheet plus the thickness of the backing sheet together equal the thickness of said precision gap spacers.

Another process is described comprising:
a) a circular disk hole plastic or metal font sheet used to produce an array of island base foundation shapes in an annular ring band on an abrasive article disk backing sheet;
b) the font sheet having the nominal thickness of the desired height of the island bases;
c) with through holes in the font sheet of the diameter or island cross sectional shape;
d) where each hole is positioned at the location of each island;
e) the font sheet attached flat to a disk backing sheet;
f) the holes in the font sheet filled level to the font sheet top surface with adhesive particle filled or unfilled resin material;
g) using phenolic, polyimide, polyester, epoxy or other resins with or without the use of solvents;
h) after partial solidification of the resin by heat, light, electron beam, laser, or other curing or drying, the font sheet is separated from the backing sheet leaving raised islands in an annular band which are adhesively attached to the backing sheet;
i) the resin island foundations are fully solidified by heat, light, electron beam, laser curing or drying.

That process may have the island hole font sheet constructed of magnetic materials including steel or magnetic stainless steel and a flat magnet surface used to clamp the font sheet flat and conformably tight to a backing disk sheet for application of island foundation resin material into the font sheet holes to form an array of raised island foundations which are adhesively attached to the backing sheet to form an annular band of raised islands on said backing disk sheet.

Another process is where a continuous perforated hole font belt is used to print island foundations on a continuous web backing with the holes in the belt having the desired configuration of the island surface shape and the thickness of the belt corresponding to the raised height of each island foundation, as measured from the top surface of the web backing. That process may additionally be practiced where the holes in the font have tapered walls with a smaller opening at the top and a larger opening at the bottom, the bottom of which is in direct contact with the backing surface, which will form an island with tapered walls where the top flat surface is less wide than the base. In that process, an option includes a font made of a magnetic material such as steel or certain magnetic stainless steels.

A process is also described where an annular band of island foundations on a disk backing is created by a pin head coater, the process comprising:
a) providing an annular array of small pins having diameters ranging from 1 mm to 10 mm which are attached rigidly to a circular pin head holder, or in a fashion which allows free but limited range of motion axial motion of the pins within the pin head holder, having the free ends of the pins extending some distance away from said holder;
b) the pin head holder is positioned to insert the free pin ends into a vat of island foundation particle filled or unfilled resin liquid material sufficient to wet the free end of the pins some distance up from the end of the pin with a consistent controlled drop volume of foundation liquid attached to each pin end;
c) the pin head is then positioned vertically over a target flexible disk backing sheet attached horizontally to a flat surface and lowered until all of the pins contact the backing sheet surface, wetting each pin site on the backing sheet with a consistent sized drop of liquid foundation adhesive resin fluid;
d) after raising the pin head, the drops of foundation material are stripped from each pin and then deposited on the backing sheet to form an array pattern of island foundations on the backing sheet.

That process may have the island foundation resin material solidified by heat, light or other curing processes or dried to form strong rigid island foundations having raised heights measured from the backing surface of from 0.1 mm to 1.0 mm and diameters ranging from 1 mm to 10 mm. That process may be practiced where the island foundations are machined or ground to a precise height as measured from the bottom surface of the backing to effect a precision thickness common to each island foundation where the thickness is measured from the flat top of each island to the bottom side of the backing in a area within 1 cm of the island foundation. That process may also include island base foundations precision thickness resin coated by a web transfer coating process where a coated transfer web is pressed conformally in uniform contact with the nominally flat top surfaces of the array band of raised islands until the resin wets each island top surface after which the coated web transfer sheet is removed, leaving at least 35% of the resin attached as a uniform layer on the island top surfaces. That process may have the coated transfer sheet is manufactured by spin coating. The process may be practiced where the disk backing having an outer annular array of raised island shapes where the island foundation tops are coated with a monolayer of diamonds or other hard abrasive particles at least 7 up to 400 micrometers in average particle diameter. The process may be practiced where the disk backing having an outer annular array of island shapes where the island foundation tops are coated with a layer of diamond or other hard abrasive particles that are smaller than 10 micrometer, where the diamonds are stacked or partially stacked into a single coated layer that is approximately 10 micrometers thick. The abrasive disk may have hard abrasive particles attached to the island base foundation top flat surfaces by drop coating onto or electrostatic coating a wet surface partially cured state make coat resin, followed by a size coat coated over and surrounding the diamonds attached to the make coat. The abrasive disk may have a size coat is applied by a transfer coat process or a spin coat process or a spray coat process. The abrasive disk may have a super-size coat is applied by spin coating or by transfer sheet coating or a spin coat process or a spray coat process.

A process is described where abrasive grinding or lapping having water coolant is applied on the abrasive surface where the grinding, lapping or polishing is completed in a closed environment with reduced atmospheric pressure of 10 cm mercury or more up to 25 cm mercury. That process may have an additive is added to the water coolant to lower the vapor boiling pressure of the new water mixture.

Another abrasive article is described with flexible backing and annular bands of raised island foundations, the raised island foundations having flat top surfaces that may be coated with a mono layer of abrasive particles which raised island foundations are distributed in the approximate form of a disk with petal spokes extending radially outwardly from a common backing center, where only the outer radial 70 percent of the outside disk diameter annular portion of the disk petals of the daisy-wheel is covered with abrasive islands and the corresponding inner radial 30 percent portion of the disk backing is free of abrasive islands. In that construction each petal spoke may be separated and divided circumferentially to form a specialty daisy-wheel abrasive article for grinding or lapping concave or convex surfaces on glass or plastic lenses.

Also described is a flexible, continuous abrasive sheet web comprising a flexible backing web sheet with an full web width band of raised island foundation material structures, the abrasive structures comprising an island of a first structural material having a flat top surface, the height of all island structures measured above the surface of a backing, have a standard deviation in structure islands height of less than 0.01 mm. That abrasive web may have a standard deviation in this defined height of less than 0.03 mm. The height and thickness measurements are typically made in localized areas of a continuous web that are approximately the size of an abrasive article that is manufactured from the web sheet. These measurements are usually made on a sample basis at discrete locations rather than being made for a whole continuous area surface. The measurements are used to verify that either the island height or the web sheet thickness meets the desired tolerance in variation from a nominal value. This variation can be described as a simple deviation from a nominal value or as a allowable tolerance in the value from a nominal value or as a standard deviation from a nominal value. The variations or deviations can define areas that are higher or thicker than the nominal or they can define areas that are lower or thinner than the nominal. High or thick areas can produce bumps to a workpiece and low or thin areas can result in the avoidance of contact with some of the abrasive by a workpiece during an abrading process. For an abrasive disk article, the height and thickness measurements would typically be made in a web surface circular area that is larger than the circular disk that is cut from the disk. In general, for abrasive disk or rectangular sheet or belt or strip or other articles, it is preferred that the measurements would be made in a web surface area that is larger than the article that is cut from the web. Web backing sheet measurements of either the height of the web attached island structures above the web surface or the total web thickness of a web sheet having abrasive coated islands or of the total web thickness of web sheet having non-coated island structures can be made on narrow strands of web that continue downstream along the length of web backing material or these measurements can be made on cross-web strands that span the width of the continuous web material. For the case of a circular disk raised island article these same height and thickness measurements can also be made on annular bands. When the thickness and height measurements are made on all 1 cm width annular band strips on a disk having an annular band of raised islands, it is possible that 1 cm wide annular bands may be selected where the 1 cm wide bands can overlap each other and a sequential series of these overlapped bands can collectively cover the whole surface of the annular band of raised islands. If the thickness and height measurements are collectively made on all of the overlapping annular 1 cm wide band strips, or if the measurements are made on all 1 cm wide annular bands of a disk article these descriptions of the locations of the position areas of the measurements are equivalent to the method of making measurements on the whole annular band of raised islands. Thus, measurements can equivalently be defined as being made on a full annular band surface area or as made for all 1 cm wide annular bands. Furthermore, these web thickness and island height annular band measurements may be made on a continuous web sheet having attached raised islands even though the web is not in the form of a circular disk article. As it is preferred that the coated abrasive island surfaces all lie in the same flat plane, it is also preferred that all thickness and height measurements of a disk be made for the whole raised island annular band surface area, not within the limited area of a single, or more, 1 cm wide annular strips. In all cases, the measurements are made to verify that the raised island structures are flat and of uniform enough height to allow: the effective coating of very thin abrasive materials; or to verify that the finished abrasive article thickness variations are adequate to produce flat workpiece lapping or grinding; and to utilize all of the abrasive particle material that is coated on the raised islands. If desired, web thickness and raised island height measurements can be made in annular band patterns on a rectangular or other array pattern of raised islands that are attached to rectangular shaped sheet or strip shaped articles having a non-circular backing.

The raised islands that are attached to the web backing can be located in rectangular island array patterns where islands extend across the full surface area of the web backing. The islands can also be arranged in array patterns where the islands are located only on certain portions or at specific areas of the web surface. Island array patterns can include annular bands that allow circular disks to be cut from continuous web sheets.

Also described is a flexible, continuous non-abrasive sheet disk comprising a flexible polymeric or metal backing sheet having an annular band array of non-abrasive raised island structures, the structures comprising islands of a first structural material having a raised flat top surface, wherein the total thickness of all islands measured from the flat top surface of each island to the bottom support surface of the backing sheet has a standard deviation in island thickness of less than 0.02 mm. That island disk may have an array of non-abrasive islands made up of circular island shapes. That disk may also have non-abrasive islands that have a standard deviation in islands thickness of less than 0.013 mm.

Another disk is described where a flexible, continuous abrasive sheet disk comprising a flexible polymeric or metal backing sheet having an annular band array of raised abrasive structures where the inner annular band radius is greater than 30% of the outer annular band radius, the abrasive structures comprising islands of a first structural material having a raised flat top surface, the island top surface having a top coating of at least a monolayer of abrasive particles or abrasive agglomerates supported in a polymeric resin, wherein the heights of all islands measured from the flat top surface of each abrasive coated island to the island-side surface of the backing sheet has a standard deviation in abrasive particle coated island height of less than 0.03 mm. That disk may have island heights having a standard deviation in abrasive particle coated island heights of less than 0.01 mm. That disk may also have an annular array of islands made up of circular island shapes. Additionally, that disk may have island structures that are top coated with a slurry mixture comprising abrasive particles or abrasive agglomerates and a polymer resin. Further, a process of resin coating that abrasive disk is described where the top exposed surfaces of the island foundation structures are precision thickness polymeric resin coated by a sheet transfer coating process where a liquid-state resin coated transfer sheet is pressed into conformation in uniform contact with the nominally flat top surfaces of the array of raised islands until the resin wets the full top surface area of each island, after which wetting the coated transfer sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. In addition, a process of abrasive slurry coating that abrasive disk is described where the top exposed surfaces of the island foundation structures are precision thickness abrasive slurry resin mixture coated by a sheet transfer coating process where a liquid-state abrasive resin slurry mixture coated transfer sheet, the slurry mixture comprising abrasive particles or abrasive agglomerates and a polymer resin, is pressed into conformation in uniform contact with the nominally flat top surfaces of the array of raised islands until the slurry mixture wets the full top surface area of each island, after which wetting the coated transfer sheet is removed, leaving at least 5% of the abrasive slurry mixture within the island areas of contact attached as a uniform layer on the island top surfaces. That disk may have islands where the height of the islands is from 0.1 to 1.0 mm. Also, that disk may be used to abrasively flat lap a workpiece surface.

Another disk is described where a flexible, continuous abrasive sheet disk comprising a flexible polymeric or metal backing sheet having an annular band array of raised abrasive structures where inner said band radius is less than 30% of the outer said band radius, the abrasive structures comprising islands of a first structural material having a raised flat top surface, the island top surface having at least a monolayer of abrasive particles or abrasive agglomerates supported in a polymeric resin, wherein the total thickness of all islands measured from the flat top surface of the islands to the bottom support surface of the backing sheet has a standard deviation in islands thickness of less than 0.01 mm. That disk may have an annular array of islands made up of circular island shapes. Further, that disk may have island structures that are top coated with a slurry mixture comprising abrasive particles or abrasive agglomerates and a polymer resin. Also, a process of resin coating that abrasive disk is described where the top exposed surfaces of the island foundation structures are precision thickness polymeric resin coated by a sheet transfer coating process where a liquid-state resin coated transfer sheet is pressed into conformation in uniform contact with the nominally flat top surfaces of the array of raised islands until the resin wets the full top surface area of each island, after which wetting the coated transfer sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. In addition, another process is described which is a process of abrasive slurry coating that abrasive disk where the top exposed surfaces of the island foundation structures are precision thickness abrasive slurry resin mixture coated by a sheet transfer coating process where a liquid-state abrasive resin slurry mixture coated transfer sheet, the slurry mixture comprising abrasive particles or abrasive agglomerates and a polymer resin, is pressed into conformation in uniform contact with the nominally flat top surfaces of the array of raised islands until the slurry mixture wets the full top surface area of each island, after which wetting the coated transfer sheet is removed, leaving at least 5% of the abrasive slurry mixture within the island areas of contact attached as a uniform layer on the island top surfaces. Further, a process is described where that abrasive disk is attached to a flat platen surface by the use of vacuum wherein the vacuum reduced atmospheric pressure is provided on the back support side of the disk sheet thereby attaching the disk flat surface in flat contact to the platen flat surface. Also, that abrasive disk may be used as a lapping film to abrasively flat lap a workpiece surface. In addition, the total thickness of all islands of that disk may have a standard deviation in islands thickness of less than 0.003 mm.

A disk is described where a flexible, continuous abrasive sheet disk comprising a flexible polymeric or metal backing sheet having an annular band array of raised abrasive structures where inner said band radius is less than 30% of the outer said band radius, the abrasive structures comprising islands of a first structural material having a raised flat top surface, the top surface having at least a monolayer of abrasive particles or abrasive agglomerates supported in a polymeric resin, wherein the total thickness of all islands measured from the flat top surface of the islands to the bottom support surface of the backing sheet has a standard deviation in islands thickness of less than 80% of the average diameter of the abrasive particles or abrasive agglomerates. That abrasive disk may have an annular array of islands that are made up of circular island shapes. The islands of that disk may have island structures that are top coated with a slurry mixture comprising abrasive particles or abrasive agglomerates and a polymer resin. Also is described is a process of resin coating that abrasive disk wherein top exposed surfaces of the island foundation structures are precision thickness polymeric resin coated by a sheet transfer coating process where a liquid-state resin coated transfer sheet is pressed into conformation in uniform contact with the nominally flat top surfaces of the array of raised islands until the resin wets the full top surface area of each island, after which wetting the coated transfer sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. Further, a process may be practiced where a abrasive slurry coating is applied to that abrasive disk where the top exposed surfaces of the island foundation structures are precision thickness abrasive slurry resin mixture coated by a sheet transfer coating process where a liquid-state abrasive resin slurry mixture coated transfer sheet, the slurry mixture comprising abrasive particles or abrasive agglomerates and a polymer resin, is pressed into conformation in uniform contact with the nominally flat top surfaces of the array of raised islands until the slurry mixture wets the full top surface area of each island, after which wetting the coated transfer sheet is removed, leaving at least 5% of the abrasive slurry mixture within the island areas of contact attached as a uniform layer on the island top surfaces. Another process is described for that disk where the abrasive disk is attached to a flat platen surface by the use of vacuum where the vacuum reduced atmospheric pressure is provided on the back support side of the disk sheet thereby attaching the disk flat surface in flat contact to the platen flat surface. Further, that coated abrasive disk may be used as a lapping film used to abrasively flat lap a workpiece surface. Also, the thickness of all islands on that disk that are measured from the flat top surface of the islands to the bottom support surface of the backing sheet may have a standard deviation in islands thickness of less than 50% of the average diameter of the abrasive particles or abrasive agglomerates. In addition, the thickness of all islands of that disk as measured from the flat top surface of the islands to the bottom support surface of the backing sheet may have a standard deviation in islands thickness of less than 30% of the average diameter of the abrasive particles or abrasive agglomerates.

Described also, is a flexible continuous abrasive sheet web comprising a flexible polymeric or metal backing web sheet having an full web width array of raised abrasive structures, the abrasive structures comprising islands of a first structural material having a raised flat top surface, the top surface having at least a monolayer of abrasive particles or abrasive agglomerates supported in a polymeric resin, wherein the heights of all islands measured from the flat top surface of the abrasive coated islands to the island-side surface of the web backing sheet have a standard deviation in abrasive particle coated islands height of less than 0.01 mm. The full web width array of islands on that web may be made up of circular island shapes. Also, that web may have island structures that are top coated with a monolayer of diamonds or other hard abrasive particles or abrasive agglomerates at least 7 up to 400 micrometers in average particle diameter. Further, the island structures of that web may be top coated with a slurry mixture comprising abrasive particles or abrasive agglomerates and a polymer resin. In addition, the raised island structure material of that web may comprise a particle filled polymer resin or a non-particle filled polymer resin and the island structure material flat top surfaces may be formed by mold plates or the surface may be formed by mold rolls or the surface may be machined or the surface may be abrasively ground to a precise raised island structure total web thickness wherein the web thickness is measured from the flat top surface of the non-abrasive coated island material structure to the bottom support surface of the web backing sheet. A process is described for resin coating that web wherein top exposed surfaces of the island foundation structures are precision thickness polymeric resin coated by a web sheet transfer coating process where a liquid-state resin coated transfer web sheet is pressed into conformation in uniform contact with the nominally flat top surfaces of the full web width array of raised islands until the resin wets the full top surface area of each island, after which wetting the coated transfer web sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. Another process of abrasive slurry coating that abrasive web is described where the top exposed surfaces of the island foundation structures are precision thickness abrasive slurry resin mixture coated by a web sheet transfer coating process where a liquid-state abrasive resin slurry mixture coated transfer web sheet, the slurry mixture comprising abrasive particles or abrasive agglomerates and a polymer resin, is pressed into conformation in uniform contact with the nominally flat top surfaces of the full web width array of raised islands until the slurry mixture wets the full top surface area of each island, after which wetting the coated transfer web sheet is removed, leaving at least 5% of the abrasive slurry mixture within the island areas of contact attached as a uniform layer on the island top surfaces.

Further described is a flexible, continuous abrasive sheet web comprising a flexible polymeric or metal backing web sheet having an full web width array of raised abrasive structures, the abrasive structures comprising islands of a first structural material having a raised flat top surface, the top surface having at least a monolayer of abrasive particles or abrasive agglomerates supported in a polymeric resin, wherein the total web thickness of all islands measured from the flat top surface of the abrasive coated islands to the bottom support surface of the backing sheet has a standard deviation in abrasive particle coated islands thickness of less than 0.03 mm. That web may have a full web width array of islands made up of circular island shapes. In addition, that web may have island structures that are top coated with a monolayer of diamonds or other hard abrasive particles or abrasive agglomerates at least 7 up to 400 micrometers in average particle diameter. Also, that web may have island structures that are top coated with a slurry mixture comprising abrasive particles or abrasive agglomerates and a polymer resin. Further, the raised island structure material of that web may comprises a particle filled polymer resin or a non-particle filled polymer resin. The island structures of that web may have the island material flat top surfaces formed by mold plates or the surfaces may be formed by mold rolls or the surface may be machined or the surface may be abrasively ground to a precise raised island structure total web thickness wherein the web thickness is measured from the flat top surface of the non-abrasive coated island material structure to the bottom support surface of the web backing sheet. Described is a process of resin coating that web where the top exposed surfaces of the island foundation structures are precision thickness polymeric resin coated by a web sheet transfer coating process where a liquid-state resin coated transfer web sheet is pressed into conformation in uniform contact with the nominally flat top surfaces of the full web width array of raised islands until the resin wets the full top surface area of each island, after which wetting the coated transfer web sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. In addition, a process is described of abrasive slurry coating that abrasive web where the top exposed surfaces of the island foundation structures are precision thickness abrasive slurry resin mixture coated by a web sheet transfer coating process where a liquid-state abrasive resin slurry mixture coated transfer web sheet, the slurry mixture comprising abrasive particles or abrasive agglomerates and a polymer resin, is pressed into conformation in uniform contact with the nominally flat top surfaces of the full web width array of raised islands until the slurry mixture wets the full top surface area of each island, after which wetting the coated transfer web sheet is removed, leaving at least 5% of the abrasive slurry mixture within the island areas of contact attached as a uniform layer on the island top surfaces.

A abrasive web is described where the flexible, continuous abrasive sheet web comprising a flexible polymeric or metal backing web sheet having an full web width array of raised abrasive structures, the abrasive structures comprising islands of a first structural material having a raised flat top surface, the top surface having at least a monolayer of abrasive particles or abrasive agglomerates supported in a polymeric resin, where the total thickness of all islands measured from the flat top surface of the abrasive coated islands to the bottom support surface of the backing sheet has a standard deviation in abrasive particle coated islands thickness of less than 80% of the average diameter of the abrasive particles or abrasive agglomerates. That web may have a full web width array of islands that are made up of circular island shapes. Also, the island structures of that web may be top coated with a monolayer of diamonds or other hard abrasive particles or abrasive agglomerates at least 7 up to 400 micrometers in average particle diameter. Further, that flexible abrasive web may have island structures that are top coated with a slurry mixture comprising abrasive particles or abrasive agglomerates and a polymer resin. The raised island structure material of that web may comprise a particle filled polymer resin or a non-particle filled polymer resin and the island structure material flat top surface may be formed by mold plates or the surface may be formed by mold rolls or the surface may be machined or the surface may be abrasively ground to a precise raised island structure total web thickness wherein the web thickness is measured from the flat top surface of the non-abrasive coated island material structure to the bottom support surface of the web backing sheet. Also, a process of resin coating that abrasive web is described where the top exposed surfaces of the island foundation structures are precision thickness polymeric resin coated by a web sheet transfer coating process where a liquid-state resin coated transfer web sheet is pressed into conformation in uniform contact with the nominally flat top surfaces of the full web width array of raised islands until the resin wets the full top surface area of each island, after which wetting the coated transfer web sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. Another process of abrasive slurry coating that abrasive web is described where the top exposed surfaces of the island foundation structures are precision thickness abrasive slurry resin mixture coated by a web sheet transfer coating process where a liquid-state abrasive resin slurry mixture coated transfer web sheet, the slurry mixture comprising abrasive particles or abrasive agglomerates and a polymer resin, is pressed into conformation in uniform contact with the nominally flat top surfaces of the full web width array of raised islands until the slurry mixture wets the full top surface area of each island, after which wetting the coated transfer web sheet is removed, leaving at least 5% of the abrasive slurry mixture within the island areas of contact attached as a uniform layer on the island top surfaces. Further, that continuous web sheet may be shape-cut to form circular abrasive disks and that web sheet may be shape-cut to form rectangular abrasive sheets.

A flexible, continuous abrasive rectangular shaped sheet article is described where the article comprising a flexible polymeric or metal backing sheet having an full article sheet surface area array of raised abrasive structures, the abrasive structures comprising islands of a first structural material having a raised flat top surface, the top surface having at least a monolayer of abrasive particles or abrasive agglomerates supported in a polymeric resin, wherein the total thickness of all rectangular sheet islands measured from the flat top surface of the abrasive coated islands to the bottom support surface of the rectangular backing sheet has a standard deviation in abrasive particle coated islands thickness of less than 0.03 mm. That rectangular article may have a full article area array of islands is made up of circular island shapes. A process is described where that rectangular abrasive sheet article is attached to a flat platen surface by the use of vacuum wherein the vacuum reduced atmospheric pressure is provided on the back support side of the disk sheet thereby attaching the disk flat surface in flat contact to the platen flat surface. Also, that abrasive sheet article may be used where the coated abrasive sheet is a lapping film used to abrasively flat lap a workpiece surface. In addition, that flexible abrasive sheet article may have island structures that are top coated with a monolayer of diamonds or other hard abrasive particles or abrasive agglomerates at least 7 and up to 400 micrometers in average particle diameter. Further that sheet may have island structures that are top coated with a slurry mixture comprising abrasive particles or abrasive agglomerates and a polymer resin. Also, that rectangular flexible abrasive sheet May have raised island structure material that comprises a particle filled polymer resin or a non-particle filled polymer resin and these island structure material may have flat top surfaces that are formed by mold plates or the surface may be formed by mold rolls or the surface may be machined or the surface may be abrasively ground to a precise raised island structure total sheet thickness wherein the rectangular sheet thickness is measured from the flat top surface of the non-abrasive coated island material structure to the bottom support surface of the rectangular backing sheet. A process of applying resin coating to form that abrasive rectangular sheet is described where the top exposed surfaces of the island foundation structures are precision thickness polymeric resin coated by a sheet transfer coating process where a liquid-state resin coated transfer sheet is pressed into conformation in uniform contact with the nominally flat top surfaces of the article full array of raised islands until the resin wets the full top surface area of each island, after which wetting the coated transfer sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. In addition, a process of abrasive slurry coating that abrasive rectangular sheet where the top exposed surfaces of the island foundation structures are precision thickness abrasive slurry resin mixture coated by a sheet transfer coating process where a liquid-state abrasive resin slurry mixture coated transfer sheet, the slurry mixture comprising abrasive particles or abrasive agglomerates and a polymer resin, is pressed into conformation in uniform contact with the nominally flat top surfaces of the article full array of raised islands until the slurry mixture wets the full top surface area of each island, after which wetting the coated transfer sheet is removed, leaving at least 5% of the abrasive slurry mixture within the island areas of contact attached as a uniform layer on the island top surfaces.

Also described is a flexible, continuous abrasive sheet rectangular shaped article comprising a flexible polymeric or metal backing web sheet having an full article sheet surface area array of raised abrasive structures, the abrasive structures comprising islands of a first structural material having a raised flat top surface, the top surface having at least a monolayer of abrasive particles or abrasive agglomerates supported in a polymeric resin, wherein the total thickness of all islands measured from the flat top surface of the abrasive coated islands to the bottom support surface of the backing sheet has a standard deviation in abrasive particle coated islands thickness of less than 80% of the average diameter of the abrasive particles or abrasive agglomerates. That sheet may have a full article area array of islands made up of circular island shapes. Further, a process is described where that abrasive sheet article may be attached to a flat platen surface by the use of vacuum wherein the vacuum reduced atmospheric pressure is provided on the back support side of the disk sheet thereby attaching the disk flat surface in flat contact to the platen flat surface. Also, that abrasive sheet article may be used where the coated abrasive disk is a lapping film used to abrasively flat lap a workpiece surface. That flexible abrasive sheet may have island structures that are top coated with a monolayer of diamonds or other hard abrasive particles or abrasive agglomerates at least 7 up to 400 micrometers in average particle diameter. In addition, that flexible abrasive sheet island structures may be top coated with a slurry mixture comprising abrasive particles or abrasive agglomerates and a polymer resin and the raised island structure material may comprise a particle filled polymer resin or a non-particle filled polymer resin. Further, the island structures may have island material flat top surfaces that are formed by mold plates or the surface may be formed by mold rolls or the surface may be machined or the surface may be abrasively ground to a precise raised island structure total sheet thickness wherein the rectangular sheet thickness is measured from the flat top surface of the non-abrasive coated island material structure to the bottom support surface of the rectangular backing sheet. A process of resin coating that abrasive rectangular sheet is described where the top exposed surfaces of the island foundation structures are precision thickness polymeric resin coated by a sheet transfer coating process where a liquid-state resin coated transfer sheet is pressed into conformation in uniform contact with the nominally flat top surfaces of the article full array of raised islands until the resin wets the full top surface area of each island, after which wetting the coated transfer sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. In addition, a process of abrasive slurry coating that abrasive rectangular is described where the top exposed surfaces of the island foundation structures are precision thickness abrasive slurry resin mixture coated by a sheet transfer coating process where a liquid-state abrasive resin slurry mixture coated transfer sheet, the slurry mixture comprising abrasive particles or abrasive agglomerates and a polymer resin, is pressed into conformation in uniform contact with the nominally flat top surfaces of the article full array of raised islands until the slurry mixture wets the full top surface area of each island, after which wetting the coated transfer sheet is removed, leaving at least 5% of the abrasive slurry mixture within the island areas of contact attached as a uniform layer on the island top surfaces.

What is claimed:

1. A flexible, continuous abrasive sheet web comprising a flexible polymeric sheet or flexible metal backing web sheet having an full web width array of raised abrasive structures, the abrasive structures comprising islands of a first structural material having a raised flat top surface, the top surface having at least a monolayer of abrasive particles or abrasive agglomerates supported in a polymeric resin, wherein the heights of all islands measured from the raised flat top surface of the abrasive coated islands to an island-side flat surface of the web backing sheet have a standard deviation in abrasive particle coated islands height of less than 0.01 mm.

2. The abrasive web of claim 1 where the full web width array of islands is made up of circular island shapes.

3. The flexible abrasive web of claim 1 wherein the island structures are top coated with a monolayer of diamonds or other hard abrasive particles or abrasive agglomerates at least 7 up to 400 micrometers in average particle diameter.

4. The flexible abrasive web of claim 1 wherein the island structures are top coated with a slurry mixture comprising abrasive particles or abrasive agglomerates and a polymer resin.

5. The flexible abrasive web of claim 1 wherein the raised island structure material comprises a particle filled polymer resin or a non-particle filled polymer resin.

6. The island structures of claim 5 wherein the island material flat top surface is formed by mold plates or the surface is formed by mold rolls or the surface is machined or the surface is abrasively ground to a precise raised island structure total web thickness wherein the web thickness is measured from the flat top surface of the non-abrasive coated island material structure to the bottom support surface of the web backing sheet.

7. A process of applying a resin coating to form the at least monolayer of the abrasive web of claim 1 wherein top exposed surfaces of the island foundation structures are precision thickness polymeric resin coated by a web sheet transfer coating process where a liquid-state resin coated transfer web sheet is pressed into conformation in uniform contact with the nominally flat top surfaces of the full web width array of raised islands until the resin wets the full top surface area of each island, after which wetting the coated transfer web sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin.

8. A process of applying a resin coating to form the at least monolayer of the abrasive web of claim 1 wherein top exposed surfaces of the island foundation structures are precision thickness abrasive slurry resin mixture coated by a web sheet transfer coating process where a liquid-state abrasive resin slurry mixture coated transfer web sheet, the slurry mixture comprising abrasive particles or abrasive agglomerates and a polymer resin, is pressed into conformation in uniform contact with the nominally flat top surfaces of the full web width array of raised islands until the slurry mixture wets the full top surface area of each island, after which wetting the coated transfer web sheet is removed, leaving at least 5% of the abrasive slurry mixture within the island areas of contact attached as a uniform layer on the island top surfaces.

9. A flexible, continuous abrasive sheet web comprising a flexible polymeric sheet or flexible metal backing web sheet having an full web width array of raised abrasive structures, the abrasive structures comprising islands of a first structural material having a raised flat top surface, the top surface having at least a monolayer of abrasive particles or abrasive agglomerates supported in a polymeric resin, wherein the total web thickness of all islands measured from the flat top surface of the abrasive coated islands to an upper surface of the bottom support surface of the backing sheet has a standard deviation in abrasive particle coated islands thickness of less than 0.03 mm.

10. The abrasive web of claim 9 where the full web width array of islands is made up of circular island shapes.

11. The flexible abrasive web of claim 9 wherein the island structures are top coated with a monolayer of diamonds or other hard abrasive particles or abrasive agglomerates at least 7 up to 400 micrometers in average particle diameter.

12. The flexible abrasive web of claim 9 wherein the island structures are top coated with a slurry mixture comprising abrasive particles or abrasive agglomerates and a polymer resin.

13. The flexible abrasive web of claim 9 wherein the raised island structure material comprises a particle filled polymer resin or a non-particle filled polymer resin.

14. The island structures of claim 13 wherein the island material flat top surface is formed by mold plates or the surface is formed by mold rolls or the surface is machined or the surface is abrasively ground to a precise raised island structure total web thickness wherein the web thickness is measured from the flat top surface of the non-abrasive coated island material structure to the bottom support surface of the web backing sheet.

15. A process of applying resin coating to form the at least monolayer of the abrasive web of claim 9 wherein top exposed surfaces of the island foundation structures are precision thickness polymeric resin coated by a web sheet transfer coating process where a liquid-state resin coated transfer web sheet is pressed into conformation in uniform contact with the nominally flat top surfaces of the full web width array of raised islands until the resin wets the full top surface area of each island, after which wetting the coated transfer web sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin.

16. A process of applying abrasive slurry to form the at least monolayer coating the abrasive web of claim 9 wherein top exposed surfaces of the island foundation structures are precision thickness abrasive slurry resin mixture coated by a web sheet transfer coating process where a liquid-state abrasive resin slurry mixture coated transfer web sheet, the slurry mixture comprising abrasive particles or abrasive agglomerates and a polymer resin, is pressed into conformation in uniform contact with the nominally flat top surfaces of the full web width array of raised islands until the slurry mixture wets the full top surface area of each island, after which wetting the coated transfer web sheet is removed, leaving at least 5% of the abrasive slurry mixture within the island areas of contact attached as a uniform layer on the island top surfaces.

17. A flexible, continuous abrasive sheet web comprising a flexible polymeric sheet or flexible metal backing web sheet having an full web width array of raised abrasive structures, the abrasive structures comprising islands of a first structural material having a raised flat top surface, the flat top surface having at least a monolayer of abrasive particles or abrasive agglomerates supported in a polymeric resin, where the total thickness of all islands measured from the flat top surface of the abrasive coated islands to the bottom support surface of the backing sheet has a standard deviation in abrasive particle coated islands thickness of less than 80% of the average diameter of the abrasive particles or abrasive agglomerates.

18. The abrasive web of claim 17 where the full web width array of islands is made up of circular island shapes.

19. The flexible abrasive web of claim 17 wherein the island structures are top coated with a monolayer of diamonds or other hard abrasive particles or abrasive agglomerates at least 7 up to 400 micrometers in average particle diameter.

20. The flexible abrasive web of claim 17 wherein the island structures are top coated with a slurry mixture comprising abrasive particles or abrasive agglomerates and a polymer resin.

21. The flexible abrasive web of claim 17 wherein the raised island structure material comprises a particle filled polymer resin or a non-particle filled polymer resin.

22. The island structures of claim 21 wherein the island material flat top surface is formed by mold plates or the surface is formed by mold rolls or the surface is machined or the surface is abrasively ground to a precise raised island structure total web thickness wherein the web thickness is measured from the flat top surface of the non-abrasive coated island material structure to the bottom support surface of the web backing sheet.

23. A process of applying resin to form the at least monolayer coating of the abrasive web of claim 17 wherein top exposed surfaces of the island foundation structures are precision thickness polymeric resin coated by a web sheet transfer coating process where a liquid-state resin coated transfer web sheet is pressed into conformation in uniform contact with the nominally flat top surfaces of the full web width array of raised islands until the resin wets the full top surface area of each island, after which wetting the coated transfer web sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin.

24. A process of applying abrasive slurry to form the at least monolayer coating of the abrasive web of claim 17 wherein top exposed surfaces of the island foundation structures are precision thickness abrasive slurry resin mixture coated by a web sheet transfer coating process where a liquid-state abrasive resin slurry mixture coated transfer web sheet, the slurry mixture comprising abrasive particles or abrasive agglomerates and a polymer resin, is pressed into conformation in uniform contact with the nominally flat top surfaces of the full web width array of raised islands until the slurry mixture wets the full top surface area of each island, after which wetting the coated transfer web sheet is removed, leaving at least 5% of the abrasive slurry mixture within the island areas of contact attached as a uniform layer on the island top surfaces.

25. The flexible abrasive web of claim 17 wherein the continuous web is shape-cut to form circular abrasive disks.

26. The flexible abrasive web of claim 17 wherein the continuous web is shape-cut to form rectangular abrasive sheets.

* * * * *